(12) United States Patent
Choi et al.

(10) Patent No.: US 8,865,274 B2
(45) Date of Patent: Oct. 21, 2014

(54) LIQUID CRYSTAL DISPLAY DEVICE, ALIGNMENT FILM, AND METHODS FOR MANUFACTURING THE SAME

(75) Inventors: Kyong-Sik Choi, Cheonan-si (KR);
Myung-Jae Park, Suwon-si (KR);
Min-Wook Park, Asan-si (KR);
Sung-Hoon Kim, Seoul (KR);
Gak-Seok Lee, Hwasung-si (KR);
Woo-Jung Shin, Ansan-si (KR);
Jun-Hyup Lee, Seoul (KR);
Keun-Chan Oh, Cheonan-si (KR);
Sang-Gyun Kim, Asan-si (KR);
Su-Jeong Kim, Seoul (KR);
Seung-Beom Park, Seoul (KR);
Youn-Hak Jeong, Cheonan-si (KR)

(73) Assignee: Samsung Display Co., Ltd., Yongin, Gyeonggi-do (KR)

( * ) Notice: Subject to any disclaimer, the term of this patent is extended or adjusted under 35 U.S.C. 154(b) by 0 days.

(21) Appl. No.: 13/242,001

(22) Filed: Sep. 23, 2011

(65) Prior Publication Data

US 2012/0249940 A1    Oct. 4, 2012

Related U.S. Application Data

(63) Continuation of application No. 13/018,630, filed on Feb. 1, 2011, which is a continuation-in-part of application No. 13/018,872, filed on Feb. 1, 2011.

(30) Foreign Application Priority Data

| Apr. 2, 2010 | (KR) | 10-2010-0030591 |
| May 20, 2010 | (KR) | 10-2010-0047746 |
| Jun. 4, 2010 | (KR) | 10-2010-0052878 |
| Jul. 16, 2010 | (KR) | 10-2010-0069254 |
| Nov. 30, 2010 | (KR) | 10-2010-0121019 |
| May 2, 2011 | (KR) | 10-2011-0041685 |
| Aug. 30, 2011 | (KR) | 10-2011-0087424 |

(51) Int. Cl.
*G02F 1/1337* (2006.01)

(52) U.S. Cl.
CPC .................. *G02F 1/1337* (2013.01)
USPC ......................................... 428/1.23; 349/131

(58) Field of Classification Search
CPC ............ G02F 1/1337; G02F 1/133719; G02F 2001/133742; G02F 2001/133746; C08G 77/20
USPC ........................... 428/1.2–1.23; 349/123–131
See application file for complete search history.

(56) References Cited

U.S. PATENT DOCUMENTS

| 5,256,456 A | 10/1993 | Ogawa |
| 5,969,055 A | 10/1999 | Nishikawa et al. |

(Continued)

FOREIGN PATENT DOCUMENTS

| EP | 0330428 | 8/1989 | |
| EP | 0386782 | 9/1990 | |
| EP | 386782 A2 * | 9/1990 | ............ G02F 1/1337 |

OTHER PUBLICATIONS

European Search Report dated Jul. 21, 2011 issued in corresponding European Appln. No. 11002283.7-2205.

(Continued)

*Primary Examiner* — Sophie Hon
(74) *Attorney, Agent, or Firm* — F. Chau & Associates, LLC

(57) ABSTRACT

A liquid crystal display device is provided, including a liquid crystal layer interposed between a first display panel and a second display panel; and an alignment film formed on at least one of the first and second display panels, the alignment film including first polysiloxanes and second polysiloxanes disposed on the first polysiloxanes, wherein a first portion of silicon atoms of the second polysiloxanes are bonded to vertical functional groups interacting with liquid crystal molecules in the liquid crystal layer, and to first pre-tilting functional groups aligning the liquid crystal molecules in the liquid crystal layer to be tilted with respect to at least one of the first and second display panels by being cross-linked. The bonding structure of the first and the second polysiloxanes being different.

20 Claims, 77 Drawing Sheets

(56) References Cited

U.S. PATENT DOCUMENTS

| | | |
|---|---|---|
| 6,097,463 A | 8/2000 | Chen |
| 6,495,221 B1* | 12/2002 | Ogawa et al. ............... 428/1.23 |
| 6,517,401 B1* | 2/2003 | Ogawa et al. ................. 445/24 |
| 6,679,942 B2* | 1/2004 | Ogawa ....................... 106/287.1 |
| 7,193,671 B2 | 3/2007 | Hashimoto et al. |
| 7,411,644 B2 | 8/2008 | Rho et al. |
| 7,592,052 B2 | 9/2009 | Sha et al. |
| 2003/0039768 A1 | 2/2003 | Buchecker et al. |
| 2003/0071952 A1 | 4/2003 | Yoshida et al. |
| 2003/0197819 A1 | 10/2003 | Sunohara et al. |
| 2003/0211342 A1* | 11/2003 | Nomura et al. ............... 428/447 |
| 2009/0086144 A1 | 4/2009 | Chen et al. |
| 2009/0239002 A1* | 9/2009 | Nagae ............................ 428/1.2 |
| 2009/0290109 A1 | 11/2009 | Lee et al. |
| 2010/0006538 A1* | 1/2010 | Asuke ............................. 216/23 |

OTHER PUBLICATIONS

European Search Report dated Jul. 26, 2011 issued in corresponding European Appln. No. 11002282.9-2205.

\* cited by examiner

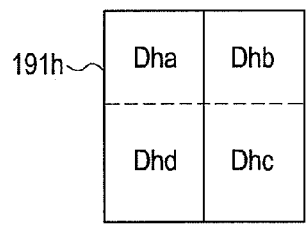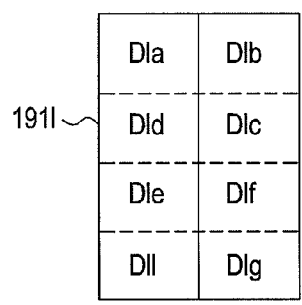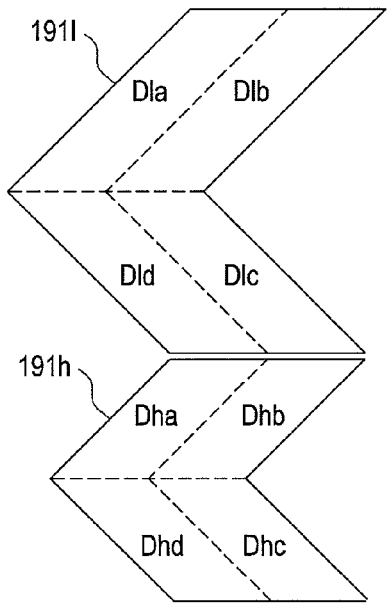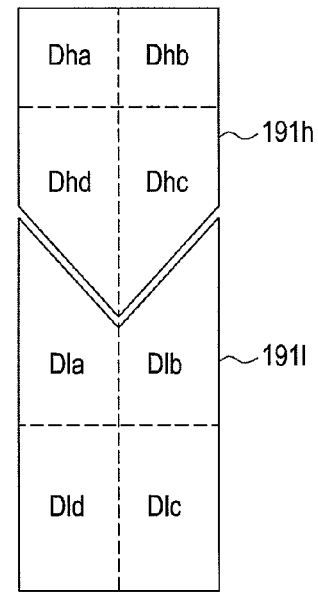
FIG.33A  FIG.33B  FIG.33C
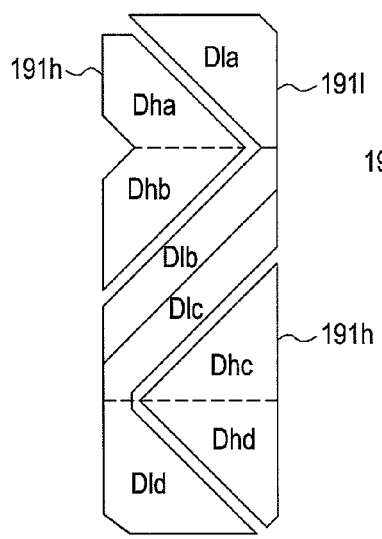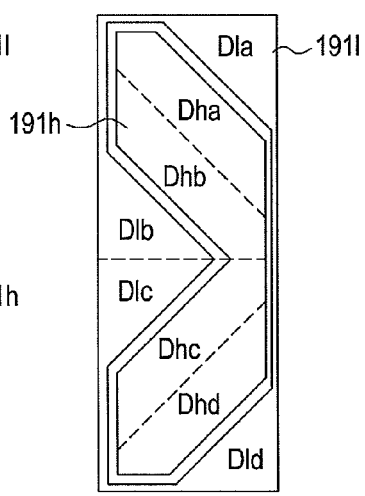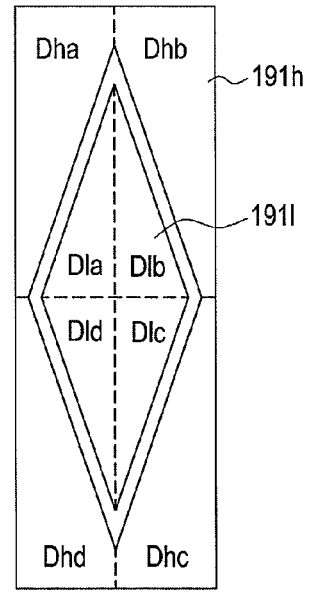
FIG.33D  FIG.33E  FIG.33F

LIQUID CRYSTAL DISPLAY DEVICE, ALIGNMENT FILM, AND METHODS FOR MANUFACTURING THE SAME

CROSS-REFERENCE TO RELATED APPLICATIONS

This application claims priority under 35 U.S.C. §119(a) to Korean Patent Application filed in the Korean Intellectual Property Office on May 2, 2011 and assigned Serial No. 10-2011-0041685 and Korean Patent Application filed in the Korean Intellectual Property Office on Aug. 30, 2011 and assigned Serial No. 10-2011-0087424, and is a continuation-in-part of U.S. Ser. No. 13/018,630 filed Feb. 1, 2011 and U.S. Ser. No. 13/018,872 also filed Feb. 1, 2011, each of the foregoing U.S. applications claim priority under 35 U.S.C. §119(a) to Korean Patent Application filed in the Korean Intellectual Property Office on Apr. 2, 2010 and assigned Serial No. 10-2010-0030591, Korean Patent Application filed in the Korean Intellectual Property Office on May 20, 2010 and assigned Serial No. 10-2010-0047746, Korean Patent Application filed in the Korean Intellectual Property Office on Jun. 4, 2010 and assigned Serial No. 10-2010-0052878, Korean Patent Application filed in the Korean Intellectual Property Office on Jul. 16, 2010 and assigned Serial No. 10-2010-0069254 and Korean Patent Application filed in the Korean Intellectual Property Office on Nov. 30, 2010 and assigned Serial No. 10-2010-0121019, the disclosures of all of the above-mentioned applications are incorporated by reference herein in their entireties.

BACKGROUND OF THE INVENTION

1. Technical Field

The present invention relates to a liquid crystal display device, an alignment film, and methods for manufacturing the same.

2. Discussion of the Related Art

In general, a liquid crystal display device may be classified into a twisted nematic type, a horizontal electric field type, and a vertical alignment type depending on the characteristics of its liquid crystal layer. A Patterned Vertically Aligned (PVA) mode has been developed to achieve a wide viewing angle. To further improve the side visibility of the PVA mode, a micro-slit mode or a Super Vertical Alignment (SVA) mode has been developed. In the SVA mode, reactive mesogen exists in the liquid crystal layer to align liquid crystal molecules. The reactive mesogen exists in the liquid crystal layer while being unhardened. The reactive mesogen, if light is irradiated thereto, is hardened, pre-tilting the liquid crystal molecules. In the hardening process, the non-hardened reactive mesogen may remain in the liquid crystal layer, increasing the persistence defect of the liquid crystal display device and thus reducing the display quality of the liquid crystal display device. Therefore, it is desirable to reduce the non-hardened reactive mesogen in the liquid crystal layer. In addition, an alignment layer capable of uniformly aligning liquid crystal molecules is also desirable.

SUMMARY

An exemplary embodiment of the present invention provides a liquid crystal display device with residual polymer reduced in a liquid crystal layer.

An exemplary embodiment of the present invention provides an alignment film for uniformly aligning liquid crystal molecules in a liquid crystal layer.

In accordance with an exemplary embodiment of the present invention, a liquid crystal display device includes a liquid crystal layer including liquid crystal molecules interposed between a first display panel and a second display panel. An alignment film formed on at least one of the first and second display panels includes first polysiloxanes and second polysiloxanes disposed on the first polysiloxanes. First portion of silicon atoms of the second polysiloxanes is bonded to vertical functional groups interacting with the liquid crystal molecules in the liquid crystal layer, and are also bonded to first pre-tilting functional groups causing the liquid crystal molecules in the liquid crystal layer to be tilted with respect to at least one of the first and second display panels. The second polysiloxanes are different from the first polysiloxanes in terms of a bonding structure.

Second portion of the silicon atoms of the second polysiloxane is bonded to second pre-tilting functional groups cross-linked to the first pre-tilting functional groups through second cross-linking chains, and a first chain length determined by a sum of the smallest number of bonds from any one of the first cross-linking chains included in the first pre-tilting functional groups to the first polysiloxane portion is longer than a second chain length determined by a sum of the smallest number of bonds from any one of the second cross-linking chains included in the second pre-tilting functional groups to the second polysiloxane portion.

The first chain length may be from about 3 times to about 7 times the second chain length.

Each of the first and second pre-tilting functional groups may comprise one or more of a vinyl group, a styrene group, a methacrylate group, a cinnamate group and an acrylic group.

The Mol % of the first pre-tilting functional groups to the second pre-tilting functional groups may be in a range from about 2:1 to about 10:1.

The first polysiloxanes are bonded to a phase separation enhancer.

The first pre-tilting functional groups may comprise a methacrylate group including an alkyl group having about 2 to about 5 carbons, and the second pre-tilting functional groups may comprise a vinyl group.

The Mol % of the first pre-tilting functional groups to the second pre-tilting functional groups may be in a range from about 1:3: to about 3:1.

The phase separation enhancer may comprise a methyl group.

The Mol % of the vertical functional groups, the first pre-tilting functional groups, the second pre-tilting functional groups, to the phase separation enhancer are present in a range from about 1:2:1:1 to about 3:10:3:3.

The second polysiloxanes may be bonded to a photoinitiator.

The photoinitiator may comprise a thiol group and an alkyl group having from 1 to about 5 carbons.

In accordance with an exemplary embodiment of the present invention, a liquid crystal display device includes a liquid crystal layer including liquid crystal interposed between a first display panel and a second display panel. An alignment film formed on at least one of the first and second display panels includes first polysiloxanes and second polysiloxanes disposed on the first polysiloxanes. The second polysiloxanes are different from the first polysiloxanes in terms of a bonding structure.

BRIEF DESCRIPTION OF THE DRAWINGS

The above and other features of the present invention will become more apparent by describing in detail exemplary embodiments thereof with reference to the accompanying drawings, in which:

FIGS. 33A to 33I are diagrams illustrating shapes and divided structures of pixel electrodes of a liquid crystal display device, according to exemplary embodiments of the present invention.

DETAILED DESCRIPTION OF EXEMPLARY EMBODIMENTS

Figure 1:
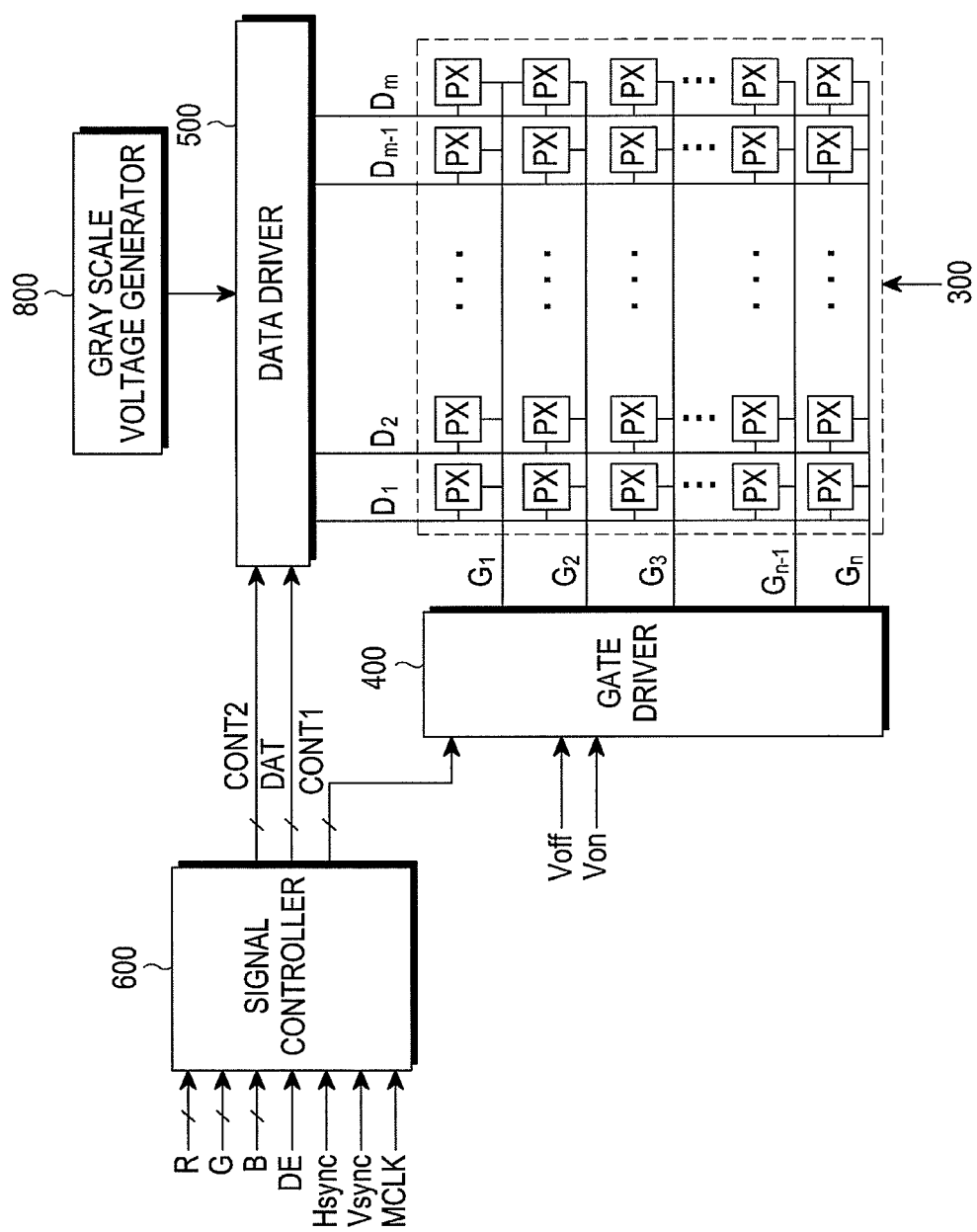
FIG. 1 is a block diagram of a liquid crystal display device according to an exemplary embodiment of the present invention.

Exemplary embodiments of the present invention will now be described in detail with reference to the accompanying drawings. The present invention may, however, be embodied in many different forms and should not be construed as being limited to the embodiments set forth herein.

Throughout the following description and drawings, the same reference numerals may refer to the same components, features and/or structures.

Figure 2:
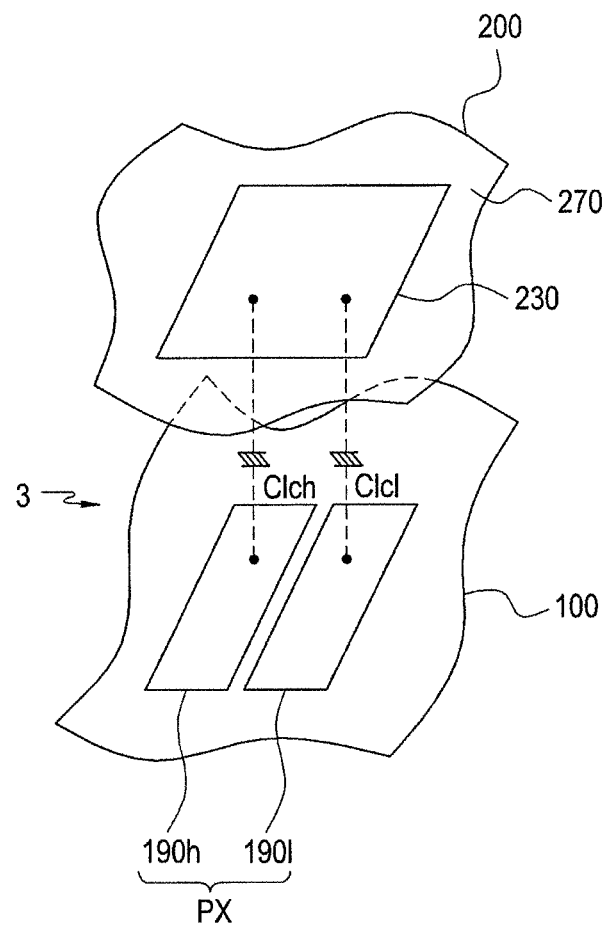
FIG. 2 is a diagram schematically illustrating a structure of two subpixels in a liquid crystal display device according to an exemplary embodiment of the present invention.

A liquid crystal display device according to an exemplary embodiment of the present invention will be described in detail with reference to FIGS. 1 and 2. FIG. 1 is a block diagram of a liquid crystal display device according to an exemplary embodiment of the present invention. FIG. 2 schematically illustrates a structure of two subpixels 190h and 190l constituting one pixel PX in a liquid crystal display device according to an exemplary embodiment of the present invention. As illustrated in FIG. 1, a liquid crystal display device includes a liquid crystal display panel assembly 300, a gate driver 400, a data driver 500, a signal controller 600, and a gray scale voltage generator 800.

The signal controller 600 receives, from a host, image signals R, G and B, and control signals including a data enable signal DE, horizontal and vertical sync signals Hsync and Vsync, and a main clock signal MCLK. The signal controller 600 outputs data control signals CONT2 and image data signals DAT to the data driver 500, and outputs gate control signals CONT1 for selecting gate lines to the gate driver 400. To adjust lighting, the signal controller 600 may output lighting control signals to a light generator (not shown).

The gray scale voltage generator 800 generates all gray scale voltages or a limited number of gray scale voltages (hereinafter, referred to as "reference gray scale voltages"), which are supplied to pixels PX, and outputs them to the data driver 500. The reference gray scale voltages are different in polarity from a common voltage Vcom.

The data driver 500 receives the reference gray scale voltages from the gray scale voltage generator 800, and outputs gray scale voltages to a plurality of data lines $D_1$-$D_m$ in response to the control signals CONT2 and the image data signals DAT from the signal controller 600. When the gray scale voltage generator 800 provides only a limited number of reference gray scale voltages, the data driver 500 may generate a greater number of extended gray scale voltages by dividing the reference gray scale voltages. When supplying the extended gray scale voltages to the data lines $D_1$-$D_m$, the data driver 500 performs inversion driving that alternately applies voltages, which are the same in voltage difference but different in polarity in every frame with respect to the common voltage Vcom, to each of the pixels. The inversion driving method includes frame inversion that supplies data voltages such that in one frame, data voltages applied to all pixels are the same in polarity and in the next frame, polarities of data voltages applied to all pixels are inversed; column inversion that supplies data voltages such that within one frame, polarities of data voltages applied to pixels on adjacent data lines $D_1$-$D_m$ are inversed; point inversion that supplies data voltages such that voltage polarities of adjacent pixels PX are different from each other; and 2+1 inversion that supplies data voltages such that two pixels PX adjacent to the same data line 171 (for 171 see FIG. 3, for example) have the same polarity and one pixel PX adjacent to the two same-polarity pixels has a different polarity, on a repeated basis.

The gate driver 400 sequentially outputs gate signals to a plurality of gate lines $G_1$-$G_n$ in response to the gate control signals CONT1. Each of the gate signals has a gate-on voltage Von capable of turning on Thin Film Transistors (TFTs) connected to a selected gate line, and a gate-off voltage Voff capable of turning off TFTs connected to non-selected gate lines.

Figure 3:
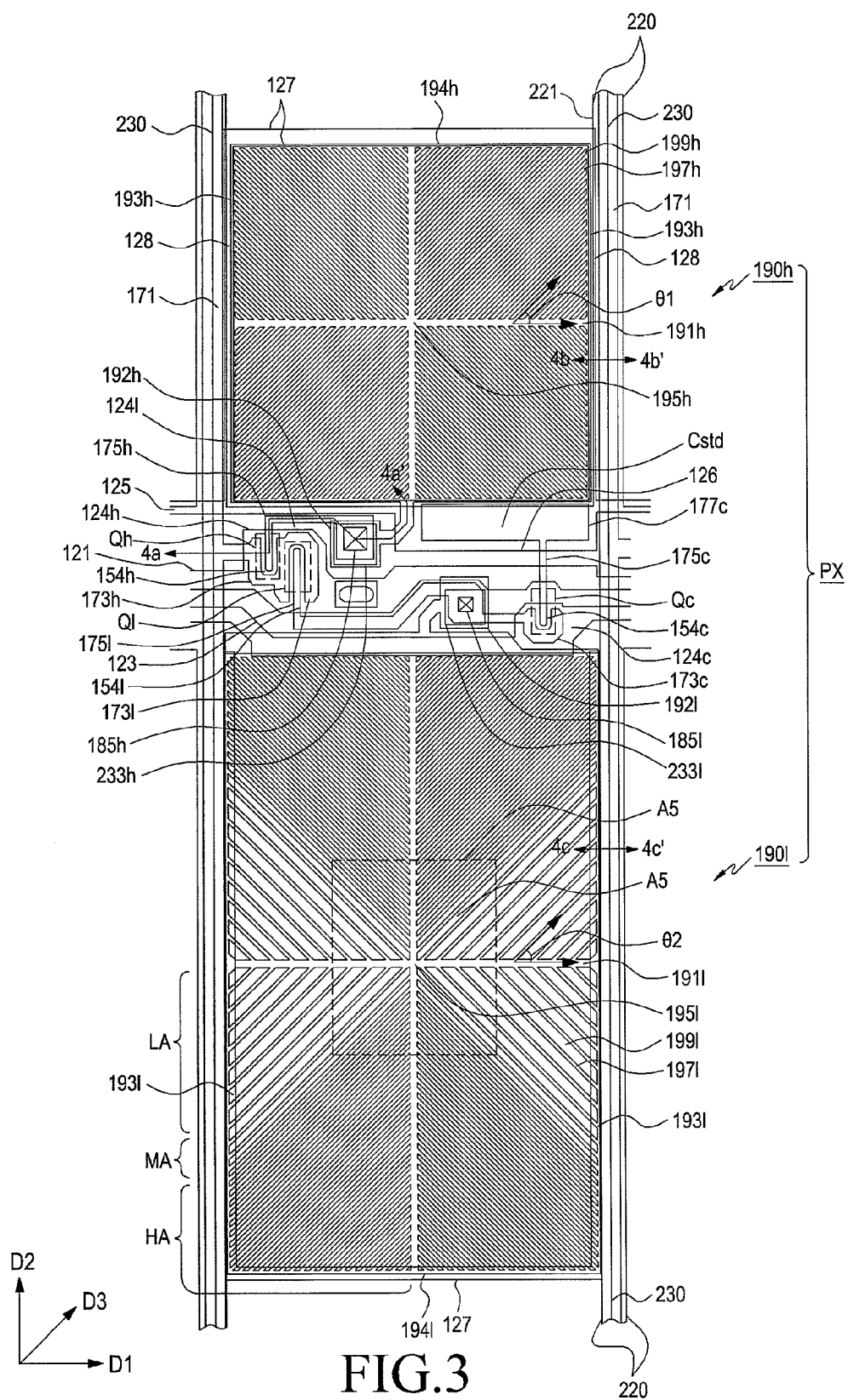
FIG. 3 is a diagram illustrating a layout of a liquid crystal display panel assembly according to an exemplary embodiment of the present invention.

The liquid crystal display panel assembly 300 includes a lower display panel 100, an upper display panel 200 facing the lower display panel 100, and a liquid crystal layer 3 interposed therebetween. The lower display panel 100 has pixels PX arranged in the form of a matrix consisting of rows and columns, a plurality of gate lines $G_1$-$G_n$ 121 (for 121 see FIG. 3, for example), to which pixels PX in the same rows are connected, respectively, and a plurality of data lines $D_1$-$D_m$ 171, to which pixels PX in the same columns are connected, respectively. FIG. 2 illustrates a schematic structure of one pixel PX among the plurality of pixels PX shown in FIG. 1. One pixel PX is divided into a pair of a first subpixel 190h and a second subpixel 190l, which are spaced apart from each other. A first subpixel electrode 191h and a second subpixel electrode 191l, as shown in FIG. 3, are formed in regions of the first subpixel 190h and the second subpixel 190l, respectively. The first and second subpixels 190h and 190l have liquid crystal capacitors Clch and Clcl, and storage capacitors Csth and Cstl (for Csth and Cstl see FIG. 11, for example), respectively. Each of the liquid crystal capacitors Clch and Clcl is formed by the liquid crystal layer 3, which is formed between one terminal of each of the subpixel electrodes 191h and 191l formed on the lower display panel 100 and one terminal of a common electrode 270 formed on the upper display panel 200. In an alternative exemplary embodiment of the present invention, each of the subpixels 190h and 190l may be connected to each of TFTs connected to different data lines $D_1$-$D_m$.

The common electrode 270 is formed on the whole surface of the upper display panel 200, and provided with the common voltage Vcom. On the other hand, the common electrode 270 and the pixel electrode 191 may be formed on the lower display panel 100, and may have a linear or bar shape according to the shape of the pixel electrode 191.

Figure 4A:
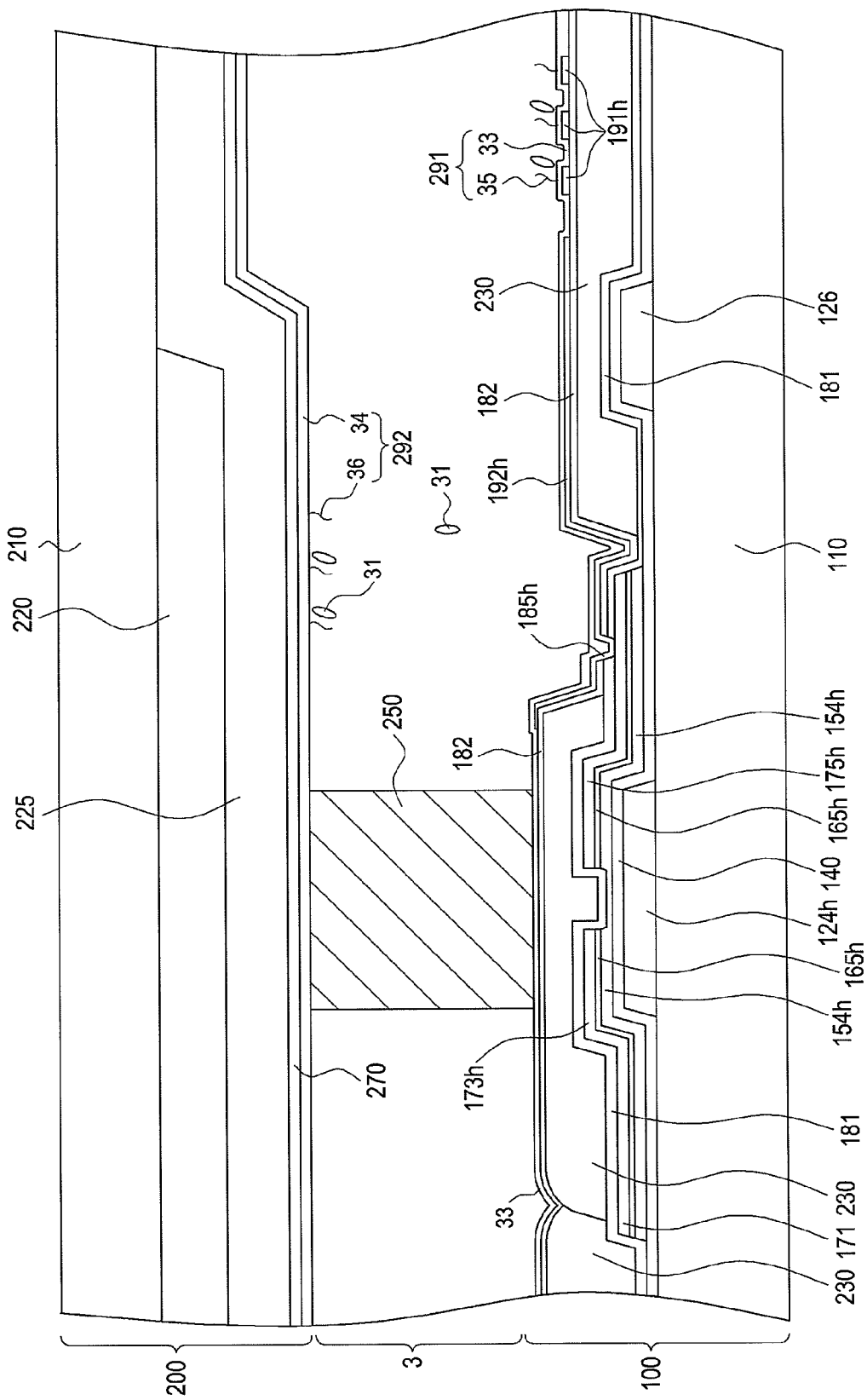
FIG. 4A is a cross-sectional view taken along line 4a-4a' of the liquid crystal display panel assembly shown in FIG. 3.

The liquid crystal layer 3 is filled in a sealant (not shown) formed between the lower and upper display panels 100 and 200. The liquid crystal layer 3 functions as a dielectric. The sealant is formed on any one of the lower and upper display panels 100 and 200, and combines the two display panels 100 and 200. The lower and upper display panels 100 and 200 may maintain a cell spacing or a cell gap of about 2.0 μm to about 5.0 μm, more preferably about 3.3 μm to about 3.7 μm, by means of a spacer 250 or a sealant (not shown) as illustrated in FIG. 4A. In an alternative exemplary embodiment of the present invention, since the region where a TFT is formed wide, the spacer may be formed on the TFT.

Polarizers (not shown) may be disposed on each of the lower and upper display panels 100 and 200 such that their polarization axes or transmission axes are substantially orthogonal with each other. In other words, the polarizers may be formed on the top or bottom of the upper display panel 200, and on the top or bottom of the lower display panel 100. On the other hand, the polarizers may be formed only on the top or bottom of any one of the lower and upper display panels 100 and 200. In an exemplary embodiment of the present invention, to reduce diffraction of external light, the polarizers may be about 1.5 in refractive index, and about 2% to about 5% in haze. The refractive index value of the polarizers and refractive index values of other materials described below were measured under light with a wavelength of about 550 nm to about 580 nm.

A liquid crystal display device is manufactured by connecting the driver devices 400, 500, 600 and 800 to the liquid crystal display panel assembly 300. The driver devices 400, 500, 600 and 800 may be formed on a single integrated circuit chip and then directly mounted on the liquid crystal display panel assembly 300, may be mounted on a flexible printed circuit film (not shown) and then attached to the liquid crystal display panel assembly 300 in the form of a Tape Carrier Package (TCP), or may be mounted on a separate printed circuit board (not shown) and then connected to the liquid crystal display panel assembly 300. On the other hand, each of these driver devices 400, 500, 600 and 800 or combinations thereof may be formed on the liquid crystal display panel assembly 300, when the signal lines $G_1 \sim G_n$, and $D_1 \sim D_m$ and TFTs Qh, Ql and Qc (shown in FIG. 3) are formed.

Now, image display principles of the liquid crystal display device will be described in brief. If a data voltage is supplied to a pixel electrode 191 of each pixel PX in the liquid crystal display device, a voltage charged in each pixel PX generates an electric field in the liquid crystal layer 3 by a voltage difference between the pixel electrode 191 and the common electrode 270. Because of the electric field formed in the liquid crystal layer 3, liquid crystal molecules 31 (for 31 see FIG. 4A, for example) in the liquid crystal layer 3 are tilted or move in a particular direction. Depending on the tilt or direction of the liquid crystal molecules 31, light passing through the liquid crystal layer 3 experiences phase retardation. The light penetrates a polarizer or is absorbed in the polarizer depending on the phase difference caused by the phase retardation that the light undergoes. Therefore, if a data voltage supplied to the pixel electrode 191 is adjusted, light transmittance differences for the primary colors occur, allowing the liquid crystal display device to represent images. The primary colors include colors selected from red, green, blue, cyan, magenta, yellow, and white. In an exemplary embodiment of the present invention, the primary colors may include red, green and blue. On the other hand, to improve the image quality, the primary colors may include four or more colors, including red, green, blue and yellow.

Liquid Crystal Display Panel Assembly

Upper Display Panel

Figure 4B:
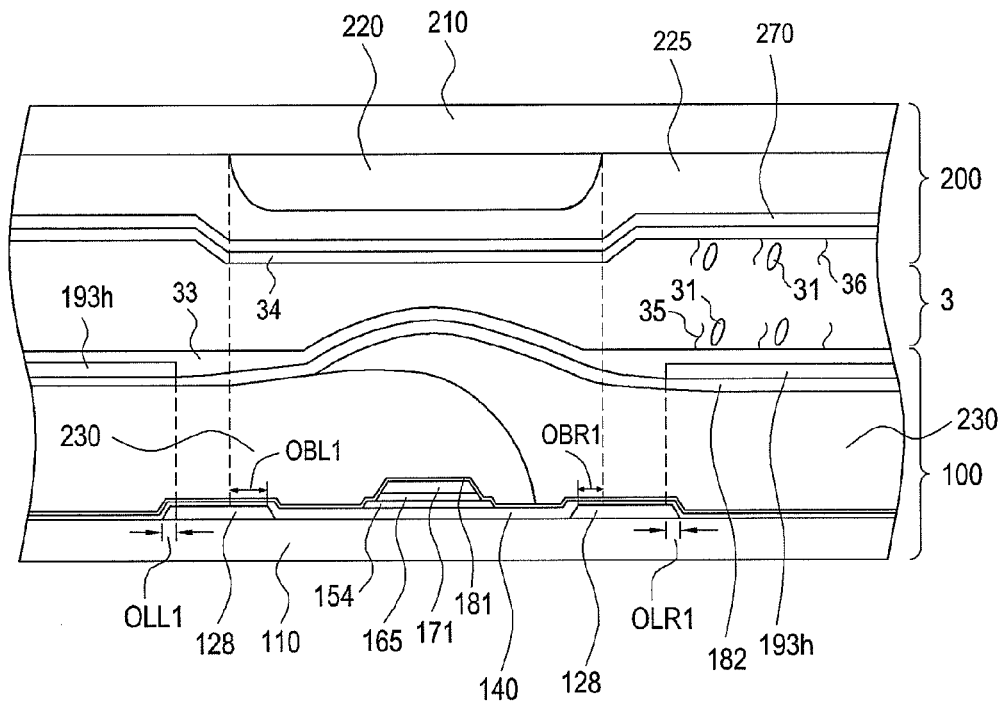
FIG. 4B is a cross-sectional view taken along line 4b-4b' of the liquid crystal display panel assembly shown in FIG. 3.
Figure 4C:
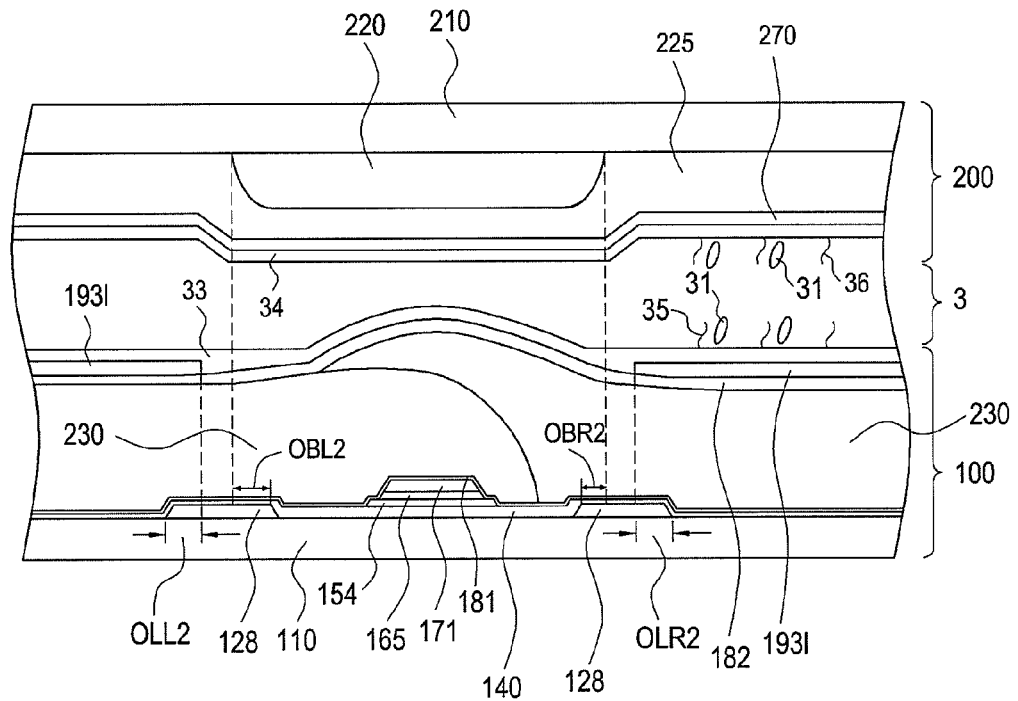
FIG. 4C is a cross-sectional view taken along line 4c-4c' of the liquid crystal display panel assembly shown in FIG. 3.
Figure 5A:
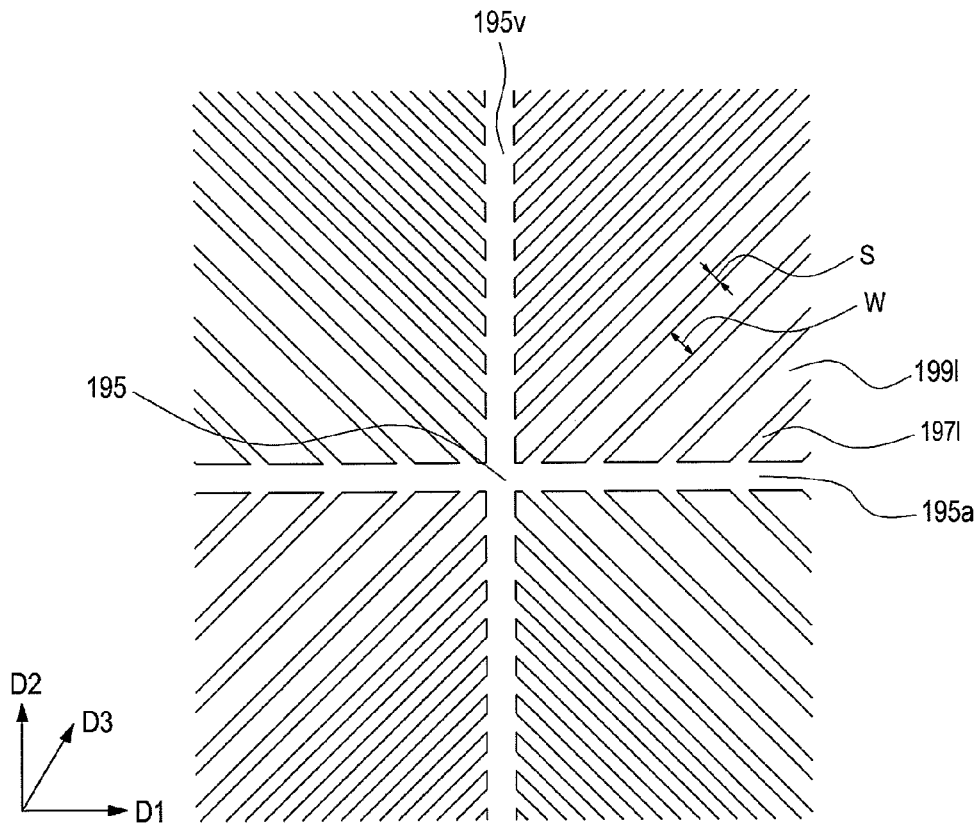
FIG. 5A is an enlarged plan view of a central part A5 of a second subpixel electrode 191l shown in FIG. 3.
Figure 5B:
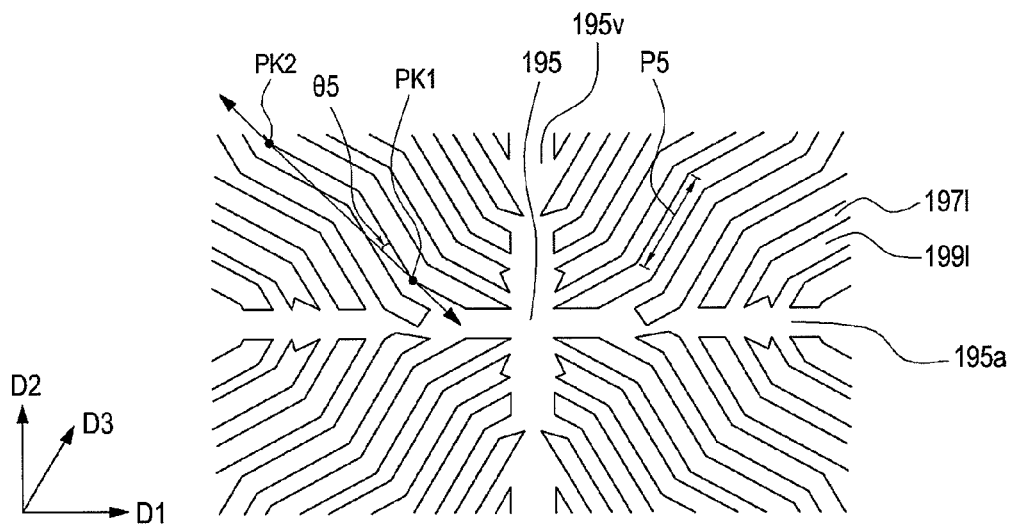
FIG. 5B is an enlarged plan view of the central part A5 of the second subpixel electrode 191l shown in FIG. 3, according to another exemplary embodiment of the present invention.

Next, the liquid crystal display panel assembly 300 according to an exemplary embodiment of the present invention will be described in detail with reference to FIGS. 3 to 5B. FIG. 3 is a plan view illustrating a layout of a unit pixel of the liquid crystal display panel assembly 300 according to an exemplary embodiment of the present invention. FIG. 4A is a cross-sectional view taken along line 4a-4a' of the liquid crystal display panel assembly 300 shown in FIG. 3. FIG. 4B is a cross-sectional view taken along line 4b-4b' of the liquid crystal display panel assembly 300 shown in FIG. 3. FIG. 4C is a cross-sectional view taken along line 4c-4c' of the liquid crystal display panel assembly 300 shown in FIG. 3. FIG. 5A is an enlarged plan view of a central part A5 of the second subpixel electrode 191l shown in FIG. 3. FIG. 5B is an enlarged plan view of the central part A5 of the second sub-pixel electrode 191l shown in FIG. 3, according to another exemplary embodiment of the present invention. While the enlarged plan view of one pixel is shown in FIG. 3, it is to be noted that, in the liquid crystal display panel assembly 300, a plurality of such pixels in rows and columns are arranged in the form of a matrix.

The liquid crystal display panel assembly 300 includes the lower display panel 100, the upper display panel 200, the liquid crystal layer 3, and a polarizer (not shown). First, the upper display panel 200 will be described in detail. The upper display panel 200 includes a light blocking member 220, an overcoat 225, a common electrode 270 and an upper-plate alignment film 292, which are formed on an upper substrate 210.

The light blocking member 220 is formed on the glass or plastic transparent upper substrate 210. The upper substrate 210 is about 0.2 mm to about 0.7 mm in thickness, and about 1.0 to about 2.5, more preferably about 1.5 in refractive index. The light blocking member 220, also called a black matrix, may be made of a metal such as chromium oxide CrOx, or an opaque organic film. The light blocking members 220 made of the metal and the organic film are about 300 Å to about 2000 Å and about 2 μm to about 5 μm in thickness, respectively. The light blocking member 220 has a plurality of apertures similar in shape to the pixels PX so that light may pass through the pixels PX. The light blocking member 220 may be formed between pixels PX to prevent light leakage between the pixels PX. The light blocking member 220 may be formed in portions corresponding to gate lines 121, and data lines 171, and TFTs Qh, Ql and Qc, which are formed on the lower display panel 100. In an alternative exemplary embodiment of the present invention, the light blocking member 220 may be formed on an inner side of a lower substrate 110, on which the gate lines 121, the data lines 171 and the TFTs are formed, or on an outer side of the lower substrate 110, on which these elements are not formed, to simplify the manufacturing process of the liquid crystal display panel assembly 300 and improve the transmittance of the liquid crystal display device.

The overcoat 225 is formed on the light blocking member 220. The overcoat 225 planarizes the rough surface of its lower layer such as the light blocking member 220, or prevents impurities from flowing out from the lower layer. In one embodiment, the thickness of overcoat 225 is about 1 μm to about 3 μm, more preferably about 1.2 μm to about 1.5 μm. in another embodiment, its refractive index can be from about 1.5 to about 2.5, more preferably about 1.8. In an alternative exemplary embodiment, if the light blocking member 220 is formed on the lower display panel 100, the overcoat 225 may be formed on the light blocking member 220 on the lower display panel 100, rather than being formed on the upper display panel 200. In one exemplary embodiment of the present invention, the overcoat 225 contains an acryl-based material (herein interchangeably referred to as an acrylic-based material. The acryl-based material contained in the overcoat 225 is hardened in a process of forming the overcoat 225. The transmittance of short-wavelength ultraviolet light is higher in an overcoat 225 containing the hardened acryl-based material than that containing an imide-based material. If the transmittance of the short-wavelength ultraviolet light is high in the overcoat 225, the intensity of the light incident to harden a light hardener or reactive mesogen (RM) in the field exposure process (as described below) or a fluorescence exposure process is increased, contributing to an increase in cross-linking rate. The acryl-based material may be included in the overcoat 225 of the stacked structure of the upper or lower plate as described below.

On the overcoat 225 is formed the common electrode 270 that does not have a plurality of slits. The common electrode 270 may be formed of a transparent conductor such as indium-tin oxide (ITO) and indium-zinc-oxide (IZO), or of the same material as that of the pixel electrodes 191. The common electrode 270 is about 500 Å to about 2000 Å, more preferably about 1200 Å to about 1500 Å in thickness. The common electrodes 270 made of IZO and ITO used to maximize the transmittance of the liquid crystal display device may be about 1200 Å to about 1500 Å and about 500 Å to about 1500 Å in thickness, respectively. To reduce diffraction of the external light, the common electrodes, 270 made of IZO and ITO may be about 1.5 to about 2.5 and about 1.5 to about 2.3 in refractive index, respectively. In an alternative exemplary embodiment of the present invention, a plurality of slits for forming more fringe electric fields may be formed in the common electrode 270.

On the common electrode 270 is formed the upper-plate alignment film 292 to maintain the liquid crystal molecules 31 in a particular alignment. The upper-plate alignment film 292 is formed by coating the common electrode 270 with a liquid organic material having alignment properties by inkjet or roll printing and then hardening it thermally or by light such as infrared light and ultraviolet light (UV). The upper-plate alignment film 292 includes an upper-plate main alignment layer 34, and may further include an upper-plate photo hardening layer 36. The main alignment layer 34 may be a vertical alignment material that aligns the major axis or principal axis of the liquid crystal molecules 31 to be substantially perpendicular to the lower or upper substrate 110 or 210, or the main alignment layer 34. The main alignment layer 34 is about 500 Å to about 1500 Å, more preferably about 700 Å to about 1000 Å in thickness. A refractive index of the main alignment layer 34 may be about 1.6 to improve the transmittance of the liquid crystal display device. The main alignment layer 34 may be a film of a material used for a Vertical Alignment (VA) mode liquid crystal display device or a Twisted Nematic (TN) mode liquid crystal display device. The photo hardening layer 36 is formed of a material that is hardened by light so that the major axis or principal axis of the liquid crystal molecules 31 have a pre-tilt angle with respect to the lower or upper substrate 110 or 210, or the main alignment layer 34. The material constituting the photo hardening layer 36 may be a light hardener, a Reactive Mesogen (RM), a photo-reactive polymer, a photopolymerization material, or a photo-isomerization material. The upper-plate alignment film 292 may be a film made of at least one material selected from a polyimide-based compound, a polyamic acid-based compound, a poly siloxane-based compound, a polyvinylcinnamate-based compound, a polyacrylate-based compound, a polymethylmethacrylate-based compound, a light hardener, a reactive mesogen, a photo-reactive polymer, a photopolymerization material, a photo-isomerization material, and mixtures thereof. The reactive mesogen may be one selected from the group consisting of acrylate, methacrylate, epoxy, oxetane, vinyl-ether, styrene, and thioren. The photo-reactive polymer may be an azo-based compound, a cinnamate-based compound, a chalcone-based compound, a coumarin-based compound, or a maleimide-based compound. The photopolymerization material may be chalcone or cumarine. The photo-isomerization material may be azo or double tolane. The upper-plate main alignment layer 34 and the upper-plate photo hardening layer 36 constituting the upper-plate alignment film 292 may be formed by the methods described below with reference to FIGS. 6A to 6C.

The upper-plate alignment film 292 may be a film that further contains a photoinitiator made of at least one material selected from benzyl dimethyl ketal (a product of Irgacure-651), α-amino acetophenone (a product of Irgacure-907), 1-hydroxy cyclohexyl phenyl keton (a product ofIrgacure-184), which are all produced by Ciba of Switzerland, and mixtures thereof.

A material constituting the upper-plate alignment film 292 according to an exemplary embodiment of the present invention may be a mixture of any one of a photo-reactive polymer and a reactive mesogen, and a polyimide-based polymer. On the other hand, the upper-plate alignment film 292 may be comprised of the main alignment layer 34, except the photo hardening layer 36.

A reactive mesogen according to an exemplary embodiment of the present invention will now be described. The reactive mesogen according to an exemplary embodiment of the present invention forms the alignment film 292, and forms the photo hardening layer 36 and photo hardening layer 35 of alignment film 291 (discussed later) by being hardened by light or heat. In terms of chemical structure, the reactive mesogen according to an exemplary embodiment of the present invention may be a photo-reactive dimetha acrylate-based monomer expressed by the following structural Formula XVI-R, and more specifically a monomer expressed by Formula XVII-R1, XVII-R2, XVII-R3, XVII-R4, XVII-R5 or XVII-R6.

Formula XVI-R

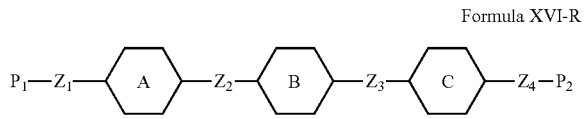

where each of A, B and C may be a selected one of a benzene ring, a cyclohexyl ring, and a naphthalene ring. Outer hydrogen atoms of the respective rings constituting A, B and C may not be substituted, or at least one of their hydrogen atoms may be substituted with an alkyl group, fluoride (F), chlorine (Cl) or methoxy group ($OCH_3$). Each of P1 and P2 may be one selected from the group consisting of acrylate, methacrylate, epoxy, oxetane, vinyl-ether, styrene, and thioren. Each of Z1, Z2 and Z3 may be a single bond, a linkage group or a combination of linkage groups. The single bond means that A, B and C are directly bonded without intermediates between them. The linkage group may be —OCO—, —COO—, alkyl group, —O—, or a linkage group.

To be more specific, the reactive mesogen according to an exemplary embodiment of the present invention may be a monomer expressed by the following Formula XVII-R1, XVII-R2, XVII-R3, XVII-R4, XVII-R5 or XVII-R6.

Formula XVII-R1

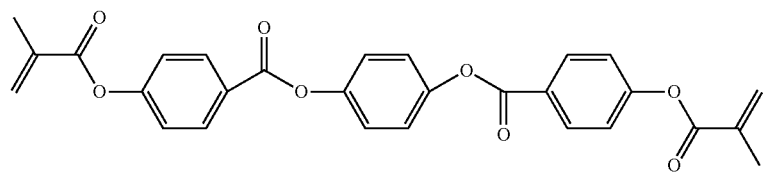

-continued

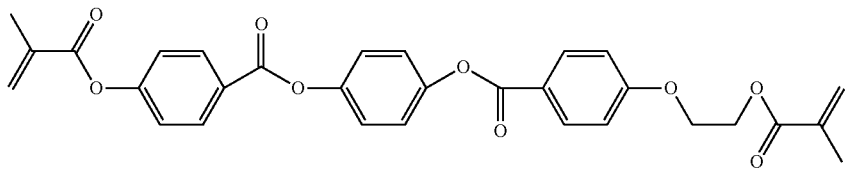

Formula XVII-R2

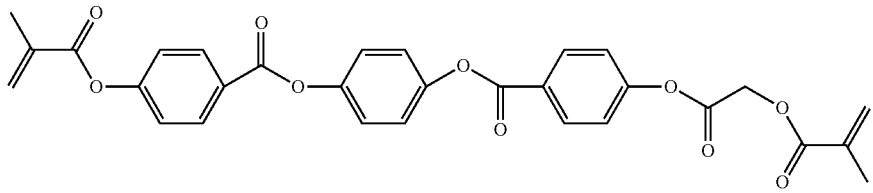

Formula XVII-R3

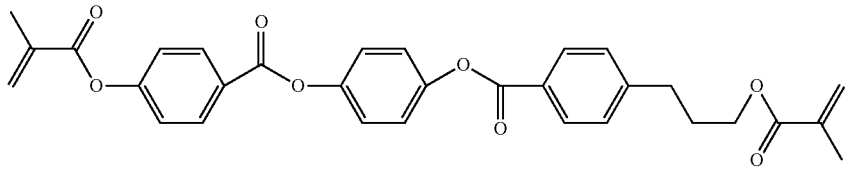

Formula XVII-R4

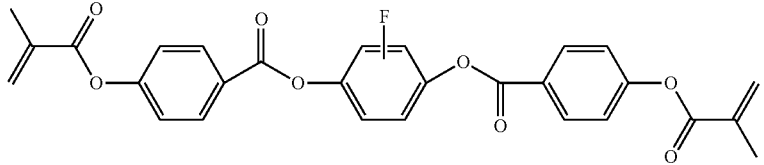

Formula XVII-R5

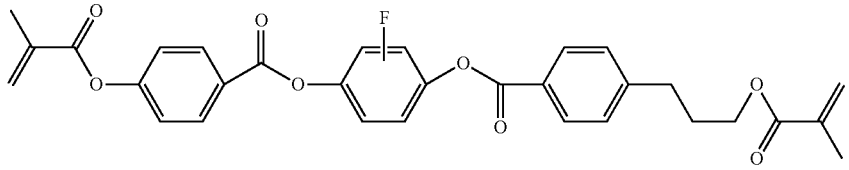

Formula XVII-R6

To evaluate characteristics of the reactive mesogen according to an exemplary embodiment of the present invention, a liquid crystal display device was manufactured by applying the reactive mesogen expressed by Formula XVII-R6 among the aforementioned reactive mesogens. A liquid crystal display panel assembly was manufactured in accordance with a Super Vertical Alignment (SVA) mode described below with reference to FIG. 6A. The structure of pixels PX of the liquid crystal display device was substantially the same as that of FIG. 3. The cell spacing in the liquid crystal layer 3 was about 3.5 μm, and the illuminance of UV applied to the fluorescence exposure process was about 0.15 mW/cm². In addition, the width of micro branches 197 of the pixel electrode 191, the exposure voltage, the UV intensity of the field exposure process, and the time of the fluorescence exposure process are shown in Table 1.

TABLE 1

|  | Width of micro branches (μm) | Exposure voltage (V) | UV intensity of field exposure (J/cm²) | Time of fluorescence exposure (Min.) |
| --- | --- | --- | --- | --- |
| Example 1 | 3 | 9.5 | 5 | 60 |
| Example 2 | 3 | 9.5 | 7 | 60 |
| Example 3 | 3 | 9.5 | 9 | 60 |
| Example 4 | 5 | 9.5 | 7 | 80 |
| Example 5 | 5 | 9.5 | 7 | 100 |

TABLE 1-continued

|  | Width of micro branches (μm) | Exposure voltage (V) | UV intensity of field exposure (J/cm²) | Time of fluorescence exposure (Min.) |
| --- | --- | --- | --- | --- |
| Example 6 | 5 | 9.5 | 7 | 120 |
| Example 7 | 5 | 9.5 | 7 | 140 |

Figure 11:
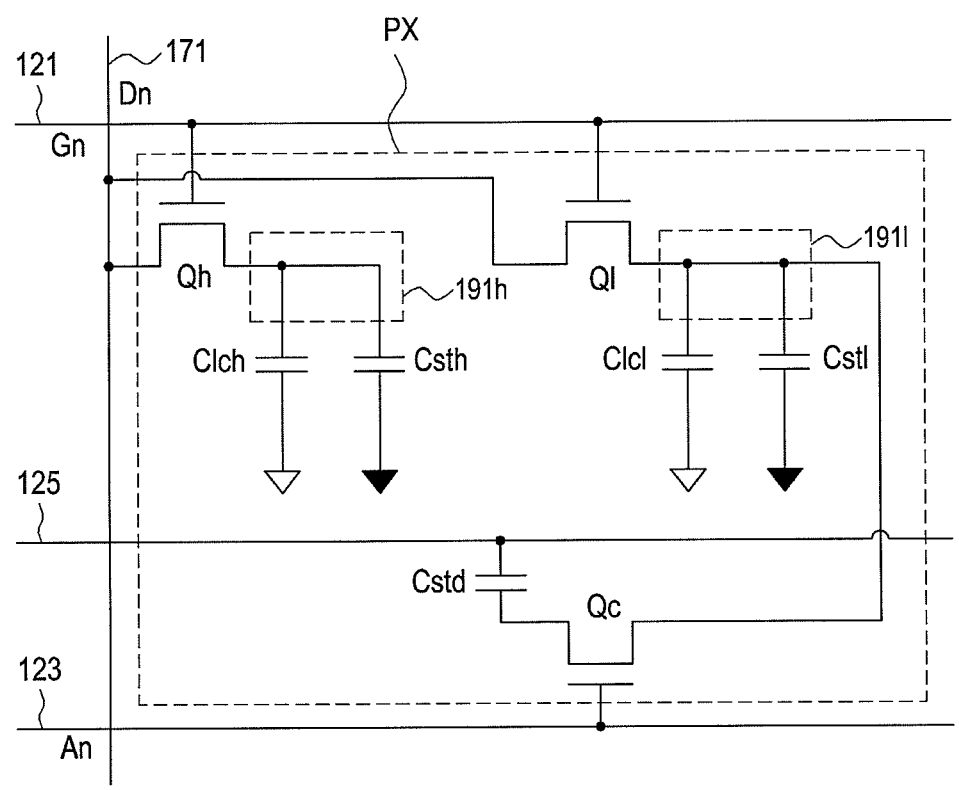
FIG. 11 is an equivalent circuit diagram for one pixel of a liquid crystal display device according to an exemplary embodiment of the present invention.

The manufactured liquid crystal display device was operated by charge sharing-based 1 Gate line 1 Data line (1G1D) driving described below in conjunction with FIG. 11.

In all the examples shown in Table 1, the black afterimage of the liquid crystal display device showed a level of approximately 2, and the inter-gray scale response time was about 0.007 seconds to about 0.009 seconds. Therefore, it can be understood that the reactive mesogen expressed by Formula XVII-R6 showed excellent characteristics when it was applied to a wide range of process conditions.

An afterimage evaluation method displays a check pattern screen on the liquid crystal display device for about one day or more, changes it with other screens, and then observes the check pattern, and the method evaluates the observation results as a level 1 through a level 5. The level 1 is a level in which the check pattern is not observed at the side of the liquid crystal display device, the level 2 is a level in which the check pattern is faintly observed at the side, the level 3 is a level in which the check pattern is clearly observed at the side, the level 4 is a level in which the check pattern is faintly observed at the front, and the level 5 is a level in which the check pattern is clearly observed at the front. The black afterimage may be evaluated by displaying a check pattern screen, changing it with a black pattern, and then observing the check pattern. A surface afterimage may be evaluated by displaying a check pattern screen, changing it with gray patterns, and then observing the check pattern.

Lower Display Panel

Now, the lower display panel 100 will be described in detail. The lower display panel 100 includes thereon a gate layer conductor becoming gate lines 121, down gate lines 123 and storage electrode lines 125, a gate insulating layer 140, a semiconductor 154, a linear ohmic contact member 165, data layer conductors 171, 173, 175 and 177*c*, a first protection layer 181, a color filter 230, a second protection layer 182, a pixel electrode 191, and a lower-plate alignment film 291.

On the glass or plastic lower substrate 110 is formed the gate layer conductor comprised of a plurality of gate lines 121, a plurality of down gate lines 123, and a plurality of storage electrode lines 125. The lower substrate 110 is about 0.2 mm to about 0.7 mm in thickness, and about 1.0 to about 2.5, more preferably about 1.5 in refractive index. The gate lines 121 and the down gate lines 123 mostly stretch in the horizontal direction, and transmit gate signals. The gate layer conductor may be formed of a material selected from Cr, Mo, Ti, Al, Cu, Ag, and a mixture thereof. A gate layer conductor according to another exemplary embodiment may have a double-film or triple-film structure. For example, the double-film structure may be Al/Mo, Al/Ti, Al/Ta, Al/Ni, Al/TiNx, Al/Co, Cu/CuMn, Cu/Ti, Cu/TiN, or Cu/TiOx, while the triple-film structure may be Mo/Al/Mo, Ti/Al/Ti, Co/Al/Co, Ti/Al/Ti, TiNx/Al/Ti, CuMn/Cu/CuMn, Ti/Cu/Ti, TiNx/Cu/TiNx, or TiOx/Cu/TiOx. The gate line 121 includes a first gate electrode 124*h* and a second gate electrode 124*l* in a convex shape. The down gate line 123 includes a third gate electrode 124*c* in a convex shape. The first gate electrode 124*h* and the second gate electrode 124*l* are connected to each other, forming one projection. The storage electrode line 125 extends in horizontal and vertical directions to surround circumferences of the first and second subpixel electrodes 191*h* and 191*l*, and transmits a predetermined voltage, for example, the common voltage Vcom. On the other hand, the storage electrode line 125 may transmit predetermined swing voltages having two or more levels. The storage electrode line 125 includes a plurality of vertical portions 128 of the storage electrode line, extending approximately perpendicular to the gate line 121, a horizontal portion 127 of the storage electrode line, connecting ends of the vertical portions 128 of the storage electrode line to one another, and a storage electrode line's extension portion 126 protruding from the horizontal portion 127 of the storage electrode line.

The gate insulating layer 140 is formed on the gate layer conductor. The gate insulating layer 140 may be a film made of an inorganic insulating material, an organic insulating material, or an organic/inorganic insulating material. The inorganic insulating material may be silicon nitride SiNx, silicon oxide SiOx, titanium dioxide $TiO_2$, alumina $Al_2O_3$, or zirconia $ZrO_2$. The organic insulating material may be poly siloxane, phenyl siloxane, polyimide, silsesquioxane, silane, or an organic insulating material. The organic/inorganic insulating material may be a mixture of at least one or more materials selected from each of the above-described inorganic insulating materials and organic insulating materials. In particular, an organic/inorganic insulating material made of an organic insulating material of poly siloxane and an inorganic insulating material of poly siloxane has a high heat-resisting property, high light transmittance, and excellent cohesion with other layers at approximately 350° C. or more. The gate insulating layer 140 made of an inorganic insulating material may be about 2000 Å to about 4000 Å, more preferably about 3000 Å in thickness. The gate insulating layer 140 made of an organic insulating material or an organic/inorganic insulating material may be about 3000 Å to about 5000 Å, more preferably about 4000 Å in thickness. To improve the transmittance of the liquid crystal display device, the refractive index of the silicon nitride SiNx, silicon oxide SiOx, organic insulating material or organic/inorganic insulating material constituting the gate insulting layer 140 may be about 1.6 to about 2.1, about 1.35 to about 1.65, about 1.4 to about 1.7, or about 1.4 to about 1.9, more preferably about 1.85, about 1.5, about 1.55, or about 1.6, respectively. The closer the refractive index of the gate insulating layer 140 approaches that of the lower substrate 110, the more the transmittance of the liquid crystal display device is improved.

On the gate insulating layer 140 is formed the semiconductor 154 that may be made of hydrogenated amorphous silicon, crystalline silica, or an oxide semiconductor. The data line 171, source electrode 173 and drain electrode 175 substantially overlap the semiconductor 154. First and second semiconductors 154*h* and 154*l* formed on the first and second gate electrodes 124*h* and 124*l*, and a third semiconductor 154*c* formed on the third gate electrode 124*c* are formed to be separated from each other. The semiconductor 154 is about 1000 Å to about 2500 Å, more preferably about 1700 Å in thickness. The oxide semiconductor may be a compound having a chemical formula expressed as $A_XB_XO_X$ or $A_XB_XC_XO_X$, where A may be Zn or Cd, B may be Ga, Sn or In, and C may be Zn, Cd, Ga, In or Hf. Further, X is not 0, and A, B, and C are different from one another. According to another exemplary embodiment, the oxide semiconductor may be a compound selected from a group of InZnO, InGaO, InSnO, ZnSnO, GaSnO, GaZnO, GaZnSnO, GaInZnO, HfinZnO, HfZnSnO and ZnO. This oxide semiconductor is about 2 times to about 100 times the hydrogenated amorphous silicon in terms of effective mobility, thus improving a charging rate of the pixel electrode 191.

The linear ohmic contact member 165 is formed on the semiconductor 154. The linear ohmic contact member 165 is about 200 Å to about 500 Å thick. First, second and third linear ohmic contact members 165*h*, 165*l* (not shown) and 165*c* (not shown) are formed on the first, second and third semiconductors 154*h*, 154*l* and 154*c*, but not formed on the channel of a TFT.

On the linear ohmic contact member 165 is formed a data layer conductor which becomes the data line 171, a first source electrode 173*h*, a first drain electrode 175*h*, a second source electrode 173*l*, a second drain electrode 175*l*, a third source electrode 173*c* and a third drain electrode 175*c*. The data layer conductor may be formed of the same material as that of the gate layer conductor described above. To improve the charging rate of the pixel electrode 191 and reduce the propagation delay of data voltages, the data layer conductor may have a low-resistance single-film metal structure, or a 2 or 3-layer structure in which at least one layer is a metal layer. If the semiconductor 154 is made of an oxide semiconductor material, the data layer conductor may be formed directly on the semiconductor 154 without being formed on the linear ohmic contact member 165.

The data line 171 crosses the gate line 121 or the down gate line 123, with the gate insulating layer 140 interposed therebetween. The data line 171 is connected to the first source electrode 173*h* in a cup or "U" shape, and the second source electrode 173*l* in a cap or "∩" inverted U-shape. End portions of the first drain electrode 175h and the second drain electrode 175l are partially surrounded by the first source electrode 173h and the second source electrode 173l, respectively. The other end portion of the second drain electrode 175l extends from an end portion partially surrounded by the second source electrode 173l, and is connected to the third source electrode 173c in a U shape. One end portion of the third drain electrode 175c is partially surrounded by the third source electrode 173c, and the other end portion 177c overlaps on the storage electrode line's extension portion 126, thereby forming a down capacitor Cstd therebetween. A capacitance of the down capacitor Cstd varies according to the size of the area where the other end portion 177c of the third drain electrode 175c overlaps the storage electrode line's extension portion 126. Each of pixels of the primary colors, constituting a basic pixel group according to an exemplary embodiment of the present invention, may have a different capacitance of the down capacitor Cstd. FIG. 19B is an enlarged view of part A19 shown in FIG. 18 in each of red, green and blue pixels PX-R, PX-G, and PX-B included in a basic pixel group, provided to represent the difference between capacitances of the down capacitors Cstd in the pixels. While the red, green and blue pixels PX-R, PX-Q, and PX-B are similar to each other, the area AOL-B, AOL-G or AOL-R of the other end portion 177c of the third drain electrode 175c, overlapping the storage electrode line's extension portion 126 in each of the pixels, is different in size. This overlapping area may be changed to adjust the below-described ratio of a voltage of the second liquid crystal capacitor Clcl to a voltage of the first liquid crystal capacitor Clch, to about 0.6:1 to about 0.9:1. To reduce the below-described generation of a yellowish color, the ratio of a voltage of the second liquid crystal capacitor Clcl to a voltage of the first liquid crystal capacitor Clch may undergo a change according to the pixels constituting the basic pixel group PS. Therefore, the overlapping area of the other end portion 177c of the third drain electrode 175c and the storage electrode line's extension portion 126 may be adjusted to make the pixels constituting the basic pixel group PS have different voltage ratios. For example, to prevent the liquid crystal display device from having a yellowish color, a voltage ratio of a blue (B) pixel may be set greater than or equal to a voltage ratio of a green (G) pixel, and a voltage ratio of the green (G) pixel may be set greater than or equal to a voltage ratio of a red (R) pixel in a basic pixel group including the red, green blue pixels. The size of the overlapping area may be set as follows to adjust voltage ratios of the pixels.

$$AOL\text{-}B \leq AOL\text{-}G \leq AOL\text{-}R$$

where AOL-B, AOL-G, and AOL-R represent the sizes of the overlapping areas of the other end portion 177c of the third drain electrode 175c and the storage electrode line's extension portion 126 in the B, G and R pixels, respectively, as illustrated in FIG. 19B.

The first, second, and third gate electrodes 124h, 124l and 124c, the first, second and third source electrodes 173h, 173l and 173c, and the first, second and third drain electrodes 175h, 175l and 175c constitute, respectively, the first, second and third TFTs Qh, Ql and Qc for operating one pixel PX, together with the first, second and third semiconductors 154h, 154l and 154c. A channel layer, through which charges transfer during operations of the TFTs Qh, Ql and Qc, is formed inside the semiconductors 154h, 154l and 154c between the source electrodes 173h, 173l and 173c, and the drain electrodes 175h, 175l and 175c. If the semiconductors 154h, 154l and 154c and the data layer conductor are etched using the same mask, the data layer conductor except for the channel region may have substantially the same patterns as those of the semiconductor 154 and the linear ohmic contact members 165h, 165l and 165c, which are formed under the data layer conductor. However, depending on the etching technique, a film of the semiconductor 154 may have portions which are exposed to extend from both sidewalls of the data layer conductor by a specific distance of about 3 μm or less, and are not covered by the data layer conductor.

In accordance with another exemplary embodiment of the present invention, a straight line of the first or second drain electrode 175h or 175l, connected from the channel to contact holes 185h and 185l, is formed in substantially the same direction as the direction of micro branches, thereby reducing a texture in the pixel region and increasing the luminance of the liquid crystal display device.

The first protection layer 181 is formed on the data layer conductor. The first protection layer 181 may be made of the aforementioned inorganic insulating material, organic insulating material, or organic/inorganic insulating material, of which the gate insulating layer 140 may be formed. The first protection layer 181 made of the inorganic insulating material may be about 300 Å to about 2000 Å, more preferably about 500 Å in thickness. The first protection layer 181 made of the organic insulating material or the organic/inorganic insulating material may be about 25000 Å to about 35000 Å in thickness. To improve the transmittance of the liquid crystal display device, the refractive index of the silicon nitride SiNx, silicon oxide SiOx, organic insulating material or organic/inorganic insulating material constituting the first protection layer 181 may be about 1.6 to about 2.1, about 1.35 to about 1.65, about 1.5 to about 1.9, or about 1.5 to about 1.9, more preferably about 1.85, about 1.5, about 1.7 to about 1.8, or about 1.6, respectively. The color filter 230 is formed on the first protection layer 181. The color filter 230 is formed in a region of a pixel PX, where light is not blocked. The color filter 230 is about 1.5 μm to about 3 82 m in thickness, and may be about 1.3 to about 2.2, more preferably about 1.6 in refractive index. The color filters 230 formed on pixels PX may have one of the primary colors, for example, red, green, blue, cyan, magenta, yellow, and white. Three primary colors such as red, green and blue, or cyan, magenta and yellow, may be defined as colors of a basic pixel group PS that forms the pixels PX. Since a white pixel may not have a color filter and the white external light passes through a white pixel region, the white pixel may represent the white color. The basic pixel group PS is the minimum set of pixels PX, which can represent color images. In an alternative exemplary embodiment, the basic pixel group PS may be comprised of pixels PX each having four or more primary colors. As an example of this, four primary colors, which include three colors of red, green and blue, and any one of cyan, magenta, yellow and white, may be selected as colors of the basic pixel group PS. The primary colors of the basic pixel group PS may not be limited to these colors but can be selected in various ways, to improve the image quality of the liquid crystal display device. The color filter 230 may be formed in most regions except for color filter holes 233h and 233l formed in the places where the contact holes 185 are located. On the other hand, the color filter 230 may not be formed in the places where the TFTs Qh, Ql and Qc are located, to make it easy to detect defects of the TFTs Qh, Ql and Qc. The color filers 230 having the same colors may be formed to extend in the vertical direction along the space between neighboring data lines 171. The color filter 230 according to another exemplary embodiment of the present invention may be formed between the light blocking member 220 and the overcoat 225, which are formed on the upper display panel 200.

The second protection layer 182 is formed on the color filter 230 or the first protection layer 181. The second protection layer 182 may be made of the aforementioned inorganic insulating material, organic insulating material, or organic/inorganic insulating material, of which the gate insulating layer 140 may be formed. The second protection layer 182 made of the inorganic insulating material may be about 300 Å to about 1500 Å, more preferably about 400 Å to about 900 Å in thickness. The second protection layer 182 made of the organic insulating material or the organic/inorganic insulating material may be about 25000 Å to about 35000 Å in thickness. To improve the transmittance of the liquid crystal display device, the refractive index of the silicon nitride SiNx, silicon oxide SiOx, organic insulating material or organic/inorganic insulating material constituting the second protection layer 182 may be about 1.6 to about 2.1, about 1.35 to about 1.65, about 1.5 to about 1.9, or about 1.4 to about 1.9, respectively. The closer the refractive index of the second protection layer 182 approaches that of the pixel electrode 191, the more the transmittance of the liquid crystal display device is improved. The second protection layer 182 prevents the color filter 230 from curling up, and inhibits an organic material such as a solvent from flowing out from the color filter 230, thereby preventing contamination of the liquid crystal layer 3 and thus improving image sticking or Persistence of Vision (POV) of the liquid crystal display device. The second protection layer 182 formed directly on the first protection layer 181 is formed relatively thick, achieving planarization. In contact portions of the first protection layer 181 and the second protection layer 182 are formed the contact holes 185$h$ and 185$l$ that expose end portions of the first drain electrode 175$h$ and the second drain electrode 175$l$, respectively. The contact holes 185$h$ and 185$l$ may be less in width than the color filter holes 233$h$ and 233$l$.

A pixel electrode layer is formed on the second protection layer 182 as illustrated in FIG. 3 and FIGS. 4A to 4C. The pixel electrode layer is a conductive layer including subpixel electrodes 191$h$ and 191$l$, pixel electrode contact portions 192$h$ and 192$l$, cross-shaped branch portions 195$h$ and 195$l$, and micro branches 197$h$ and 197$l$, and micro slits 199$h$ and 199$l$ are portions obtained by removing the conductive layer from the pixel electrode layer. The pixel electrode 191 may be about 300 Å to about 700 Å, more preferably about 550 Å in thickness. The pixel electrode 191 includes the first subpixel electrode 191$h$ formed in the region of the first subpixel 190$h$, and the second subpixel electrode 191$l$ formed in the region of the second subpixel 190$l$. The pixel electrode 191 may be formed of a transparent conductive material such as ITO or IZO. The refractive index of the pixel electrode 191 may be about 1.5 to about 2.5, and the refractive indexes of IZO and ITO may be about 1.8 to about 2.3 and about 1.7 to about 2.0, respectively. In an exemplary embodiment of the present invention, the pixel electrodes made of an ITO material to reduce diffraction of the external light may have a thickness of about 400 Å. A material having a refractive index similar to that of a micro branch electrode or each of main alignment layers 33 and 34 may be further formed in the space between micro branches 197 described below, e.g., in regions of micro slits 199. The material having a refractive index similar to that of the micro branches 197 or the main alignment layer 33 may be $TiO_2$, polyphenylenevinylene (PPV), or polyfluorinated polyimides $TiO_2$ ($PI$—$TiO_2$). To reduce external light diffracting or reflecting on the surface of the pixel electrode 191, the surface of the pixel electrode 191 undergoes a plasma process in the atmosphere of a gas of Ar, $H_2$, $O_2$, He or $Cl_2$, thus significantly increasing roughness of the surface of the pixel electrode 191. In addition, by forming the pixel electrode 191 with a material which is similar in refractive index to the material formed on the upper or lower portion of the pixel electrode 191, the external light being diffracted or reflected may be minimized and the transmitted light may be maximized on the surface of the pixel electrode 191. The material of a transparent pixel electrode, having a refractive index similar to that of the lower or upper film may be a nanowire (NW), a zinc oxide ZnO, or a conductive polymer. These materials may be formed as a pixel electrode having a refractive index of about 1.8 or below. The nanowire (NW) is needle-shaped conductive particles having a diameter of about $10^{-9}$ m to about $10^{-8}$ m and a length of about $10^{-7}$ m to about $10^{-6}$ m, and may be formed as a pixel electrode by being mixed with a polymer. The nanowire (NW) may contain silver (Ag), and a resistance of a pixel electrode having nanowire (NW) formed of the silver (Ag) may be about 50Ω to about 250Ω. The first and second subpixel electrodes 191$h$ and 191$l$ include, respectively, first and second subpixel electrode contact portions 192$h$ and 192$l$, cross-shaped branch portions 195$h$ and 195$l$, vertical connection portions 193$h$ and 193$l$ and horizontal connection portions 194$h$ and 194$l$. The vertical connection portions 193$h$ and 193$l$ and horizontal connection portions 194$h$ and 194$l$ surround contours of their associated subpixel electrodes 191$h$ and 191$l$. Each of the cross-shaped branch portions 195$h$ and 195$l$ includes a horizontal branch portion and a vertical branch portion. The first and second subpixel electrode contact portions 192$h$ and 192$l$ contact the drain electrodes 175$h$ and 175$l$ of the first and second TFTs Qh and Ql through the contact holes 185$h$ and 185$l$ of the first or second protection layer 181 or 182, respectively. The pixel electrode 191 according to another exemplary embodiment may be formed on a layer (or part) of the color filter 230 or a layer (or part) of the first protection layer 181 without forming of the second protection layer 182, and may have three or more subpixel electrodes.

A brief description will be made of a high-definition pattern process, e.g., a process of forming micro branches 197 or micro slits 199 having a width of 5 μm or below according to an exemplary embodiment of the present invention. On a lower layer is deposited or applied a conductive metal to be formed as a pixel electrode. A photoresist (PR) is applied onto the conductive metal. The photoresist has a pattern similar to the pattern of the pixel electrode layer by a photo-lithography process. Since widths of the micro branches 197 or micro slits 199 are very small, the formed pattern of the photoresist may have residues, or some patterns may be defective. To prevent this, an ashing process or a dry etching process may be performed. Thereafter, the conductive metal is subjected to etching and the photoresist is removed, forming a pattern of the pixel electrode layer. In accordance with an exemplary embodiment of the present invention, to realize a high-precision pattern by improving adhesion with the lower layer, the photoresist may contain an adhesion promoter, e.g., Bis(1,2, 2,6,6-pentamethyl-4-piperidinyl)-[[3,5-bis(1,1-dimethylethyl)-4-hydroxyphenyl]methyl]butylmalonate). In other words, the photoresist may be manufactured by dissolving a solid containing, as a matrix, a cresol novolac resin of about 15% by weight (hereinafter: 15 wt %) to about 25 wt %, more preferably about 20 wt %, and a photo-sensitizer of about 3 wt % to about 7 wt %, more preferably about 5 wt %, and containing, as an adhesion promoter, a Bis(1,2,2,6,6-pentamethyl-4-piperidinyl)-[[3,5-bis(1,1-dimethylethyl)-4-hydroxyphenyl]methyl]butylmalonate) of about 0.1 wt % to about 10 wt %, in a solvent, such as, for example, poly (2-glycidyl methacrylate) PGMEA of about 65 wt % to about 74.95 wt %. The cresol novolac resin may have a weight-average molecular weight of about 7,000 to about 9,000, and may be manufactured by a condensation reaction on a cresol monomer, in which a meta-cresol and a para-cresol are mixed at a ratio of 6:4, and a formaldehyde in an oxalic acid catalyst. The photosensitizer may be a compound manufactured by a condensation reaction on a compound of 2,3,4,4'-tetrahydroxybenzophenone and naphthoquinone 1.2-diazide-5-sulfonylchloride, or a compound manufactured by a condensation reaction on a compound of 4,4',4,"-ethylidyne tris phenol and naphthoquinone 1.2-diazide-5-sulfonylchloride. Since a photoresist having such a composition has an excellent adhesion with the lower layer, a high-precision pattern can be formed in a photo-lithography process.

The lower-plate alignment film 291 is formed on the pixel electrode 191. Since the lower-plate alignment film 291 is substantially the same as the upper-plate alignment film 292, a description thereof is omitted.

The spacer 250 and the liquid crystal layer 3, which maintain a specific interval, e.g., a cell interval, between a pair of the display panels 100 and 200, are formed between the lower and upper display panels 100 and 200. The refractive index of liquid crystals constituting the liquid crystal layer 3 may be about 1.3 to about 1.6, more preferably about 1.48.

To improve the transmittance of the liquid crystal display device, when the color filter 230 is formed on the lower display panel 100, the total thickness of silicon nitride SiNx formed in the pixel electrode region of the lower display panel 100 may be about 3,500 Å to about 4000 Å, and when the color filter 230 is formed on the upper display panel 200, the total thickness of silicon nitride SiNx formed in the pixel electrode region of the lower display panel 100 may be about 4,000 Å to about 5000 Å. The total thickness of silicon nitride SiNx is a sum of thicknesses of silicon nitrides SiNx constituting the gate insulating layer 140 and the protection layers 181 and 182.

In an exemplary embodiment of the present invention, the lower substrate 110, the gate insulating layer 140 made of silicon nitride SiNx, the first protection layer 181 made of silicon nitride SiNx, the second protection layer 182 made of an organic insulating material or an organic/inorganic insulating material, and the pixel electrode 191 made of IZO or ITO are about 1.5, about 1.9, about 1.9, about 1.65 to about 1.9 and about 1.9 in refractive index, respectively, and the liquid crystal display device having these components may improve the transmittance by about 2% compared with a conventional liquid crystal display device. In addition, an average refractive index of liquid crystal molecules may be 1.7 or more.

In an alternative exemplary embodiment of the present invention, the lower substrate 110, the gate insulating layer 140 made of an organic insulating material or an organic/inorganic insulating material, the first protection layer 181 made of an organic insulating material or an organic/inorganic insulating material, and the pixel electrode 191 made of IZO or ITO may be about 1.5, about 1.55, about 1.55 to about 1.9 and about 1.9 in refractive index, respectively, and the liquid crystal display device having these components may improve the transmittance by about 4% compared with a conventional liquid crystal display device.

Now, a shape of the pixel electrode 191 according to an exemplary embodiment of the present invention will be described in detail with reference to FIGS. 3, 5A, 5B, 16A to 16G, and 17A to 17G FIG. 5A is an enlarged plan view of a central part A5 of the second subpixel electrode 191*l* shown in FIG. 3. FIGS. 5B and 17A to 17G are enlarged plan views of the central part A5 of the second subpixel electrode 191*l* shown in FIG. 3, according to other exemplary embodiments of the present invention. In addition, FIGS. 16A to 16G are diagrams illustrating shapes of micro branches 197 and/or micro slits 199, according to exemplary embodiments of the present invention.

To improve the side visibility and the luminance of the liquid crystal display device, consideration may be taken into a variety of parameters, such as contour shapes of the pixel electrode 191 and the subpixel electrodes 191*h* and 191*l* formed in the region of each pixel PX, an area ratio of the subpixel electrodes 191*h* and 191*l*, a shape of the pixel electrode 191, widths and distributions of the micro branches 197 or the micro slits 199, and directions of the micro branches 197. The figures discussed below are illustrative, and may undergo a change according to factors such as a cell gap of the liquid crystal layer 3, the type of liquid crystal, and characteristics of an alignment film.

Contour Shapes of Pixel Electrode and Subpixel Electrodes

The pixel electrode 191 is separated into the first and second subpixel electrodes 191*h* and 191*l*. The separated first and second subpixel electrodes 191*h* and 191*l* have first and second liquid crystal capacitors Clch and Clcl, respectively, and the first and second liquid crystal capacitors Clch and Clcl may be different in capacitance. Contour shapes of the pixel electrode 191 and its subpixel electrodes 191*h* and 191*l* are tetragonal. Contour shapes of the pixel electrode 191 and its subpixel electrodes 191*h* and 191*l* according to another exemplary embodiment may be zigzag, radial or rhombic. Since the first and second subpixel electrodes 191*h* and 191*l* are spaced apart in the vertical direction, and spaced apart from the gate line 121, unnecessary parasitic capacitive coupling is reduced and a kickback voltage Vkb decreases. A pixel PX according to another exemplary embodiment may include three or more subpixels. The first subpixel electrode 191*h* according to another exemplary embodiment may be substantially surrounded by the second subpixel electrode 191*l*.

Area Ratio of Subpixel Electrodes

To improve the side visibility of the liquid crystal display device and reduce the luminance loss thereof, the area of the second subpixel electrode 191*l* is about 1 to about 3 times, more preferably about 1.5 to about 2 times that of the first subpixel electrode 191*h*. In FIG. 3, the area of the second subpixel electrode 191*l* is about 1.75 times that of the first subpixel electrode 191*h*. The side visibility refers to visibility of the liquid crystal display device, when viewed from the side. The closer the quality of images visually perceived at the side approaches the quality of images visually perceived as the front, the better the side visibility is.

Shape of Pixel Electrode

Referring to FIG. 3, the first and second subpixel electrodes 191*h* and 191*l* have cross-shaped branch portions 195*h* and 195*l*, respectively, and each of the subpixel electrodes 191*h* and 191*l* has 4 domains divided by the cross-shaped branch portions 195*h* and 195*l*. Each domain has a plurality of micro branches 197*h* and 197*l* obliquely extending outward from the cross-shaped branch portions 195*h* and 195*l*. Although FIGS. 5A and 5B only show parts of the second subpixel electrode 191*l*, since these parts may be substantially the same as corresponding parts of first subpixel electrode 191*h*, references will be made to both subpixel electrodes' parts. Referring to FIGS. 5A and 5B, the micro branches 197*h* and 197*l* are straight or zigzag in shape. Micro slits 199*h* and 199*l* between the neighboring micro branches 197*h* and 197*l* are alternately arranged with the micro branches 197*h* and 197*l*. Each of the micro branches 197*h* and 197*l* may be formed symmetrically about at least a selected one of horizontal branch portions 195*a* and vertical branch portions 195*v* of the cross-shaped branch portions 195*h* and 195*l*. In an alternative exemplary embodiment, each of the micro branches 197*h* and 197*l* may be formed in a portion where the horizontal branch portion 195*a* and the vertical branch portion 195*v* of the cross-shaped branch portion meet each other, so as to move about 2 μm to about 5 μm from the position where at least one of the horizontal branch portion 195*a* and the vertical branch portion 195*v* crosses the other branch portion, and a concave or convex bend may be formed on the horizontal or vertical branch portion 195*a* or 195*v* of the cross-shaped branch portion. Because of the shape of each of the micro branches 197*h* and 197*l* moving away from the position where the horizontal and vertical branch portions 195*a* and 195*v* cross each other, and of the bend formed on the horizontal or vertical branch portion 195*a* or 195*v*, an arrangement of liquid crystal molecules formed in each of the domains does not interfere with arrangements of liquid crystal molecules in other domains, reducing textures in the pixel regions.

FIG. 5A is an enlarged view of the central part A5 of the second subpixel electrode 191*l* shown in FIG. 3. Stripe-shaped micro branches 197 and micro slits 199 are shown. In the central part A5 of the second subpixel electrode 191*l*, the width of micro branches 197 is defined as S and the width of micro slits 199 is defined as W, as illustrated in FIG. 5A. The micro slits 199 and the micro branches 197 are alternately arranged. In other words, the micro slits 199 are interposed between the micro branches 197. The widths W of the micro slits 199 gradually change, and a detailed description thereof will be given later.

Now, zigzag-shaped micro branches 197 and micro slits 199 will be described with reference to FIG. 5B. Since the micro branches 197*h* and 197*l* are substantially the same as the micro slits 199*h* and 199*l* in shape, just shapes of the micro branches 197*h* and 197*l* will be described in detail. To prevent external light incident on the liquid crystal display device from generating rainbow-colored stains by being reflected on the pixel electrode 191, the pixel electrodes 191 shown in FIG. 5B may be formed, which have micro branches 197 formed in a zigzag shape. The zigzag shape may have repetitive and periodic valleys and ridges.

Now, the cause of rainbow stains occurring in the liquid crystal display device will be described in brief. A visible ray incident on the liquid crystal display device is diffracted in the liquid crystal display device by elements serving as diffraction gratings, e.g., the micro branches, and due to the diffracted light, the liquid crystal display device outputs reflected light. Since the visible ray consists of different wavelengths, the diffracted reflected light has diffraction patterns having different diffraction angles. Hence, when fluorescent light is incident on the liquid crystal display device, because the diffraction patterns have rainbow colors, the rainbow stains are visually perceived in the liquid crystal display device. Diffraction of the visible ray may occur mainly by the refractive index difference between materials on which the visible ray is incident, and by the structures of pixel electrodes serving as diffraction gratings. Based on this fact, it has been determined by the inventors of the present invention that if the difference between refractive indexes of the pixel electrodes, liquid crystals, alignment films and insulating materials constituting the liquid crystal display device is reduced, diffraction of the visible ray is reduced, contributing to a reduction in the rainbow stains. In addition, it has been determined by the inventors of the present invention that if the structure of the pixel electrodes serving as the diffraction gratings is adjusted, diffraction of the visible ray is distributed, reducing the rainbow stains.

Figure 16A:
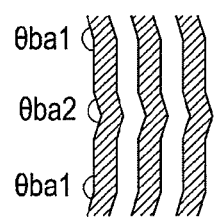
FIGS. 16A to 16G are diagrams illustrating shapes of micro branches and/or micro slits, according to exemplary embodiments of the present invention.
Figure 16D:
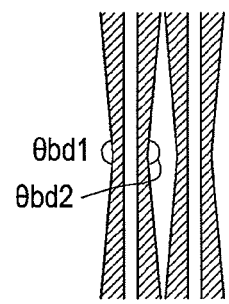
Figure 16B:
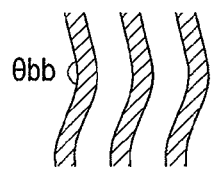
Figure 16B:
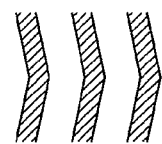
Figure 16E:
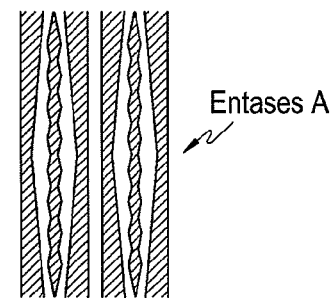
Figure 16C:
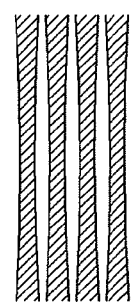
Figure 16F:
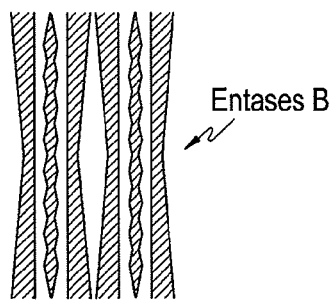
Figure 16G:
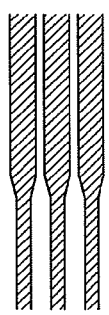

Therefore, to prevent the micro branch electrodes from serving as diffraction gratings, the pixel electrode structure may be made as randomly as possible. To randomize the pixel electrode structure, directions, widths, periods, shapes, intervals and the like of the micro branch electrodes can be randomized. Directions of the micro branches may be determined such that the micro branches have two or more different directions in each domain, or have different directions in different domains. Widths of the micro branches may be determined to gradually change with respect to those of adjacent micro branches. The micro branch electrodes may be periodically disposed such that in one domain, one group is made that has a period in which the width of multiple micro branches is constant, and a plurality of groups having different periods are made. Referring to FIGS. 5A, 5B, and 16A to 16G, the micro branches 197 or micro slits 199 may have shapes of stripes, bats, zigzags, multi-broken zigzags, waves, entases, paired entases, combined entases A, or combined entases B. The micro branch electrodes may be formed to have different intervals from those of the adjacent micro branch electrodes. Each of the shapes shown in FIGS. 16A to 16G may be a basic unit of micro branches 197 or micro slits 199 having a cyclic form, and is a shape of a basic unit pixel electrode. The micro branches 197 or micro slits 199 may be constructed by each of or a combination of the shapes of basic unit pixel electrodes. The shapes of basic unit pixel electrodes may be about 4 μm to about 25 μm in basic unit length, and about 1.5 μm or more in width. FIG. 16A illustrates multi-broken zigzag shapes, which are broken at angles θba1 and θba2. The angles θba1 and θba2 may be different from each other. FIG. 16B illustrates wave shapes, which are bent at an angle ebb. FIG. 16C illustrates entasis shapes whose central portions are smaller in thickness than both end portions. The entasis shapes may be applied to micro electrodes 197 or micro slits 199. FIG. 16D illustrates paired entasis shapes, which include pairs of a shape consisting of a straight line bent at an angle θbd1 and θbd2 and a non-bent straight line, wherein the shape of a two-shape pair is symmetrical to the other shape of that pair and a pair of the entasis shapes is symmetrical to the other pair of entasis shapes. In accordance with an exemplary embodiment of the present invention, the angles θbd1 and θbd2 may be different from each other. FIG. 16E illustrates shapes of combined entases A, a basic unit of which has a shape in which diamonds are connected between two bent straight lines in the paired entasis shapes. FIG. 16F illustrates shapes of combined entases B, in which diamonds are connected between two non-bent straight lines in the paired entasis shapes. FIG. 16G illustrates bat shapes combined to have different widths at different portions. The bat shapes may be stripe shapes in which two or more widths, e.g., widths of about 1.8 μm, about 3.2 μm and about 4.5 μm, are repeatedly connected. The stripe-shaped basic unit pixel electrodes have already been described with reference to FIG. 5A, and the zigzag-shaped basic unit pixel electrodes will be described below with reference to FIG. 5B. In accordance with an exemplary embodiment of the present invention, micro branches 197 or micro slits 199 can be constructed by each of or a combination of the shapes of basic unit pixel electrodes. In addition, micro branches 197 or micro slits 199 may be constructed, in which basic units of different lengths are combined by each of or a combination of the shapes of basic unit pixel electrodes. In the following description, a pixel electrode is formed using the shapes of basic unit pixel electrodes.

In accordance with an exemplary embodiment of the present invention, the micro branch electrodes formed in the shapes of basic unit pixel electrodes may be different in interval from adjacent micro branch electrodes.

Since a lot of an external visible ray is incident if the color filter 230 is formed on the lower display panel 100, the color filter 230 may be formed on the upper display panel 200 to reduce the incidence of the external visible ray.

Now, the micro branches 197*l* formed in a zigzag shape to reduce the rainbow stains will be described in brief with reference to FIG. 5B. The zigzag-shaped micro branches 197*l* are constructed to have a zigzag unit length P5 and a zigzag angle θ5. As to the zigzag unit length P5, each of the micro branches 197*h* and 197*l* has a straight length, which is about 31 μm to about 25 μm, more preferably about 4 μm to about 10 μm. The main direction of the micro branches 197 formed in each domain is the direction in which a straight line connecting peaks PK1 and PK2 shown in FIG. 5B extends. The peaks PK1 and PK2 are adjacent points in one period in one micro branch 197. The zigzag angle θ5 is a bending angle between the main-direction line of the micro branch 197 and the line corresponding to the zigzag unit length P5, and the zigzag angle θ5 is about 0° to about ±40°, more preferably about ±12° to about ±20°. The diffraction light being diffracted by a pixel electrode having a large zigzag angle θ5 or various zigzag angles θ5 is dispersed, contributing to a reduction in rainbow stains on the liquid crystal display device. The zigzag-shaped micro branches 197*l* extend from the vicinity of the horizontal branch portion 195*a* and the vertical branch portion 195*v* of the cross-shaped branch portion up to the edge of each of the subpixel electrodes 191*h* and 191*l*. An increase in the number of zigzag shapes constituting the micro branch 197 leads to an increase in the number of diffraction spots of light being diffracted by the zigzag shapes, facilitating a reduction in rainbow stains on the liquid crystal display device. Since the light reflected on the micro branches 197*l* of the pixel electrode 191 differs in interference effect according to wavelength, the micro branches 197 formed on the pixel electrodes 191 associated with the color filters of the primary colors may have different zigzag unit lengths P5 and different zigzag angles θ5. In this manner, if the micro branches 197*l* having different zigzag shapes are formed on the pixel electrode 191 according to the pixels of the primary colors, the rainbow stains of the liquid crystal display device are reduced.

In an alternative exemplary embodiment, one micro branch 197 constituting the pixel electrode 191 may have zigzag unit lengths P5 of different sizes. Since the micro branch 197 formed in this way has a high irregularity, the diffraction light diffracted by the micro branch 197 is dispersed, leading to a reduction in rainbow stains on the liquid crystal display device. In another exemplary embodiment, one micro branch 197*h* or 197*l* constituting the pixel electrode 191 may be constructed in a mixed shape of straight lines and zigzags. In another exemplary embodiment, mixed micro branches of straight line-shaped micro branches 197*h* and 197*l* and zigzag-shaped micro branches 197*h* and 197*l* may be constructed in one domain.

Shapes of micro branches 197 and micro slits 199 according to other exemplary embodiments of the present invention will now be described with reference to FIGS. 17A to 17G. Since the micro branches 197 and micro slits 199 are substantially similar in shape, a detailed description of the shapes will be focused on the shapes of the micro branches 197. Micro branches 197 and micro slits 199 shown in FIGS. 17A, 17B, 17C and 17E have zigzag shapes. A width S of each of the micro branches 197 and a width W of each of the micro slits 199 have been described above with reference to FIG. 3 or 5A.

Figure 17A:
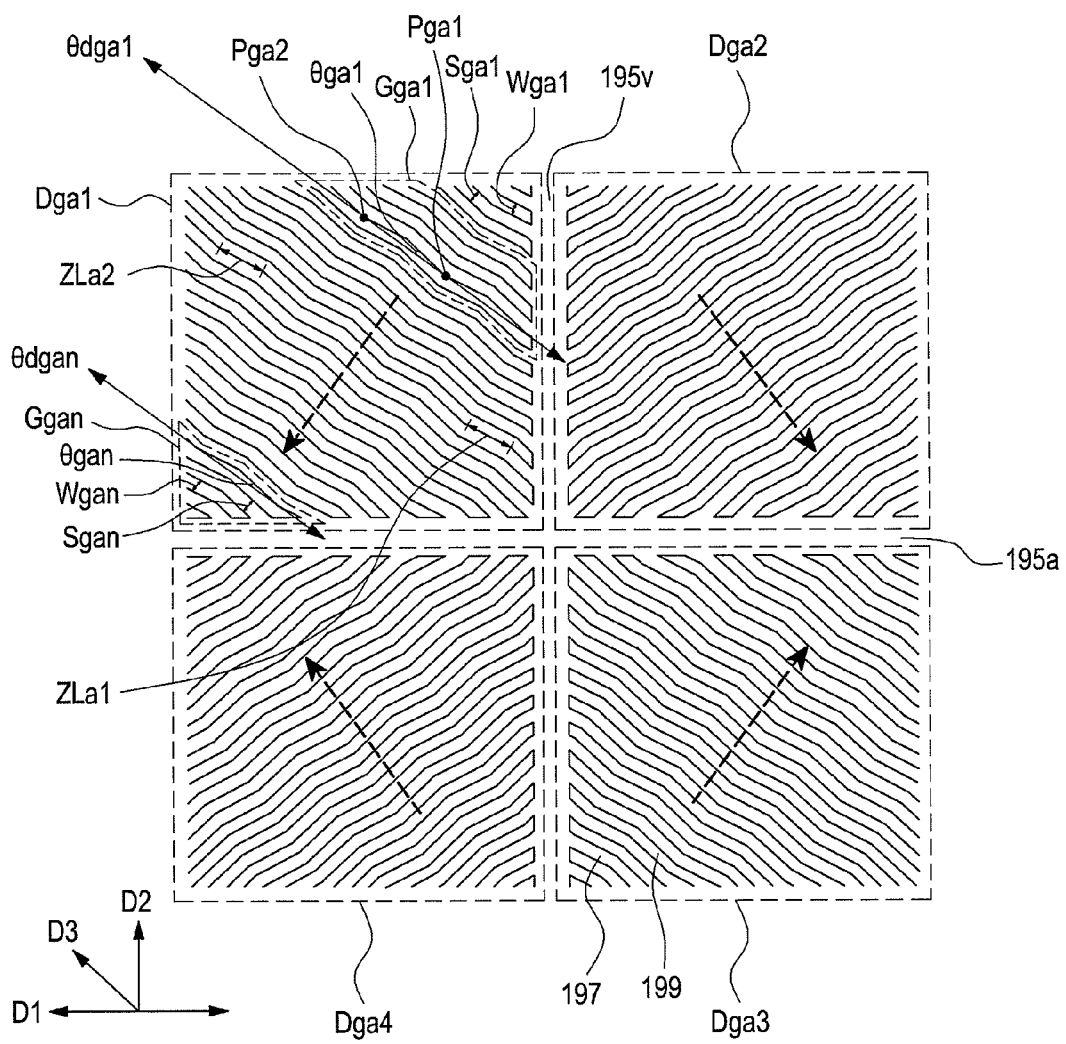
FIGS. 17A to 17G are enlarged plan views of the central part A5 of the second subpixel electrode 191l shown in FIG. 3, according to other exemplary embodiments of the present invention.

In the plan view of a pixel electrode shown in FIG. 17A, micro branches 197 or micro slits 199 gradually change in width according to an exemplary embodiment of the present invention. FIG. 17A is a plan view of a pixel electrode including four domains Dga1, Dga2, Dga3, and Dga4. The four domains have micro branches 197 extending in different directions, and these domains are separated by a cross-shaped branch 195 and connected to the cross-shaped branch 195. Structures of the micro branches 197 constituting each domain, for example, shapes, lengths, widths and/or directions, are symmetrical about a horizontal branch portion 195*a* and a vertical branch portion 195*v* of the cross-shaped branch 195. On the other hand, the micro branches 197 constituting the domains may be have different structures according to the domains, for example, they may have an asymmetrical structure with respect to the horizontal branch portion 195*a* and the vertical branch portion 195*v* of the cross-shaped branch 195.

As illustrated in FIG. 17A, the domain Dga1 includes a plurality of subdomains Gga1~Ggan including a plurality of micro branches 197 and a plurality of micro slits 199. The plurality of subdomains may be distinguished from other subdomains by widths and zigzag angles of the micro branches 197 and micro slits 199, and main directions θdga1 and θdgan and zigzag unit lengths ZLa1 and ZLan of the subdomains. In accordance with an exemplary embodiment of the present invention, the subdomains are distinguished by the widths of the micro branches 197 and micro slits 199. Widths of micro branches 197 or micro slits 199 constituting a first subdomain Gga1 may be the same, but different from widths of micro branches 197 or micro slits 199 constituting an n-th subdomain Ggan. Micro branches 197 or micro slits 199 in the other domains Dga2, Dga3, and Dga4 may be equal in structure to those in the domain Dga1.

In accordance with an exemplary embodiment of the present invention, widths S and W of micro branches 197 and micro slits 199 constituting the domains Dga1, Dga2, Dga3, and Dga4 may be about 2.0 μm to about 6 μm, and may gradually increase along the dotted arrows. In the start portion of a dotted arrow, e.g., in the first subdomain Gga1 shown in the domain Dga1, widths Sga1 and Wga1 of micro branches 197 and micro slits 199 may be about 2.5 μm, and in the end portion of the dotted arrow, e.g., in the n-th subdomain Ggan shown in the domain Dga1, widths Sgan and Wgan of micro branches 197 and micro slits 199 may be about 5 μm. In a subdomain corresponding to the central portion where the dotted arrow passes by, widths of micro branches 197 and micro slits 199 may fall within a range of about 2.5 μm to about 5 μm. The widths of micro branches 197 and micro slits 199 may gradually increase along the dotted arrow by up to about 0.25 μm.

Lengths Pga1 and Pgan (not shown) of zigzag units constituting each of domains Dga1, Dga2, Dga3, and Dga4 and shown therein may be about 5 μm to about 20 μm. The zigzag unit lengths may gradually increase in a direction away from the horizontal branch portion 195*a* and the vertical branch portion 195*v* of the cross-shaped branch 195.

A main direction angle for a main direction θdga of micro branches 197 or micro slits 199 constituting the domains Dga1, Dga2, Dga3, and Dga4 may be about ±30° to about ±60°, more preferably about ±40° to about ±50° with respect to a direction D1. The main direction θdga1 of micro branches 197 is a direction of a straight line connecting peaks Pga1 and Pga2 of a micro branch, shown in the domain Dga1. An angle between the main direction of micro slits 199 or micro branches 197 and the direction D1, for example, a polarization axis of a polarizer, will be referred to herein as a 'main direction angle' of micro slits 199 or micro branches

197. Zigzag angles θga1 and θgan shown in the domain Dga1 may be about 0° to about ±40°, more preferably about 0° to about ±30° with respect to the main direction of micro branches 197 or micro slits 199. Absolute values of the zigzag angles shown in FIG. 17A may gradually increase along the dotted arrow by a value within a range of about 2° to about 5°. A first zigzag angle θga1 formed in the first subdomain Gga1 may be 0°, and an n-th zigzag angle θgan formed in the n-th subdomain Ggan may be +30° or −30°. A main direction of micro branches 197 or micro slits 199 may be determined as described in connection with FIG. 5B, e.g., determined by a direction of a straight line connecting peaks of a zigzag shape. The formed pixel electrode has an irregular structure, contributing to a significant reduction in rainbow stains on the liquid crystal display device.

Figure 17B:
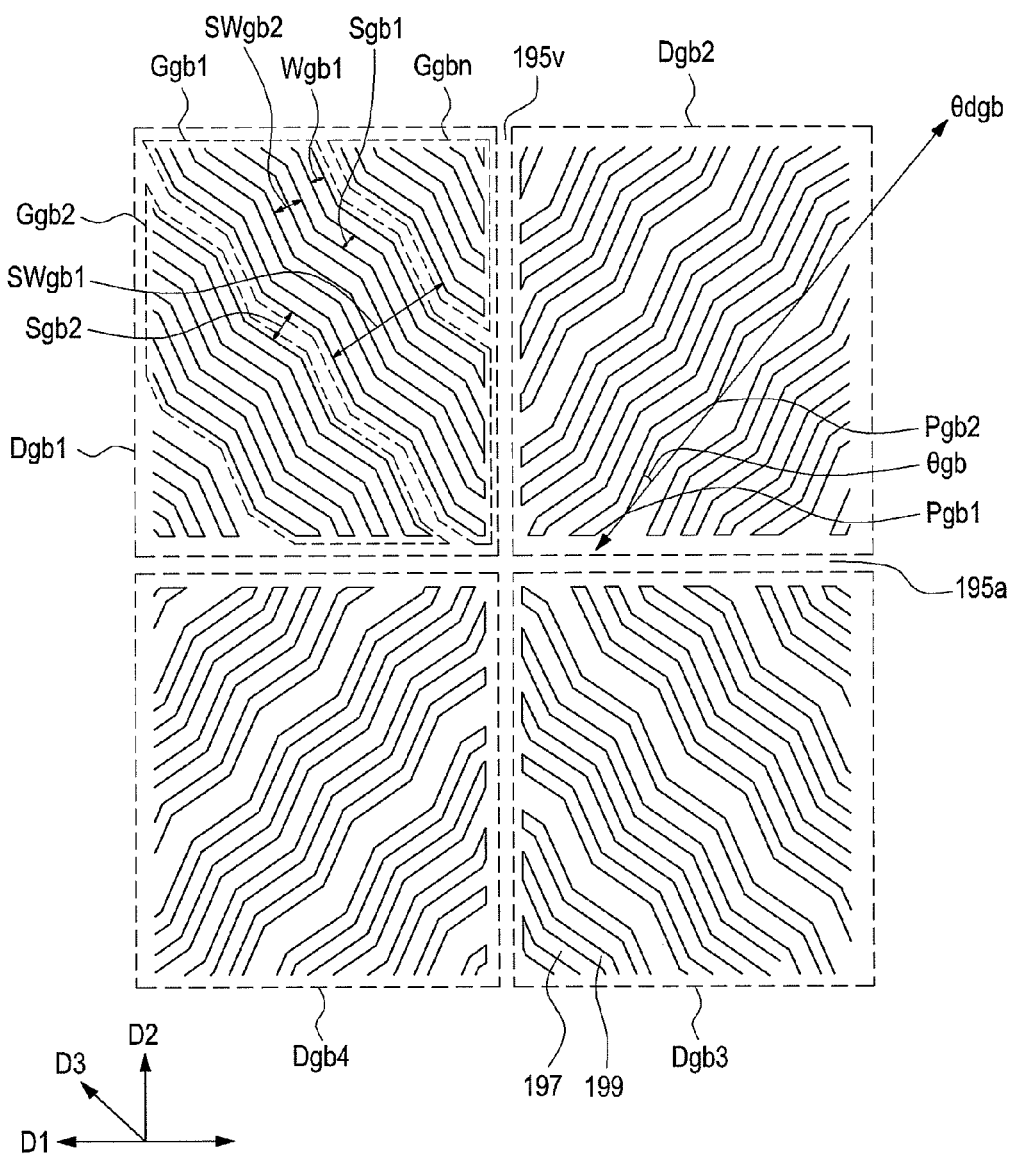

In the following description of FIGS. 17B to 17G, the corresponding description which has already been made with reference to FIGS. 5A, 5B and 17A is omitted, and only the different features in FIGS. 17B to 17G are described in detail. Referring to FIG. 17B, each of four domains Dgb1, Dgb2, Dgb3, and Dgb4 has a plurality of first to n-th subdomains Ggb1~Ggbn. Micro branches 197 and micro slits 199 in the domains Dgb1, Dgb2, Dgb3, Dgb4 are formed asymmetrically about a cross-shaped branch 195.

In the plan view of a pixel electrode shown in FIG. 17B, micro branches 197 and micro slits 199 are formed in each of the plurality of domains Dgb1, Dgb2, Dgb3, and Dgb4 according to an exemplary embodiment of the present invention. Micro branches 197 or micro slits 199 forming the four domains Dgb1, Dgb2, Dgb3, and Dgb4 are formed asymmetrically about the cross-shaped branch 195. In a domain Dgb2, a main direction angle of micro slits 199 or micro branches 197, which is formed by main angles θdgb of the micro slits 199 or micro branches 197, is about ±45°, and a zigzag angle θgb thereof may be about ±7° to about ±20°, more preferably about ±10° or about ±15°. The domains Dgb1, Dgb2, Dgb3, and Dgb4 have the same main direction angle and zigzag angle of micro branches 197. Each of the subdomains Ggb1, and Ggb2~Ggbn includes a predetermined number of micro branches and micro slits interposed therebetween. Micro subdomains SWgb2 including adjacent micro branch-micro slit pairs may be formed in subdomains periodically or repeatedly. Widths Wgb1 and Sgb1 of micro slits and micro branches constituting micro branch-micro slit pairs may be about 3 μm. Therefore, widths of micro subdomains SWgb2 may be about 6 μm. In an exemplary embodiment of the present invention, if each of the subdomains has four micro branches 197 and four micro slits 199, a width SWgb1 of each subdomain may be about 26 μm. Therefore, as illustrated in FIG. 17B, each of domains Dgb1, Dgb2, Dgb3, and Dgb4 has subdomains Ggb1, and Ggb2 Ggbn, which may have the same widths of micro subdomains. However, widths Sgb2 of micro branches between adjacent subdomains in each domain may be different from widths of micro branches in each subdomain. For example, widths of micro branches in each subdomain may be about 3 μm, while the widths Sgb2 of micro branches may be about 5 μm. In conclusion, widths of micro branches 197 between adjacent subdomains in each domain are different from widths of micro branches 197 in each subdomain, and micro branches and micro slits formed in domains are asymmetrical about the cross-shaped branch, increasing irregularity of the pixel electrode structure, dispersing diffraction spots of the light diffracted thereby, and thus contributing to a significant reduction in rainbow stains on the liquid crystal display device. The number of subdomains in each of the aforementioned domains is subject to change according to the size of the pixel electrode.

Figure 17C:
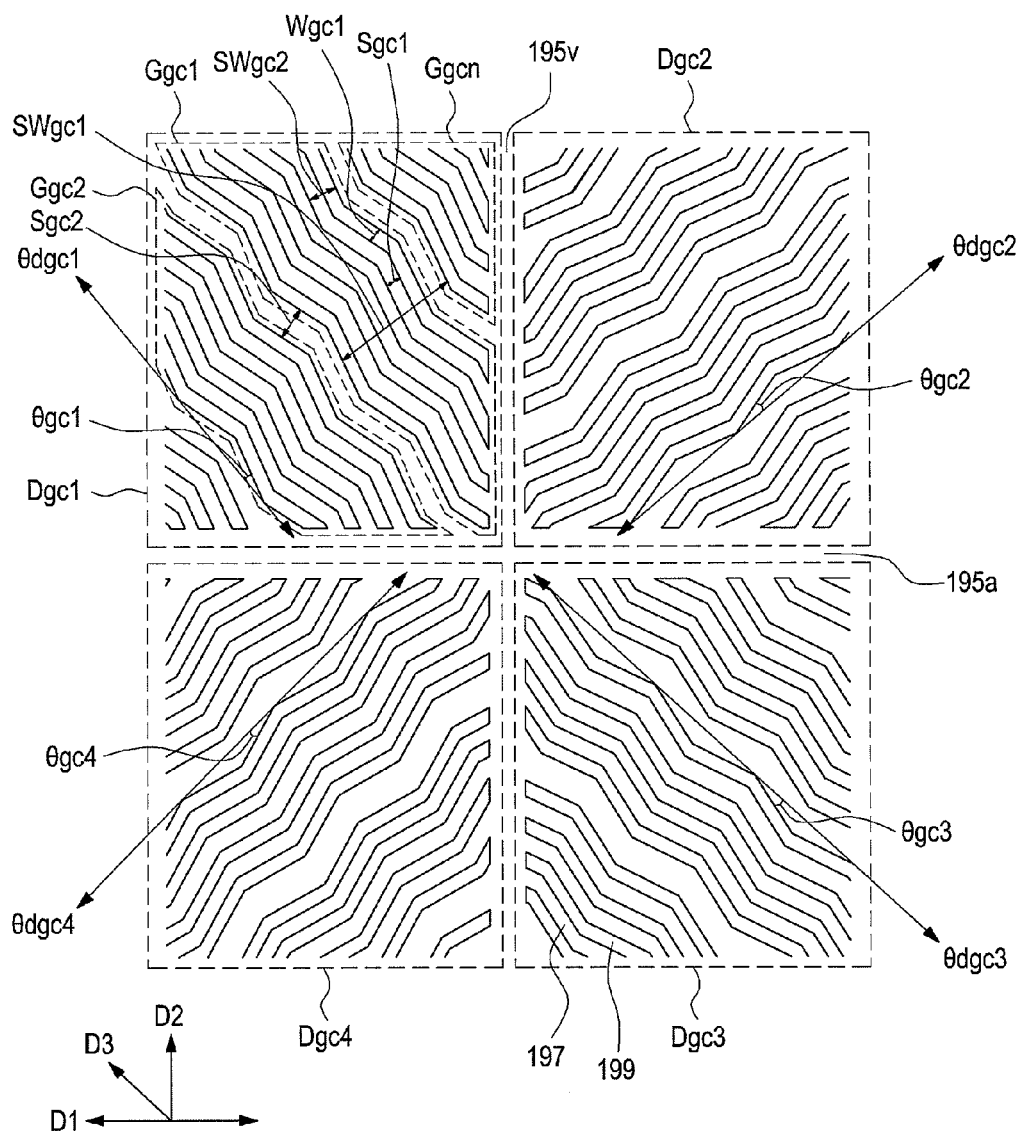

In the plan view of a pixel electrode shown in FIG. 17C, micro branches 197 constituting domains have different main directions according to an exemplary embodiment of the present invention. The pixel electrode includes four domains Dgc1, Dgc2, Dgc3, and Dgc4. The domains Dgc1, Dgc2, Dgc3, and Dgc4 have different main directions θdgc1, θdgc2, θdgc3, and θdgc4 of micro branches 197, determined by connecting peaks of each of the micro branches 197. Main direction angles of the main directions θdgc1, θdgc2, θdgc3, and θdgc4 of micro branches or micro slits forming domains may be different from each other within about 30° to about 60°. For example, main direction angles for the main directions θdgc1, θdgc2, θdgc3 and θdgc4 may be about 50°, about 41.3°, about 40°, and about 48.7°, respectively. In these main directions of micro branches 197, zigzag angles θgc1, θgc2, θgc3, and θgc4 of micro branches 197 may fall within a range of about ±5° to about ±30°, more preferably about ±10° to about ±15°. In accordance with an exemplary embodiment of the present invention, zigzag angles of micro branches 197 formed in each domain may be different from each other and may gradually increase along a specific direction. A difference between zigzag angles of adjacent micro branches 197 may be about 0.5° to about 5°, more preferably about 2° to about 3°. In accordance with another exemplary embodiment of the present invention, zigzag angles of micro branches 197 formed in one domain may be the same as those of micro branches formed in the same subdomain, and different from those of micro branches formed in other subdomains. A difference in zigzag angles between subdomains may be about 0.5° to about 5°, more preferably about 2° to about 3°. On the other hand, zigzag angles of micro branches 197 formed in one domain may be different from those of micro branches formed in the same subdomain, and symmetrical to those of micro branches formed in other subdomains. Symmetry between domains Dgc1, Dgc2, Dgc3, and Dgc4, symmetry between subdomains Ggc1, and Ggc2~Ggcn, widths Sgc1, Sgc2, and Wgc1 of micro branches 197 and micro slits 199 constituting subdomains Ggc1, and Ggc2~Ggcn in each domain, and periodicity and widths SWgc1 of subdomains Ggc1, and Ggc2~Ggcn are largely similar to those described in connection with FIG. 17B. In this way, main directions and zigzag angles of micro branches 197 in two different domains among the domains are formed different from each other, thereby increasing irregularity of the pixel electrode structure, dispersing diffraction spots of the light diffracted thereby, and thus contributing to a significant reduction in rainbow stains on the liquid crystal display device. In an exemplary embodiment, main directions θdgc1, θdgc2, θdgc3, and θdgc4 of the domains may be symmetrically paired.

Figure 17D:
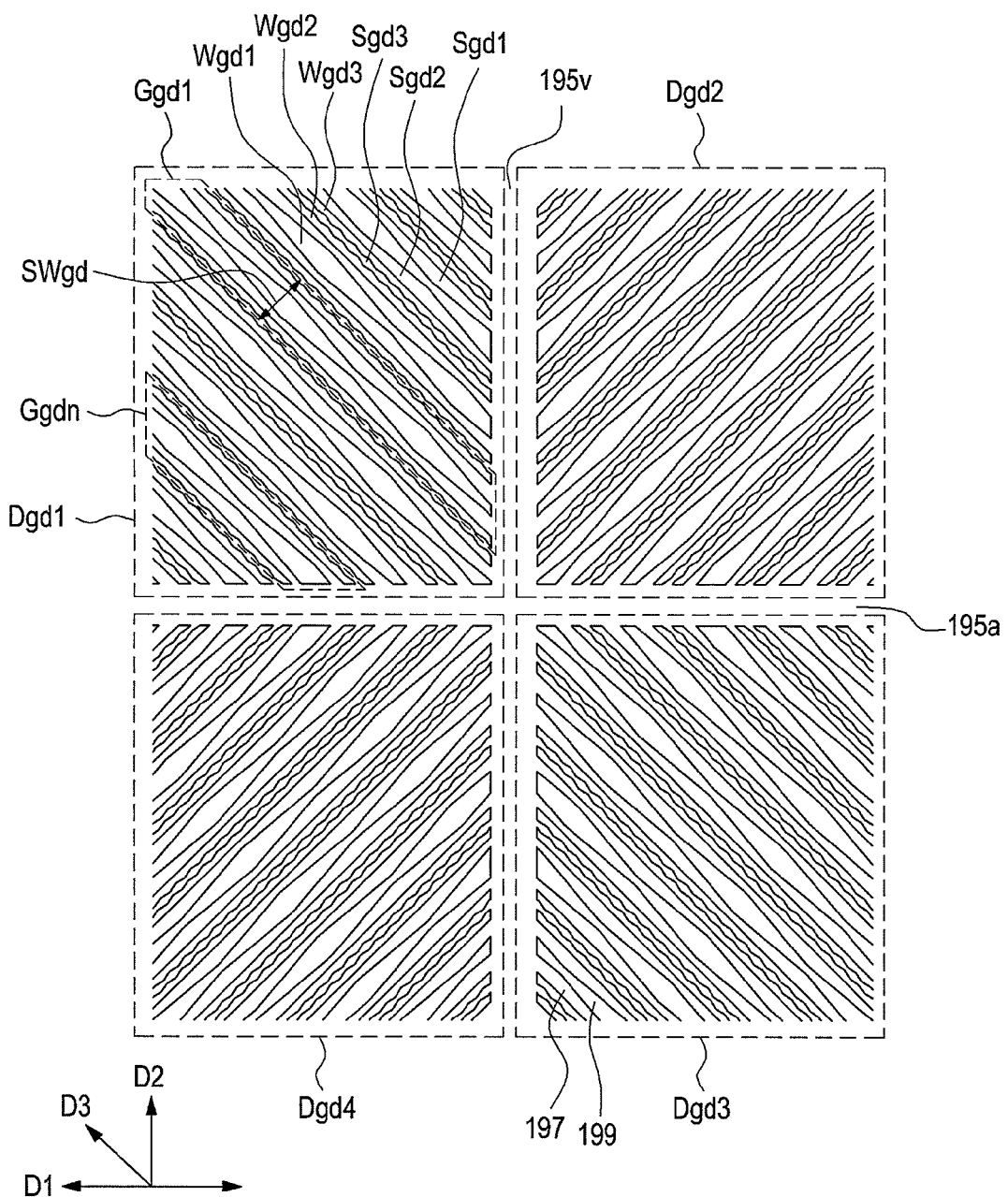

In the plan view of a pixel electrode shown in FIG. 17D, shapes of micro branches Sgd1, Sgd2, and Sgd3 and micro slits Wgd1, Wgd2, and Wgd3 constituting subdomains Ggd1~Ggdn are combined according to an exemplary embodiment of the present invention. The pixel electrode includes four domains Dgd1, Dgd2, Dgd3, and Dgd4. Each of the domains Dgd1, Dgd2, Dgd3, and Dgd4 includes subdomains Ggd1~Ggdn which are periodically repeated. Each of the subdomains Ggd1~Ggdn includes a plurality of micro branches Sgd1, Sgd2, and Sgd3, and micro slits Wgd1, Wgd2, and Wgd3. Micro branches 197 and micro slits 199 have shapes similar to the above-described combined entases A (see FIG. 16E) or combined entases B (see FIG. 16F). The micro branches 197 may be formed as Sgd1, Sgd2 and Sgd3. A micro branch Sgd1 has a shape formed in a combination of a straight line and a zigzag. A micro branch Sgd2 has a shape symmetrical to the micro branch Sgd1. A micro branch Sgd3 has a rhombus or diamond-connected shape. The shapes of micro branches 197 may be applied to micro slits 199. The micro slits 199 may be formed as Wgd1, Wgd2 and Wgd3. A micro slit Wgd1 has a shape formed in a combination of two zigzags. A micro slit Wgd2 has a shape formed by a straight line and a zigzag which is smaller than the zigzags of the micro slit Wgd1. A micro slit Wgd3 has a shape symmetrical to the micro slit Wgd2. Widths SWgd of subdomains may be about 10 µm to about 40 µm, and widths of micro branches Sgd1, Sgd2, and Sgd3, and micro slits Wgd1, Wgd2, and Wgd3 may be about 2 µm to about 10 µm. The shapes of micro slits 199 may be applied to the micro branches 197. Micro branches 197 and micro slits 199 constituting four domains Dgd1, Dgd2, Dgd3, and Dgd4, and main directions of the micro branches 197 may be formed symmetrically about a cross-shaped branch 195. Any one of the main directions of micro branches 197 may be about 30° to about 60°, more preferably about 45°. While it has been described that micro slits and micro branches in domains are symmetrical about the cross-shaped branch 195 in accordance with an exemplary embodiment of the present invention, the micro slits and micro branches in domains may be formed asymmetrically, and main directions of micro branches 197 in domains may also be asymmetrical. In this manner, micro branches 197 constituting subdomains are diverse in shape and width, thereby increasing irregularity of the pixel electrode structure, dispersing diffraction spots of the light diffracted thereby, and thus contributing to a significant reduction in rainbow stains on the liquid crystal display device.

Figure 17E:
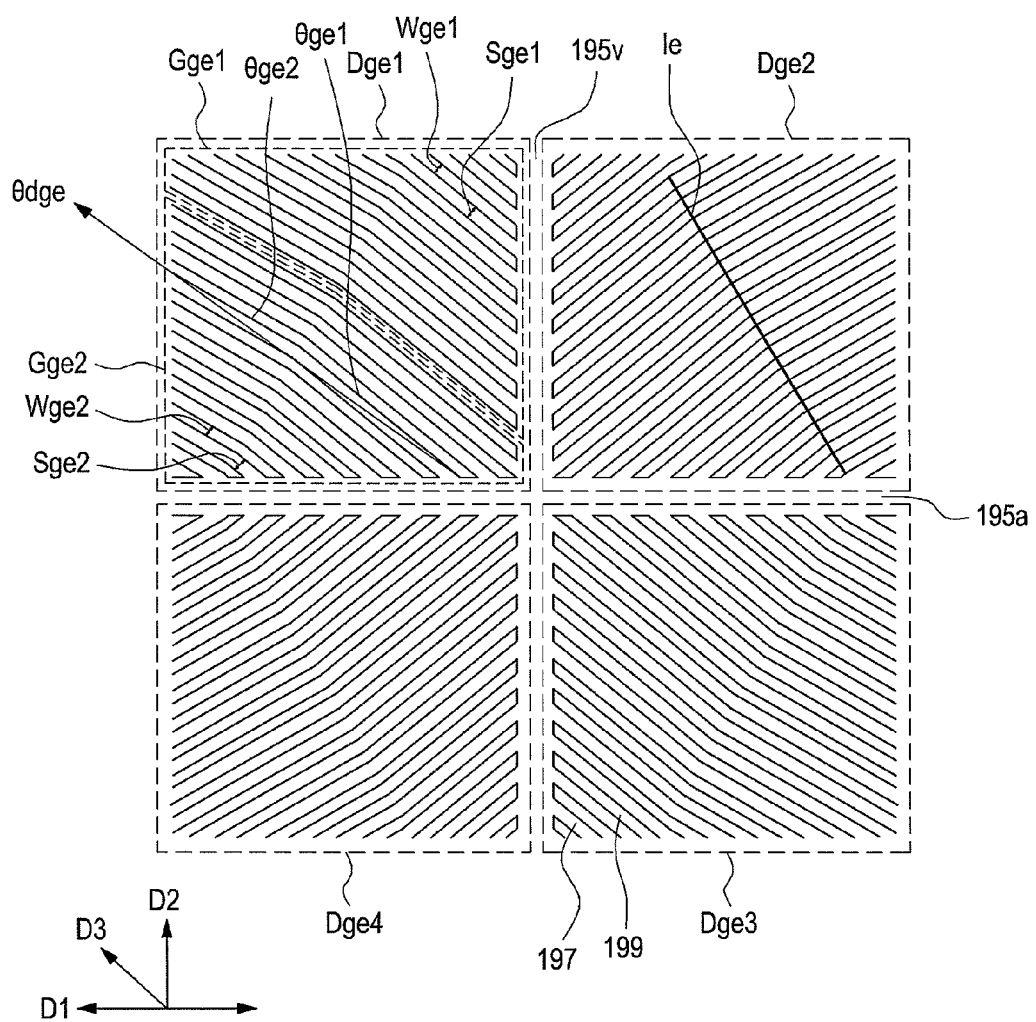

In the plan view of a pixel electrode shown in FIG. 17E, micro slits 199 having two different directions are provided diagonally in each of four domains Dge1, Dge2, Dge3, and Dge4 according to an exemplary embodiment of the present invention. The pixel electrode includes four domains Dge1, Dge2, Dge3, and Dge4. Domain Dge1 includes subdomains Gge1 and Gge2. Subdomain Gge1 has micro branches 197 and micro slits 199, whose widths are Sge1 and Wge1, respectively. Subdomain Gge2 has micro branches 197 and micro slits 199, whose widths are Sge2 and Wge2, respectively. In accordance with an exemplary embodiment of the present invention, the widths Sge1 and Sge2 of micro branches may be different, and the widths Wge1 and Wge2 of micro slits may also be different. For example, the width Sge2 of micro branches may be greater than the width Sge1 of micro branches, or the width Wge2 of micro slits may be greater than the width Wge1 of micro slits. In accordance with an exemplary embodiment of the present invention, a sum of a micro branch's width Sge1 and its adjacent micro slit's width Wge1 formed in the subdomain Gge1 may be different from a sum of a micro branch's width Sge2 and its adjacent micro slit's width Wge2 formed in the subdomain Gge2. For example, a sum (e.g., about 5.5 µm to about 10 µm) of a micro branch's width Sge2 and a width Wge2 of its adjacent micro slit 199 formed in the subdomain Gge2 may be greater than a sum (e.g., about 4 µm to about 8 µm) of a micro branch's width Sge1 and a width Wge1 of its adjacent micro slit 199 formed in the subdomain Gge1. Between the subdomains Gge1 and Gge2 may be another subdomain in which widths of micro branches 197 or micro slits 199 may gradually change. Subdomains Gge1 and Gge2 have micro branches 197 having two directions θge1 and θge2 different from their main direction edge. In other words, subdomains each have a region including micro branches 197 in a direction θge1 and another region including micro branches 197 in a direction θge2. Angles between the directions θge1 and θge2 may be any value within a range of about 40° to about 50° and any value within a range of about 30° to about 39°, more preferably about 42° and about 37°, respectively. Main direction angles for main directions edge of micro branches 197 may be any value within a range of about 30° to about 60°, more preferably about 45°. As illustrated in the domain Dge2, a straight line Ie connecting points at which micro branches 197 change from a direction θge1 to a direction θge2, may be an arc of an ellipse, or a straight line. The above-described structure of micro branches 197 may also be applied to a structure of micro slits 199. The structure formed in the domain Dge1 may also be applied to other domains Dge2, Dge3, and Dge4, and the pixel electrode's structures formed in the domains may be symmetrical about a horizontal portion 195a or a vertical portion 195v of the cross-shaped branch 195. The pixel electrode formed in this manner may change the strength of an electric field within a liquid crystal layer, improving side visibility of the liquid crystal display layer. In addition, irregularity of the pixel electrode structure increases, thereby dispersing diffraction spots of external light and contributing to a noticeable decrease in rainbow stains on the liquid crystal display device.

In accordance with another exemplary embodiment of the present invention, micro branches 197 having a direction θge2 may be closer to a data wiring than micro branches 197 having a direction θge1, and an angle between a data line 171 and the direction θge2 may be greater than an angle between the data line 171 and the direction θge1. Since the micro branches 197 close to the data line 171 and having the direction θge2 are more perpendicular to the data line 171 than the micro branches 197 having the direction θge1, the major axes or principal axes of liquid crystal molecules adjacent to the data line 171 are arranged more perpendicularly to the data line 171 than those of liquid crystal molecules adjacent to a cross-shaped branch. Therefore, the major axes or principal axes of liquid crystal molecules arranged approximately perpendicular to the data line 171 may improve side visibility representing visibility in a direction perpendicular to the data line 171. In addition, the micro branches 197 having the direction θge1 are arranged more parallel to the data line 171 than the micro branches 197 having the direction θge2, thereby improving side visibility representing visibility in a direction parallel to the data line 171 due to the micro branches 197 having the direction θge1. The pixel electrode having micro branches 197 arranged in two or more directions may improve side visibility of the liquid crystal display device.

Figure 17F:
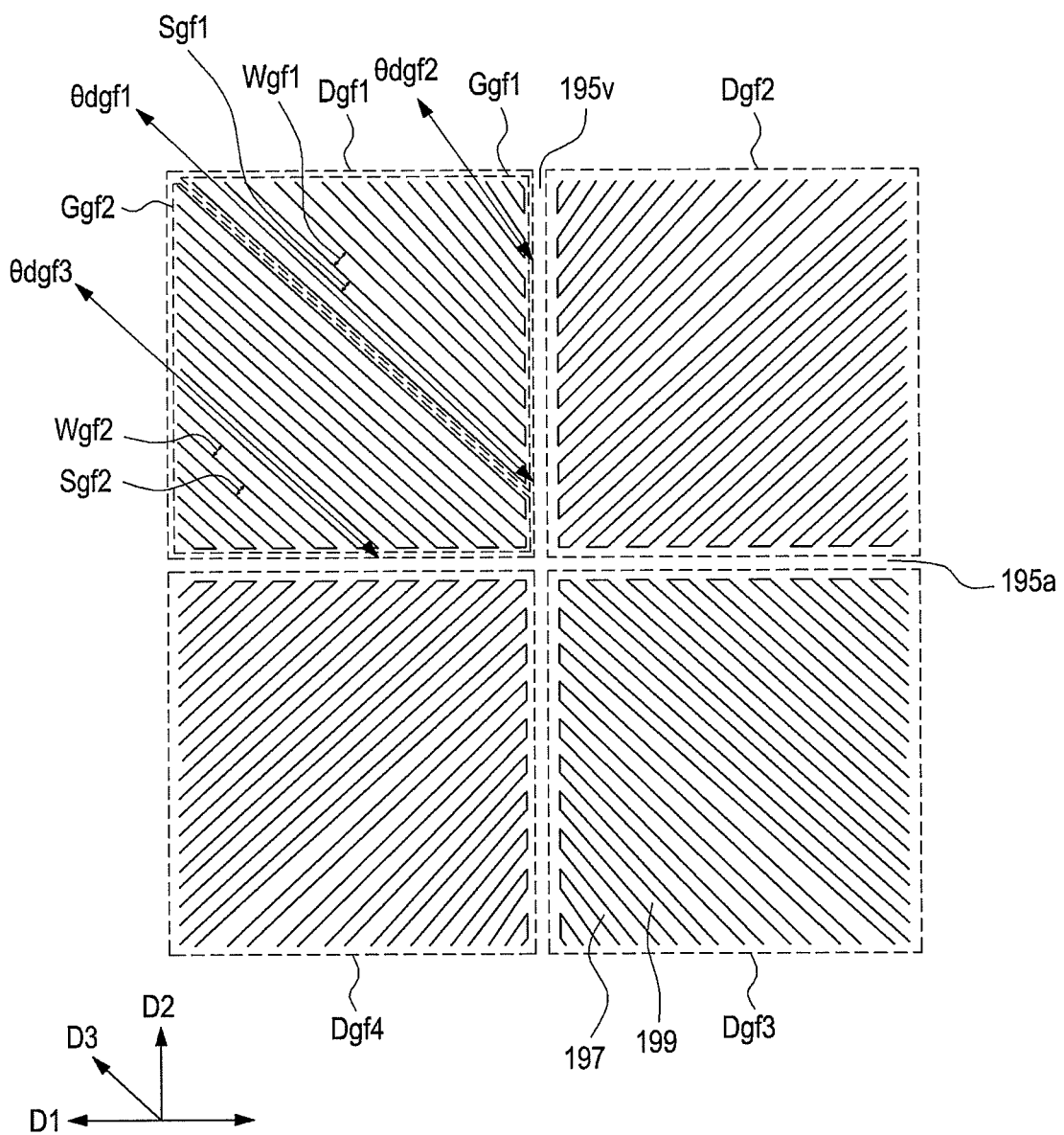
Figure 17G:
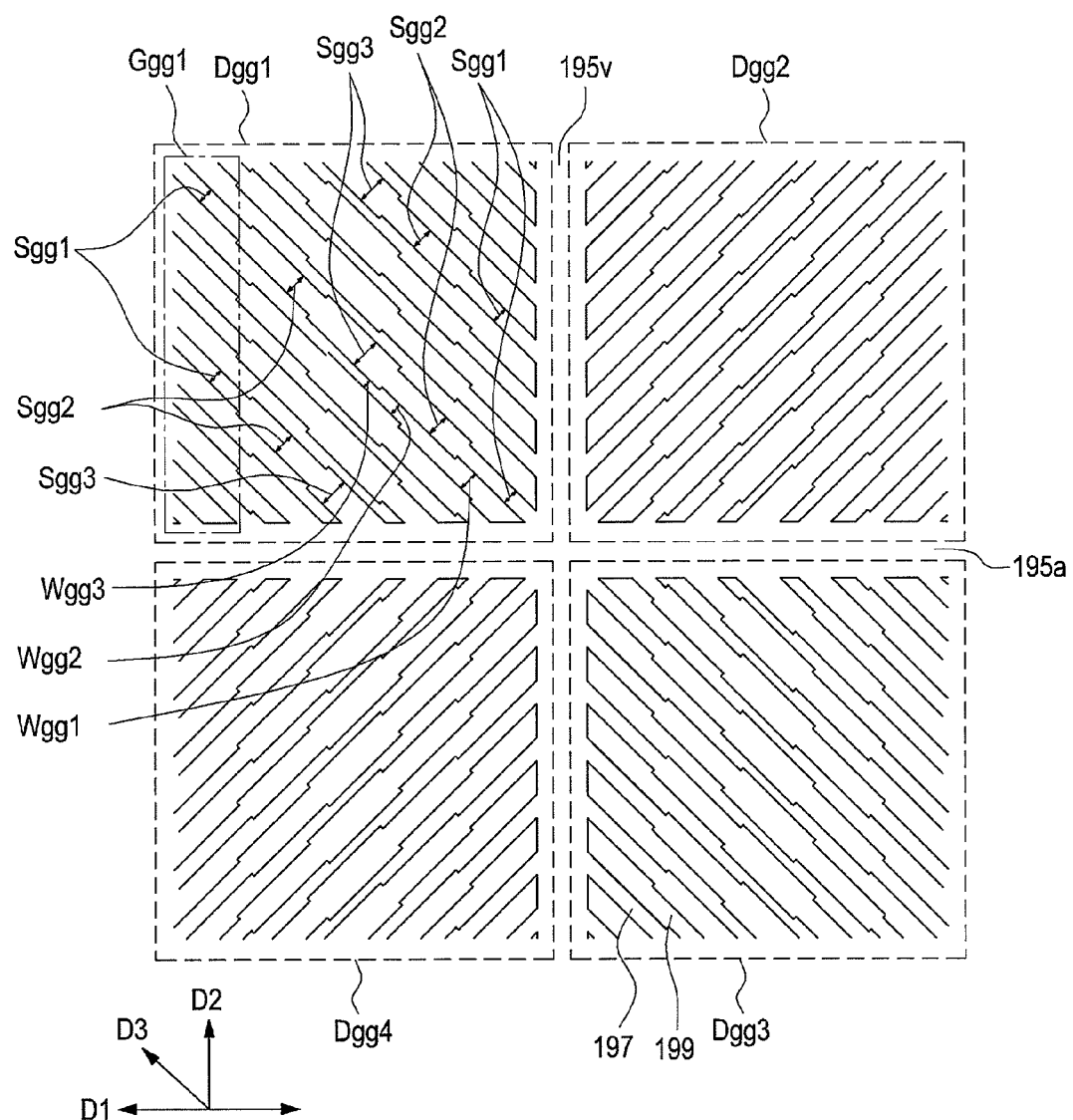

Micro branches 197 and micro slits 199 shown in FIGS. 17F and 17G have stripe shapes. Widths S and W of micro branches 197 and micro slits 199 have been described in conjunction with FIGS. 3 and 5A. In the plan view of a pixel electrode shown in FIG. 17F, widths of micro slits 199 gradually increase as they go from a horizontal portion 195a or a vertical portion 195v of a cross-shaped branch 195 toward the edge of the pixel electrode, e.g., toward a vertical connection portion 193 or a horizontal connection portion 194, according to an exemplary embodiment of the present invention. In other words, as micro slits 199 extend to the edge of the pixel electrode, their widths gradually increase. The pixel electrode has four domains Dgf1, Dgf2, Dgf3, and Dgf4. Domain Dgf1 includes subdomains Ggf1 and Ggf2. Subdomain Ggf1 has micro branches 197 and micro slits 199 having micro branch's width Sgf1 and micro slit's width Wgf1, respectively, which change along their extension direction. In addition, the subdomain Ggf1 has micro slits 199 or micro branches 197 having main direction angles θdgf1 and θdgf2. The main direction angle of micro slits or micro branches means an angle between a straight line connecting central points of widths of micro slits or micro branches and a polarization axis of a polarizer, or a direction D1. Widths Wgf1 of micro slits 199 constituting the subdomain Ggf1 gradually increase as they go from a horizontal portion 195a or a vertical portion 195v of a cross-shaped branch 195 toward the edge of the pixel electrode, e.g., toward a vertical connection portion 193 or a horizontal connection portion 194. Widths Sgf1 of micro branches 197 may be constant, or may gradually increase as they go from the horizontal portion 195a or the vertical portion 195v of the cross-shaped branch 195 toward the edge of the pixel electrode, or toward the vertical connection portion 193 or the horizontal connection portion 194 of the pixel electrode.

In accordance with another exemplary embodiment of the present invention, the main directions θdgf1 and θdgf2 of micro slits 199, shown in the subdomain Ggf1, may be different from each other. In the subdomain Ggf1, main direction angles for main directions θdgf1 of micro slits 199 adjacent to a subdomain Ggf2 may be smaller than main direction angles for main directions θdgf2 of other micro slits 199 in the subdomain Ggf2, and the main direction angles of micro slits 199 may gradually increase from the main direction angle θdgf1 to the main direction angle θdgf2. In accordance with an exemplary embodiment of the present invention, main direction angles for main directions θdgf1 and θdgf2 of micro slits 199 may be about 30° to about 55°. Main direction angles of micro branches 197 are substantially similar to the main direction angles of micro slits 199. Any one of main direction angles for main directions θdgf1 and θdgf2 of micro slits 199, shown in the subdomain Ggf1, may be greater than main direction angles of micro slits 199, shown in the subdomain Ggf2. The subdomain Ggf2 has micro branches 197 and micro slits 199 having micro branch's width Sgf2 and micro slit's width Wgf2, respectively, which are constant along their extension direction. The micro branch's width Sgf2 and micro slit's width Wgf2 may be substantially equal in values. On the other hand, the micro branch's width Sgf2 and micro slit's width Wgf2 may be different to adjust the strength of an electric field being applied to a liquid crystal layer. Main directions of micro slits 199 or micro branches 197, shown in the subdomain Ggf2, are substantially the same. The pixel electrode structure formed in the domain Dgf1 may be applied to the other domains Dgf2, Dgf3, and Dgf4, and the structures of a pixel electrode, formed in the domains, may be symmetrical about the horizontal portion 195a or the vertical portion 195v of the cross-shape branch 195. The pixel electrode including the micro branches 197 and micro slits 199 formed in this manner can adjust the strength of an electric field formed in a liquid crystal layer according to the subdomains, thereby improving side visibility of the liquid crystal display device or significantly reducing rainbow stains of the liquid crystal display device.

In the plan view of a pixel electrode shown in FIG. 17G, a plurality of micro branches 197 and a plurality of micro slits 199 have two or more discontinuous widths according to an exemplary embodiment of the present invention. The pixel electrode shown in FIG. 17G includes four domains Dgg1, Dgg2, Dgg3, and Dgg4. A domain Dgg1 has micro branches 197 and micro slits 199 in a stair shape. In other words, the micro branches 197 and micro slits 199 have various discontinuous widths. As illustrated in FIG. 17G each micro branch 197 has widths Sgg1, Sgg2 and Sgg3, and the widths of each micro branch 197 may discontinuously increase in an order of widths Sgg1, Sgg2 and Sgg3 as they go from a horizontal portion 195a or a vertical portion 195v of a cross-shaped branch 195 to the edge of the pixel electrode. Each of the micro branch widths Sgg1, Sgg2 and Sgg3 may have any value within a range of about 2.0 μm to about 6 μm. In accordance with an exemplary embodiment of the present invention, micro branch widths Sgg1, Sgg2 and Sgg3 may be about 1.8 μm, about 3.2 μm and about 4.5 μm, respectively. Micro slit widths adjacent to the micro branch widths Sgg1, Sgg2 and Sgg3 may be Wgg1, Wgg2 and Wgg3, respectively. The micro slit widths Wgg1, Wgg2 and Wgg3 may have any value within a range of about 2.0 μm to about 6 μm. In accordance with an exemplary embodiment of the present invention, the micro slit widths Wgg1, Wgg2 and Wgg3 may be about 4.5 μm, about 3.2 μm and about 1.8 μm, respectively. In each of adjacent micro branch-micro slit pairs, a sum of a micro branch width and a micro slit width may have two or more values. In accordance with an exemplary embodiment of the present invention, for at least one micro branch 197 situated diagonally in the domains, micro branch widths Sgg1, Sgg2, Sgg3, Sgg2, and Sgg1 may discontinuously increase and decrease as they extend from the central portion of the pixel electrode, or the horizontal portion 195a or the vertical portion 195v of the cross-shaped branch 195, to the edge of the pixel electrode. In an exemplary embodiment of the present invention, at least one micro branch 197 may increase in discontinuous widths as it goes from the horizontal portion 195a or vertical portion 195v of the cross-shaped branch 195 to the central portion of the domain, and may decrease in discontinuous widths as it goes from the central portion of the domain to a vertical connection portion 193 or a horizontal connection portion 194 of the pixel electrode, or the edge of the pixel electrode. Other micro branches 197 may increase in discontinuous micro branch widths as they go from the horizontal portion 195a or vertical portion 195v of the cross-shaped branch 195 to the edge of the pixel electrode, and the other remaining micro branches 197 may decrease in discontinuous micro branch widths as they go from the horizontal portion 195a or vertical portion 195v of the cross-shaped branch 195 to the edge of the pixel electrode. Micro branches 197 in a subdomain Ggg1 of the domain Dgg1 may have the same micro branch width Sgg1. The subdomain Ggg1 may be formed in a portion adjacent to the vertical connection portion 193 or horizontal connection portion 194 of the pixel electrode, or the edge of the pixel electrode. A main direction of each of the micro branches 197 or micro slits 199 formed in the domain Dgg1 is a direction of a straight line connecting central points of widths of the micro branches 197 or micro slits 199, and main directions of the micro branches or micro slits are parallel to each other. The pixel electrode structure formed in the domain Dgg1 may also be applied to other domains Dgg2, Dgg3, and Dgg4, and pixel electrode structures formed in the domains may be symmetrical about the horizontal portion 195a or vertical portion 195v of the cross-shaped branch 195. The pixel electrode including the micro branches 197 and micro slits 199 formed in this manner may tilt liquid crystal molecules in a liquid crystal layer at various angles, thereby improving side visibility of the liquid crystal display device or significantly reducing rainbow stains of the liquid crystal display device.

The pixel electrode according to another exemplary embodiment may have at least one V-shaped notch. In other words, a V-shaped notch may be engraved or embossed on an electrode of the micro branches 197 or the cross-shaped branch portions 195. If the notch is formed on the pixel electrode, a response speed of the liquid crystal display increases and the luminance thereof increases.

Referring to FIG. 3, the first and second subpixel electrodes 191h and 191l have the vertical connection portions 193h and 193l both on the left and right, respectively. The vertical connection portions 193h and 193l block parasitic capacitive coupling occurring between the data line 171 and the subpixel electrodes 191*h* and 191*l*. Referring to FIGS. 4B and 4C, in adjacent pixels, the vertical connection portions 193*h* of the first subpixel electrode 191*h* overlap the vertical portions 128 of the storage electrode line by OLL1 and OLR1, respectively. OLL1 and OLR1 may be values selected from about 0.5 μm to about 3 μm, respectively. In adjacent pixels, the vertical connection portions 193*l* of the second subpixel electrode 191*l* overlap the vertical portions 128 of the storage electrode line by OLL2 and OLR2, respectively. OLL2 and OLR2 may be values selected from about 1 μm to about 3 μm, respectively. To reduce a change in capacitance of the second liquid crystal capacitor Clcl formed on the second subpixel electrode 191*l*, OLL2 and OLR2 may be greater than or equal to OLL1 and OLR1, respectively. The light blocking member 220 formed on the upper display panel 200 overlaps the vertical portions 128 of the storage electrode line formed in the portion of the first subpixel electrode 191*h* by OBL1 and OBR1, respectively. Each of OBL1 and OBR1 may be about 0.5 μm to about 3 μm. In addition, the light blocking member 220 formed on the upper display panel 200 overlaps the vertical portions 128 of the storage electrode line formed in the region of the second subpixel electrode 191*l* by OBL2 and OBR2, respectively. Each of OBL2 and OBR2 may be about 0.5 μm to about 3 μm. The light leakage of the liquid crystal display device may be improved by matching values of OBL1, OBR1, OBL2 and OBR2 with process conditions and the cell gap's size.

Widths and Distributions of Micro Branches and Micro Slits

To improve the transmittance and side visibility of the liquid crystal display device and reduce occurrence of rainbow stains, the widths S of the micro branches 197 and the widths W of the micro slits 199 (shown in FIG. 5A) may be determined in different ways according to the parameters such as the thickness of the liquid crystal layer 3, the type of the liquid crystal molecules 31, the maximum data voltage, and the voltage ratio and area ratio of the first subpixel electrode 191*h* and the second subpixel electrode 191*l*.

Each of the widths S of the micro branches 197 and the width W of the micro slits 199 according to an exemplary embodiment of the present invention is about 2 μm to about 6 μm, more preferably about 2.5 μm to about 4 μm. In accordance with another exemplary embodiment of the present invention, if micro branches 197 are greater than micro slits 199 in area, an electric field between the pixel electrode and the common electrode increases, contributing to an increase in response speed and transmittance of the liquid crystal display device. Therefore, the micro branch widths S may not be limited to what is shown in the figures. Referring to FIG. 3, S and W are constant in the first subpixel electrode 191*h*, and respective domains of the second subpixel electrode 191*l* have first to third regions HA, LA and MA according to the S and W and the distributions of the micro branches and micro slits. In the first area HA, the width S of the micro branches 197 and the width W of the micro slits 199 are defined as S1 and W1, respectively, and S1 and W1 are the same. In the second region LA, the width S of the micro branches 197 and the width W of the micro slits 199 are defined as S2 and W2, respectively, and W2 is greater than S2. In the third region MA, the width S of the micro branches 197 and the width W of the micro slits 199 are defined as S3 and W3, respectively, and S3 is constant but W3 gradually changes. In the third region MA, W3 gradually increases as it gets close to the second region LA from the first region HA. S and W of the first subpixel electrode 191*h* according to an exemplary embodiment are about 3 μm and about 3 μm, respectively, and S1 and W1; S2 and W2; and S3 and W3 of the second subpixel electrode 191*l* are about 3 μm and about 3 μm; about 3 μm and about 4 μm; about 3 μm and about 3 μm to about 4 μm, respectively. The step, by which the width W3 of the micro slits 199*l* gradually changes, is about 0.15 p m to about 0.5 μm, more preferably about 0.2 μm. On the other hand, each of S3 and W3 in the third region MA may gradually change, and S2 and W2 in the second region LA may be greater than S1 and W1 in the first region HA, respectively. The area of the first region HA formed in each domain of the second subpixel electrode 191*l* is greater than the area of the second region LA. In an exemplary embodiment of the present invention, of the area of the entire region in each domain, each subpixel, or each pixel, e.g., of the combined area of the HA region, the LA region and the MA region, the area of the first region HA is about 50% to about 80%, more preferably about 60% to about 70%, and the combined area of the second region LA and the third region MA is about 20% to about 50%, more preferably about 30% to about 40%. The areas of the first to third regions HA, LA and MA may have different distributions (sizes) in each domain. The first to third regions HA, LA and MA may be formed symmetrically about at least a selected one of the horizontal branch portion and the vertical branch portion of each of the cross-shaped branch portions 195*h* and 195*l*. In an alternative exemplary embodiment, the first to third regions HA, LA and MA may be formed in the first subpixel electrode 191*h*.

Directions of Micro Branches

Because the major axis of the liquid crystal molecules 31 is tilted in a direction parallel to the micro branches 197*h* and 197*l* by the electric field formed in the liquid crystal layer 3, the liquid crystal display device having the micro branches 197*h* and 197*l* extending in the direction of about 45° with respect to the polarization axis of the polarizer has the maximum transmittance. Therefore, depending on the directions of the micro branches 197*h* and 197*l* of the subpixel electrodes 191*h* and 191*l*, the luminance and side visibility of the liquid crystal display device may vary based on the change in transmittance of light passing through regions of the subpixels 190*h* and 190*l*.

In each domain, directions of the micro branches 197 and the micro slits 199 may be about 0° to about 45°, more preferably about 30° to about 45°, with respect to at least a selected one of a first direction D1 and a second direction D2. The first direction D1 and the second direction D2 may be a direction of a polarization axis of a polarizer attached to the lower display panel 100 or the upper display panel 200. Referring to FIG. 3, the micro branches 197 are formed in directions of θ1 and θ2 with respect to the polarization axis of the polarizer in the first subpixel electrode 191*h* and the second subpixel electrode 191*l*, respectively, and θ1 and θ2 are about 40° and about 45°, respectively. In an exemplary embodiment, the θ1 can be different from θ2 by about 20° or less. Directions of the micro branches 197*h* and 197*l* may be about 30° to about 45° with respect to the direction of the horizontal portion 195*a* or vertical portion 195*v* of the cross-shaped branch 195, or the gate line 121. The direction of the gate line 121 may be a direction of a virtual line passing by between the first subpixel electrode 191*h* and the second subpixel electrode 191*l* constituting the pixel electrode. In the case of the zigzag-shaped micro branches 197 having a period of peaks PK1 and PK2 shown in FIG. 5B, the direction in which the line connecting the peaks PK1 and PK2 extends is the main direction of the micro branches 197. Directions of the micro branches 197*h* and 197*l* may be determined differently according to the domains, the pixels, or the subpixel electrodes 191*h* and 191*l*.

A liquid crystal display panel assembly 300 according to another exemplary embodiment of the present invention will be described in detail below with reference to FIGS. 18 to 21B. The liquid crystal display panel assembly 300 has patterns of a pixel electrode layer shown in FIGS. 18 to 21B according to exemplary embodiments of the present invention, thereby improving visibility of the liquid crystal display device and reducing stains and defects.

Figure 18:
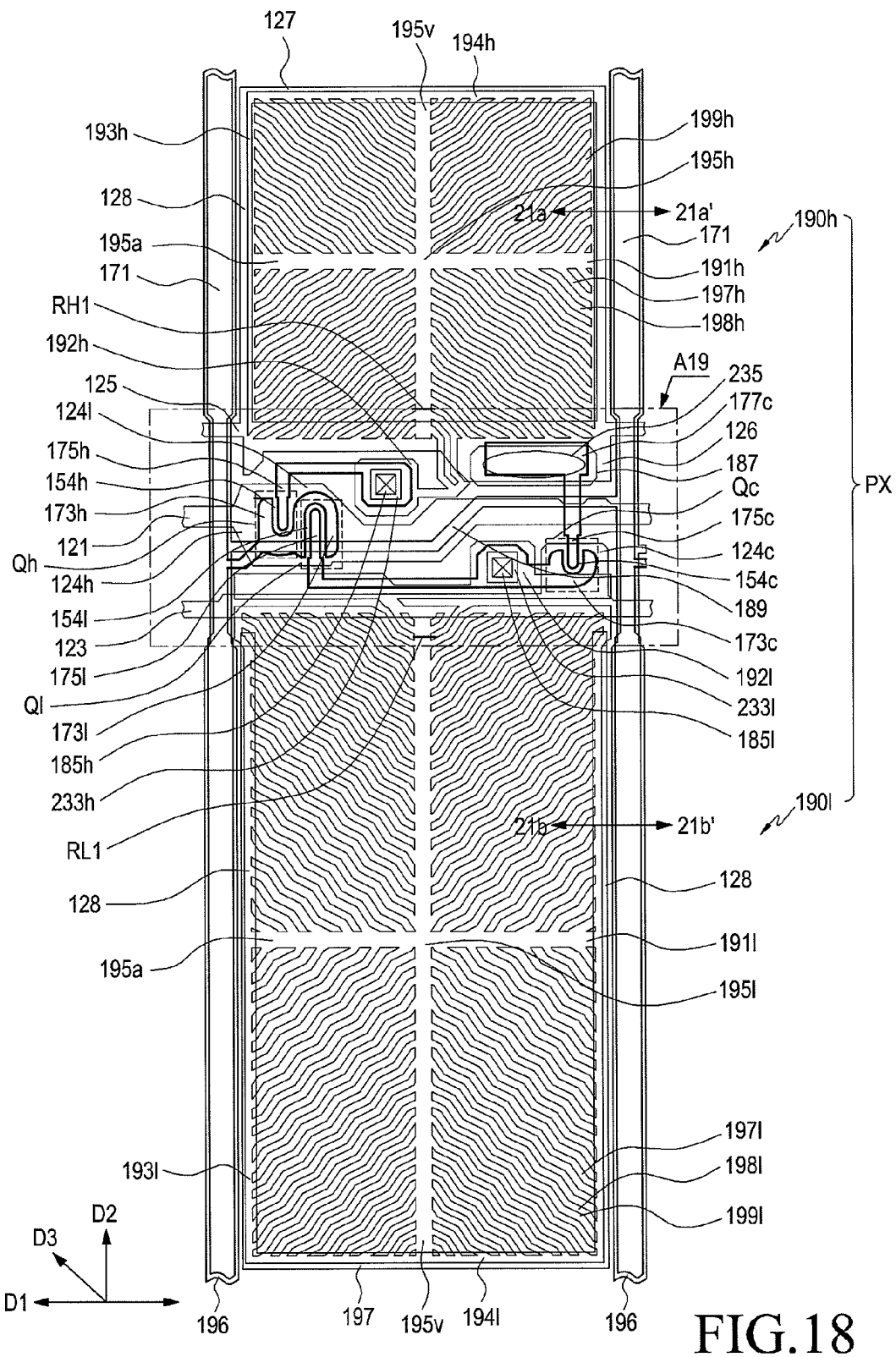
FIG. 18 is a diagram illustrating a schematic layout of a pixel according to another exemplary embodiment of the present invention.
Figure 19A:
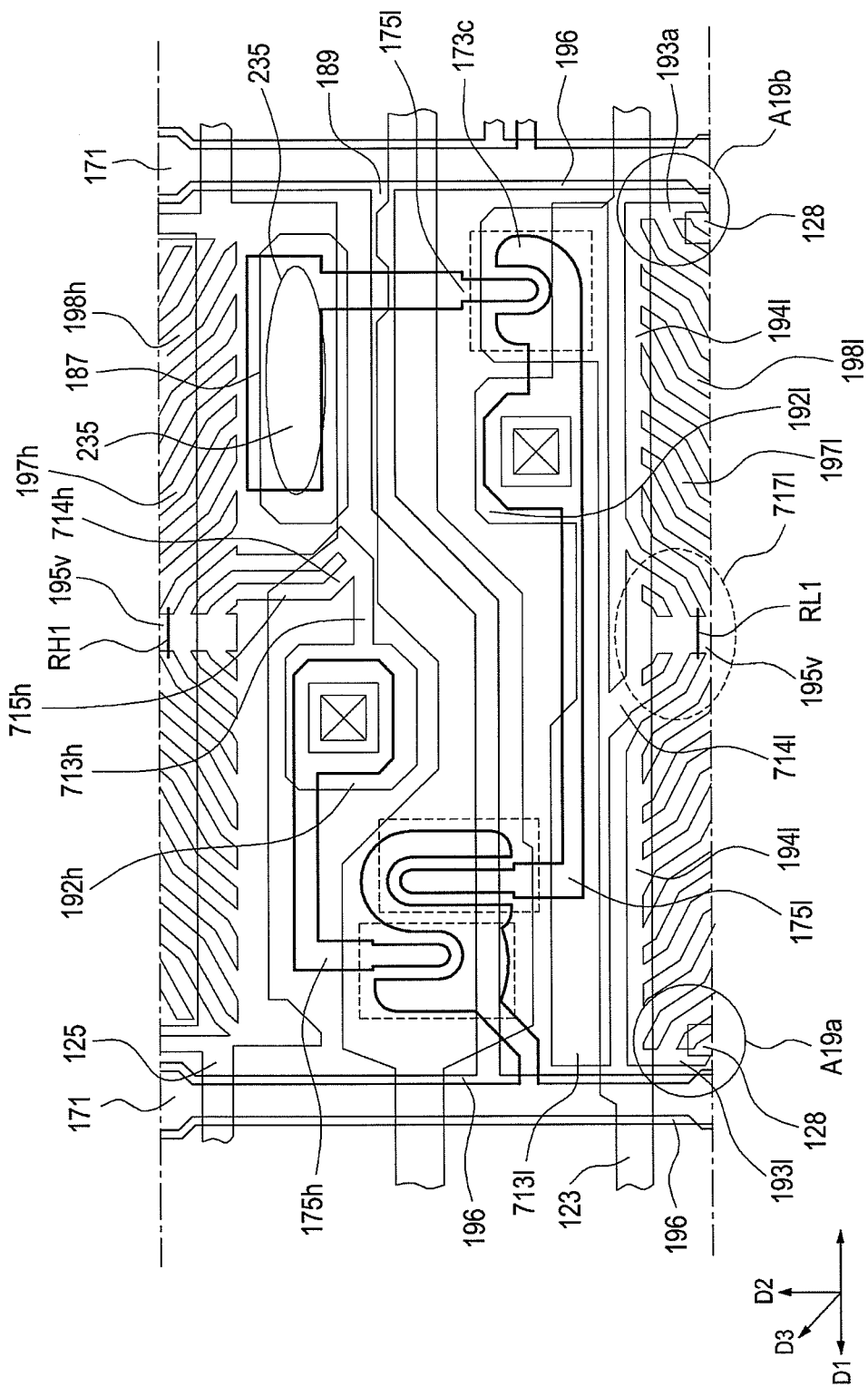
FIG. 19A is an enlarged view of a central part A19 of the pixel layout shown in FIG. 18.
Figure 19B:
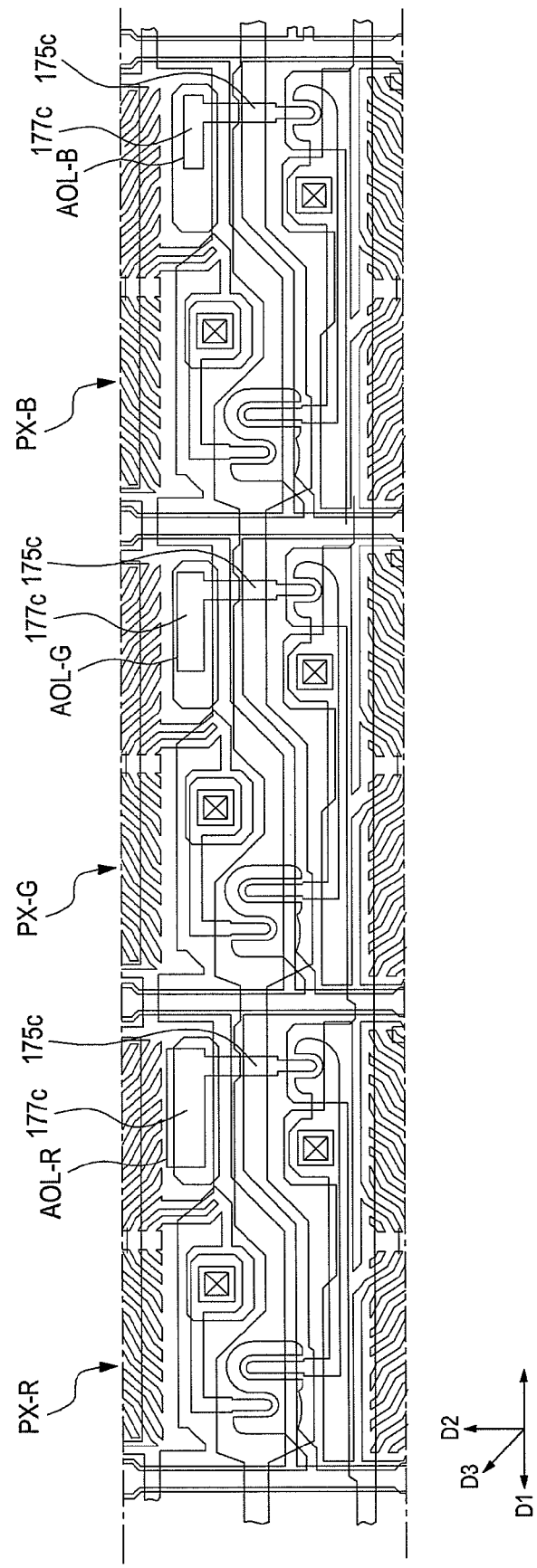
FIG. 19B is an enlarged view corresponding to the central part A19 shown in FIG. 18 for each pixel included in a pixel group, according to an exemplary embodiment of the present invention.
Figure 20A:
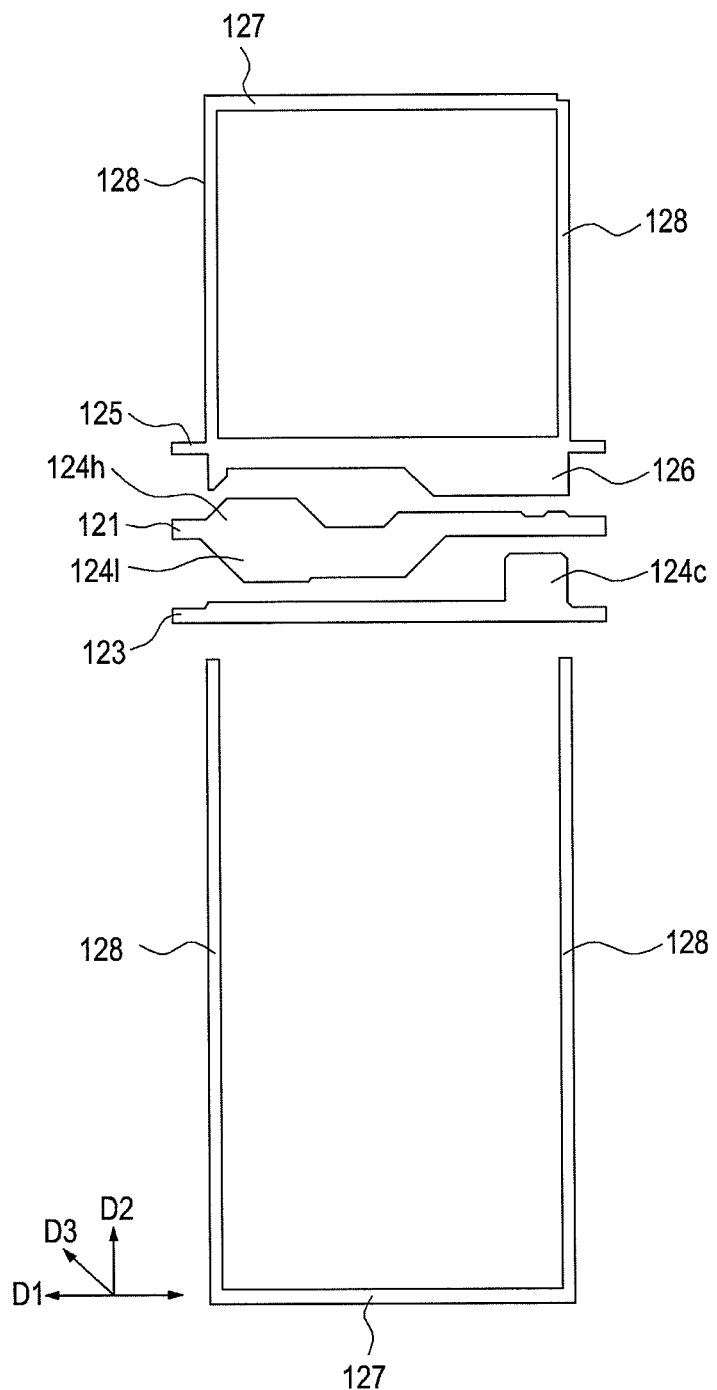
FIGS. 20A to 20C are diagrams illustrating patterns for major layers of the pixel layout shown in FIG. 18, according to exemplary embodiments of the present invention.
Figure 20B:
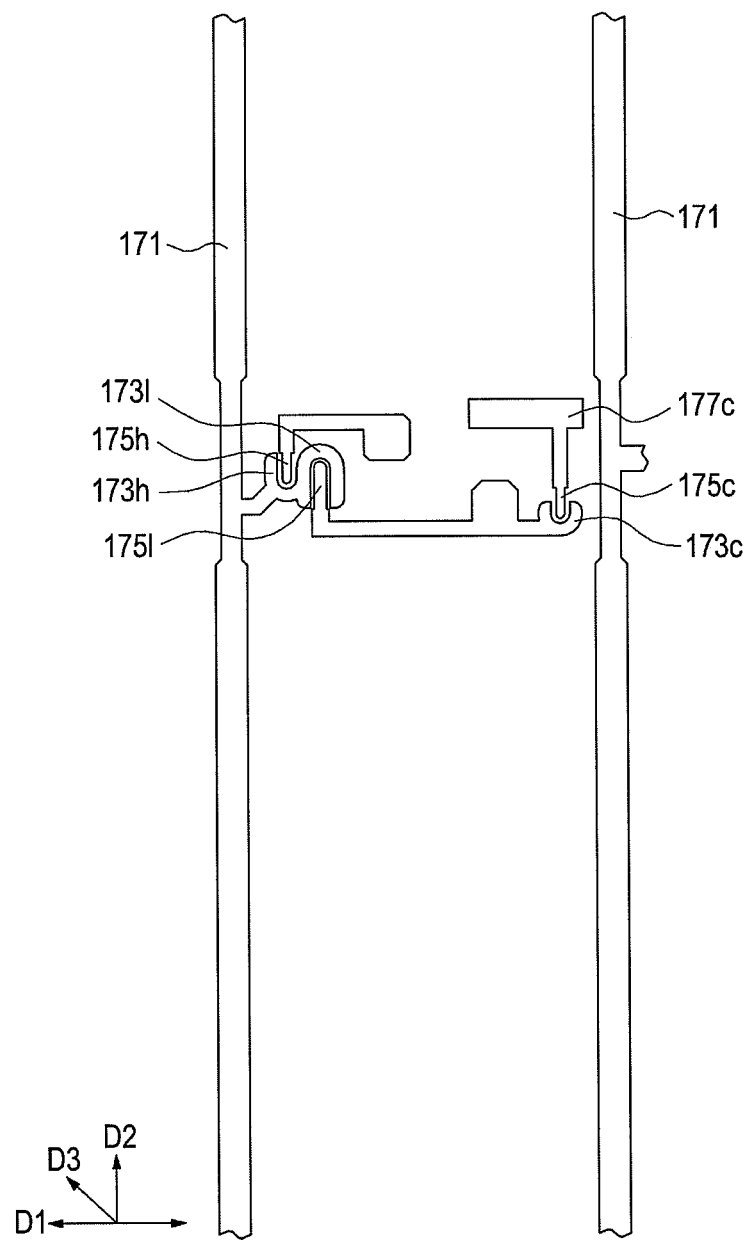
Figure 20C:
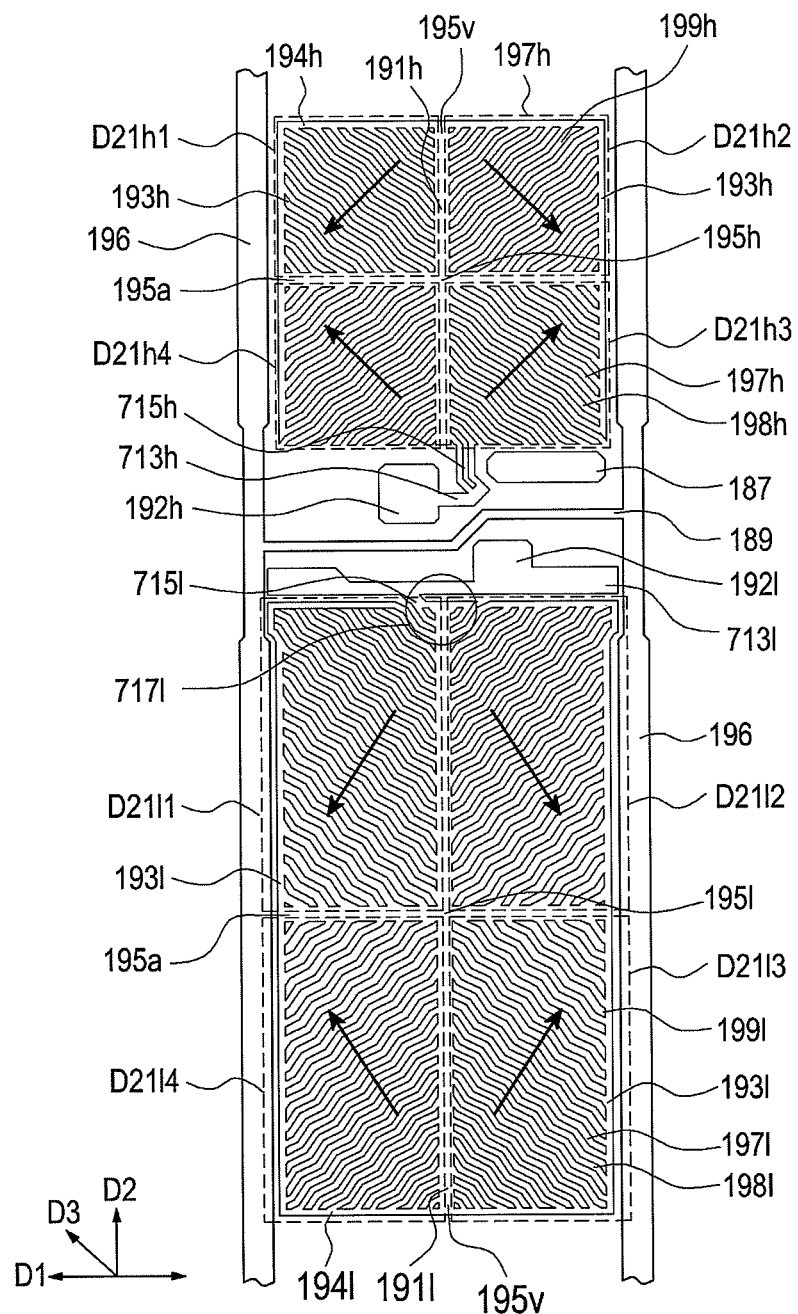
Figure 20D:
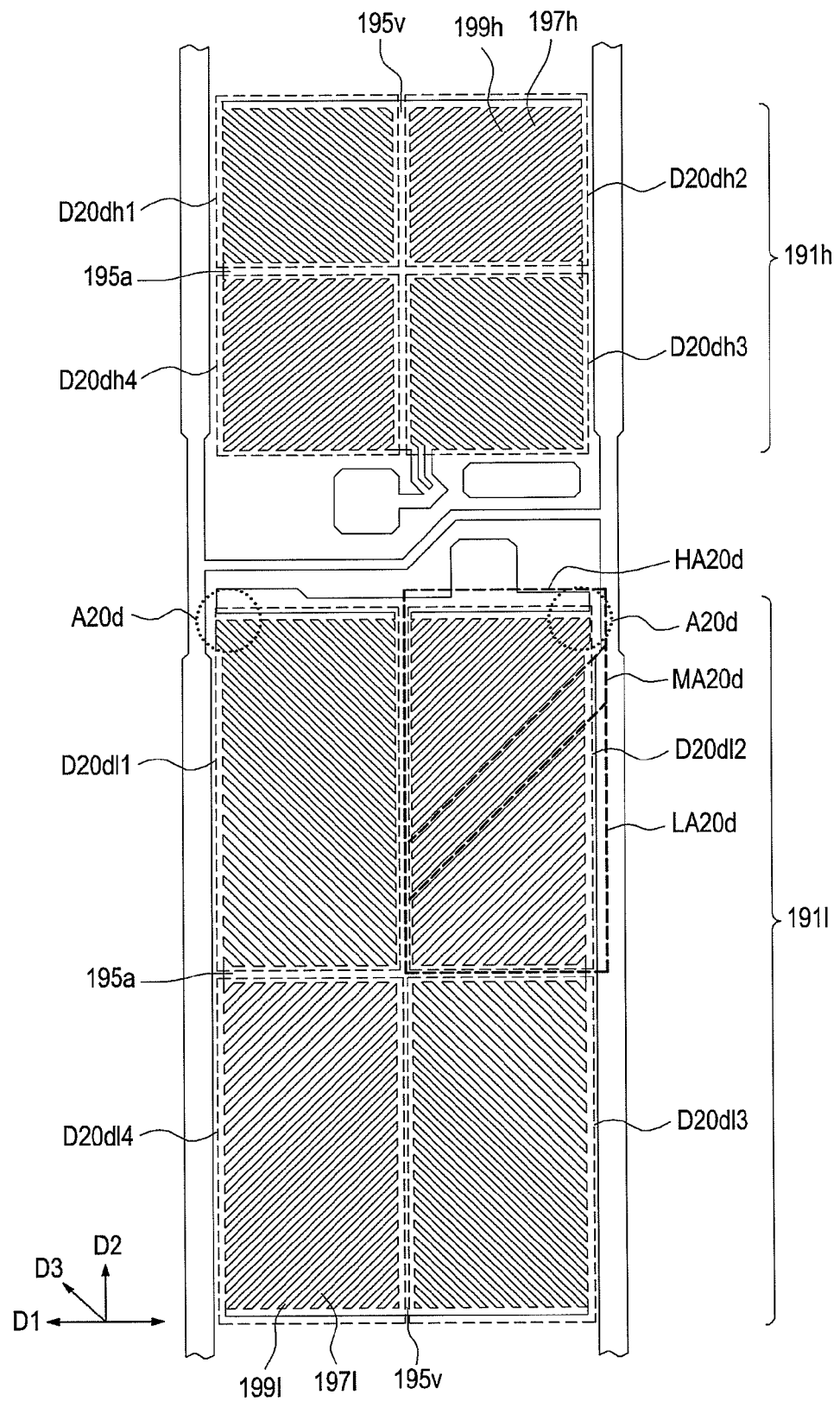
FIGS. 20D and 20E are plan views illustrating patterns of pixel electrode layers shown in FIGS. 18 and 20C, according to exemplary embodiments of the present invention.

FIG. 18 illustrates a schematic layout of a unit pixel of a liquid crystal display panel assembly 300 according to another exemplary embodiment of the present invention. FIG. 19A is an enlarged view of a central part A19 of the pixel layout shown in FIG. 18. FIGS. 20A to 20D illustrate patterns for major layers of the pixel structure shown in FIG. 18, according to exemplary embodiments of the present invention. More specifically, FIG. 20A illustrates a pattern of a gate layer conductor, FIG. 20B illustrates a pattern of a data layer conductor, and FIG. 20C illustrates a pattern of a pixel electrode layer. FIG. 20D illustrates another pattern of the pixel electrode layer shown in FIG. 18, according to an exemplary embodiment of the present invention. FIGS. 21A and 21B are cross-sectional views taken along lines 21a-21a' and 21b-21b' of the pixel layout shown in FIG. 18. The cross-sectional views shown in FIGS. 21A and 21B further disclose patterns of several other layers not shown in FIG. 18. As to the cross-sectional views of the liquid crystal display panel assembly 300 shown in FIGS. 21A and 21B, cross sections along the directions 21a' and 21b' are cross sections that are formed along the cutting-plane lines shown in FIG. 18 when the pixel electrode of FIG. 18 is repeatedly arranged in the form of a matrix consisting of rows and columns. The pixel structures shown in FIGS. 18 to 21B are similar to those described in connection with FIGS. 3 to 4C, so duplicate descriptions of similar parts will be omitted. In addition, reference numerals of the pixel structure shown in FIG. 3 may be used in FIGS. 18, and 19A to 20D.

As described above, a liquid crystal display panel assembly 300 includes a lower display panel 100, an upper display panel 200, a liquid crystal layer 3 between these display panels, and polarizers situated on an inner or outer side of the display panels 100 and 200. A stacked structure of the lower display panel 100 and upper display panel 200 of the liquid crystal display panel assembly 300 will be described in detail below.

1) Stacked Structure

Figure 21A:
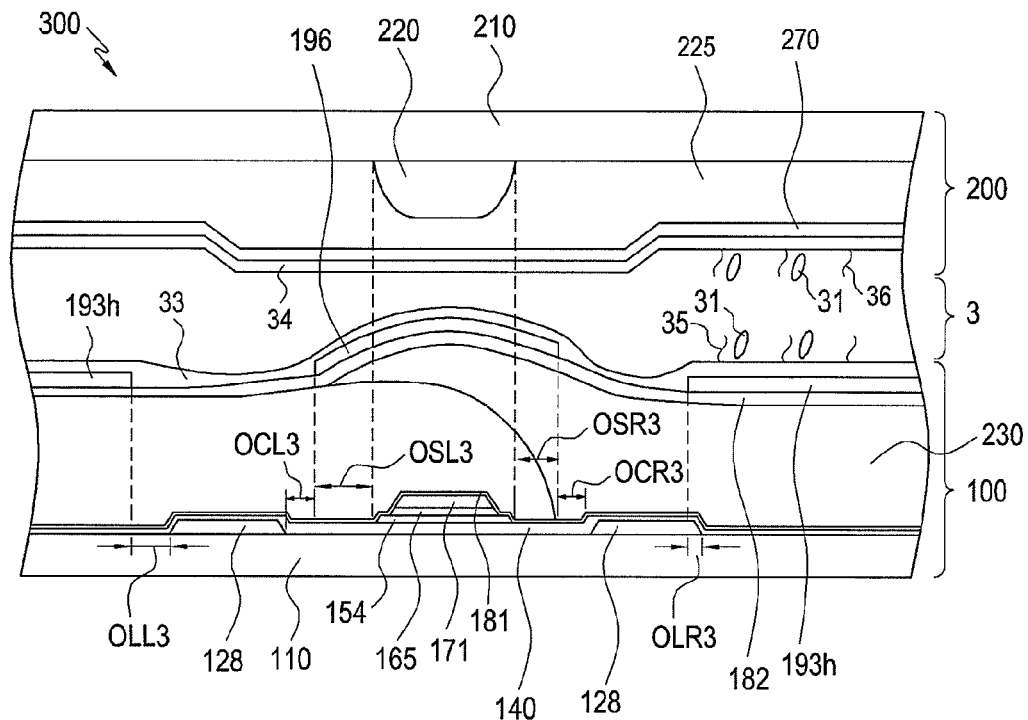
FIGS. 21A and 21B are cross-sectional views taken along lines 21a-21a' and 21b-21b' of the pixel layout shown in FIG. 18, respectively.
Figure 21B:
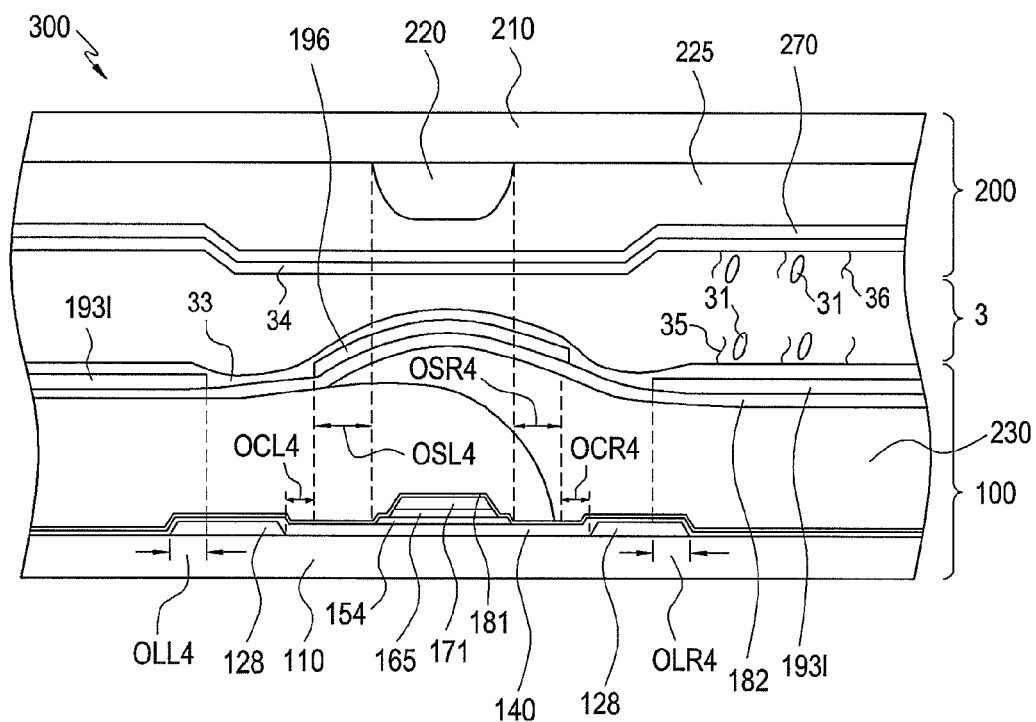
Figure 22A:
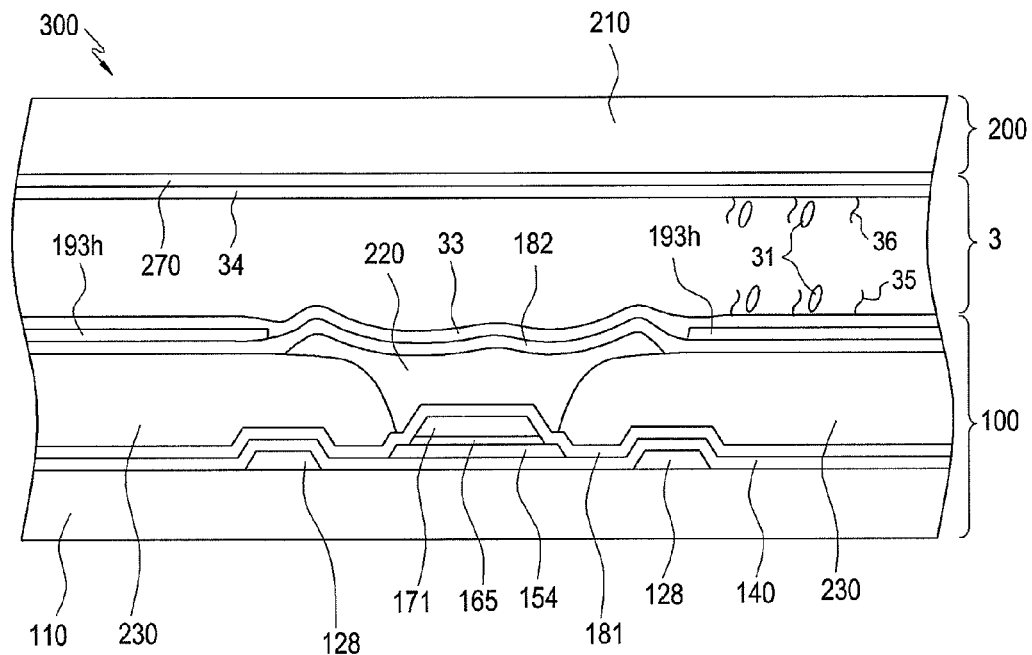
FIGS. 22A to 22H are cross-sectional views of liquid crystal display panel assemblies according to other exemplary embodiments of the present invention, taken along line 21a-21a' of the pixel layout shown in FIG. 18, respectively.
Figure 22B:
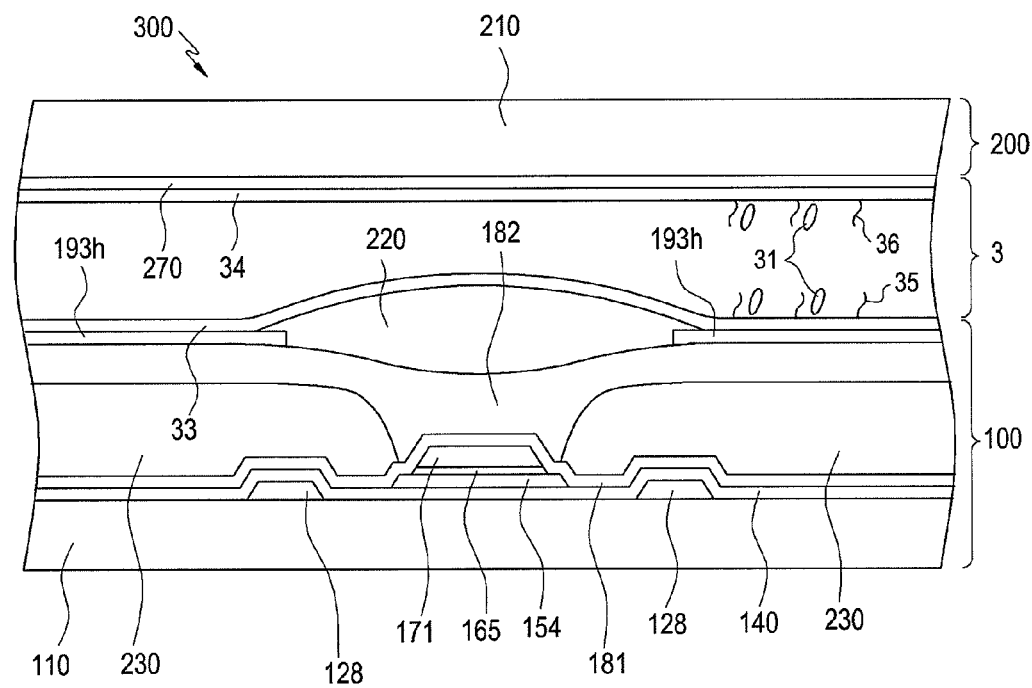

As illustrated in FIGS. 21A and 21B, an upper display panel 200 has a structure in which a light blocking member 220, an overcoat 225, a common electrode 270, a spacer 250 (not shown), and an upper-plate alignment film 292 (e.g., 34 and 36) are stacked on an upper substrate 210 in sequence. The light blocking member 220, the overcoat 225, the common electrode 270, the spacer 250, and the upper-plate alignment film 292 may be formed by the manufacturing methods and materials described in connection with FIGS. 4A to 4C. The light blocking member 220 may overlap a data line 171. The light blocking member 220 may be equal to the data line 171 in width, or may be as wide as about 0.5 μm to about 2 μm. In accordance with another exemplary embodiment of the present invention, instead of being formed on the upper display panel 200, the light blocking member 220 may be formed between a color filter 230 and a second protection layer 182 on a lower display panel 100 as illustrated in FIGS. 22A and 22B. In accordance with another exemplary embodiment of the present invention, the upper display panel 200 may not have the overcoat 225 to simplify a manufacturing process thereof. In accordance with an exemplary embodiment of the present invention, to reduce the height of the spacer 250 and uniformize the cell gap, the spacer 250 may be formed on the upper display panel 200 or the lower display panel 100 so as to overlap the light blocking member 220, a TFT, an outgasing color filter hole 235, or an outgasing hole cover 187.

The lower display panel 100 shown in FIGS. 18 to 21B may have a structure in which a lower substrate 110, gate layer conductors 121, 123, 124h, 124l, 124c, 125, 126, 127, and 128, a gate insulating layer 140, semiconductors 154h, 154l, and 154c, a linear ohmic contact member 165, data layer conductors 171, 173h, 173l, 173c, 175h, 175l, 175c, and 177c, a first protection layer 181, a color filter 230, a second protection layer 182, pixel electrode layers 187, 189, 191h, 191l, 192h, 192l, 193h, 193l, 194h, 194l, 195h, 195l, 196, 197h, 197l, 198h, 198l, 713h, 713l, 715h, 715l (not shown), 717h, and 717l, and a lower-plate alignment film 291 (e.g., 33 and 35) are stacked in sequence. These elements may be formed by the manufacturing methods and materials described in connection with FIGS. 4A to 4C.

A gate layer conductor is formed and patterned on the lower substrate 110. The gate layer conductor may include a plurality of gate lines 121, a plurality of down gate lines 123, a plurality of gate electrodes 124, a plurality of storage electrode lines 125, a plurality of storage electrode line's extension portions 126, a plurality of storage electrode line's horizontal portions 127, and a plurality of storage electrode line's vertical portions 128. Components of the gate layer conductor may be formed of the above-described corresponding materials. The gate insulating layer 140 is formed and patterned on the gate layer conductor. The gate insulating layer 140 may be formed of the above-described materials and in the above-described structures corresponding thereto. The semiconductor 154 is formed and patterned on the gate insulating layer 140. The semiconductor 154 has first, second and third semiconductors 154h, 154l, and 154c. The semiconductors 154 may be separated from each other on the gate electrodes 124 as described above. The semiconductor 154 may be formed of the above-described materials and in the above-described structures corresponding thereto. The linear ohmic contact member 165 is formed and patterned on the semiconductor 154. The linear ohmic contact member 165 has first, second and third linear ohmic contact members, which are formed under a first source electrode 173h, a first drain electrode 175h, a second source electrode 173l, a second drain electrode 175l, a third source electrode 173c and a third drain electrode 175c, respectively. In another exemplary embodiment of the present invention, the linear ohmic contact member 165 may be formed under the data line 171. The linear ohmic contact member 165 may be formed of the above-described materials and in the above-described structures corresponding thereto. A data layer conductor is formed and patterned on the linear ohmic contact member 165. The data layer conductor has one end portion 177c of the third drain electrode 175c, which overlaps the data line 171, the first source electrode 173h, the second source electrode 173l, the third source electrode 173c, the first drain electrode 175h, the second drain electrode 175l, the third drain electrode 175c, and the storage electrode line's extension portion 126. These elements may be formed of the above-described materials and in the above-described structures corresponding thereto. First, second and third TFTs Qh, Ql, and Qc are formed in the above-described structure corresponding thereto and operate in the above-described method to drive a pixel PX. The first protection layer 181 is formed and patterned on the data layer conductor. The first protection layer 181 may be formed of the above-described materials and in the above-described structures, and performs the aforementioned functions corresponding thereto. The color filter 230 is formed and patterned on the first protection layer 181. No color filter is formed in the outgasing color filter hole 235. The outgasing color filter hole 235 is a hole through which debris or gases can be discharged, which have been generated in a process of forming a color filter. The outgasing color filter hole 235 may be formed on the pattern of a TFT, a gate layer conductor, or a data layer conductor. After the color filter process is completed, the outgasing color filter hole 235 is covered by a material forming a protection layer or a pixel electrode layer. The color filter 230 may be formed of the above-described materials and in the above-described structures corresponding thereto. The second protection layer 182 is formed and patterned on the color filter 230 or the first protection layer 181. The second protection layer 182 may be formed of the above-described materials and in the above-described structures corresponding thereto.

A pixel electrode layer is formed and patterned on the second protection layer 182. The pixel electrode layer may have first and second subpixel electrodes 191h and 191l, first and second subpixel electrode contact portions 192h and 192l, vertical connection portions 193h and 193l, horizontal connection portions 194h and 194l, cross-shaped branch portions 195h and 195l, micro branches 197h and 197l, zigzag micro branches 198h and 198l, first and second pixel electrode's horizontal connection portions 713h and 713l, first and second pixel electrode's vertical connection portions 715h and 715l, first and second pixel electrode's oblique connection portions 714h and 714l, and first and second pixel electrode connection portion coupling points 717h and 717l, which are formed on first and second subpixels 190h and 190l, respectively, and may also have an outgasing hole cover 187, a shield common electrode 196, and a shield common electrode connection portion 189. Referring to FIGS. 18, 21A and 21B, the shield common electrode 196 overlaps the data line 171. The shield common electrode 196 may prevent an upper-plate common voltage from being distorted by the voltage being applied to the data line 171, or may reduce parasitic capacitive coupling occurring between the data line 171 and the subpixel electrodes 191h and 191l. Shield common electrodes may stay in an equipotential state by being connected to each other by shield common electrode connection portions 189. A width of the shield common electrode 196 may be greater than a width of the data line 171 by distances OSL3 and OSR3 from both edges of the data line 171 in a first subpixel region, and may be greater than the width of the data line 171 by distances OSL4 and OSR4 from both edges of the data line 171 in a second subpixel region. The distances OSL3, OSR3, OSL4 and OSR4 may fall within a range of about 0.5 μm to about 2 μm. The shield common electrode 196 may be spaced apart from edges of storage electrode line's vertical portions 128 situated on the left and right sides of the data line 171 by distances OCL3 and OCR3 in the first subpixel region, and may be spaced apart from edges of storage electrode line's vertical portions 128 situated in the left and right sides of the data line 171 by distances OCL4 and OCR4 in the second subpixel region. The distances OCL3, OCR3, OCL4 and OCR4 may fall within a range of about 0.5 μm to about 3 μm. The shield common electrode 196 may be floated so as not to receive a voltage, or may receive a predetermined voltage. The predetermined voltage may be a common voltage, an upper-plate common voltage, or a voltage applied to a storage electrode line. The shield common electrode 196 may overlap light blocking members 220h (corresponding to 220 of 190h) and 220l (corresponding to 220 of 190l). The outgasing hole cover 187 may be formed to completely cover the outgasing color filter hole 235. The outgasing hole cover 187 prevents the gases generated in the color filter 230 or lower layers from being discharged via the outgasing color filter hole 235. Other components constituting the pixel electrode layer, except a structure of the pixel electrode, are substantially similar to those described above, so a detailed description thereof is omitted. The structure of the pixel electrode is described in detail below. The lower-plate alignment film 291 is formed on the pixel electrode layer. The lower-plate alignment film 291 may be formed of the above/below-described materials and in the above/below-described methods, and may perform the above/below-described functions corresponding thereto.

2) Structure of Pixel Electrode

A structure of a pixel electrode layer and a cross-sectional view of a peripheral portion of a data line 171 will be described in detail below with reference to FIGS. 18 to 21B. The first subpixel electrode 191h is formed in a region of the first subpixel 190h, and the second subpixel electrode 191l is formed in a region of the second subpixel 190l. Cross-shaped branch portions 195h and 195l of the first and second subpixel electrodes 191h and 191l, and vertical and horizontal connection portions 193h, 194h, 193l, and 194l surrounding the vertical and horizontal edges of the first and second subpixel electrodes 191h and 191l will now be described in detail.

The vertical connection portions 193h and 193l of the pixel electrode will be described in detail with reference to FIGS. 18, 20C, 21A and 21B. In each of the first and second subpixel electrodes 191h and 191l, the vertical connection portions connect end portions of micro branches 197, and isolate micro slits 199 with the pixel electrode removed. The vertical connection portions 193h and 193l of the pixel electrode, formed in this way, may reduce parasitic capacitive coupling. In the first subpixel electrode 191h, the vertical connection portions 193h are spaced apart from storage electrode line's vertical portions 128 by a distance OLL3 without overlapping the storage electrode line's vertical portions 128 on the left side of the data line 171, but overlap the storage electrode line's vertical portions 128 by the distance OLR3 on the right side of the data line 171. Values of OLL3 and OLR3 may fall within a range of about 0.5 μm to about 2 μm. By asymmetrically forming the vertical connection portions 193h about the data line 171 in this manner, image degradation occurring due to mis-alignment with other layers may be reduced. The image degradation may occur due to mis-alignment with other layers in a first subpixel region rather than in a second subpixel region. Referring to FIG. 21B, in the second subpixel electrode 191l, vertical connection portions 193l overlap the storage electrode line's vertical portions 128 by OLL4 and OLR4 on the left and right sides of the data line 171, respectively. OLL4 and OLR4 may fall within a range of about 0.5 μm to about Referring to FIGS. 18 and 19A, an upper end of the first subpixel electrode 191h and a lower end of the second subpixel electrode 191l have horizontal connection portions 194h and 194l, respectively. The horizontal connection portions 194h and 194l connect end portions of micro branches 197 of the pixel electrode, and isolate micro slits 199 with the pixel electrode removed. The horizontal connection portions 194h and 194l overlap the storage electrode line's horizontal portions 127. Since the horizontal connection portions 194h are not formed on a lower end of the first subpixel electrode 191h, micro branches 197 formed in this portion are not connected to each other, but micro slits 199 are connected to each other. Micro branches 197h situated on the lower end of the first subpixel electrode 191h may overlap the storage electrode line 125. Micro branches 197 situated on the lower end of the second subpixel electrode 191l are connected to each other to have horizontal connection portions 194*l*, and micro slits 199 are not connected to each other. On the other hand, micro branches 197*l* situated in the upper end of the second subpixel electrode 191*l* may overlap a down gate line 123. The micro branches 197 and micro slits 199 formed in this way may increase a response speed of the liquid crystal display device and reduce textures. In the alternative, micro branches 197 situated on the lower end of the first pixel electrode 191*h* may be connected to each other, and micro slits 199 may not be connected to each other. Further, micro branches 197 on the upper end of the second subpixel electrode 191*l* may be isolated by micro slits 199, and the micro slits 199 may be connected to each other.

As illustrated in FIGS. 18 and 20C, first and second subpixel electrodes 191*h* and 191*l* each have four domains including zigzag-shaped micro branches 198*h* and 198*l*. In other words, the first subpixel electrode 191*h* has four domains D21*h*1, D21*h*2, D21*h*3 and D21*h*4, and the second subpixel electrode 191*l* has four domains D21*l*1, D21*l*2, D21*l*3 and D21*l*4. The domains D21*h*1, D21*h*2, D21*h*3, D21*h*4, D21*l*1, D21*l*2, D21*l*3 and D21*l*4 have main directions θd21*h*1, θd21*h*2, θd21*h*3, θd21*h*4, θd21*l*1, θd21*l*2, θd21*l*3 and θd21*l*4 (not shown) of micro branches 197, respectively, defined by directions of straight lines connecting peaks of the micro branches 197. Main direction angles of main directions of micro branches in the domains may fall within a range of about 30° to about 60° with respect to the direction D1. Main directions of micro branches in domains facing a cross-shaped branch's vertical portion 195*v* may be symmetrical about the cross-shaped branch's vertical portion 195*v*. Main direction angles of the main directions θd21*l*1, θd21*l*2, θd21*l*3 and θd21*l*4 of micro branches may be greater than main direction angles of the main directions θd21*h*1, θd21*h*2, θd21*h*3 and θd21*h*4 of micro branches. In accordance with an exemplary embodiment of the present invention, main direction angles of the main directions θd21*h*1, θd21*h*2, θd21*h*3, θd21*h*4, θd21*l*1, θd21*l*2, θd21*l*3 and θd21*l*4 of micro branches may be about 40.8°, about 40.8°, about 39.2°, about 39.2°, about 42°, about 42°, about 41.3° and about 41.3°, respectively. In accordance with an exemplary embodiment of the present invention, micro branches 197 and micro slits 199 formed in the domains have patterns which are symmetrical about the cross-shaped branch's vertical portion 195*v*. In the domains D21*h*1, D21*h*2, D21*h*3, D21*h*4, D21*l*1, D21*l*2, D21*l*3 and D21*l*4, zigzag angles θ21*h*1, θ21*h*2, θ21*h*3, θ21*h*4, θ21*l*1, θ21*l*2, θ21*l*3 and θ21*l*4 (not shown) of micro branches 197 may fall within a range of about ±7° to about ±30°, more preferably about ±10° or about ±15°. Zigzag angles of micro branches 197 formed in domains of the second subpixel electrode 191*l* may be greater than zigzag angles of micro branches 197 formed in domains of the first subpixel electrode 191*h*. In accordance with an exemplary embodiment of the present invention, values of θ21*h*1, θ21*h*2, θ21*h*3 and θ21*h*4 may be about 10°, while values of θ21*l*1, θ21*l*2, θ21*l*3 and θ21*l*4 may be about 15°. It should be noted that as described above, the zigzag angles of micro branches 197 mean angles between main directions of micro branches 197 and zigzag directions thereof.

The micro branches 197 and micro slits 199 of a pixel electrode shown in FIGS. 18 and 20C have zigzag shapes. Zigzag unit lengths formed in the pixel electrode may fall within a range of about 5 μm to about 20 μm. In accordance with an exemplary embodiment of the present invention, zigzag unit lengths formed in the first and second subpixel electrodes 191*h* and 191*l* may be about 14 μm and about 10 μm, respectively. Widths of micro branches 197 and micro slits 199 formed in the domains of the pixel electrode may fall within a range of about 21 μm to about 5 μm. Widths of micro branches 197 and micro slits 199 included in domains may be different according to the domains. Widths of micro branches 197*h* and micro slits 199*h* in the domains D21*h*1, D21*h*2, D21*h*3 and D21*h*4 may fall within a range of about 2.8 μm to about 3.71 μm, and widths of micro branches 197 and micro slits 199 may gradually increase along the arrows shown in the domains. In accordance with an exemplary embodiment of the present invention, widths of micro branches 197 and micro slits 199 may be about 2.8 μm in start portions of the arrows in the domains, while widths of micro branches 197 and micro slits 199 may be about 3.3 μm in end portions of the arrows. In accordance with another exemplary embodiment of the present invention, widths of micro branches 197 and micro slits 199 may be about 3.3 μm in start portions of the arrows in the domains, while widths of micro branches 197 and micro slits 199 may be about 3.7 μm in end portions of the arrows. Widths of micro branches 197*l* and micro slits 199*l* included in the domains D21*l*1, D21*l*2, D21*l*3 and D21*l*4 may fall within a range of about 2.8 μm to about 3.9 μm, and widths of micro branches 197 and micro slits 199 may gradually increase along the arrows shown in the domains. In accordance with an exemplary embodiment of the present invention, widths of micro branches 197 and micro slits 199 may be about 2.8 μm in start portions of the arrows in the domains, while widths of micro branches 197 and micro slits 199 may be about 3.9 μm in end portions of the arrows. Widths of micro branches 197 and micro slits 199 in the domains D21*h*1, D21*h*2, D21*h*3, D21*h*4, D21*l*1, D21*l*2, D21*l*3, and D21*l*4 may gradually increase by a value within a range of about 0.2 μm to about 1 μm.

A pixel electrode structure with a pixel electrode layer according to exemplary embodiments of the present invention will be described in detail below with reference to FIGS. 20D to 20J. Patterns of a pixel electrode layer shown in FIGS. 20D to 20J are other exemplary embodiments of the patterns of a pixel electrode layer shown in FIGS. 18 and 20C. Therefore, other layers except for the pixel electrode layer are similar to those described in FIGS. 18 to 20C, so a duplicate description thereof will be omitted. Subpixel electrodes formed in first and second subpixels 190*h* and 190*l* shown in FIG. 20D have a structure in which end portions of micro branches 197 adjacent to a data line 171 are not connected to each other according to an exemplary embodiment of the present invention. In other words, subpixel electrodes formed in first and second subpixels 190*h* and 190*l* shown in FIG. 20D may not have the vertical connection portions 193*h* and 193*l* of the pixel electrode shown in FIG. 20C. By not having the vertical connection portions 193*h* and 193*l*, the subpixel electrodes may be spaced apart farther from the data line 171, reducing textures occurring in the subpixel electrodes adjacent to the data line 171. In accordance with an exemplary embodiment of the present invention, the distance from end portions of micro branches 197 adjacent to the data line 171 up to the data line 171 adjacent thereto may be greater than or equal to widths of micro branches 197 or micro slits 199. As illustrated in regions A20*d* of FIG. 20D, vertical ends of micro branches 197 further project in upper corner regions of the second subpixel, compared with vertical ends of their lower micro branches 197. The micro branches 197 projecting in the upper corner regions A20*d* can reduce textures occurring in subpixel regions adjacent to the data line 171 by blocking an electric field occurring in a peripheral portion. Micro branches 197 projecting in the corners may be formed in corners of first or second subpixel 190*h* or 190*l*.

The pixel electrode shown in FIG. 20D has two subpixel electrodes 191*h* and 191*l*, each of which has four domains. A first subpixel electrode 191*h* has fourth domains D20*dh*1, D20*dh*2, D20*dh*3, and D20*dh*4, and a second subpixel electrode 191*l* has four domains D20*dl*1, D20*dl*2, D20*dl*3, and D20*dl*4. Micro branches 197 and micro slits 199 are symmetrical about a cross-shaped branch 195. Micro branches 197 and micro slits 199, whose widths gradually change, are formed in regions MA20*d* formed in the four domains of the second subpixel electrode 191*l*. Micro branches 197 constituting the pixel electrode have a stripe shape. Widths of micro branches 197 and micro slits 199 formed in first and second subpixels 190*h* and 190*l* may fall within a range of about 21 μm to about 5 μm, more preferably about 2.5 μm to about 3.5 μm. When micro branches 197 and micro slits 199 are in the shape of stripes, an electric field formed in a liquid crystal layer is high in strength, increasing transmittance of the liquid crystal display device. When the entire region of micro branches 197 distributed over the pixel electrode is greater than the entire region of micro slits 199, for example, when widths of micro branches 197 are greater and when widths of micro slits 199 are less, an electric field between the pixel electrode and the common electrode is high in strength, increasing a response speed of the liquid crystal display device and improving transmittance thereof.

In accordance with an exemplary embodiment of the present invention, widths of micro branches 197 and micro slits 199 formed in the first subpixel 190*h* shown in FIG. 20D may be about 2.6 μm and about 2.4 μm, respectively, and widths of micro branches 197 and micro slits 199 formed in the second subpixel 190*l* may be about 2.8 μm and about 3.4 μm in regions LA20*d*, respectively; may fall within a range of about 2.6 μm to about 2.8 μm and a range of about 2.4 μm to about 3.4 μm in regions MA20*d*, respectively; and may be about 2.6 μm and about 2.4 μm in regions HA20*d*, respectively. In the regions MA20*d*, widths of micro branches 197 and micro slits 199 may gradually increase by about 0.25 μm, and may fall within a range of about 5 μm to about 10 μm, more preferably about 6.2 μm to about 10 μm. In the region of the second subpixel 190*l*, an area of a sum of the regions LA20*d* and MA20*d*, and an area of the region HA20*d* may be about 45% and about 55%, respectively. Directions of micro branches 197 and micro slits 199 formed in this manner may be about 40° with respect to a polarization axis of a polarizer in a first subpixel region, and about 45° with respect to a polarization axis of a polarizer in a second subpixel region. An area ratio of the first subpixel region to the second subpixel region may be about 1:2. A sum of areas of domains D20*dl*1 and D20*dl*2 formed in the region of the second subpixel 190*l* may be greater than a sum of areas of domains D20*dl*3 and D20*dl*4.

In accordance with another exemplary embodiment of the present invention, widths of micro branches 197 and micro slits 199 formed in the first subpixel 190*h* shown in FIG. 20D may be about 2.6 μm and about 3.1 μm, respectively, and widths of micro branches 197 and micro slits 199 formed in the second subpixel 190*l* may be about 2.8 μm and about 3.4 μm in regions LA20*d*, respectively; may fall within a range of about 2.6 μm to about 2.8 μm and a range of about 2.4 μm to about 3.4 μm in regions MA20*d*, respectively; and may be about 2.6 μm and about 2.4 μm in regions HA20*d*, respectively. Other elements may be formed as correspondingly done in other exemplary embodiments described above. If widths of micro branches 197 are large, transmittance of the liquid crystal display device improves and a response speed thereof increases. However, if widths of micro slits 199 are small or 0, it is not easy to form a pre-tilt angle of liquid crystal molecules. Thus, it may be required to appropriately combine widths of micro branches 197 and micro slits 199.

Figure 20E:
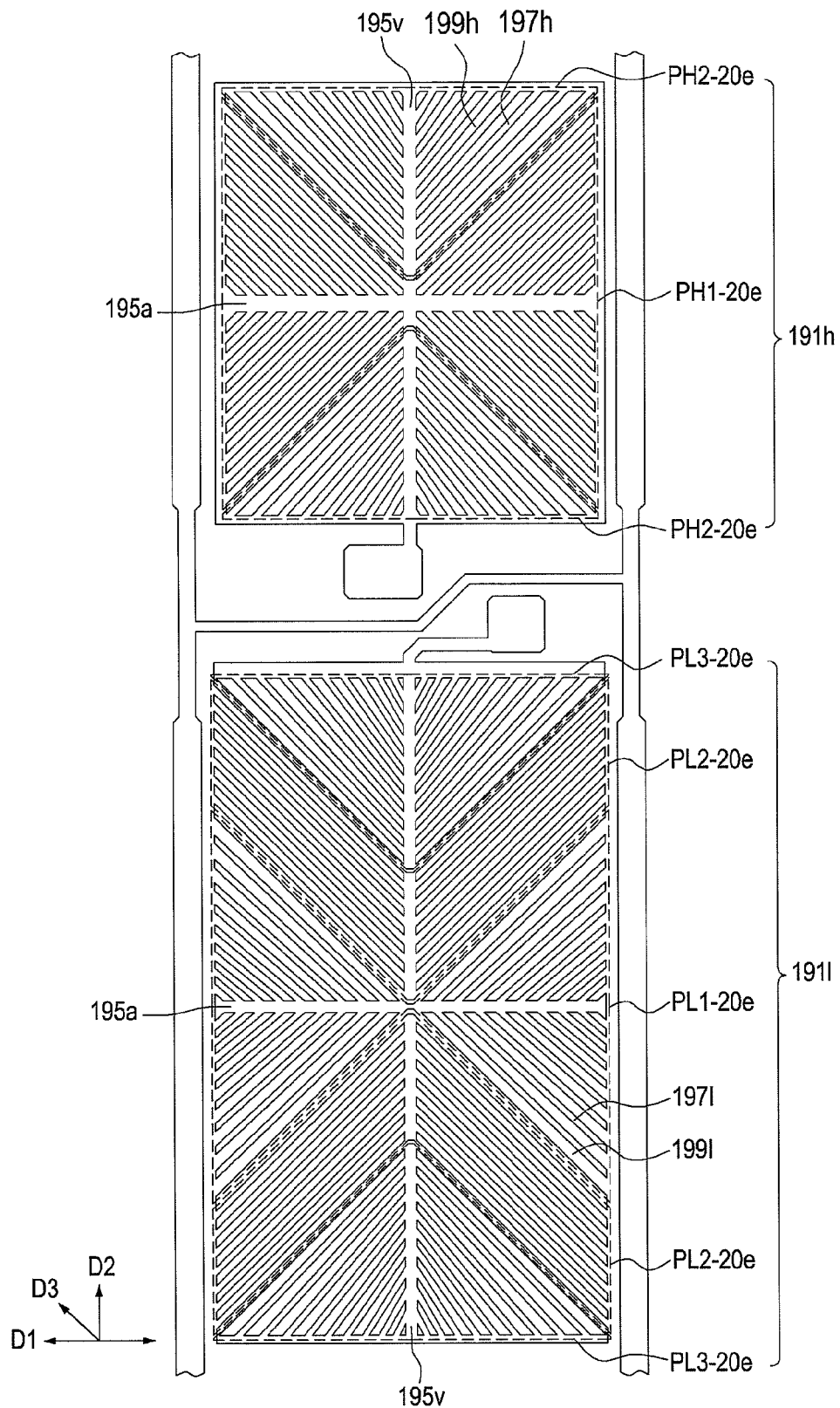

FIG. 20E is a plan view of a pixel electrode according to another exemplary embodiment of the present invention. In accordance with an exemplary embodiment of the present invention, a pixel electrode illustrated in FIG. 20E is divided into five regions according to structures of micro branches 197 and micro slits 199, and in one or more regions, micro slits 199 gradually increase in width as they extend from a cross-shaped branch to the edge of the pixel electrode. The pixel electrode formed in this manner reduces a curvature of a luminance ratio curve of the liquid crystal display device, improving visibility of the liquid crystal display device. The luminance ratio curve represents changes in luminance ratio of the vertical axis with respect to a gray scale of the horizontal axis as described below with reference to FIGS. 13A and 13B.

Each of first and second subpixel electrodes 191*h* and 191*l* is divided into four domains by a cross-shaped branch. Micro branches 197 and micro slits 199 formed in the domains may be symmetrical about the cross-shaped branch. The subpixel electrodes have micro branches 197 and micro slits 199 in a stripe shape. The first subpixel electrode 191*h* has two different regions PH1-20*e* and PH2-20*e* according to the distribution of widths of micro branches 197 and micro slits 199. In the region PH1-20*e*, micro branches 197 and micro slits 199 are substantially constant in width along their extension direction, and their widths may fall within a range of about 1.5 μm to about 4.5 μm, more preferably about 3 μm. Main directions of extension directions of micro branches 197 and micro slits 199 may fall within a range of about 30° to about 45° or a range of about 135° to about 150°, more preferably about 38° or about 142° with respect to the direction D1 shown in FIG. 20E or the gate line 121. In the region PH2-20*e*, widths of micro branches 197 are uniform along the extension direction of micro branches 197, and widths of micro slits 199 gradually increase along the extension direction of micro slits 199 as they go away from the cross-shaped branch or go from the center to the edge of the subpixel electrode. The central line of the subpixel electrode may be a cross line separating the subpixel electrode into domains, for example, a cross-shaped branch. Widths of micro branches 197 may fall within a range of about 1.5 μm to about 5 μm, more preferably about 2.5 μm to about 3.5 μm. Extension directions of micro branches 197 and micro slits 199 are similar to the extension directions of micro branches 197 and micro slits 199 of the region PH1-20*e* in a boundary portion with the region PH2-20*e*, and main direction angles of the extension directions of micro branches 197 and micro slits 199 gradually increase as they go away from the boundary portion with the region PH2-20*e*. The extension direction of micro branches or micro slits means a direction of a straight line connecting central points of widths of micro branches or micro slits, and it should be noted that an angle between the straight light and the direction D1 is an extension direction angle (or main direction angle) of micro branches or micro slits.

The second subpixel electrode 191*l* has three different regions PL1-20*e*, PL2-20*e*, and PL3-20*e* according to the distribution of widths of micro branches 197 and micro slits 199. In region PL1-20*e*, micro branches 197 are uniform in width along their extension direction, and micro slits 199*l* gradually increase in width W along their extension directions as they go away from a cross-shaped branch or go from the center to the edge of the subpixel electrode. Widths of micro branches 197 may fall within a range of about 1.5 μm to about 5 μm. Main direction angles of micro branches 197 and micro slits 199 gradually increase as they go from a horizontal portion 195*a* of the cross-shaped branch 195 to a boundary portion with the region PL2-20*e*. In region PL2-20*e*, micro branches 197 and micro slits 199 are substantially uniform in width along their extension direction, and their widths may fall within a range of about 1.5 µm to about 4.5 µm, more preferably about 3 µm. Main direction angles of micro branches 197 and micro slits 199 may fall within a range of about 30° to about 45° or a range of about 135° to about 150°, more preferably about 38° or about 142° with respect to the direction D1 or a direction of the gate line 121. In a region PL3-20*e*, micro branches 197 are constant in width along their extension direction, and micro slits 199*l* gradually increase in width along their extension direction as they go away from the cross-shaped branch 195. Widths of micro branches 197 may fall within a range of about 1.5 µm to about 5 µm, and widths of micro slits 199 may be greater than or equal to widths of adjacent micro branches 197. Main direction angles of extension directions of micro branches 197 and micro slits 199 are similar to the main direction angles of extension directions of micro branches 197 and micro slits 199 of the region PL2-20*e* in a boundary portion with the region PL2-20*e*, and gradually increase as they go away from a boundary portion with the region PL2-20*e*. The maximum main direction angle of micro branches 197 and micro slits 199 in the region PL1-20*e* may be less than or equal to the main direction angle in the region PL2-20*e*, and the minimum main direction angle of micro branches 197 and micro slits 199 in the region PL3-20*e* may be greater than or equal to the main direction angle in the region PL2-20*e*. The maximum width of micro branches 197 in the regions PL1-20*e* and PL3-20*e* may be greater than or equal to widths of micro slits 199 in the region PL2-20*e*. Widths of micro branches 197 may be substantially similar in the regions PL1-20*e*, PL2-20*e* and PL3-20*e*. In the pixel electrode structure formed in this manner, the pixel electrode formed in the regions PH2-20*e* and PL3-20*e* reduces luminance visible at the side, and the pixel electrode formed in the regions PH1-20*e* and PL1-20*e* increases luminance visible at the side, resulting in a reduction in curvature of the luminance ratio curve. The reduction in curvature of the luminance ratio curve decreases a change in visible luminance with respect to each gray scale, improving visibility of the liquid crystal display device. The luminance ratio curve represents changes in luminance ratio of the vertical axis with respect to a gray scale of the horizontal axis as described with reference to FIGS. 13A and 13B.

Figure 20F:
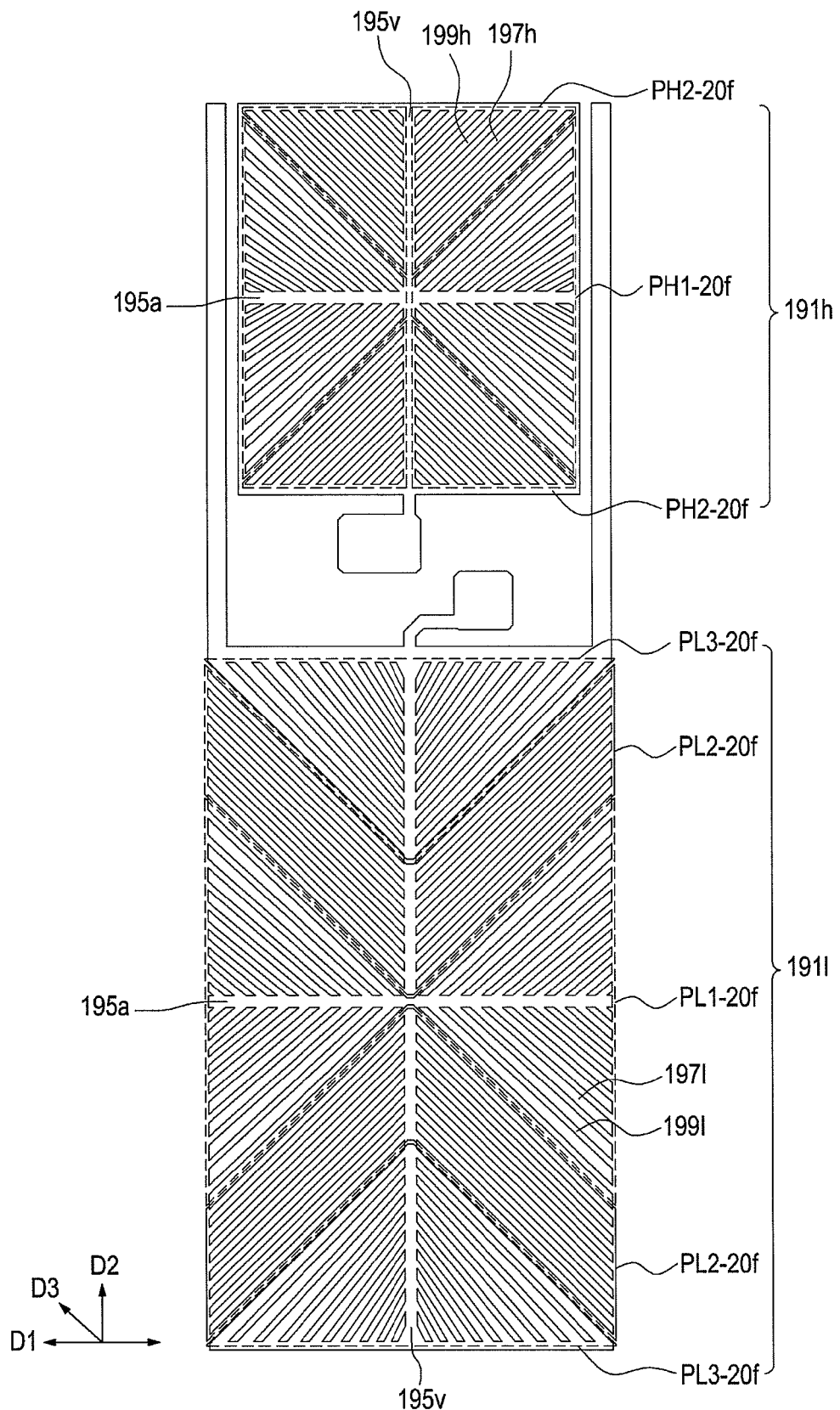
FIGS. 20F to 20J are plan views illustrating pixel electrodes according to other exemplary embodiments of the present invention.

FIG. 20F is a plan view of a pixel electrode according to another exemplary embodiment of the present invention. In accordance with an exemplary embodiment of the present invention, a pixel electrode shown in FIG. 20F has five different regions according to the structure of micro branches 197 and micro slits 199, and in one or more regions, micro branches 197 gradually increase in width as they go away from a cross-shaped branch 195 or go from the central line to the edge of a subpixel electrode. A liquid crystal display device with such a pixel electrode has the characteristics described in connection with FIG. 20C. To avoid the duplicate description, the two-subpixel electrode structures, the domain structures, the shapes of micro branches 197 or micro slits 199, the widths of micro branches 197 and micro slits 199, and the directions of micro branches 197 and micro slits 199, which have been described above or described with reference to FIG. 20E, will be omitted or done in brief.

A first subpixel electrode 191*h* has two different regions PH1-20*f* and PH2-20*f* according to the distribution of widths of micro branches 197 and micro slits 199. In the region PH1-20*f*, widths of micro slits 199 are substantially uniform along with extension directions of the micro slits 199, and widths of micro branches 197 gradually increase along extension directions of the micro branches 197 as they go away from the cross-shaped branch 195 or go from the central line of the subpixel electrode to the edge of the subpixel electrode. Main direction angles of micro branches 197 and micro slits 199 in the region PH1-20*f* gradually increase as they get closer to a boundary portion with a region PH2-20*f*. In the region PH2-20*f*, micro branches 197 and micro slits 199 are substantially uniform in width along their extension direction. In this region, main direction angles of micro branches 197 and micro slits 199 may fall within a range of about 30° to about 45° or a range of about 135° to about 150°, more preferably about 38° or about 142° with respect to the direction D1 or the gate line 121. The maximum width of micro branches 197 in the region PH1-20*f* may be greater than or equal to widths of micro branches 197 in the region PH2-20*f*. Widths of micro slits 199 in the region PH1-20*f* and widths of micro slits 199 in the region PH2-20*f* may be substantially similar.

A second subpixel electrode 191*l* has three different regions PL1-20*f*, PL2-20*f*, and PL3-20*f* according to the distribution of widths of micro branches 197 and micro slits 199. In the region PL1-20*f*, widths of micro slits 199 are constant along extension directions of the micro slits 199, and widths of micro branches 197 gradually increase along extension directions of the micro branches 197 as they go away from the cross-shaped branch 195 or go from the center to the edge of the subpixel electrode. Widths of micro branches 197 may be greater than or equal to widths of their adjacent micro slits 199. Main direction angles for directions of micro branches 197 and micro slits 199 may gradually increase as they get closer to a boundary portion with the region PL2-20*f*. In the region PL2-20*f*, widths of micro branches 197 and micro slits 199 are substantially uniform along extension directions of micro branches 197 and micro slits 199. Main direction angles of micro branches 197 and micro slits 199 may fall within a range of about 30° to about 45° or a range of about 135° to about 150°, more preferably about 38° or about 142° with respect to the direction D1 or the direction of the gate line 121. In the region PL3-20*f*, widths of micro slits 199 are constant along extension directions of the micro slits 199, and widths of micro branches 197 gradually increase along extension directions of the micro branches 197 as they go away from the cross-shaped branch 195. Micro branches 197 may be greater than or equal to their adjacent micro slits 199 in width. Main direction angles of micro branches 197 and micro slits 199 are similar to the main direction angles of micro branches 197 and micro slits 199 formed in the region PL2-20*f* in a boundary portion with the region PL2-20*f*, and gradually increase as they go away from the boundary portion with the region PL2-20*f*. The maximum direction angle of micro branches 197 and micro slits 199 in the region PL1-20*f* may be less than or equal to the main direction angles in the region PL2-20*f*, and the minimum direction angles of micro branches 197 and micro slits 199 in the region PL3-20*f* may be greater than or equal to the main direction angles of micro branches 197 and micro slits 199 in the region PL2-20*f*. The maximum width of micro branches 197 in the regions PL1-20*f* and PL3-20*f* may be greater than or equal to the widths of micro branches 197 in the region PL2-20*f*. Widths of micro slits 199 may be substantially similar in the regions PL1-20*f*, PL2-20*f* and PL3-20*f*. The pixel electrode formed in this manner improves side visibility of the liquid crystal display device as described above.

Figure 20G:
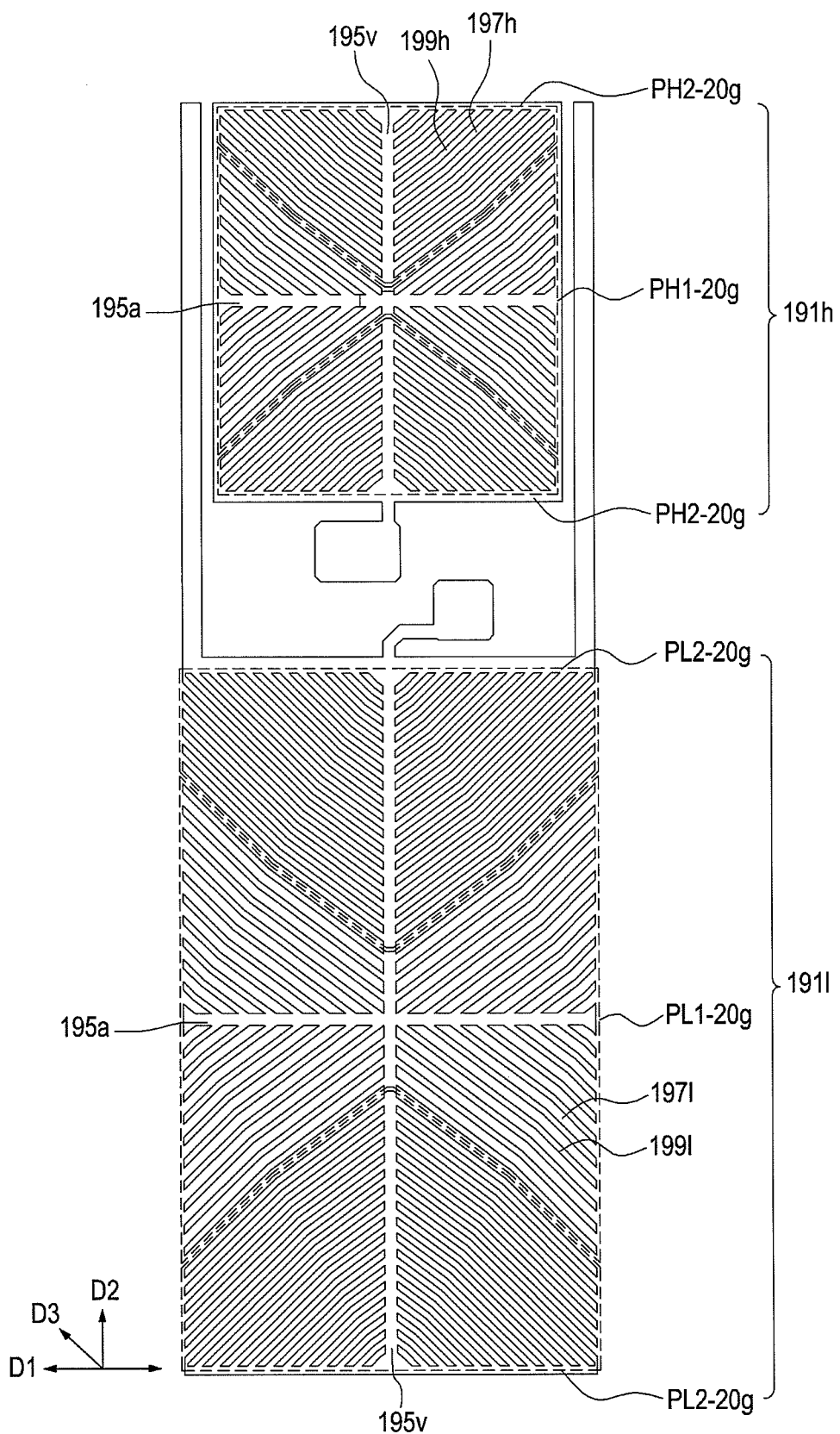

FIG. 20G is a plan view of a pixel electrode according to another exemplary embodiment of the present invention. In accordance with an exemplary embodiment of the present invention, a pixel electrode shown in FIG. 20G has four different regions according to the structure of micro branches 197 and micro slits 199, and in each of the regions, micro branches 197 or micro slits 199 are broken (e.g., bent) once. The micro branches 197 formed in this manner generally do not reduce the strength of an electric field formed in a liquid crystal layer, avoiding reducing transmittance of the liquid crystal display device and improving visibility of the liquid crystal display device. The features of the current exemplary embodiment of the present invention will be described in detail below; however, those features overlapping with the embodiments described above are omitted. Micro branches 197 and micro slits 199 formed in regions of first and second subpixel electrodes 191h and 191l have constant widths along their extension directions. Micro branches 197 in domains of the subpixel electrodes 191h and 191l have a bifurcated stripe shape broken (e.g., bent) once. Micro branches 197 with a bifurcated stripe shape extend in two different directions. Micro branches 197 of the first and second subpixel electrodes 191h and 191l include micro branches 197 with a first stripe shape and micro branches 197 with a second stripe shape. Micro branches 197 with the first stripe shape are micro branches 197 connected to a cross-shaped branch 195, and micro branches 197 with the second stripe shape are micro branches 197 connected to micro branches 197 with the first stripe shape. In the first subpixel electrode 191h, direction angles of micro branches 197 having the first stripe shape with respect to the direction D1 or a direction of the gate line 121 may fall within a range of about 30° to about 39°, more preferably about 37°, and direction angles of micro branches 197 having the second stripe shape with respect to the direction D1 or a direction of the gate line 121 may fall within a range of about 40° to about 50°, more preferably about 42°. In the second subpixel electrode 191l, direction angles of micro branches 197 having the first stripe shape with respect to the direction D1 or a direction of the gate line 121 may fall within a range of about 30° to about 39°, more preferably about 37°, and direction angles of micro branches 197 in the second stripe shape with respect to the direction D1 or a direction of the gate line 121 may fall within a range of about 40° to about 50°, more preferably about 45°.

The first subpixel electrode 191h has two different regions PH1-20g and PH2-20g according to the widths of micro branches 197 and micro slits 199. In each of the regions PH1-20g and PH2-20g, widths of micro branches 197 and micro slits 199 are uniform. In the region PH1-20g, micro branches 197 may be greater than micro slits 199 in width. In the region PH2-20g, widths of micro branches 197 are substantially equal to widths of micro slits 199. Widths of micro branches 197 in the region PH1-20g may be greater than widths of micro branches 197 in the region PH2-20g. Widths of micro slits 199 may be substantially the same in the regions PH1-20g and PH2-20g.

The second subpixel electrode 191l has two different regions PL1-20g and PL2-20g according to the widths of micro branches 197 and micro slits 199. In the region PL1-20g, micro slits 199 may be greater than micro branches 197 in width. In the region PL2-20g, widths of micro branches 197 are substantially equal to widths of micro slits 199. Widths of micro slits 199 in the region PL1-20g may be greater than widths of micro slits 199 in the region PL2-20g. Widths of micro branches 197 in the region PL1-20g may be substantially equal to widths of micro branches 197 in the region PL2-20g. Widths of micro branches 197 in the region PL1-20g may be greater than widths of micro branches 197 in the region PL2-20g. The pixel electrode formed in this manner can improve side visibility of the liquid crystal display device without reducing transmittance thereof.

Figure 20H:
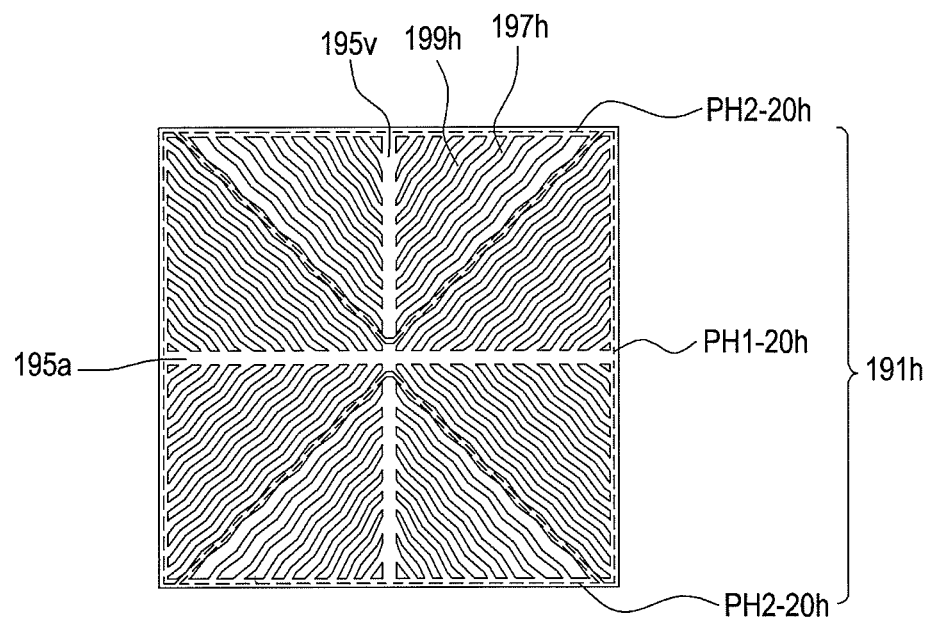
Figure 20H:
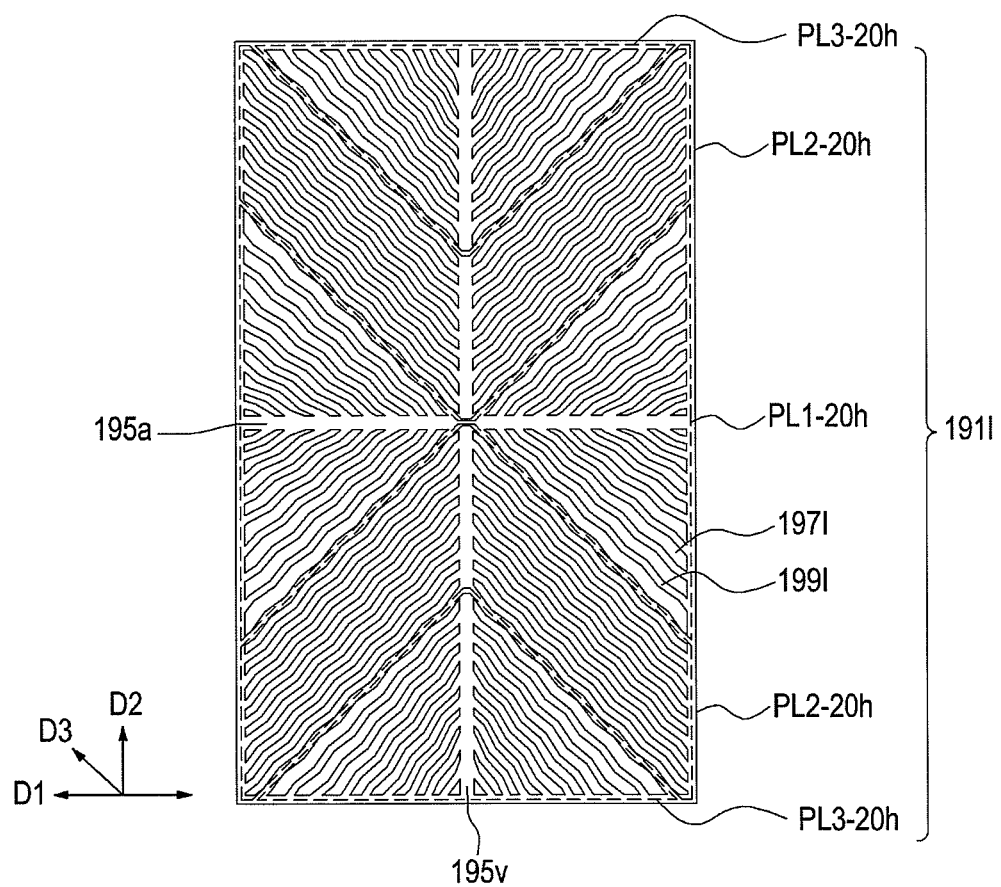

FIG. 20H is a plan view of a pixel electrode according to another exemplary embodiment of the present invention. A pixel electrode illustrated in FIG. 20H is substantially equal in structure to the pixel electrode described in connection with FIG. 20E, except for micro branches 197 having a zigzag shape and horizontal and vertical connection portions 193l and 194l formed in a second subpixel electrode 191l. For simplicity, the duplicate description will be omitted. Micro branches 197 illustrated in FIG. 20H have a zigzag shape to reduce rainbow stains of the liquid crystal display device as described above. The pixel electrode has five different regions PH1-20h, PH2-20h, PL1-20h, PL2-20h, and PL3-20h according to the structures of micro branches 197 and micro slits 199, and micro slits 199 gradually increase in width as they go from a cross-shaped branch 195 to the edge of the pixel electrode. Each of the first and second subpixel electrodes 191h and 191l is divided into four domains by the cross-shaped branch 195. Widths of micro branches 197 and micro slits 199, and main direction angles of micro branches 197 and micro slits 199 in regions PH1-20h, PH2-20h, PL1-20h, PL2-20h, and PL3-20h have been described with reference to FIG. 20E. The pixel electrode formed in this manner can improve visibility of the liquid crystal display device and reduce rainbow stains.

Figure 20I:
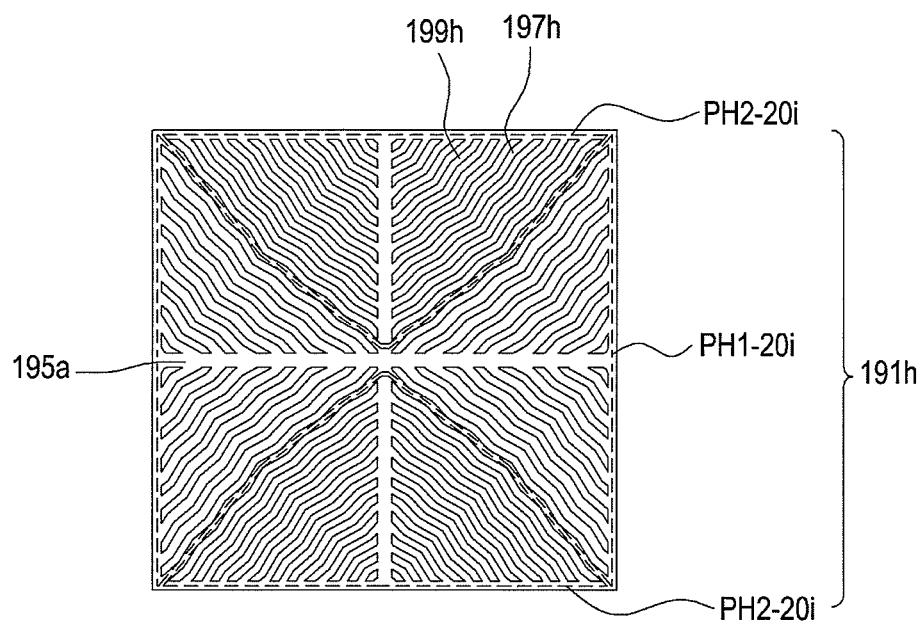
Figure 20I:
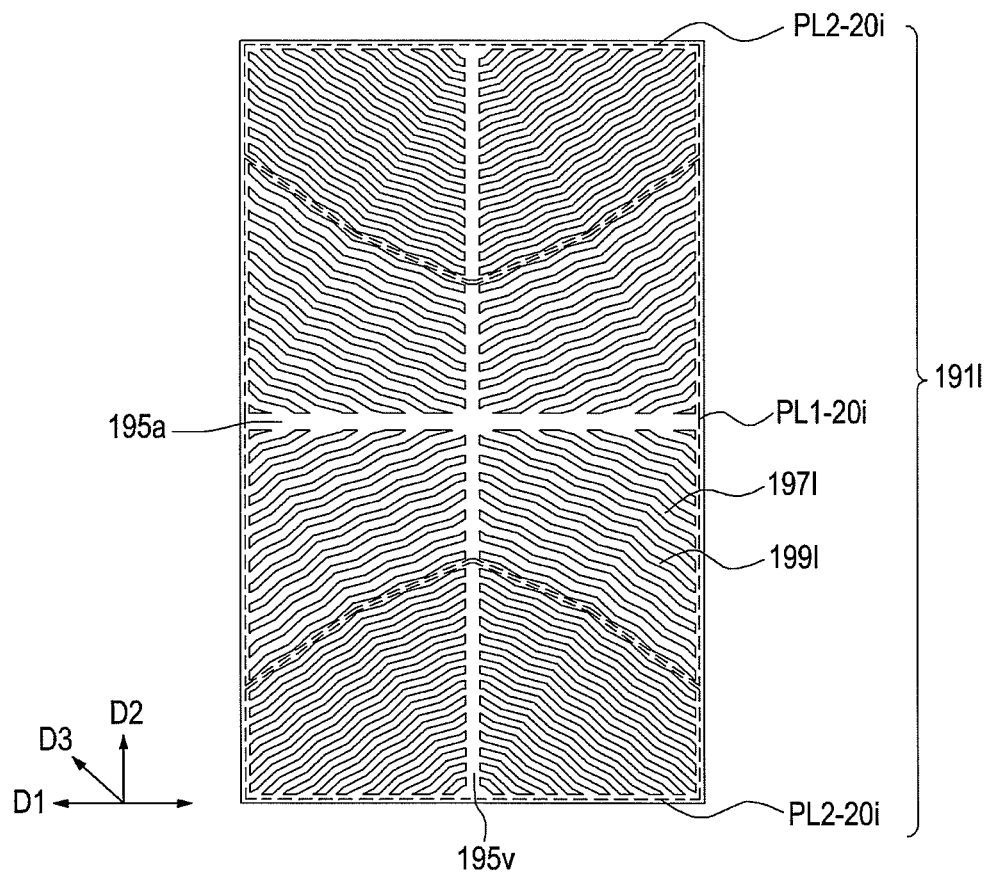

FIG. 20I is a plan view of a pixel electrode according to another exemplary embodiment of the present invention. A pixel electrode illustrated in FIG. 20I is substantially equal in structure to the pixel electrode described in conjunction with FIG. 20G, except for micro branches 197 having a zigzag shape, horizontal and vertical connection portions 193l and 194l formed in a second subpixel electrode 191l, and widths of micro branches 197 and micro slits 199 formed in a region PL1-20i. For simplicity, the duplicate description will be omitted. Micro branches 197 illustrated in FIG. 20I have a zigzag shape to reduce rainbow stains of the liquid crystal display device as described above. In the region PL1-20i of the second subpixel electrode 191l, widths of micro branches 197 may be greater than widths of micro slits 199. In a region PL2-20i, widths of micro branches 197 are substantially equal to widths of micro slits 199. Widths of micro branches 197 in the region PL1-20i may be greater than widths of micro branches 197 in the region PL2-20i. Widths of micro slits 199 in the region PL1-20i may be substantially equal to widths of micro slits 199 in the region PL2-20i. The pixel electrode has four different regions PH1-20i, PH2-20i, PL1-20i, and PL2-20i according to the structures of micro branches 197 and micro slits 199. Micro branches 197 and micro slits 199 are constant in width along their extension directions, and each of first and second subpixel electrodes 191h and 191l is divided into four domains by a cross-shaped branch 195. Except for widths of micro branches 197 and micro slits 199 formed in the region PL1-20i, widths of micro branches 197 and micro slits 199 in the regions PH1-20i, PH2-20i, and PL2-20i and main direction angles of micro branches 197 and micro slits 199 in the regions PH1-20i, PH2-20i, PL1-20i, and PL2-20i, are similar to those described in conjunction with FIG. 20G The pixel electrode formed in this manner can improve visibility of the liquid crystal display device and reduce rainbow stains.

Figure 20J:
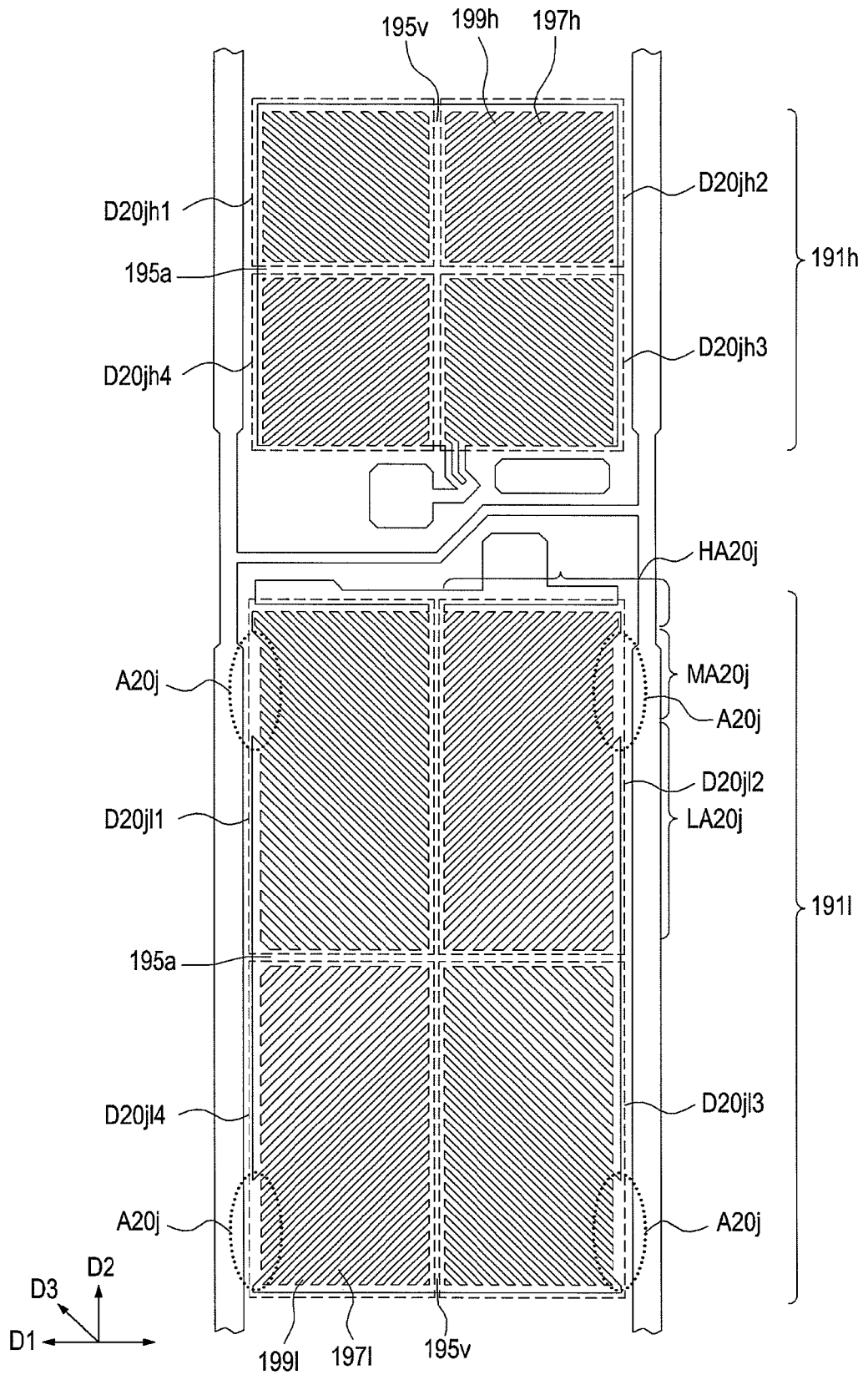

FIG. 20J is a plan view of a pixel electrode according to another exemplary embodiment of the present invention. A pixel electrode illustrated in FIG. 20J is substantially similar in structure to the pixel electrode described in connection with FIG. 3, except that the vertical connection portions 193 do not exist in a third region, or a region MA20j. For simplicity, the duplicate description will be omitted. The region MA20j is similar to the region MA described in connection with FIG. 3, in which widths of micro branches 197 or micro slits 199, more preferably, widths of micro slits 199 gradually change. In the region MA, e.g., the MA-LA boundary region or the MA-HA boundary region of the pixel electrode illustrated in FIG. 3, since widths of micro branches 197 or micro slits 199 change, the balance between the strength of an electric field formed by vertical connection portions 193 of the pixel electrode and the strength of an electric field formed by micro branches 197 or micro slits 199 may be broken. Due to the broken balance, in these regions, liquid crystal molecules may be arranged irregularly, generating textures. To correct this, the pixel electrode may not have the vertical connection portions 193 in the region MA20j adjacent to the data line 171 as illustrated in FIG. 20J. In other words, in the region MA20j adjacent to the data line 171, micro slits 199 are connected and ends of micro branches 197 may be closed. In the region MA20j where the vertical connection portions 193 do not exist, which are formed in other regions HA20j and LA20j, an electric field formed by the vertical connection portions 193 does not exist or is very weak. Therefore, in the region MA20j adjacent to the data line 171, since liquid crystal molecules are significantly influenced by the electric field formed by micro branches 197 or micro slits 199, the liquid crystal molecules may be arranged in the direction of the micro branches 197. The pixel electrode formed in this manner can reduce textures in the region MA20j, and increase transmittance of the liquid crystal display device.

Structures of a liquid crystal display panel assembly 300 according to other exemplary embodiments of the present invention will be described in detail below with reference to FIGS. 22A to 22H. Liquid crystal display panel assemblies 300 illustrated in FIGS. 22A to 22H have different stacked structures according to exemplary embodiments of the present invention. These stacked structures may enable uniform formation of photo hardening layers 35 and 36 or reduce a non-hardened light hardener in the below-described process for manufacturing liquid crystal display panel assemblies of certain modes. Main alignment layers 33 and 34 and photo hardening layers 35 and 36 constituting alignment films included in the upper or lower display panel 200 or 100 are formed on a flat lower layer, thus improving display quality of the liquid crystal display device. FIGS. 22A to 22H are cross-sectional views taken along line 21a-21a' of the pixel layout shown in FIG. 18. The liquid crystal display panel assemblies 300 illustrated in FIGS. 22A to 22H are similar to those described in connection with FIGS. 3 to 4C and 18 to 21B, except for the stacked structures. Thus, duplicate descriptions will be omitted. Therefore, the liquid crystal display panel assemblies 300 having the structures of FIGS. 22A to 22H may have above/below-described patterns of a pixel electrode layer.

The liquid crystal display panel assemblies 300 illustrated in FIGS. 22A to 22D have a light blocking member 220 formed on a lower display panel 100. First, a method of manufacturing a liquid crystal display panel assembly 300 according to an exemplary embodiment of the present invention and a structure thereof will be described in brief with reference to FIG. 22A. An upper display panel 200 has an upper substrate 210, a common electrode 270 and an upper-plate alignment film 292 (shown as 34 and 36). The common electrode 270 is formed on the upper substrate 210 by the above-described method corresponding thereto, and the upper-plate alignment film 292 is formed on the common electrode 270 by a corresponding technique to be described below with regard to a liquid crystal display panel assembly of a certain mode. The upper-plate alignment film 292 may include a main alignment layer 34 and a photo hardening layer 36.

The lower display panel 100 is manufactured as described below. On a lower substrate 110 is formed a gate layer conductor including storage electrode line's vertical portions 128. The gate layer conductor may have the above-described patterns 121, 123, 124h, 124l, 124c, 125, 126, and 127. A gate insulating layer 140 is formed on the gate layer conductor. A semiconductor 154 is formed on the gate insulating layer 140. The semiconductor 154 may have the above-described patterns 154h, 154l, and 154c. A linear ohmic contact member 165 is formed on the semiconductor 154. The linear ohmic contact member 165 may have the above-described patterns corresponding thereto. On the linear ohmic contact member 165 is formed a data layer conductor including a data line 171. The data layer conductor may have the above-described patterns 173h, 173l, 173c, 175h, 175l, 175c, and 177c. A first protection layer 181 is formed on the data layer conductor. Preferably, the first protection layer 181 may be the above-described inorganic insulating material, for example, silicon nitride SiNx, silicon oxide SiOx, titanium oxide $TiO_2$, alumina $Al_2O_3$ or zirconia $ZrO_2$. Color filters 230 are formed on the first protection layer 181. The color filters 230 may overlap the data line 171, a storage electrode line adjacent to the data line 171, or the light blocking member 220 formed on the color filters 230. As illustrated in FIG. 22A, the light blocking member 220 is formed to overlap at least sidewalls of the color filters 230 overlapping the storage electrode line's vertical portions 128 situated on both sides of the data line 171 interposed between two adjacent unit pixels, and to overlap the data line 171 between the sidewalls. The color filters 230 may have R, G and B components, or may have red, green, blue, and yellow components. The light blocking member 220 is formed on the color filters 230. The light blocking member 220 may completely cover the data line 171, or may overlap vertical connection portions 193h situated on both sides of the data line 171. The light blocking member 220 may be formed on a channel of a TFT. The light blocking member 220 may not be formed under contact holes 185h and 185l. A second protection layer 182 is formed on the light blocking member 220. Preferably, the second protection layer 182 may be an inorganic insulating material, for example, silicon nitride SiNx, silicon oxide SiOx, titanium oxide $TiO_2$, alumina $Al_2O_3$ or zirconia $ZrO_2$. A pixel electrode layer is formed on the second protection layer 182. The pixel electrode layer may have the above/below-described patterns 187, 189, 191h, 191l, 192h, 192l, 193l, 194h, 194l, 195h, 195l, 196, 197h, 197l, 198h, 198l, 713h, 713l, 715h, 715l, 717h, and 717l, including vertical connection portions 193h, and a pixel electrode structure. The vertical connection portions 193h formed on both sides of the data line 171 may overlap at least one portion of the storage electrode line's vertical portions 128. A spacer 250 (not shown) is formed on the pixel electrode layer. The spacer 250 may include a pigment constituting color filters, and may be made of a colored substance. In accordance with an exemplary embodiment of the present invention, the spacer 250 may be black in color. In accordance with another exemplary embodiment of the present invention, both a spacer 250 and a light blocking pattern may be formed in an inner region and an outer region of the lower display panel 100, respectively. The spacer 250 and the light blocking pattern may be black, and the light blocking pattern may block light which is leaked in the outer region. A lower-plate alignment film 291 is disposed on the spacer 250 as will be explained in at least one of the below-described modes of a liquid crystal display panel assembly.

The lower-plate alignment film 291 may include a main alignment layer 33 and a photo hardening layer 35. A liquid crystal layer 3 is formed between the upper and lower display panels 200 and 100. The lower display panel 100 manufactured in this way includes an opaque film or the light blocking member 220. In other words, on the lower display panel 100 are formed layers blocking or absorbing light, for example, the protection layers 181 and 182, the color filters 230, or the light blocking member 220. However, the upper display panel 200 does not generally include materials blocking or absorbing light. Since the upper display panel 200 manufactured in this way has a less number of materials blocking or absorbing light, the light incident upon the upper display panel 200 in a process for manufacturing a liquid crystal display panel assembly with a certain mode may be uniformly incident upon the materials forming the lower-plate alignment film 291 and the upper-plate alignment film 292. To form uniform lower-plate and upper-plate alignment films 291 and 292, the light which is irradiated in a field or fluorescence exposure process may be uniformly irradiated to the materials forming alignment films. To reduce a non-hardened light hardener, there may be no region to which light is not irradiated. By doing so, the lower-plate and upper-plate alignment films 291 and 292 are uniformly formed, and the non-hardened light hardener may be significantly reduced. Because the upper display panel 200 has mostly flat layers, liquid crystal molecules may be uniformly aligned, improving the display quality of the liquid crystal display device.

A method of manufacturing a liquid crystal display panel assembly 300 according to an exemplary embodiment of the present invention and a structure thereof will be described below in brief with reference to FIG. 22B. A liquid crystal display panel assembly 300 illustrated in FIG. 22B is manufactured by a process in which a light blocking member 220 and a spacer (not shown) are simultaneously formed on a pixel electrode layer according to an exemplary embodiment of the present invention. An upper display panel 200 is manufactured as described with reference to FIG. 22A. A lower display panel 100 is manufactured as described below. A gate layer conductor, a gate insulating layer 140, a semiconductor 154, a linear ohmic contact member 165, a data layer conductor, a first protection layer 181 and color filters 230 are formed as described with reference to FIG. 22A. A second protection layer 182 is formed on the color filters 230. Preferably, the second protection layer 182 may be an organic insulating material to planarize the upside of the color filters 230. A pixel electrode layer is formed on the second protection layer 182. The pixel electrode layer may be formed as described with reference to FIG. 22A. A light blocking member 220 and a spacer 250 are simultaneously formed on the pixel electrode layer. Since the light blocking member 220 and the spacer 250 are simultaneously formed of the same material, the process may be simplified. The spacer 250 may be colored as described above with reference to FIG. 22A. In accordance with an exemplary embodiment of the present invention, the light blocking member 220 and the spacer 250 may be black. A lower-plate alignment film 291 (shown as 33 and 35) is formed on the spacer 250 (not shown) by the below-described methods. The lower and upper display panels 100 and 200 formed in this way may have the characteristics described with reference to FIG. 22A.

Figure 22C:
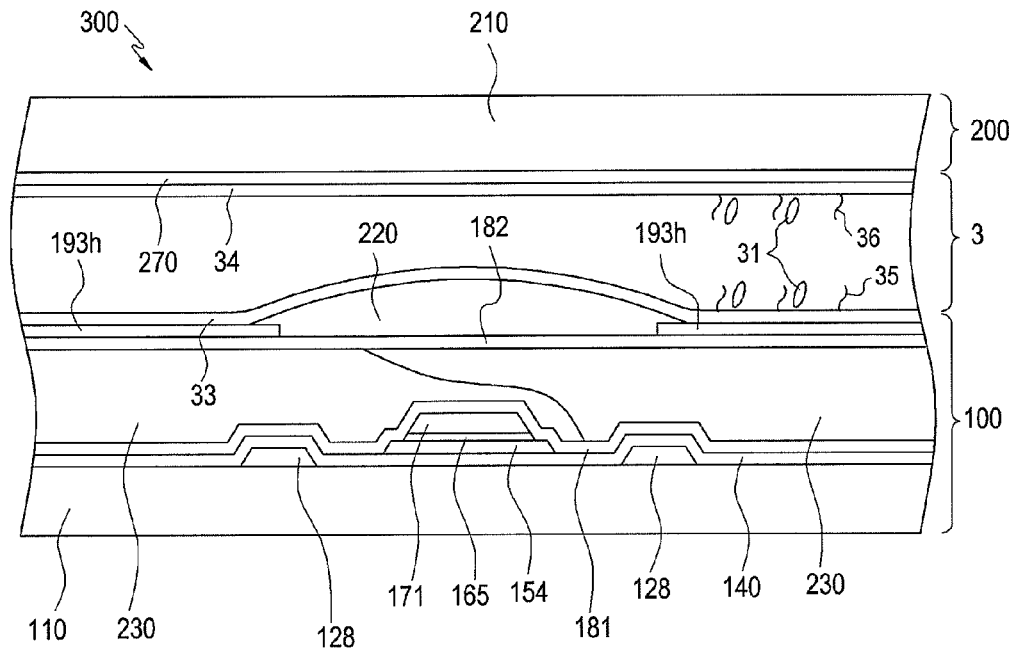

A method of manufacturing a liquid crystal display panel assembly 300 according to an exemplary embodiment of the present invention and a structure thereof will be described below in brief with reference to FIG. 22C. In a liquid crystal display panel assembly 300 illustrated in FIG. 22C, one lower color filter among overlapping color filters has a concave cross section according to an exemplary embodiment of the present invention. In addition, an overlapping portion of one color filter overlapping a side of another color filter is provided on a data line, and a light blocking member is formed on the overlapping portion. The upper display panel 200 is manufactured as described with reference to FIG. 22A. A lower display panel 100 is manufactured as described below. A gate layer conductor, a gate insulating layer 140, a semiconductor 154, a linear ohmic contact member 165, a data layer conductor, and a first protection layer 181 are formed as described with reference to FIG. 22A. Color filters 230 are formed on the first protection layer 181. Among the primary color components constituting the color filters 230, two or more color components may overlap on the data line 171. To prevent the upside of the color filters 230 from becoming convex due to the overlapping of primary color components of the color filters 230, one of the overlapping color filters 230 may be formed concave by a photo-lithography process. The color filter layers formed to be flat in this way ensure excellent spread of liquid crystal molecules or light hardeners. A second protection layer 182 is formed on the color filters 230. Preferably, the second protection layer 182 may be the above-described inorganic insulating material. After the second protection layer 182 is formed, a pixel electrode layer, a light blocking member 220, a spacer 250 (not shown) and a lower-plate alignment film 291 are formed as described with reference to FIG. 22B. The lower and upper display panels 100 and 200 formed in this manner may have the characteristics described with reference to FIG. 22A.

Figure 22D:
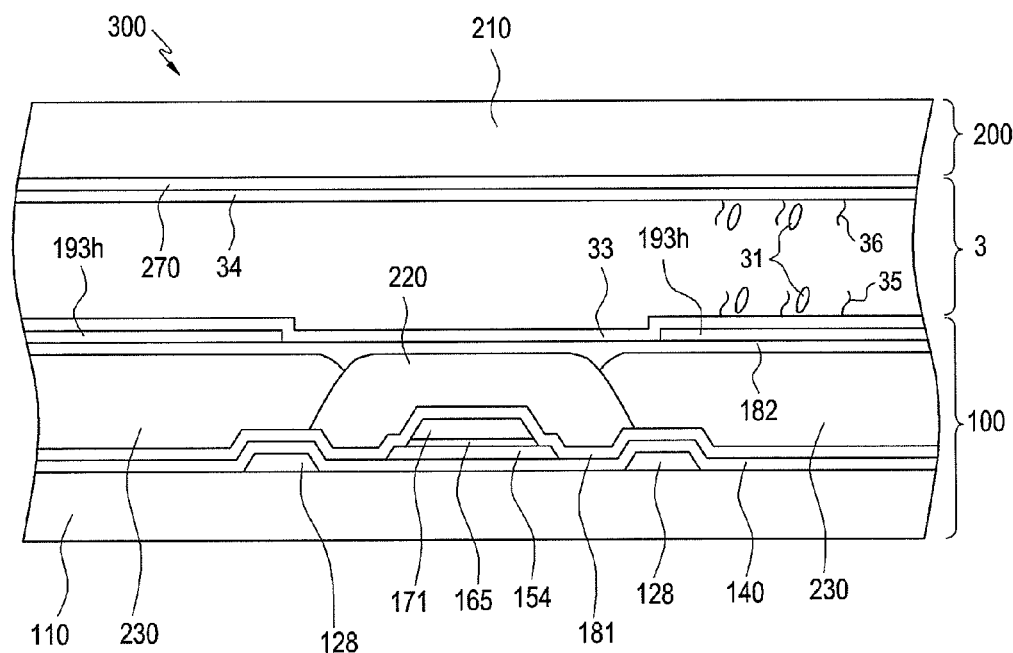

A method of manufacturing a liquid crystal display panel assembly 300 according to an exemplary embodiment of the present invention and a structure thereof will be described below in brief with reference to FIG. 22D. A liquid crystal display panel assembly 300 illustrated in FIG. 22D is manufactured by including a process in which boundaries of pixels are surrounded by a light blocking member 220, and liquid materials for the color filters 230 are applied onto the inside of the pixels surrounded by the light blocking member 220 according to an exemplary embodiments of the present invention. The upper display panel 200 is manufactured as described with reference to FIG. 22A. A lower display panel 100 is manufactured as described below. A gate layer conductor, a gate insulating layer 140, a semiconductor 154, a linear ohmic contact member 165, a data layer conductor, and a first protection layer 181 are formed as described with reference to FIG. 22A. A light blocking member 220 is formed on the first protection layer 181. The light blocking member 220 may be formed to completely surround one pixel along boundaries of pixels, for example, a data line 171 or a gate layer 121. By forming the light blocking member 220 in this manner, liquid materials, for the color filters 230 may be applied onto the inside of the light blocking member 220 in the succeeding process. The liquid materials for the color filters 230 are applied onto the inside of the pixel surrounded by the light blocking member 220. The liquid materials for the color filters 230 may be applied and formed by the above-described inkjet method. Forming the color filters 230 using the inkjet method can simplify a process for manufacturing patterns of the color filters 230. A second protection layer 182 is formed on the color filters 230. Preferably, the second protection layer 182 may be an organic insulating material to planarize the upside of the color filters 230. A pixel electrode layer is formed on the second protection layer 182, a spacer 250 (not shown) is formed on the pixel electrode layer, and a lower-plate alignment film 291 is formed on the spacer 250. The pixel electrode layer, the spacer 250, and the lower-plate alignment film 291 may be formed as described with reference to FIG. 22A. The lower and upper display panels 100 and 200 formed in this manner can have the characteristics described with reference to FIG. 22A.

Liquid crystal display panel assemblies 300 illustrated in FIGS. 22E to 22H have a light blocking member 220 formed on an upper display panel 200 according to exemplary embodiments of the present invention. A method of manufacturing a liquid crystal display panel assembly 300 according to an exemplary embodiment of the present invention and a structure thereof will be described below in brief with reference to FIG. 22E. An upper display panel 200 has an upper substrate 210, a light blocking member 220, color filters 230, an overcoat 225, a common electrode 270, a spacer 250 (not shown), and an upper-plate alignment film 292 (shown as 34 and 36). The light blocking member 220 is formed on the upper substrate 210 by the above-described method corresponding thereto. The light blocking member 220 may completely cover a data line 171, and may overlap some parts of vertical connection portions 193h situated on both sides of the data line 171. The light blocking member 220 may be formed to overlap a channel of a TFT. The color filters 230 are formed on the light blocking member 220 by the above-described method corresponding thereto. The color filters 230 may overlap the data line 171, an opaque film adjacent to the data line 171, or the light blocking member 220 formed after the formation of the color filters 230. The color filters 230 may include R, G and B components, or may include red, green, blue and yellow components. The overcoat 225 is formed on the color filters 230 to planarize a lower layer. The common electrode 270 is formed on the overcoat 225 by the above-described method corresponding thereto. The spacer 250 may be formed on the common electrode 270. The spacer 250 includes a pigment constituting color filters, and may be made of a colored substance. The spacer 250 may be block in color. On the other hand, the spacer 250 may be formed under a lower-plate substrate film 291 (shown as 33 and 35) on the lower display panel 100. The upper-plate-alignment film 292 is formed on the spacer 250 by the below-described methods of making a liquid crystal display panel assembly with a certain mode. The upper-plate alignment film 292 may include a main alignment layer 34 and a photo hardening layer 36.

The lower display panel 100 is formed as described below. On a lower substrate 110 is formed a gate layer conductor including storage electrode line's vertical portions 128. The gate layer conductor may have the above-described patterns 121, 123, 124h, 124l, 124c, 125, 126, and 127. A gate insulating layer 140 is formed on the gate layer conductor. A semiconductor 154 is formed on the gate insulating layer 140. The semiconductor 154 may have the above-described patterns 154h, 154l, and 154c. A linear ohmic contact member 165 is formed on the semiconductor 154. The linear ohmic contact member 165 may have the above-described patterns corresponding thereto. On the linear ohmic contact member 165 is formed a data layer conductor including the data line 171. The data layer conductor may have the above-described patterns 173h, 173l, 173c, 175h, 175l, 175c, and 177c. A first protection layer 181 is formed on the data layer conductor. Preferably, the first protection layer 181 may be made of the above-described inorganic material. A pixel electrode layer is formed on the first protection layer 181. The pixel electrode layer may have the above/below-described patterns 187, 189, 191h, 191l, 192h, 192l, 193l, 194h, 194l, 195h, 195l, 196, 197h, 197l, 198h, 198l, 713h, 713l, 715h, 715l, 717h, and 717l, including vertical connection portions 193h, and a pixel electrode structure. The vertical connection portions 193h formed on both sides of the data line 171 may overlap storage electrode line's vertical portions 128. The lower-plate alignment film 291 is formed on the pixel electrode layer by the below-described methods. The lower-plate alignment film 291 may include a main alignment layer 33 and a photo hardening layer 35. A liquid crystal layer 3 is formed between the upper and lower display panels 200 and 100. The upper and lower display panels 200 and 100 manufactured in this manner can have the characteristics described in FIG. 22A. In other words, the upper display panel 200 includes layers 220, 230, and 225 blocking or absorbing light, and the lower display panel 100 does not substantially include materials blocking light. The light irradiated in the field or fluorescence exposure process to form the lower-plate and upper-plate alignment films 291 and 292 may be incident upon the lower display panel 100. As a result, the lower-plate and upper-plate alignment films 291 and 292 may be uniformly formed, and the non-hardened light hardener may be reduced significantly, contributing to an improvement in the display quality of the liquid crystal display device.

Figure 22E:
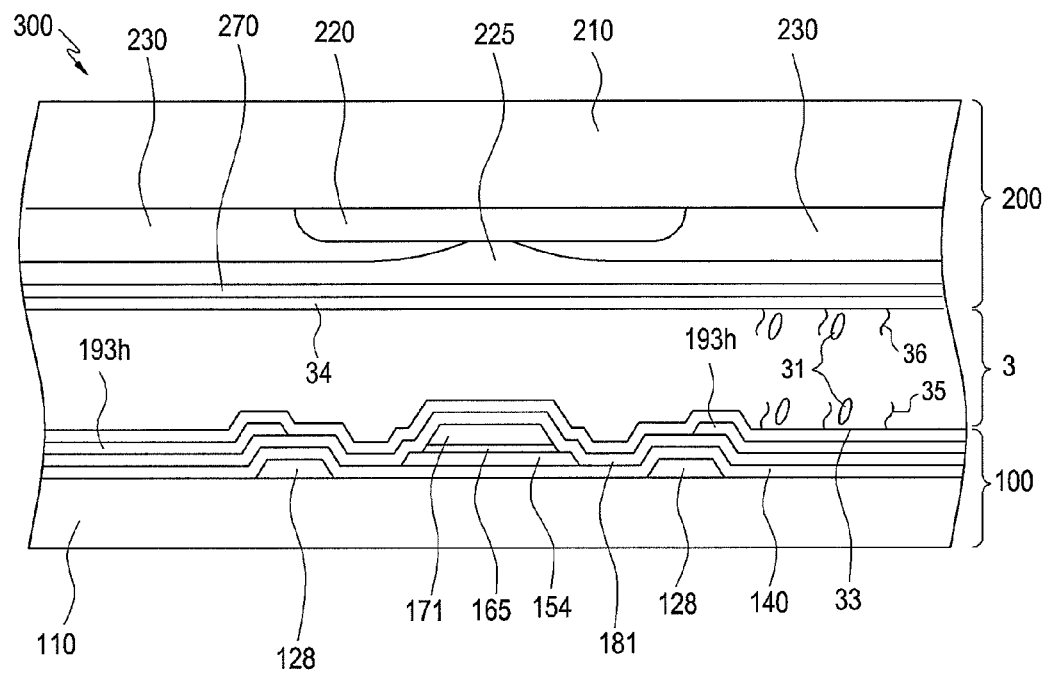
Figure 22F:
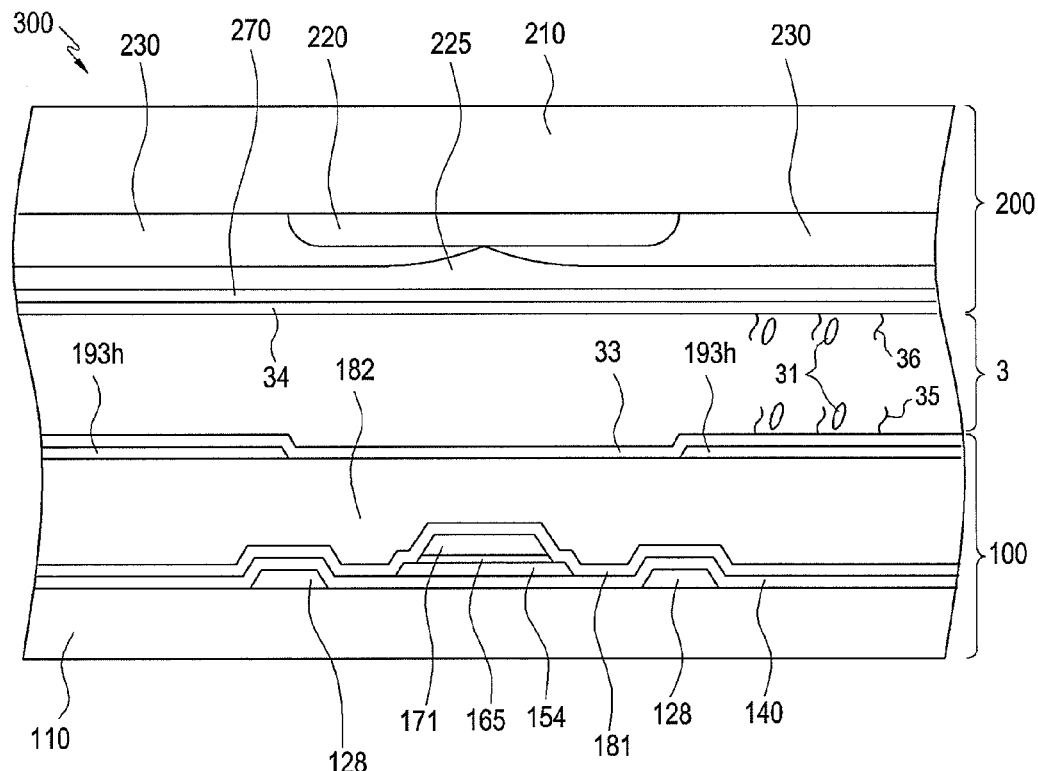

A liquid crystal display panel assembly 300 illustrated in FIG. 22F is substantially similar to that described in FIG. 22E except that a second protection layer 182 is formed between a pixel electrode layer and a first protection layer 181. The second protection layer 182 may be made of an organic material to planarize a lower layer.

Figure 22G:
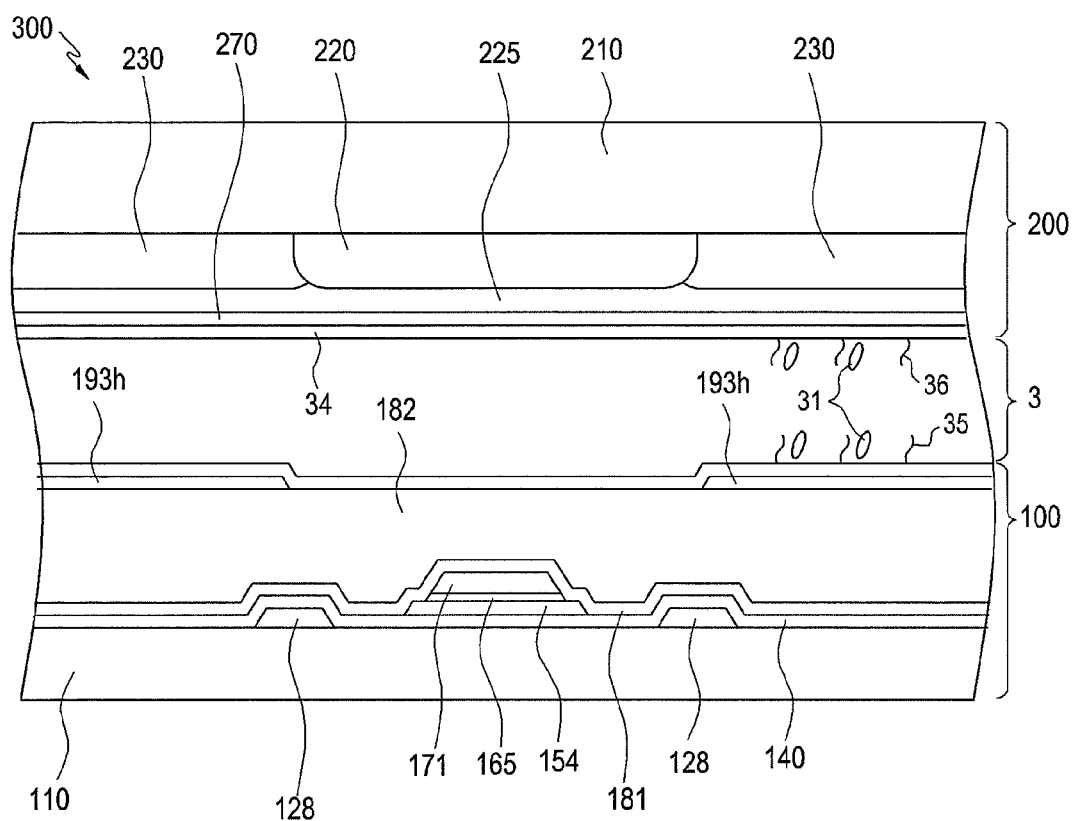

A liquid crystal display panel assembly 300 illustrated in FIG. 22G is substantially similar to that described in FIG. 22F except how color filters 230 are formed. The color filters on an upper display panel shown in FIG. 22G may be formed by the inkjet method that has already been described with reference to FIG. 22D.

Figure 22H:
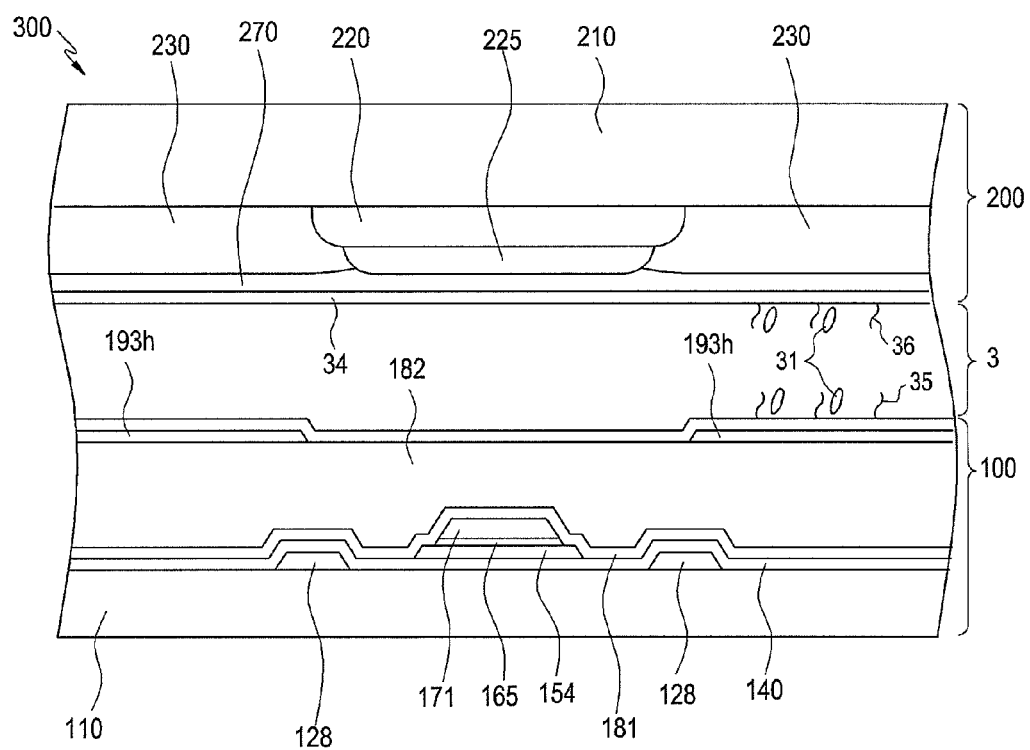

A liquid crystal display panel assembly 300 illustrated in FIG. 22H has an overcoat 225 formed on a light blocking member 220 for barrier or planarization, compared with the liquid crystal display panel assembly 300 illustrated in FIG. 22G. After the overcoat 225 is formed, a layer of color filters 230 may be formed within sidewalls of the light blocking member 220 and overcoat 225 by the inkjet method. The barrier may be formed in a portion where colors of color filters formed in one pixel are identified. The lower and upper display panels 100 and 200 with the structures illustrated in FIGS. 22A to 22H can improve the display quality of the liquid crystal display device. In accordance with an exemplary embodiment of the present invention, the overcoat 225 illustrated in FIGS. 21A and 21B, and FIGS. 22A to 22H may contain an acryl-based material. The acryl-based material contained in the overcoat 225 may be hardened in a process of forming the overcoat 225. The overcoat 225 containing the hardened acryl-based material has a high transmittance for the short-wavelength ultraviolet light, increasing the energy or intensity of the light being incident on the light hardener or reactive mesogen and thus increasing the cross-linking rate of the light hardener or reactive mesogen.

3) Enlarged View of Region A19 Shown in FIG. 18

A structure of the region A 19 shown in FIG. 18 will be described below in detail with reference to FIGS. 18, 19A and 19B. FIG. 19A is an enlarged view of the region A19 shown in FIG. 18. Patterns of each layer formed in the region A19, for example, patterns of first and second pixel electrode contact portions 192h and 192l and first and second pixel electrode junction connection portions can improve unrestoration and light leakage defects of the liquid crystal display device. Patterns illustrated in FIGS. 23A to 23F and 24A to 24T are different exemplary embodiments of the present invention each capable of improving unrestoration and light leakage defects of the liquid crystal display device.

The unrestoration and light leakage phenomena of a liquid crystal display device are described below. Unrestoration refers to a phenomenon in which transition of liquid crystal molecules from any arrangement, for example, a stable arrangement, to another arrangement is delayed. If a display unit of a liquid crystal display device is pressed or impacted from the outside while the liquid crystal display device is in use, liquid crystal molecules in a liquid crystal layer are rearranged. The rearranged liquid crystal molecules may remain in the rearranged state for a predetermined time without returning to their original state. In addition, even though a data voltage is applied to a pixel electrode and an electric field is formed in a liquid crystal layer, liquid crystal molecules arranged in a stable state may continuously maintain the previous arrangement state, for example, a stable state in some regions without moving in an electric field formed on the pixel electrode. This phenomenon is called unrestoration of liquid crystal molecules, which may cause texture defects. In the pixel electrode structure illustrated in FIGS. 18 and 19A, the unrestoration phenomenon may occur due to the characteristics that in a region of a cross-shaped branch 195 of a first or second subpixel and a boundary region A19 between first and second subpixels, liquid crystal molecules are equal in arrangement direction and thus maintain the stable state. When the display unit is not pressed or impacted from the outside, liquid crystal molecules in the region of the cross-shaped branch 195 and the boundary region A19 remain independent, whereas if the display unit is impacted, liquid crystal molecules in these regions may be rearranged in a stable arrangement in the same direction. To address the unrestoration, e.g., to prevent liquid crystal molecules from being rearranged in a stable state, the strength and direction of an electric field may be adjusted in the region A19 and its adjacent regions shown in FIG. 18.

Light leakage refers to a phenomenon in which external light (not shown) passes through a liquid crystal display panel assembly 300 by a liquid crystal layer which is not controlled by a data voltage. For example, when an alignment of liquid crystal molecules in lower and upper display panels 100 and 200 is distorted by the external impact, the light incident on the liquid crystal display panel assembly 300 may pass through the liquid crystal display panel assembly 300 without being controlled by the liquid crystal display device. The light leakage phenomenon may occur even when the liquid crystal display device is not driven. In addition, when the lower and upper display panels 100 and 200 are twisted, light leakage may occur as a light blocking member deviates from its normal alignment or an electric field formed in a liquid crystal layer is distorted. Because of the light leakage, the liquid crystal display device may have texture, stain, reddish or greenish defects. The texture or stain defects caused by the light leakage occur in boundary regions between pixel electrodes. The reddish defects caused by the light leakage make the liquid crystal display device display reddish-dominant images, causing light leakage of a red color to be more visible than light leakage of other colors. Like the reddish defects, defects of a greenish color or other colors constituting a basic pixel group cause light of any one or more colors to be more visible than light of other colors. Tapping light leakage, a kind of light leakage, may occur when the liquid crystal display device is tapped or patted. When the liquid crystal display device is tapped, the lower and upper display panels 100 and 200 may deviate from the normal alignment by a value within a range of about 10 μm to about 15 μm, and the tapping light leakage may occur due to misalignment of layers formed in the lower and upper display panels 100 and 200.

Patterns of the first and second pixel electrode contact portions 192*h* and 192*l*, first and second pixel electrode junction connection portions, a pixel electrode, and other layers, illustrated in FIG. 19A, are patterns that improve the unrestoration and light leakage defects. The first and second pixel electrode contact portions 192*h* and 192*l* electrically connect first and second drain electrodes 175*h* and 175*l* to the first and second pixel electrode junction connection portions, respectively. The first and second pixel electrode junction connection portions serve to electrically connect the first and second pixel electrode contact portions 192*h* and 192*l* to the first and second subpixel electrodes 191*h* and 191*l*, respectively. The first and second subpixel electrodes 191*h* and 191*l* receive data signals by the first and second pixel electrode contact portions 192*h* and 192*l* and the first and second pixel electrode junction connection portions, respectively. The first pixel electrode contact portion 192*h* and the first pixel electrode junction connection portion may have a concave shape formed therein.

The first pixel electrode junction connection portion may include a first pixel electrode's horizontal connection portion 713*h*, a first pixel electrode connection portion coupling point, and a first pixel electrode's vertical connection portion 715*h*. The first pixel electrode's vertical connection portion 715*h* may include two bifurcated branches, which are slanted from a first pixel electrode's oblique connection portion 714*h* connected to a first pixel electrode's horizontal connection portion 713*h* and extend in a substantially vertical direction, and the first pixel electrode's vertical connection portion 715*h* is connected to first pixel electrode's central micro branches 197, more preferably micro branches 197 to the right of a cross-shaped branch's vertical portion 195*v*. In accordance with an exemplary embodiment of the present invention, a wiring of the first pixel electrode connection portion coupling point may be the first pixel electrode's oblique connection portion 714*h*, which is formed to be oblique as illustrated in FIGS. 18 and 19A. The first pixel electrode's oblique connection portion 714*h* may be slanted with respect to a wiring of the first pixel electrode's horizontal connection portion 713*h*, a polarization axis of a polarizer, or the above-described direction D1 by a value within a range of about 30° to about 60°. The first pixel electrode's horizontal connection portion 713*h* extends in a substantially horizontal direction, and electrically connects the first pixel electrode contact portion 192*h* to the first pixel electrode's oblique connection portion 714*h*. The first pixel electrode's vertical connection portion 715*h* and the first pixel electrode's oblique connection portion 714*h* are connected at an obtuse angle, while the first pixel electrode's horizontal connection portion 713*h* and the slanted bifurcated branches are connected at an acute angle. The first pixel electrode junction connection portion formed in this way may disperse an electric field occurring in a region between the first and second subpixels 191*h* and 191*l*, or prevent the electric field occurring in this region from affecting the first subpixel region, thereby improving the liquid crystal molecule's unrestoration and light leakage defects, which may occur in the first subpixel region.

In accordance with an exemplary embodiment of the present invention, the number of micro branches 197 connected to the first pixel electrode's vertical connection portion 715*h* may be one or more. In accordance with an exemplary embodiment of the present invention, the number of wirings 713*h*, 714*h*, and 715*h* constituting the first pixel electrode junction connection portion may be one, or two or more, and their widths may fall within a range of about 2 μm to about 7 μm. A width of the first pixel electrode's horizontal connection portion 713h may be greater than a width of the first pixel electrode's oblique connection portion 714h. In accordance with an exemplary embodiment of the present invention, the first pixel electrode junction connection portion may be constructed to facilitate easy repair of the pixel electrode. Therefore, a line RH1 may be fused by laser to repair manufacturing defects of the first subpixel 191h.

A second pixel electrode junction connection portion may include a second pixel electrode's horizontal connection portion 713l, a second pixel electrode connection portion coupling point or a second pixel electrode's oblique connection portion 714l, and a second pixel electrode connection portion 717l. The second pixel electrode connection portion coupling point 714l is connected to the second pixel electrode's horizontal connection portion 713l extending in a horizontal direction, and the second pixel electrode connection portion 717l. In accordance with an exemplary embodiment of the present invention, a wiring of the second pixel electrode connection portion coupling point 714l may be the second pixel electrode's oblique connection portion 714l, which is formed to be oblique as illustrated in FIGS. 18 and 19A. The second pixel electrode's horizontal connection portion 713l overlaps a portion of a down gate line 123 along a longitudinal direction of the down gate line 123. The overlapping second pixel electrode's horizontal connection portion 713l blocks an electric field existing in a peripheral portion of the down gate line 123. In addition, the second pixel electrode's horizontal connection portion 713l may overlap a wiring that connects a second drain electrode 175l to a third source electrode 173c. A longitudinal length of the second pixel electrode's horizontal connection portion 713l is substantially similar to a longitudinal length of the second pixel electrode 191l. The second pixel electrode's oblique connection portion 714l is formed by a wiring slanted with respect to the second pixel electrode's horizontal connection portion 713l, and electrically connects the second pixel electrode's horizontal connection portion 713l to the second pixel electrode connection portion 717l. The second pixel electrode's oblique connection portion 714l is connected to micro branches 197 to the left of a vertical portion 195v of the cross-shaped branch 195. A tilt angle between the second pixel electrode's oblique connection portion 714l and the second pixel electrode's horizontal connection portion 713l may fall within a range of about 30° to about 60°. A line width of the second pixel electrode's oblique connection portion 714l may fall within a range of about 2 μm to about 7 μm, and may be greater than a width of the second pixel electrode's micro branches 197. The second pixel electrode connection portion 717l electrically connects the second pixel electrode's oblique connection portion 714l to the second pixel electrode 191l. The second pixel electrode connection portion 717l is formed in a central portion of a second pixel electrode 191l to electrically connect the second pixel electrode's oblique connection portion 714l to two micro branches 197 on one end of the cross-shaped branch's vertical portion 195v. The second pixel electrode connection portion 717l has a hanger shape. In accordance with an exemplary embodiment of the present invention, the number of micro branches 197 connected to the second pixel electrode's vertical connection portion 715l may be one or more.

In accordance with an exemplary embodiment of the present invention, a second pixel electrode's horizontal connection portion 194l adjacent to the second pixel electrode's horizontal connection portion 713l is formed on both sides of the second pixel electrode connection portion 717l. The second pixel electrode's horizontal connection portion 194l connects second pixel electrode's micro branches 197l. The second pixel electrode's horizontal connection portion 194l formed on both sides of the second pixel electrode connection portion 717l overlaps a portion of the down gate line 123 along an extension direction of the down gate line 123. The overlapping second pixel electrode's horizontal connection portion 194l blocks an electric field existing in a peripheral portion of the down gate line 123. By doing so, the second pixel electrode junction connection portion or second pixel electrode's horizontal connection portion 194l may disperse the electric field occurring in a region between the first and second subpixels 190h and 190l, or prevent the electric field occurring in this region from affecting the second subpixel region, thereby improving the liquid crystal molecule's unrestoration and light leakage defects, which may occur in the second subpixel region.

In accordance with another exemplary embodiment of the present invention, the second subpixel 190l may have regions A19a and A19b illustrated in FIG. 19A. In the region A19a, a second pixel electrode's vertical connection portion 193l extends in a stair shape, overlapping a portion of a storage electrode, line's vertical portion 128 (see FIG. 21B). A projection 193a of the second pixel electrode's vertical connection portion 193l may be formed in a portion where a line width of a data line 171 or a shield common electrode 196 reduces. The region A19b is substantially similar in structure to the region A19a, so its detailed description is omitted. The structures formed in this way contribute to blocking an electric field occurring in the regions A19a and A19b, and reducing light leakage defects in these regions.

In accordance with an exemplary embodiment of the present invention, the second pixel electrode connection portion 717l may be constructed to facilitate easy repair of the pixel electrode. Therefore, the line RL1 may be fused by laser spot to repair manufacturing defects of the second subpixel 190l.

Various examples for improving liquid crystal molecule's unrestoration and light leakage defects will be described below with reference to FIGS. 23A to 23F and 24A to 24T. While micro branches 197 constituting a pixel electrode, illustrated in FIGS. 23A to 23F and 24A to 24T, have a zigzag shape, micro branches 197 may have the above-described stripe shape or a basic unit pixel electrode shape according to an exemplary embodiment of the present invention. In FIGS. 23A to 23F, patterns of some layers, for example, a gate layer conductor, a data layer conductor, and a pixel electrode layer, are only illustrated.

Figure 23A:
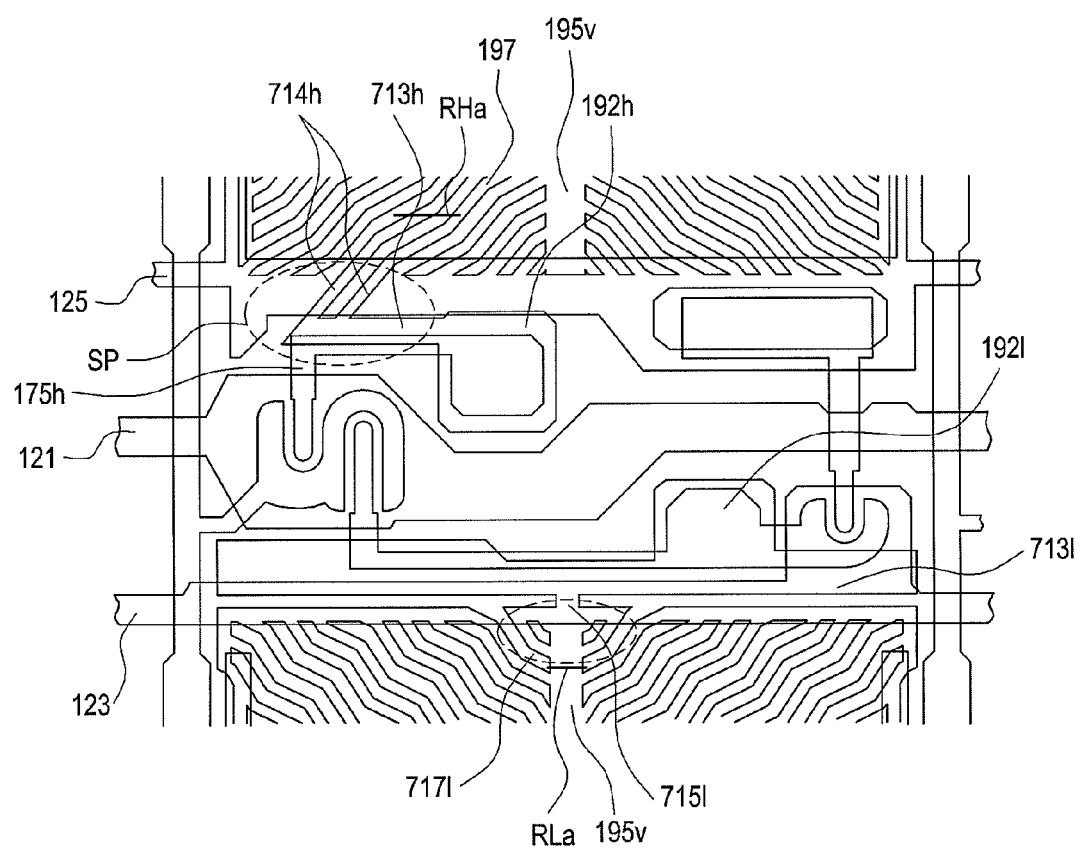
FIGS. 23A to 23F are plan views of lower display panels of a liquid crystal display device according to exemplary embodiments of the present invention.

Referring to FIG. 23A, a first pixel electrode junction connection portion includes a first pixel electrode's horizontal connection portion 713h and a first pixel electrode's oblique connection portion 714h. The connection portions 713h and 714h, or a pixel electrode's horizontal connection portion 713, a pixel electrode's oblique connection portion 714, and a pixel electrode's vertical connection portion 715, which are to be described in connection with FIGS. 23B to 23F and 24A to 24T, may be constructed by at least one wiring, and widths thereof may fall within a range of about 2 μm to about 7 μm. The first pixel electrode's oblique connection portion 714h has branches bifurcated at an end of the first pixel electrode's horizontal connection portion 713h, and the bifurcated branches have a straight line or stripe shape, and are connected to first pixel electrode's micro branches extending from a central portion of a bottom end of a domain to the left of a cross-shaped branch's vertical portion 195v, thereby dispersing an electric field that causes unrestoration of liquid crystal molecules. An angle between the pixel electrode's oblique connection portion 714h and the first pixel electrode's horizontal connection portion 713h may fall within a range of about 30° to about 60°. The first pixel electrode's horizontal connection portion 713h may have a wedge shape making an acute angle with the first pixel electrode's oblique connection portion 714h. The wedge-shaped first pixel electrode's horizontal connection portion 713h may disperse an electric field by forming a singular point. The singular point is a region where an electric field gathers or does not substantially exist, for example, a region SP illustrated in FIG. 23A. A wiring of the first pixel electrode's horizontal connection portion 713h may overlap a first drain electrode 175h. In case of manufacturing defects of the first subpixel 190h, the first subpixel 190h may be repaired by fusing micro branches connected to the first pixel electrode's oblique connection portion 714h, along a line RHa. The first pixel electrode junction connection portion formed in this manner ensures easy repair of the first subpixel electrode 191h, and can improve liquid crystal molecule's unrestoration and light leakage defects, which may occur in the first subpixel region due to the above-described reasons. In accordance with an exemplary embodiment of the present invention, the first pixel electrode's horizontal connection portion 713h may be greater in wiring width than the first pixel electrode's oblique connection portion 714h.

A second pixel electrode junction connection portion includes a second pixel electrode's horizontal connection portion 713l, a second pixel electrode's vertical connection portion 715l, and a second pixel electrode connection portion 717l. The second pixel electrode's vertical connection portion 715l is connected to a central portion of a vertical portion 195v of a cross-shaped branch 195, thereby preventing an electric field from being distorted to one side. In accordance with an exemplary embodiment of the present invention, the second subpixel 190l can be repaired by fusing the second subpixel electrode 191l along a line RLa. The second pixel electrode junction connection portion formed in this way ensures easy repair of the subpixel electrode 190l, and can improve liquid crystal molecule's unrestoration and light leakage defects, which may occur in the second subpixel region due to the above-described reasons. Other elements and their structures are the same as those described with reference to FIG. 19a, so a description thereof is omitted. Lines RHb, RLb, RHc, RLc1, RLc2, RHd, RLd, RHe, RLe, RHf, RLf, R24a, R24b, R24c, R24d, R24f, R24g, R24h, R24i, R24j, R24k, R24l, R24m, R24n, R24o, R24p, R24q, R24r and R24s illustrated in FIGS. 23B to 23F and 24A to 24T may be fused by the above-described laser spot to repair the first and second subpixels 190h and 190l.

Figure 23B:
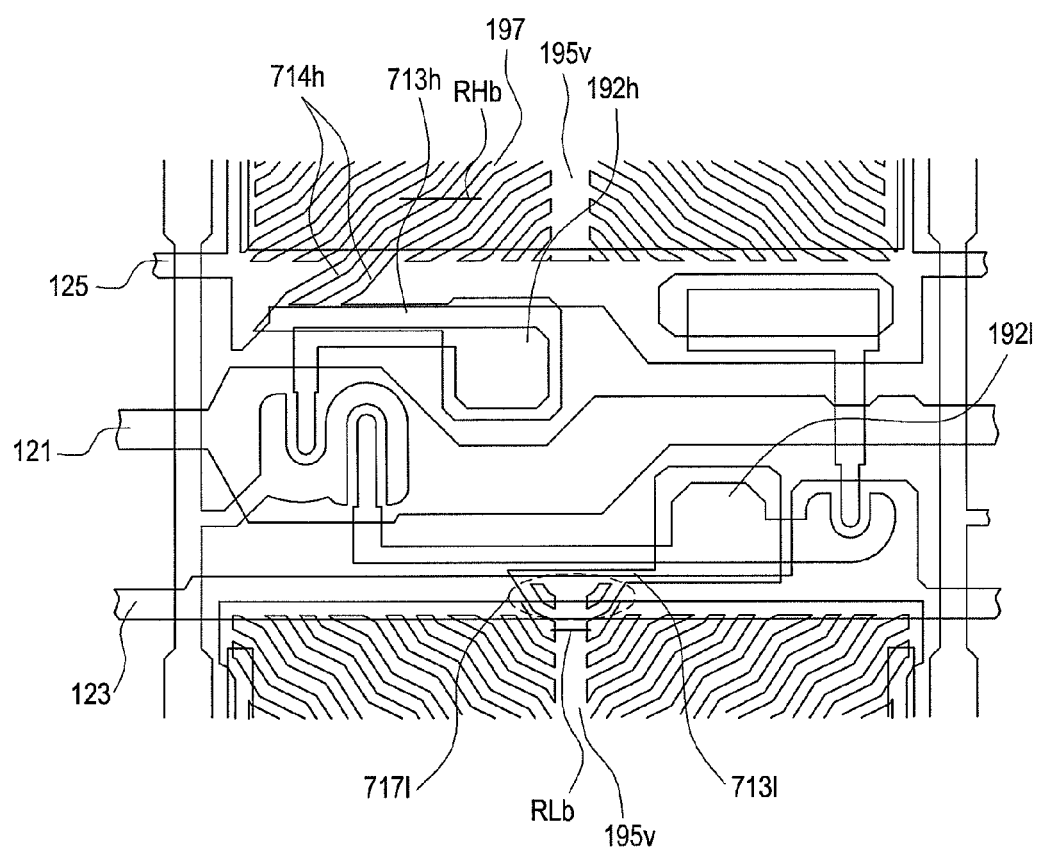

Referring to FIG. 23B, a first pixel electrode junction connection portion includes a first pixel electrode's horizontal connection portion 713h and a first pixel electrode's oblique connection portion 714h. The first pixel electrode junction connection portion is substantially similar to that described in FIG. 23A except that a wiring of the first pixel electrode's oblique connection portion 714h is in a zigzag shape, so a detailed description of other details about the first pixel electrode junction connection portion will be omitted. A second pixel electrode junction connection portion includes a second pixel electrode's horizontal connection portion 713l and a second pixel electrode connection portion 717l. The second pixel electrode connection portion 717l extends in a vertical direction to a down gate line 123, overlapping the down gate line 123, and is electrically connected to a second pixel electrode's horizontal connection portion 713l connected to a second pixel electrode contact portion 192l. As the second pixel electrode connection portion 717l extends and is connected to the second pixel electrode's horizontal connection portion 713l, an electric field formed in the pixel electrode contact portion 192l and the pixel electrode region can be dispersed. Other details about the second pixel electrode junction connection portion have been described with reference to FIG. 23A.

Figure 23C:
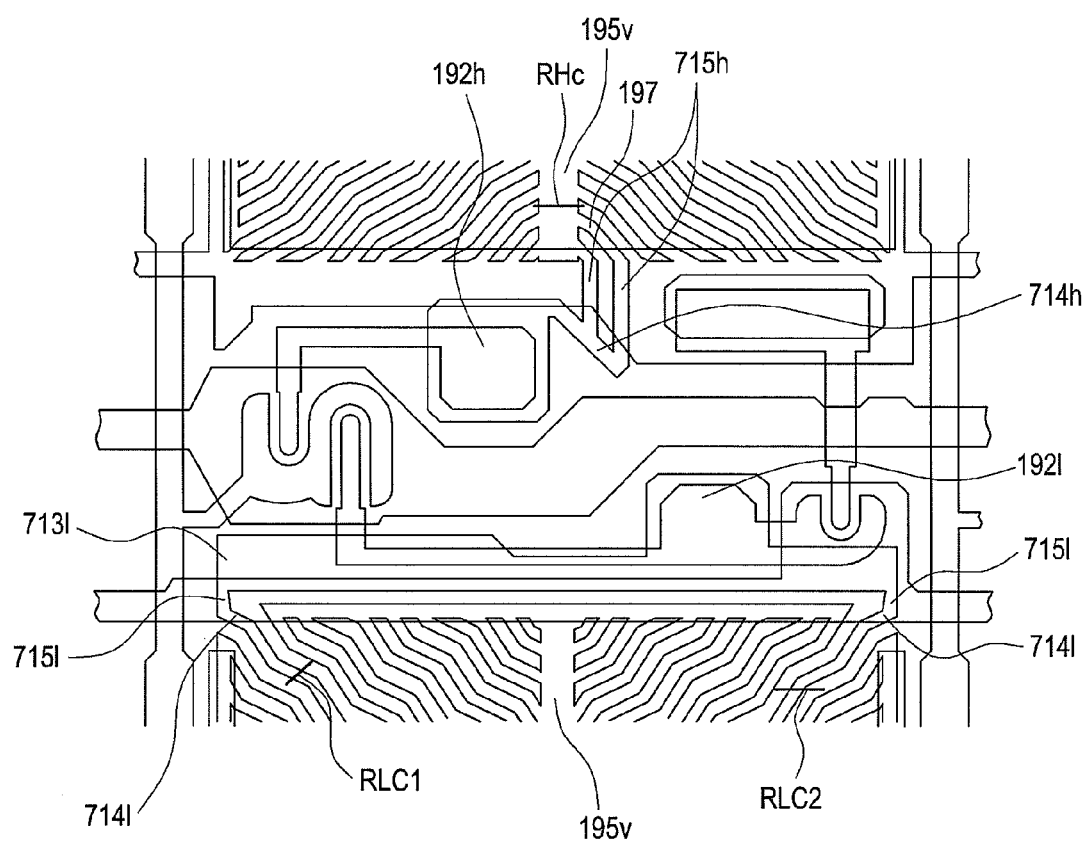

Referring to FIG. 23C, a first pixel electrode junction connection portion includes a first pixel electrode's oblique connection portion 714h and a first pixel electrode's vertical connection portion 715h. In a right bottom end of a cross-shaped branch's vertical portion 195v, the first pixel electrode's vertical connection portion 715h and first pixel electrode's micro branches 197 are electrically connected. Micro branches 197 connected to the first pixel electrode's vertical connection portion 715h may be micro branches 197 on a lower end of the cross-shaped branch's vertical portion 195v among the micro branches 197 connected to the cross-shaped branch's vertical portion 195v. The first pixel electrode's oblique connection portion 714h extends obliquely to electrically connect the first pixel electrode's vertical connection portion 715h to the top of a first pixel electrode contact portion 192h. The first pixel electrode's oblique connection portion 714h may be slanted against the first pixel electrode's vertical connection portion 715h by a value within a range of about 30° to about 60°. The first pixel electrode junction connection portion formed in this manner ensures easy repair of the first subpixel electrode 191h, and may improve liquid crystal molecule's unrestoration and light leakage defects, which may occur in the first subpixel region due to the above-described reasons.

A second pixel electrode junction connection portion includes a second pixel electrode's horizontal connection portion 713l and second pixel electrode's vertical connection portions 715l. The second pixel electrode's horizontal connection portion 713l extending in the horizontal direction is electrically connected to ends of the second pixel electrode's vertical connection portions 715l at both ends of the second pixel electrode's horizontal connection portion 713l, and other ends of the second pixel electrode's vertical connection portions 715l are connected to second pixel electrode's micro branches 197 extending from edges of two domains adjacent to a data line. As the second pixel electrode junction connection portion is formed in both end portions of the second subpixel electrode 191l in this way, an electric field formed in the pixel electrode contact portion 192l and the pixel electrode region can be dispersed widely, thereby improving the liquid crystal molecule's unrestoration and light leakage defects, which may occur in the second subpixel region.

Figure 23D:
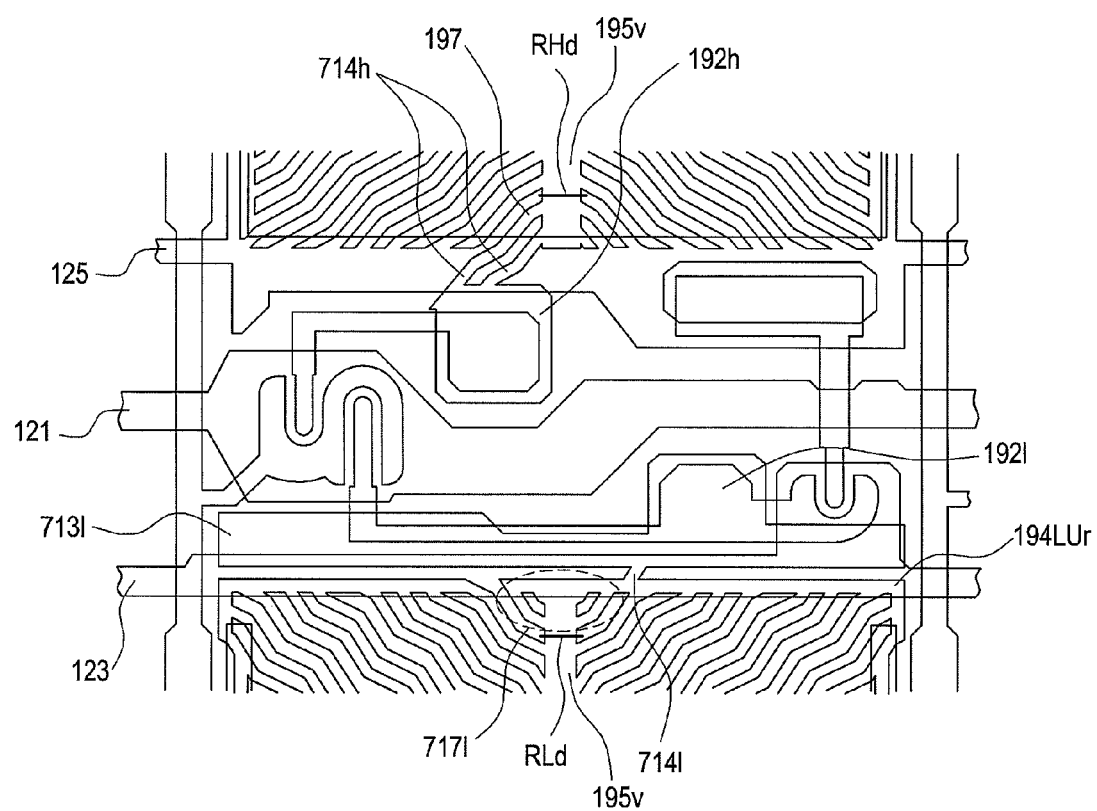

Referring to FIG. 23D, a first pixel electrode junction connection portion includes a first pixel electrode's oblique connection portion 714h. Micro branches 197 on the left bottom of a cross-shaped branch's vertical portion 195v are electrically connected to the first pixel electrode's oblique connection portion 714h, and the first pixel electrode's oblique connection portion 714h is connected to a pixel electrode contact portion 192h. The first pixel electrode's oblique connection portion 714h may be zigzag branches extending from the first pixel electrode's oblique connection portion 714h. The first pixel electrode junction connection portion formed in this manner has the above-described characteristics. A second pixel electrode junction connection portion includes a second pixel electrode's horizontal connection portion 713l, a second pixel electrode's oblique connection portion 714l, and a second pixel electrode connection portion 717l. The second pixel electrode connection portion 717l is connected to a cross-shaped branch's vertical portion 195v of the second subpixel, a right end of the second pixel electrode connection portion 717l is connected to a horizontal connection portion 194LUR connected to micro branches on the right top of the second subpixel 190*l*, and the horizontal connection portion 194LUR is connected to the second subpixel electrode's horizontal connection portion 713*l* obliquely extending in the horizontal direction. Other details, except for the just-discussed structures, are similar to those described in connection with FIG. 19A.

Figure 23E:
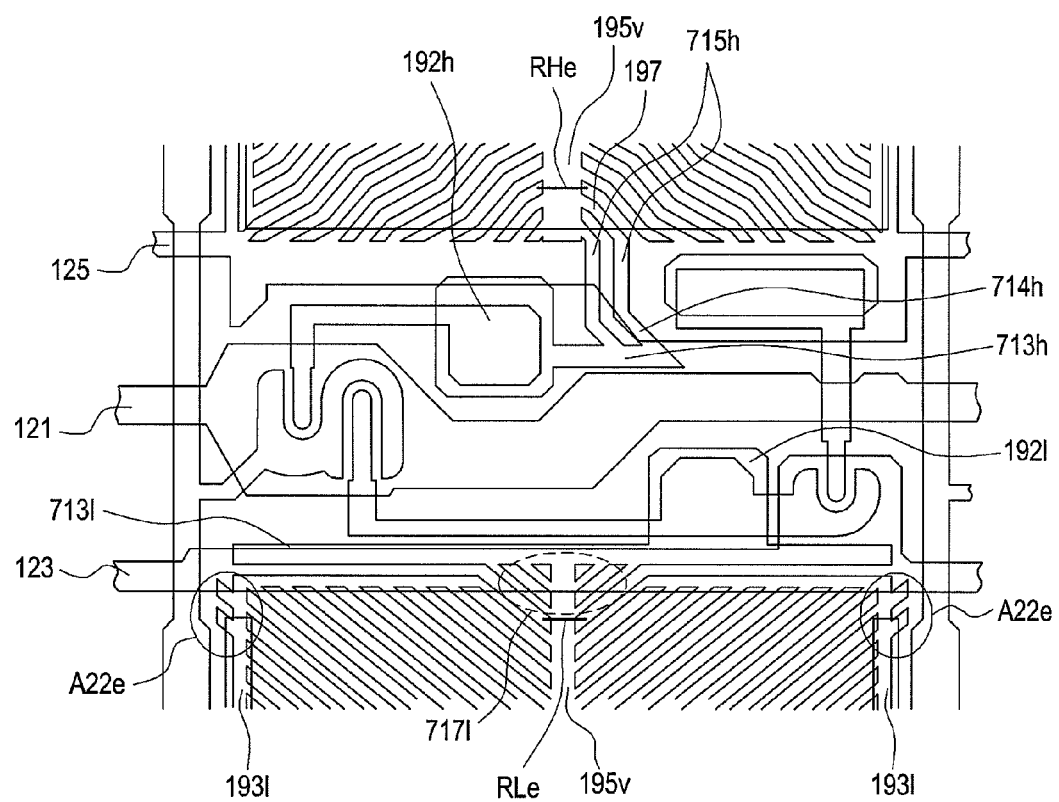

Referring to FIG. 23E, a first pixel electrode junction connection portion includes a first pixel electrode's oblique connection portion 714*h*, a first pixel electrode's vertical connection portion 715*h*, and a first pixel electrode contact portion 192*h*. The first pixel electrode junction connection portion illustrated in FIG. 23E is similar to that described with reference to FIG. 19A, except that a portion where the first pixel electrode's oblique connection portion 714*h* and a first pixel electrode's horizontal connection portion 713*h* are connected, has a wedge shape. A second pixel electrode junction connection portion includes a second pixel electrode's horizontal connection portion 713*l*, a second pixel electrode connection portion 717*l*, and a second pixel electrode contact portion 192*l*. The second pixel electrode's horizontal connection portion 713*l* in the horizontal direction is electrically connected to the second pixel electrode contact portion 192*l* and the second pixel electrode connection portion 717*l*. The second pixel electrode junction connection portion is similar to that described with reference to FIG. 23B, except that micro branches constituting the second subpixel electrode and the second pixel electrode connection portion 717*l* have a stripe shape. In regions A22*e*, micro branches 197 project by extending from a pixel electrode's vertical connection portion 193*l* to be adjacent to a data line. The projecting micro branches may disperse or block electric fields formed by a down gate line 123, a storage electrode line's vertical portion 128, and the data line 171. The projecting micro branches in regions A22*e* may be formed near the edge of the first or second pixel electrode 191*h* or 191*l* adjacent to the data line 171. The structure of the second pixel electrode's horizontal connection portion 713*l* and the characteristics of the second pixel electrode junction connection portion are substantially similar to those described in FIG. 19A.

Figure 23F:
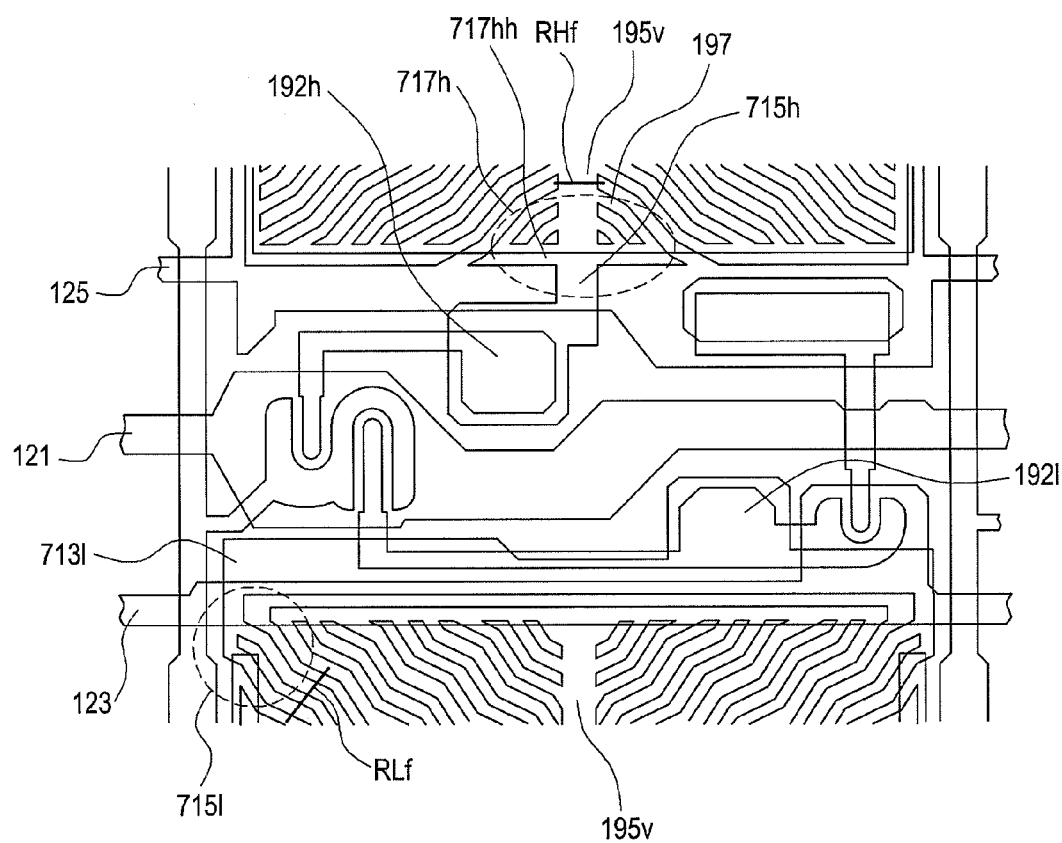

Referring to FIG. 23F, a first pixel electrode junction connection portion includes a first pixel electrode's vertical connection portion 715*h*, a first pixel electrode connection portion 717*h*, and a first pixel electrode contact portion 192*h*. The first pixel electrode connection portion 717*h* is formed on the bottom of a cross-shaped branch's vertical portion 195*v*, and electrically connects the first pixel electrode contact portion 192*h* connected to the first pixel electrode's vertical connection portion 715*h*, to the first subpixel electrode 191*h*. A horizontal connection portion 717*hh* formed in the first pixel electrode connection portion 717*h* in a hanger shape is connected to micro branches 197 on the bottom of the vertical portion 195*v* on both sides of the vertical portion 195*v*. The first pixel electrode connection portion 717*h* may have the above-described characteristics. A second pixel electrode junction connection portion includes a second pixel electrode's horizontal connection portion 713*l*, a second pixel electrode's vertical connection portion 715*l*, and a second subpixel electrode contact portion 192*l*. The second pixel electrode's horizontal connection portion 713*l* extending in the horizontal direction electrically connects the second pixel electrode contact portion 192*l* to the second pixel electrode's vertical connection portion 715*l*. The second pixel electrode's vertical connection portion 715*l* is connected to a plurality of micro branches projecting in the direction of a data line 171. Arrangements of other elements are similar to those described in connection with FIG. 23C. The characteristics of the second pixel electrode junction connection portion are the same as described above.

Figure 24A:
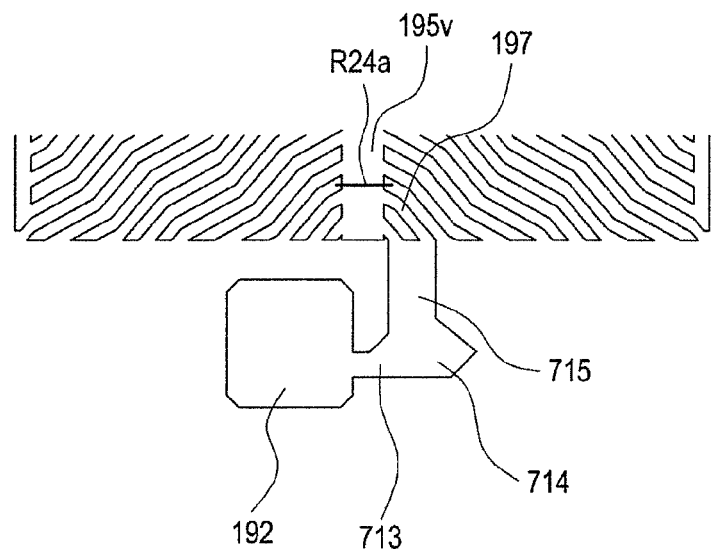
FIGS. 24A to 24T are plan views illustrating parts of pixel electrode layers of a liquid crystal display device according to other exemplary embodiments of the present invention.

Various examples for improving liquid crystal molecule's unrestoration and light leakage defects will be described below with reference to FIGS. 24A to 24T. FIGS. 24A to 24T illustrate partial patterns of a pixel electrode layer in a portion of a pixel electrode and a boundary region between subpixel electrodes. Structures illustrated in FIGS. 24A to 24T may be applied to pixel electrode junction connection portions of first and second subpixel electrodes. Referring to FIG. 24A, a pixel electrode junction connection portion includes a subpixel electrode contact portion 192, a pixel electrode's horizontal connection portion 713, a pixel electrode's oblique connection portion 714, and a pixel electrode's vertical connection portion 715. A plurality of micro branches 197 to the right of a cross-shaped branch's vertical portion 195*v* are connected to the pixel electrode's vertical connection portion 715. The pixel electrode's vertical connection portion 715 joins two or more micro branches 197 in common, and is connected to the pixel electrode's oblique connection portion 714. The pixel electrode's oblique connection portion 714 is connected to the subpixel electrode contact portion 192 via the pixel electrode's horizontal connection portion 713. The lines of the pixel electrode's horizontal connection portion 713 connected to the right bottom of the subpixel electrode contact portion 192 are connected to two oblique lines of the pixel electrode's oblique connection portion 714 at an angle falling within a range of about 120° to about 150°. The pixel electrode junction connection portion formed in this way may improve the liquid crystal molecule's unrestoration and light leakage defects.

Figure 24B:
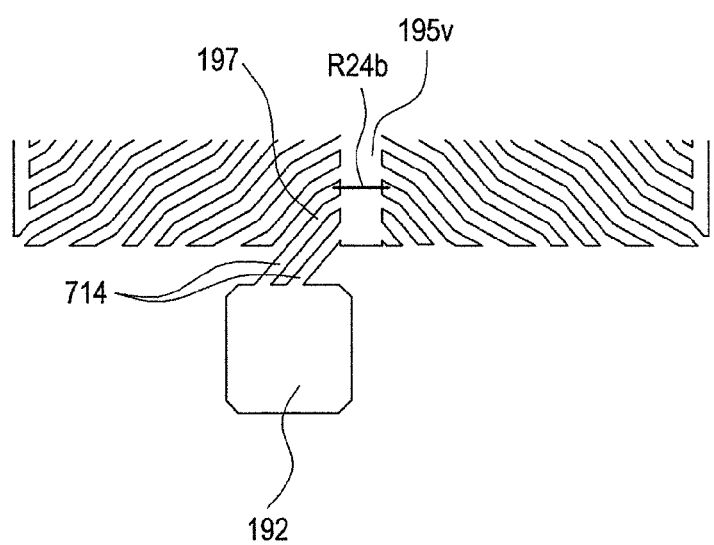

Referring to FIG. 24B, a pixel electrode junction connection portion includes a pixel electrode's oblique connection portion 714. A plurality of micro branches 197 extending from the left bottom of a cross-shaped branch's vertical portion 195*v* are connected to the pixel electrode's oblique connection portion 714, and the pixel electrode's oblique connection portion 714 is obliquely connected to the top of a pixel electrode contact portion 192, and its tilt angle may be determined by the extending micro branches 197.

Figure 24C:
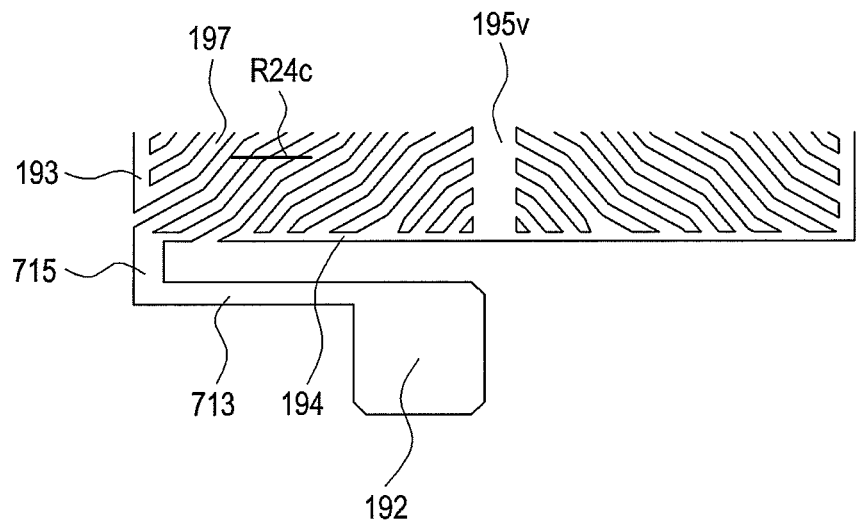

Referring to FIG. 24C, a pixel electrode junction connection portion includes a pixel electrode's horizontal connection portion 713 and a pixel electrode's vertical connection portion 715. A plurality of micro branches 197 on the pixel electrode's corner in a region adjacent to a data line 171 (not shown) are connected to the pixel electrode's vertical connection portion 715. This connection portion 715 is separated from a horizontal connection portion 194 and a vertical connection portion 193 of the subpixel electrode. It is to be noted that the micro branches connected to the horizontal connection portion 194 of the pixel electrode and vertical connection portion 193 of the pixel electrode, and the pixel electrode's vertical connection portion 715, the pixel electrode's horizontal connection portion 713 and a pixel electrode contact portion 192 are made of the same material in an integrated layer.

Figure 24D:
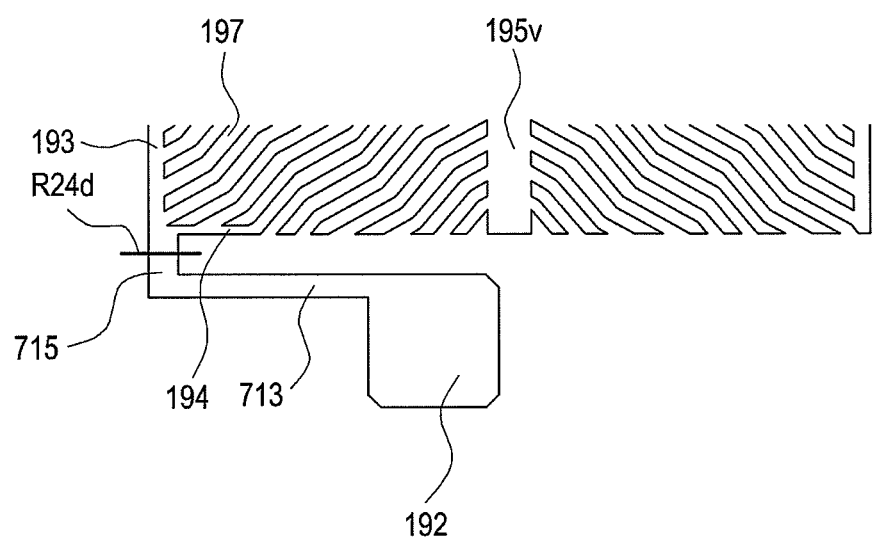

Referring to FIG. 24D, a pixel electrode junction connection portion includes a pixel electrode's horizontal connection portion 713 and a pixel electrode's vertical connection portion 715, provided to connect micro branches 197 of the subpixel electrode to a pixel electrode contact portion 192. Other elements of the pixel electrode junction connection portion are similar in structure to those described in conjunction with FIG. 24C, except that the pixel electrode's vertical connection portion 715 is connected to a pixel electrode's vertical connection portion 193 and a part of a horizontal connection portion 194 of the pixel electrode. All of the patterns illustrated in FIGS. 24A to 24T, e.g., patterns including micro branches 197 of the pixel electrode, a pixel electrode junction connection portion for connecting micro branches 197 to a pixel electrode contact portion 192, and the pixel electrode contact portion 192 constitute an integrated layer made of the same material.

Figure 24E:
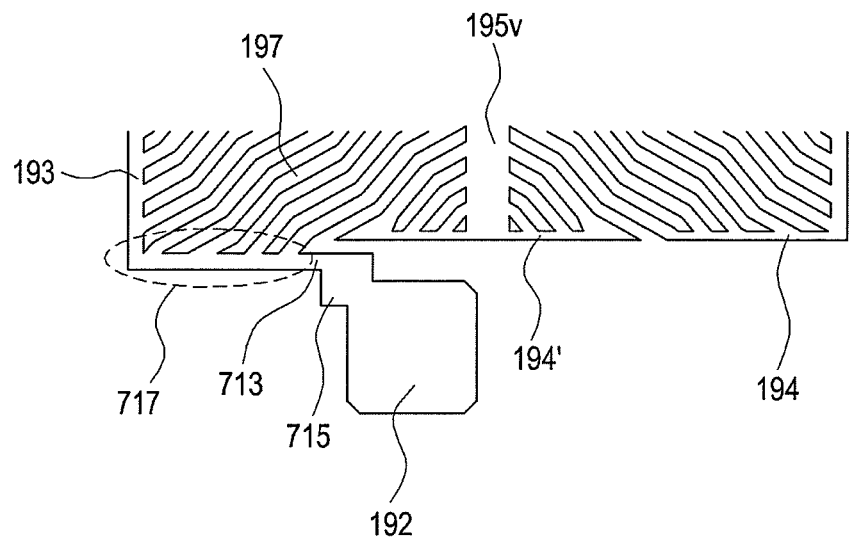

Referring to FIG. 24E, a pixel electrode junction connection portion includes a pixel electrode's horizontal connection portion 713, a pixel electrode's vertical connection portion 715, and a pixel electrode connection portion 717. The pixel electrode connection portion 717 includes a vertical connection portion 193 of the pixel electrode and the pixel electrode's horizontal connection portion 713 connected thereto, which are connected to a plurality of micro branches 197 to the left of a cross-shaped branch's vertical portion 195v. The pixel electrode's horizontal connection portion 713 extends from the bottom of a pixel electrode's first horizontal connection portion 194 in the horizontal direction, and is connected to a plurality of extending micro branches 197, and to the pixel electrode's vertical connection portion 715 connected to the top of a pixel electrode contact portion 192. A width of the pixel electrode's vertical connection portion 715 may be greater than a wiring width of the pixel electrode's horizontal connection portion 713. To disperse an electric field, micro branches 197 formed on the bottom of the cross-shaped branch's vertical portion 195v have a hanger shape extending to be connected to a pixel electrode's second horizontal connection portion 194' separated from the pixel electrode's first horizontal connection portion 194.

Figure 24F:
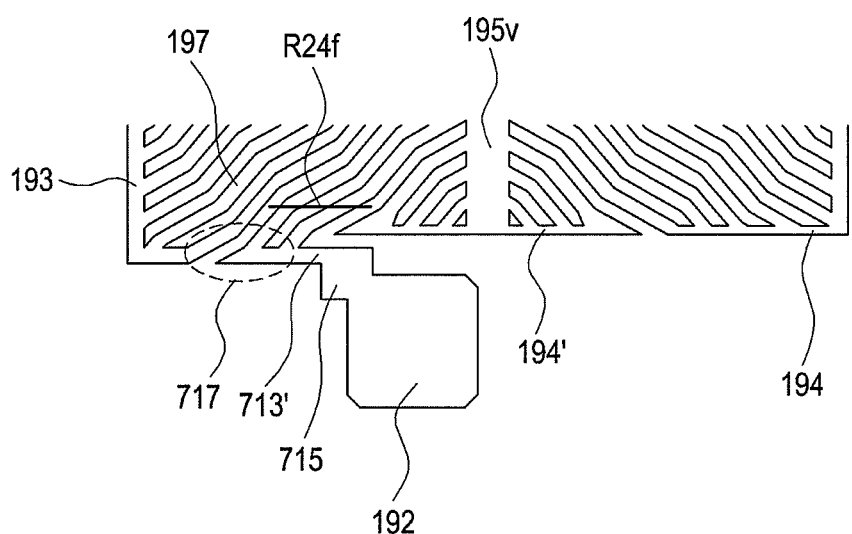

Referring to FIG. 24F, a pixel electrode junction connection portion includes a pixel electrode's horizontal connection portion 713', a pixel electrode's vertical connection portion 715, and a pixel electrode connection portion 717. The pixel electrode junction connection portion is similar in structure to that of FIG. 24E, except that the pixel electrode's horizontal connection portion 713' is bifurcated.

Figure 24G:
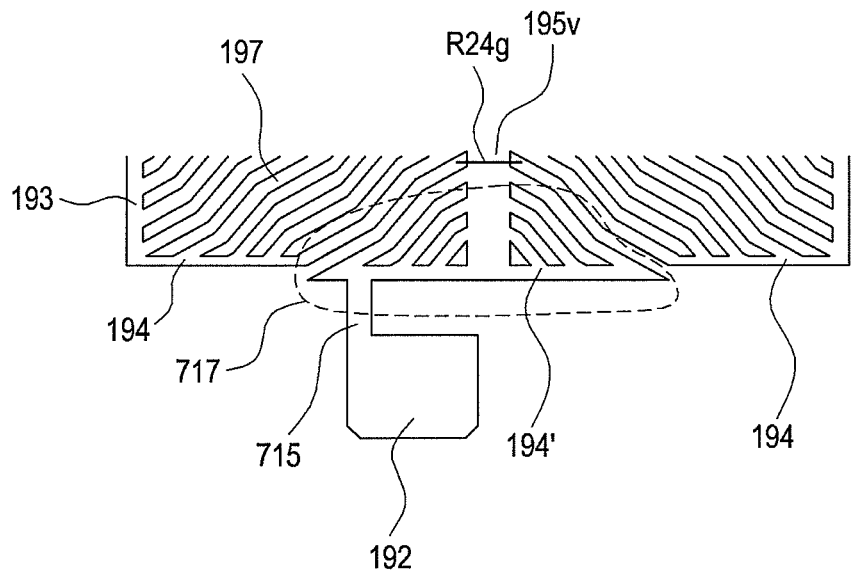
Figure 24H:
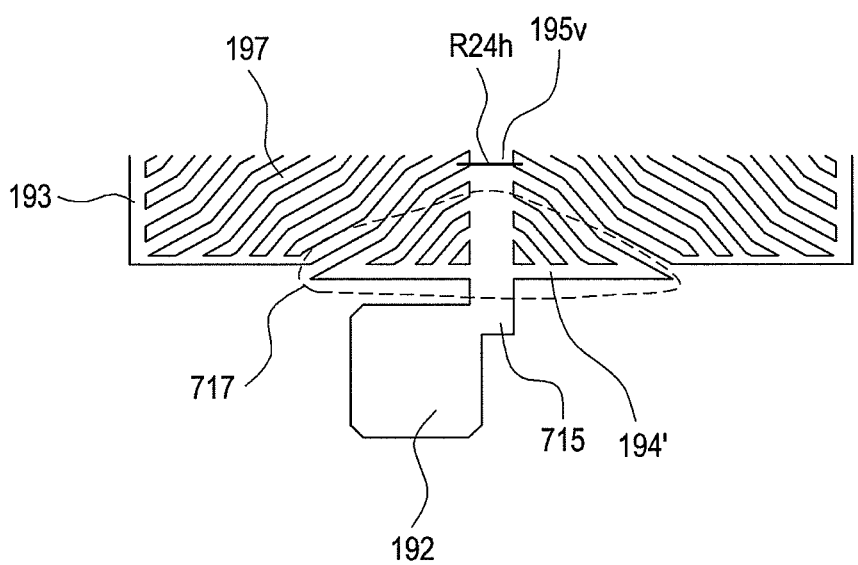

Referring to FIGS. 24G and 24H, a pixel electrode junction connection portion includes a pixel electrode's vertical connection portion 715 and a pixel electrode connection portion 717. The pixel electrode connection portion 717 has the above-described hanger shape situated in the bottom of a cross-shaped branch's vertical portion 195v. To disperse an electric field, the pixel electrode connection portion 717 is separated from a pixel electrode's horizontal connection portion 194 formed on both sides thereof. In addition, the pixel electrode connection portion 717 has a second horizontal connection portion 194' projecting beyond the pixel electrode's horizontal connection portions 194 at both sides thereof. One end of the pixel electrode's vertical connection portion 715 formed in FIG. 24G is connected to one end of the second horizontal connection portion 194' of the pixel electrode connection portion 717, and another end thereof is connected to a pixel electrode contact portion 192. The pixel electrode's vertical connection portion 715 formed in FIG. 24H is connected to a central portion of the pixel electrode connection portion 717 extending from the cross-shaped branch's vertical portion 195v.

Figure 24I:
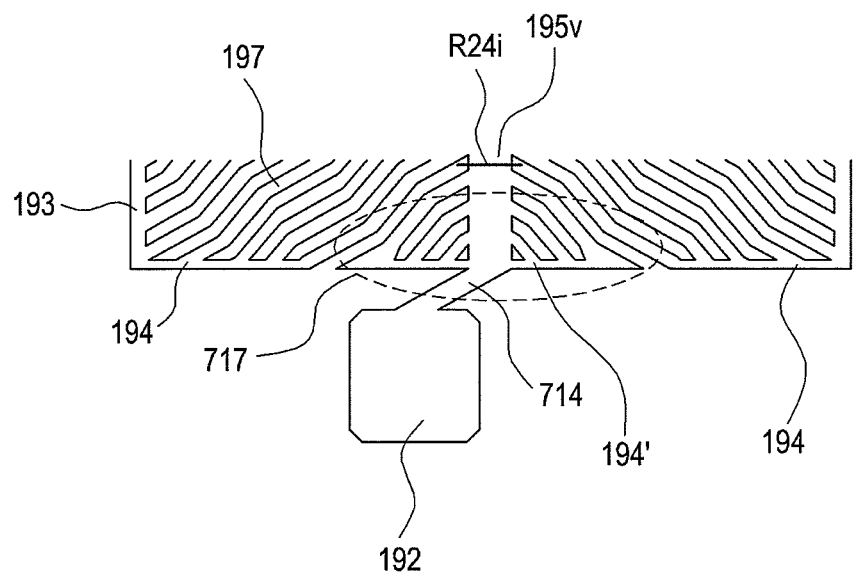

Referring to FIG. 24I, a pixel electrode junction connection portion includes a pixel electrode's oblique connection portion 714 and a pixel electrode connection portion 717. The pixel electrode connection portion 717 has a hanger shape as described above, and its second horizontal connection portion 194' is on the same line as a pixel electrode's horizontal connection portion 194 connected to a vertical connection portion 193. The pixel electrode's oblique connection portion 714 extends to be slanted with respect to a central portion of the second horizontal connection portion 194' at an angle falling within a range of about 30° to about 60°, and is connected to the top of a pixel electrode contact portion 192.

Figure 24J:
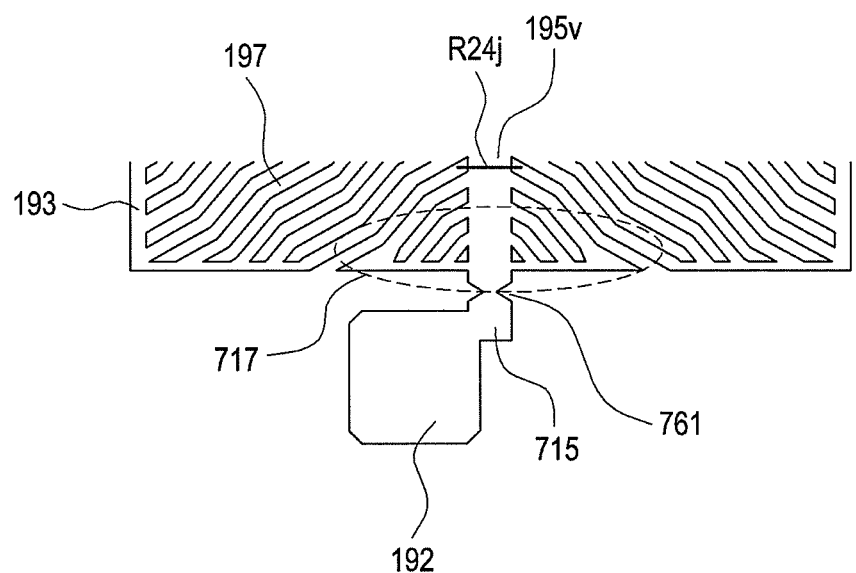
Figure 24K:
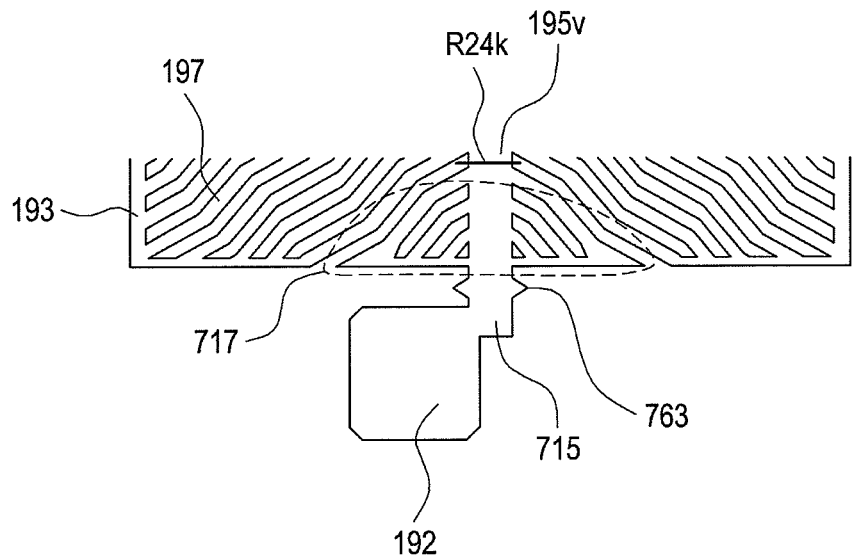
Figure 24L:
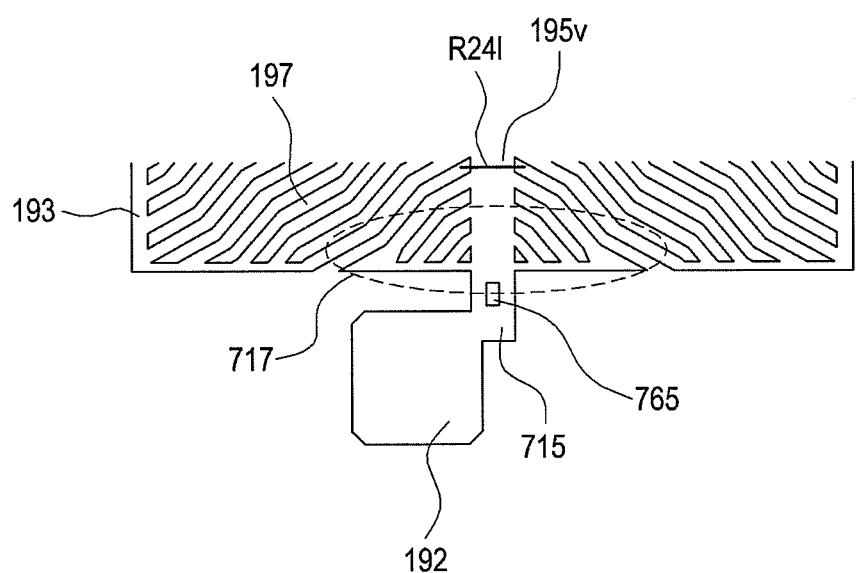
Figure 24M:
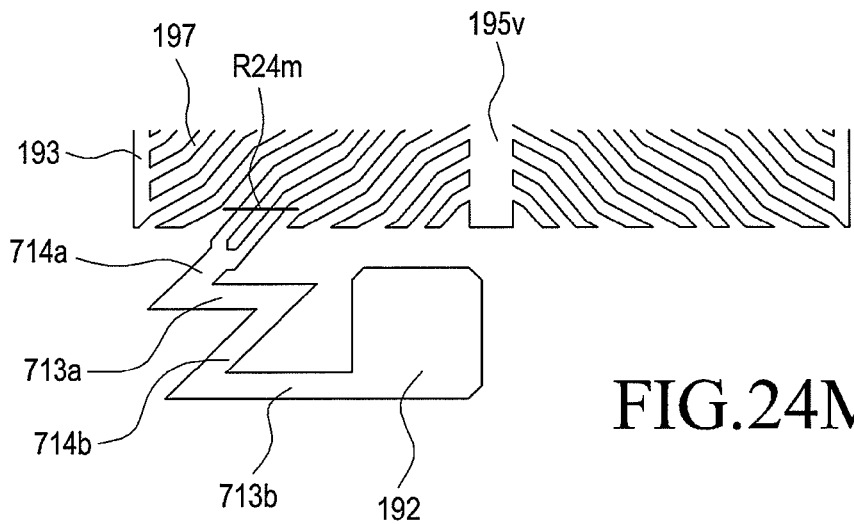

Referring to FIGS. 24J, 24K and 24L, a pixel electrode junction connection portion includes a pixel electrode's vertical connection portion 715 and a pixel electrode connection portion 717. The pixel electrode connection portion 717 is connected to a pixel electrode contact portion 192 by the pixel electrode's vertical connection portion 715. The pixel electrode's vertical connection portion 715 illustrated in FIGS. 24J and 24K may have a notch shape. The vertical connection portion 715 illustrated in FIG. 24J has concave notches 761, a depth of which may fall within a range of about 2.0 µm to about 5 µm. A wiring of the vertical connection portion 715 illustrated in FIG. 24K has convex notches 763, a height of which may fall within a range of about 2.0 µm to about 5 µm. The pixel electrode's vertical connection portion 715 illustrated in FIG. 24L has a groove 765 formed therein, and this groove may serve as a singular point.

Referring to FIGS. 24M to 24Q, a pixel electrode junction connection portion has a Z-shaped wiring to disperse an electric field. The Z-shaped wiring includes first and second pixel electrode's horizontal connection portions 713a and 713b, and a second pixel electrode's oblique connection portion 714b. The first pixel electrode's horizontal connection portion 713a may overlap a drain electrode line of a TFT, and the second pixel electrode's horizontal connection portion 713b may overlap a drain electrode and a source electrode of the TFT. The horizontal connection portion 713b of the Z shape is connected to the bottom of a pixel electrode contact portion 192. A first pixel electrode's oblique connection portion 714a illustrated in FIGS. 24M to 24O has a bifurcated shape having at least two micro branches extending from micro branches 197 at the left bottom of a domain to the left of a cross-shaped branch's vertical portion 195v, and is slanted with respect to the first pixel electrode's horizontal connection portion 713a. The second pixel electrode's oblique connection portion 714b connects the first and second pixel electrode's horizontal connection portions 713a and 713b extending in the horizontal direction, is substantially parallel to the first pixel electrode's oblique connection portion 714a, and the second pixel electrode's horizontal connection portion 713b is connected to the bottom of the pixel electrode contact portion 192.

Figure 24N:
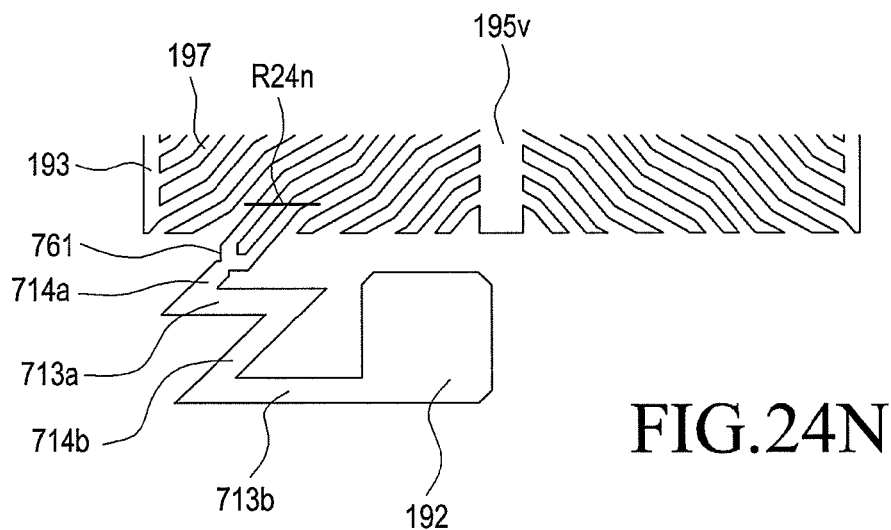
Figure 24O:
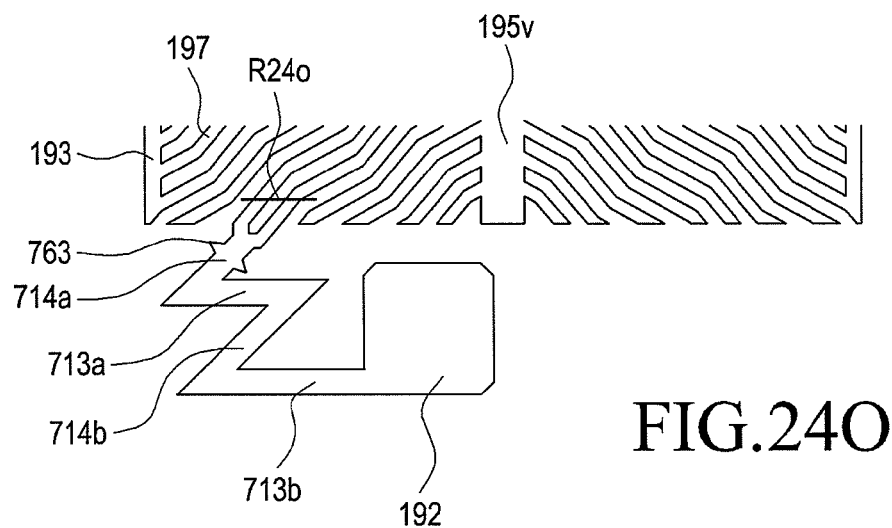
Figure 24P:
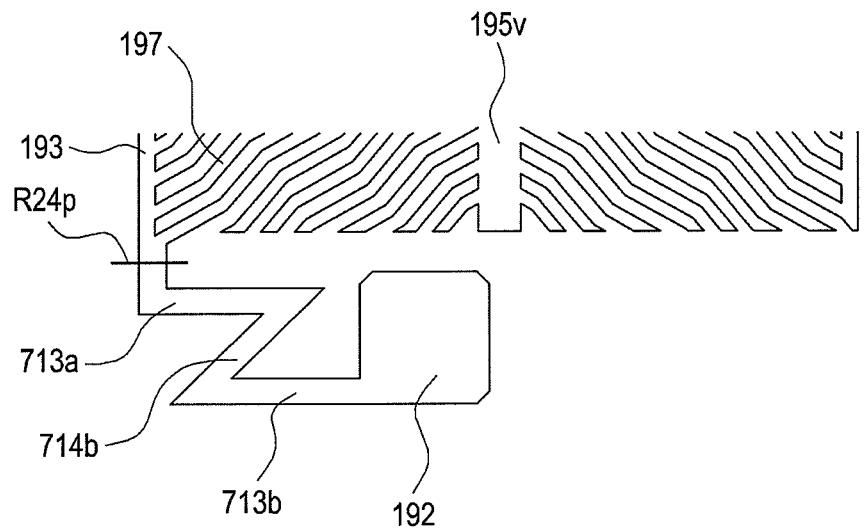
Figure 24Q:
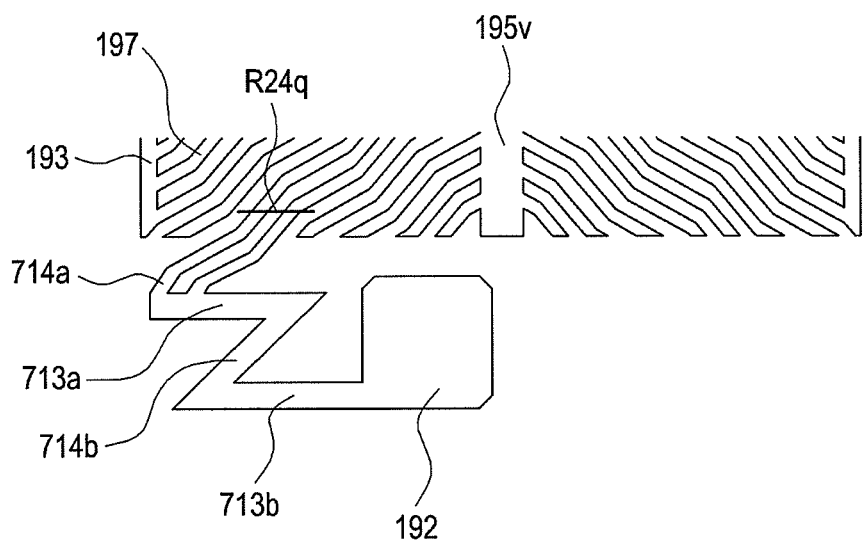

The first pixel electrode's oblique connection portion 714a illustrated in FIG. 24N has a concave notch 761. The first pixel electrode's oblique connection portion 714a illustrated in FIG. 24O has a convex notch 763. A size of the notches may be the same as those just described above. A Z-shaped wiring illustrated in FIG. 24P is similar to the above-described ones of FIGS. 24M to O except that it has a first pixel electrode's horizontal connection portion 713a extending to and connecting with a pixel electrode's vertical connection portion 193 to which micro branches 197 are connected. A Z-shaped wiring illustrated in FIG. 24Q is similar to the above-described ones of FIGS. 24M to O except that a plurality of branches of a first pixel electrode's oblique connection portion 714a, extending from the left bottom of a domain to the left of a cross-shaped branch's vertical portion 195v, are connected to a first pixel electrode's horizontal connection portion 713a.

Figure 24R:
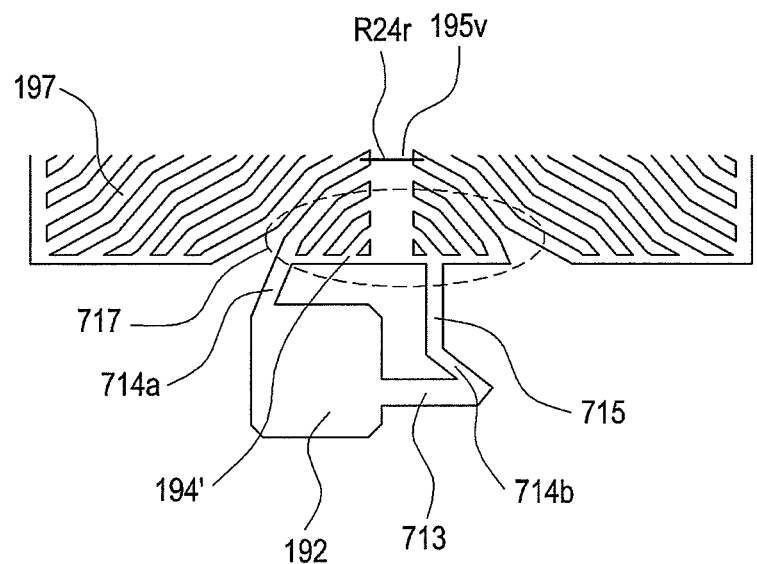

Referring to FIG. 24R, a pixel electrode junction connection portion includes a pixel electrode's horizontal connection portion 713, first and second pixel electrode's oblique connection portions 714a and 714b, a pixel electrode's vertical connection portion 715, and a pixel electrode connection portion 717. The pixel electrode connection portion 717 has the above-described hanger shape. One end of a horizontal connection portion 194' of the pixel electrode connection portion 717 is obliquely connected to one end of a pixel electrode contact portion 192 by the first pixel electrode's oblique connection portion 714a, and another portion of the horizontal connection portion 194' is connected to the right bottom of the pixel electrode contact portion 192 through the pixel electrode's vertical connection portion 715, the second pixel electrode's oblique connection portion 714b, and the pixel electrode's horizontal connection portion 713. An angle made between the pixel electrode's horizontal connection portion 713 and the second pixel electrode's oblique connection portion 714b may fall within a range of about 30° to about 60°.

Figure 24S:
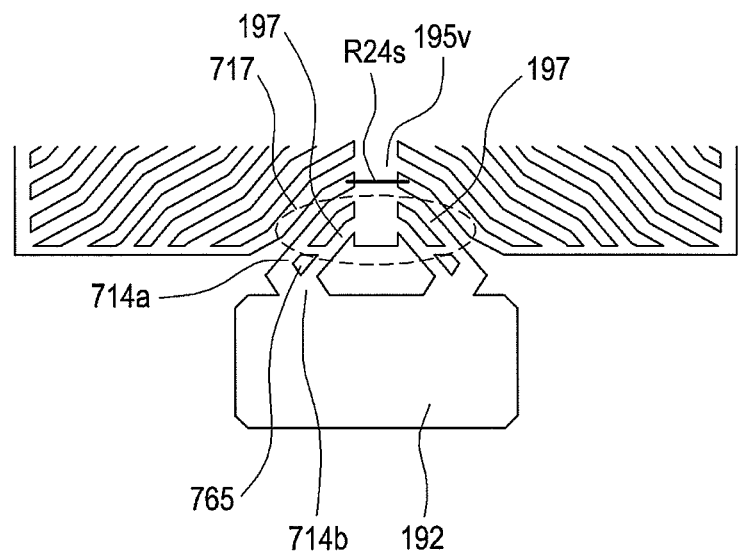
Figure 24T:
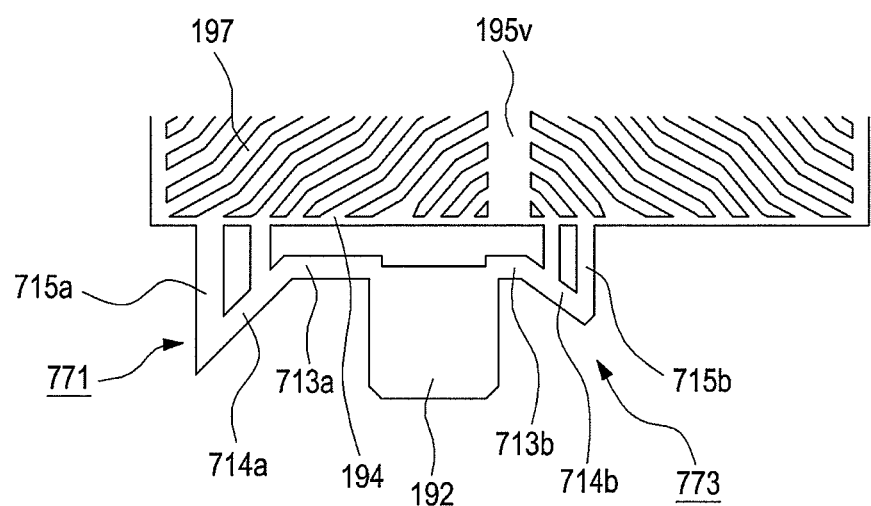

Referring to FIG. 24S, a pixel electrode junction connection portion includes first and second pixel electrode's oblique connection portions 714a and 714b, and a pixel electrode connection portion 717. The pixel electrode connection portion 717 includes a plurality of micro branches 197 which are symmetrical about a cross-shaped branch's vertical portion 195v. The first pixel electrode's oblique connection portion 714a is connected to a plurality of the micro branches 197 and to the second pixel electrode's oblique connection portion 714b which is obliquely connected to the top of a pixel electrode contact portion 192. The first and second pixel electrode's oblique connection portions 714a and 714b are connected at a right angle, and a groove 765 may be formed in the first pixel electrode's oblique connection portion 714a. The pixel electrode's oblique connection portions 714a and b are symmetrical about the cross-shaped branch's vertical portion 195v.

Referring to FIG. 24T, a pixel electrode junction connection portion includes first and second pixel electrode junction connection portions 771 and 773. The first pixel electrode junction connection portion 771 includes a first pixel electrode's horizontal connection portion 713a, a first pixel electrode's oblique connection portion 714a, and a first pixel electrode's vertical connection portion 715a. The first pixel electrode's vertical connection portion 715a connects a pixel electrode's horizontal connection portion 194 formed at the left bottom of a domain to the left of a cross-shaped branch's vertical portion 195v, to the first pixel electrode's oblique connection portion 714a. The first pixel electrode's vertical connection portion 715a may include two branches. The first pixel electrode's oblique connection portion 714a may be substantially similar in tilt angle to micro branches 197 formed on the pixel electrode. The first pixel electrode's oblique connection portion 714a may be slanted with respect to the first pixel electrode's vertical connection portion 715a at an angle falling within a range of about 30° to about 60°. The first pixel electrode's horizontal connection portion 713a connects the first pixel electrode's oblique connection portion 714a to the top of a pixel electrode contact portion 192. The second pixel electrode junction connection portion 773 includes a second pixel electrode's horizontal connection portion 713b, a second pixel electrode's oblique connection portion 714b, and a second pixel electrode's vertical connection portion 715b. The second pixel electrode's vertical connection portion 715b connects a pixel electrode's horizontal connection portion 194 formed at the right bottom domain of the cross-shaped branch's vertical portion 195v adjacent to the domain to which the first pixel electrode junction connection portion 771 is connected, to the second pixel electrode's oblique connection portion 714b. The second pixel electrode's vertical connection portion 715b may have two branches. The second pixel electrode's oblique connection portion 714b may be substantially similar in tilt angle to the micro branches 197 formed on the pixel electrode. The second pixel electrode's oblique connection portion 714b may be slanted with respect to the second pixel electrode's vertical connection portion 715b at an angle falling within a range of about 30° to about 60°. The second pixel electrode's horizontal connection portion 713b connects the second pixel electrode's oblique connection portion 714b to the top of the pixel electrode contact portion 192. The pixel electrode junction connection portion formed in this manner can improve the liquid crystal molecule's unrestoration and light leakage defects.

In another exemplary embodiment of the present invention that can improve the unrestoration of liquid crystal molecules, an electric field formed in a domain region and an electric field formed in a non-domain region may be substantially symmetrical about a straight light that is perpendicular to lower and upper display panels. The domain region may be a region in which micro branches 197 are formed, in the region A19 illustrated in FIG. 19A, and the non-domain region may be a region in which micro branches 197 are not formed, or a region in which a light blocking member 220 is formed. A tilt direction of an alignment film, made between the domain region and the non-domain region, may be substantially perpendicular to the direction of liquid crystal molecules, formed in the domain region.

Figure 25:
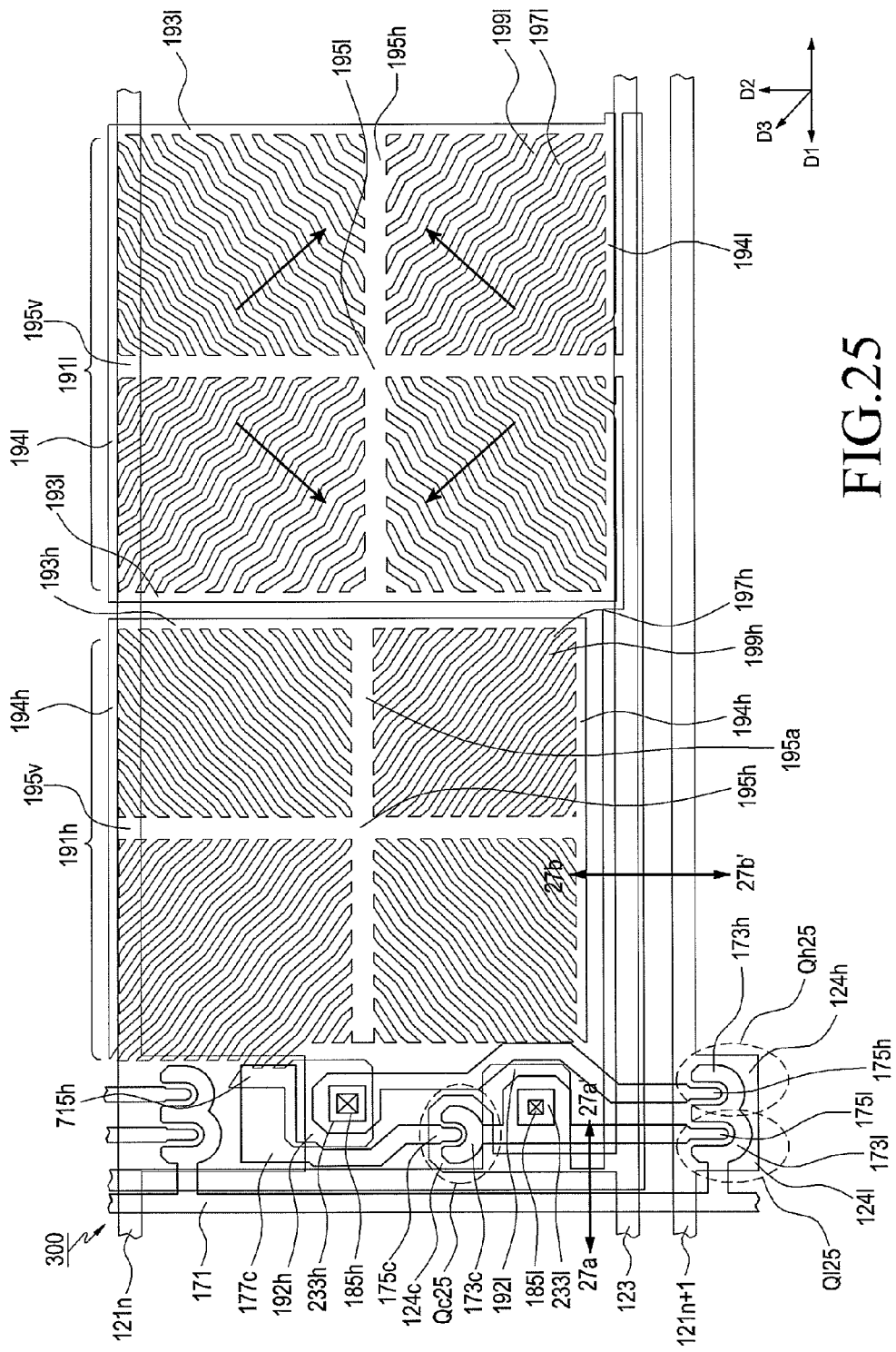
FIG. 25 is a diagram illustrating a schematic layout of a pixel according to an exemplary embodiment of the present invention.
Figure 26A:
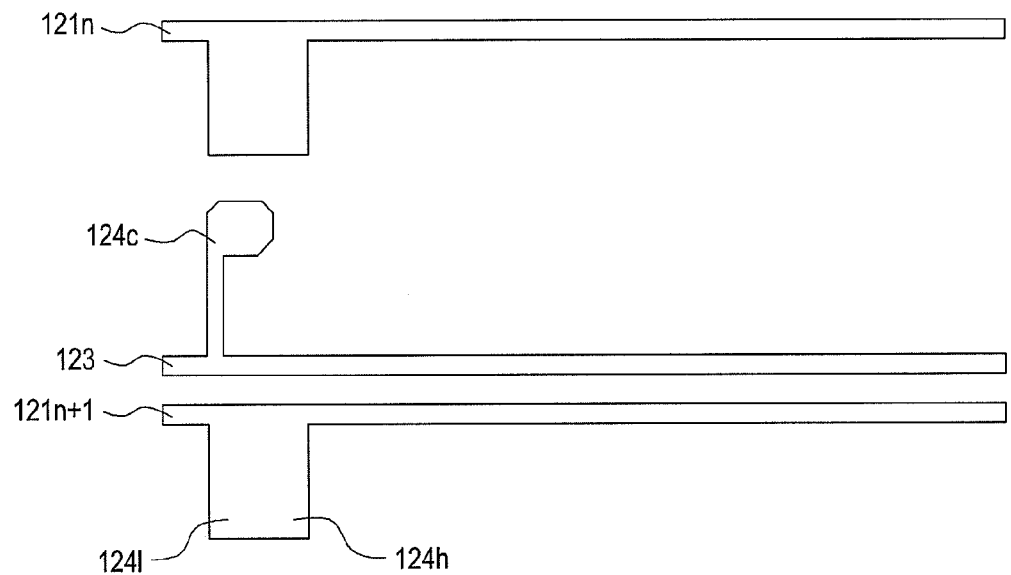
FIGS. 26A to 26C are diagrams illustrating patterns for major layers of the pixel layout shown in FIG. 25, according to exemplary embodiments of the present invention.
Figure 26B:
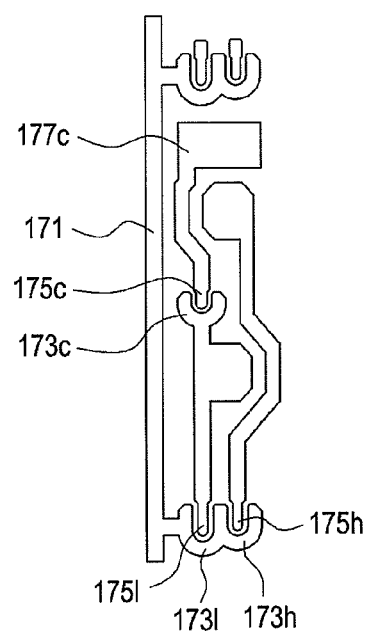
Figure 26C:
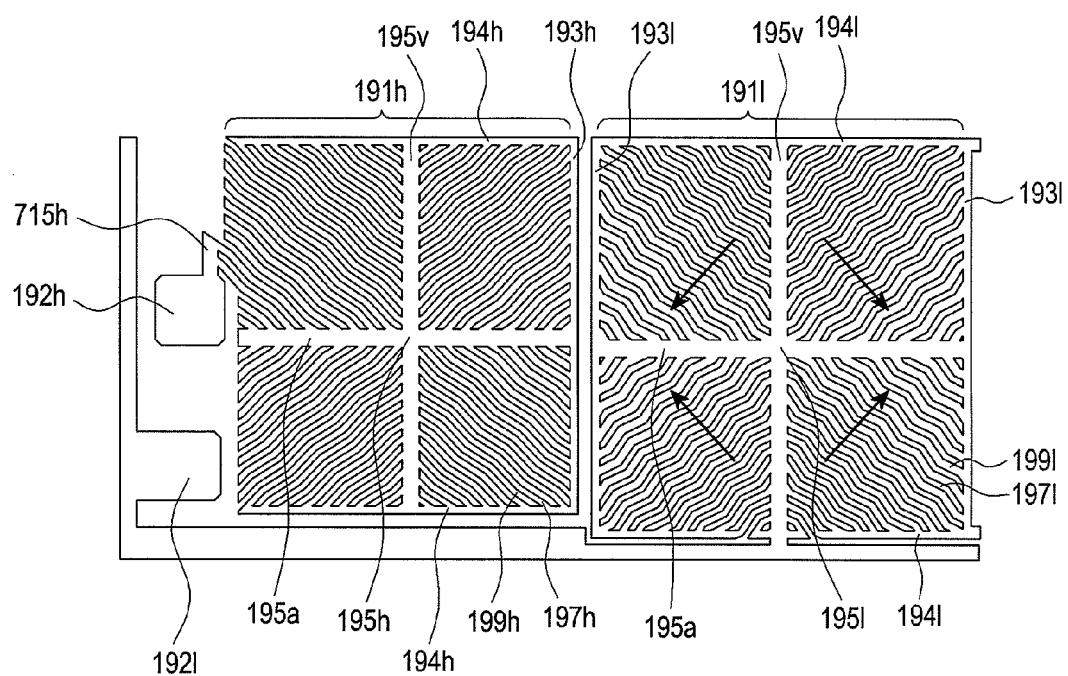
Figure 27A:
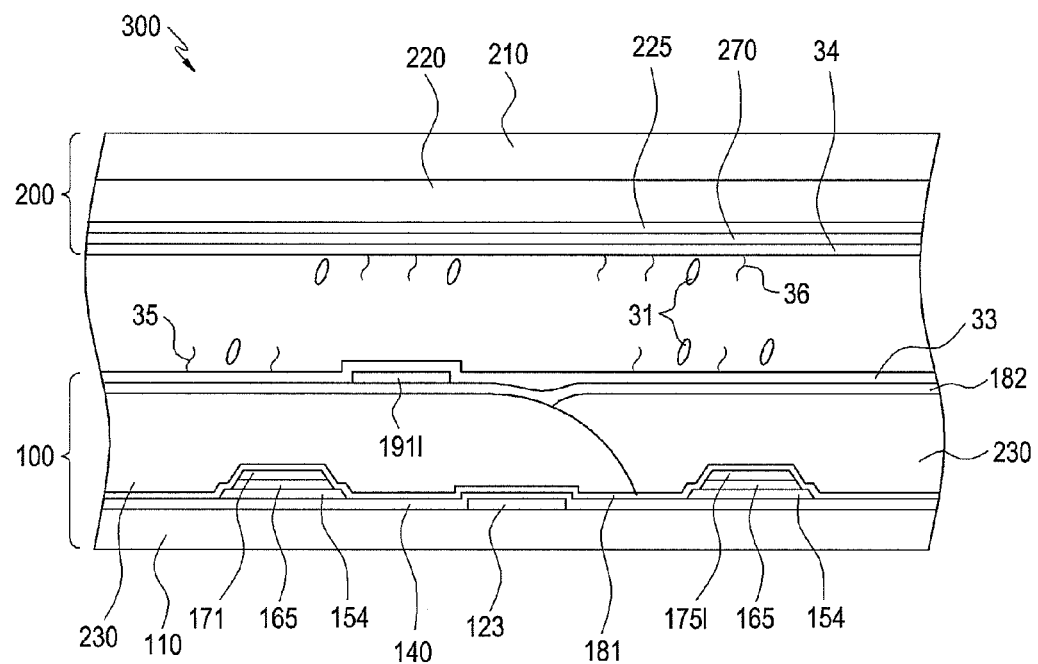
FIGS. 27A and 27B are cross-sectional views taken along lines 27a-27a' and 27b-27b' of the pixel layout shown in FIG. 25, respectively.
Figure 27B:
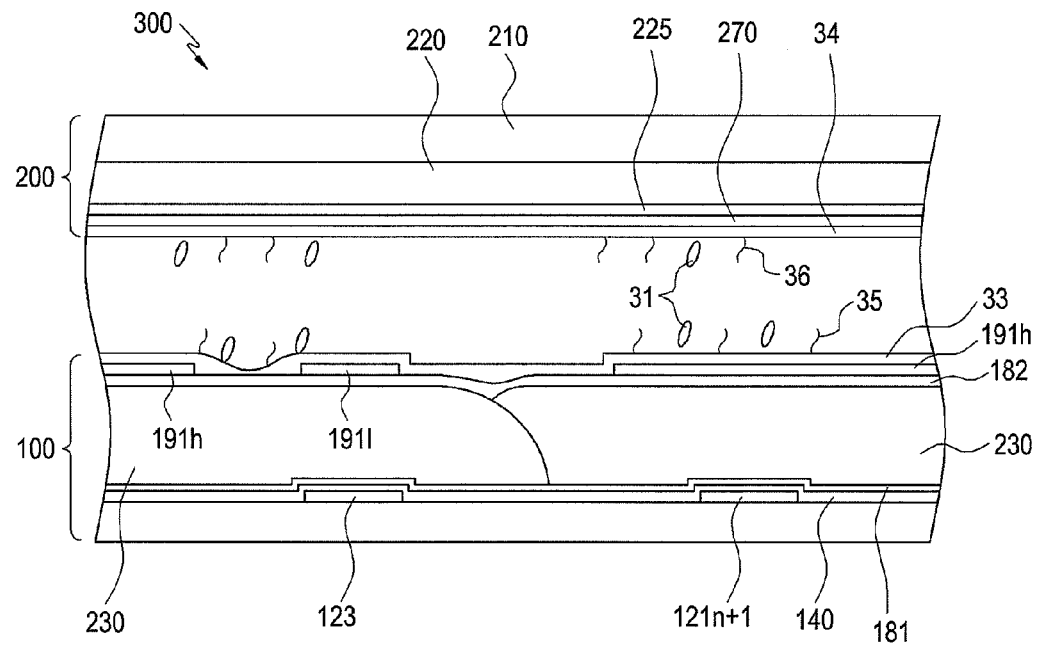

A liquid crystal display panel assembly 300 according to another exemplary embodiment of the present invention will be described in detail below with reference to FIGS. 25 to 27B. In the liquid crystal display panel assembly 300, gate lines are arranged in parallel to longer sides of a unit pixel electrode according to an exemplary embodiment of the present invention, to reduce the number of drive Integrated Circuits (ICs) constituting a data driver 500. By doing so, the liquid crystal display panel assembly 300 configured in this manner and the rest thereof having any of the above-described liquid crystal display panel assemblies' structures and pixel electrode layers' patterns, makes it possible to further improve the display quality of the liquid crystal display device and reduce the manufacturing cost. FIG. 25 is a diagram illustrating a schematic layout of a pixel of a liquid crystal display panel assembly 300 according to an exemplary embodiment of the present invention. To express a pixel structure in brief, patterns of a gate layer conductor, a data layer conductor, contact holes 185, and a pixel electrode layer are selectively arranged in the layout of the pixel illustrated in FIG. 25. FIGS. 26A to 26C illustrate patterns for major layers of the pixel structure illustrated in FIG. 25. Specifically, FIGS. 26A to 26C illustrate a gate layer conductor pattern, a data layer conductor pattern, and a pixel electrode layer pattern including a pixel electrode in the pixel layout illustrated in FIG. 25, respectively. FIGS. 27A and 27B are cross-sectional views taken along lines 27a-27a' and 27b-27b' of the pixel layout illustrated in FIG. 25, respectively. The cross-sectional views illustrated in FIGS. 27A and 27B additionally show several layers omitted in FIG. 25. In the cross-sectional views of the liquid crystal display panel assembly 300, illustrated in FIGS. 27A and 27B, cross sections along the directions 27a and 27b are cross sections taken along the cutting-plane lines shown in FIG. 25 when the pixel structure of FIG. 25 is arranged in the form of a matrix consisting of rows and columns. In the following description made with reference to FIGS. 25 to 27B, since the stacking order for lower and upper display panels 100 and 200 has been described with reference to FIGS. 3 to 4C, a detailed description thereof is omitted. In addition, a duplicate description for similar elements made in connection with FIGS. 3 to 4C and 18 to 21B will be omitted.

A layout of lower and upper display panels 100 and 200 of a liquid crystal display panel assembly 300 will be described in detail below with reference to FIGS. 25 to 27B. A gate layer conductor is formed on a lower substrate 110, and includes a plurality of gate lines 121*n* and 121*n*+1, a down gate line 123, and a plurality of gate electrodes 124*h*, 124*l*, and 124*c*. A data layer conductor is formed on a linear ohmic contact member 165, and includes a data line 171, a first source electrode 173*h*, a second source electrode 173*l*, a third source electrode 173*c*, a first drain electrode 175*h*, a second drain electrode 175*l*, a third drain electrode 175*c*, and a third drain electrode's extension portion 177*c*. A pixel electrode layer is formed on a second protection layer 182, and includes first and second subpixel electrodes 191*h* and 191*l*, first and second pixel electrode contact portions 192*h* and 192*l*, vertical connection portions 193*h* and 193*l*, horizontal connection portions 194*h* and 194*l*, cross-shaped branch portions 195*h* and 195*l*, micro branches 197*h* and 197*l*, first and second pixel electrode's vertical connection portions 715*h* and 715*l* (not shown), and an outgasing hole cover 187 (not shown).

The first and second subpixel electrodes 191*h* and 191*l* receive data voltages from the data line 171 through TFTs Qh25 and Ql25 connected to an (n+1)-th gate line 121*n*+1. The first subpixel electrode 191*h* receives a pixel or gray scale voltage from the first pixel electrode contact portion 192*h* by means of the shape of the pixel electrode junction connection portion illustrated in FIG. 23B. The second subpixel electrode 191*l* is connected to the second pixel electrode contact portion 192*l* and receives a pixel or gray scale voltage by means of a wiring or a line extending in the direction of the down gate line 123. A wiring connecting the second subpixel electrode 191*l* to the second pixel electrode contact portion 192*l*, may cover the down gate line 123 on the whole, and may extend in the direction of the data line 171. The upper horizontal connection portions 194*h* and 194*l* of the first and second subpixel electrodes 191*h* and 191*l* overlap an n-th gate line 121*n*, while the lower horizontal connection portion 194*l* of the second subpixel electrode 191*l* overlaps the down gate line 123. Gate electrodes 124*h* and 124*l* constituting first and second TFTs Qh25 and Ql25 extend in the direction of the data line 171, overlapping the third drain electrode's extension portion 177*c*. The first and second subpixel electrodes 191*h* and 191*l* are adjacent to each other, and micro branches 197*h* and 197*l*, and micro slits 199*h* and 199*l* formed on these electrodes have a zigzag shape. Widths of micro branches 197*h* and micro slits 199*h* formed on the first subpixel electrode 191*h* may fall within a range of about 5 µm to about 6 µm, and the widths may gradually change from about 5 µm to about 6 µm. Unit lengths of zigzag micro branches 197 or micro slits 199 may be about 14 µm. Main directions of micro branches 197 or micro slits 199 may be about ±40° with respect to a direction of a cross-shaped branch 195, and zigzag angles thereof may also be about ±7°. Widths of micro branches 197*l* and micro slits 199*l* formed on the second subpixel electrode 191*l* may fall within a range of about 5 µm to about 7 µm. In accordance with an exemplary embodiment of the present invention, widths of micro slits 199*l* may be uniform, while widths of micro branches 197*l* may gradually increase from about 5 µm to about 7 µm in the arrow directions shown in FIGS. 25 and 26C. On the other hand, widths of micro slits 199*l* may gradually increase in the arrow directions. Unit lengths of zigzag micro branches 197 or micro slits 199 may be about 10 µm. Main directions of micro branches 197 or micro slits 199 may be about ±45° with respect to the direction of the cross-shaped branch 195, and zigzag angles thereof may be about ±15°.

Referring to FIGS. 27A and 27B, a light blocking member 220 formed on the upper display panel 200 is formed between pixels, and overlaps the down gate line 123 and the gate line 121. More preferably, one end of the light blocking member 220 is substantially coincident with one end of the down gate line 123 adjacent to the pixel electrode, and another end thereof is substantially coincident with an end of the gate line 121 adjacent to the pixel electrode. In the pixel structure formed in this way, unlike in the pixel structure illustrated in FIGS. 3 and 18, a longer side of the pixel electrode is formed in parallel to the gate line 121 according to an exemplary embodiment of the present invention. In other words, a gate line 121 along one side of a pixel electrode is long, while its associated data line 171, which is along the perpendicular side of the pixel electrode, is short. Therefore, a liquid crystal display device having this pixel structure may operate with a less number of data drive ICs, for example, with about ⅓ of the number of data drive ICs constituting part of a conventional liquid crystal display device, thereby reducing its manufacturing cost and improving its display quality.

Figure 32:
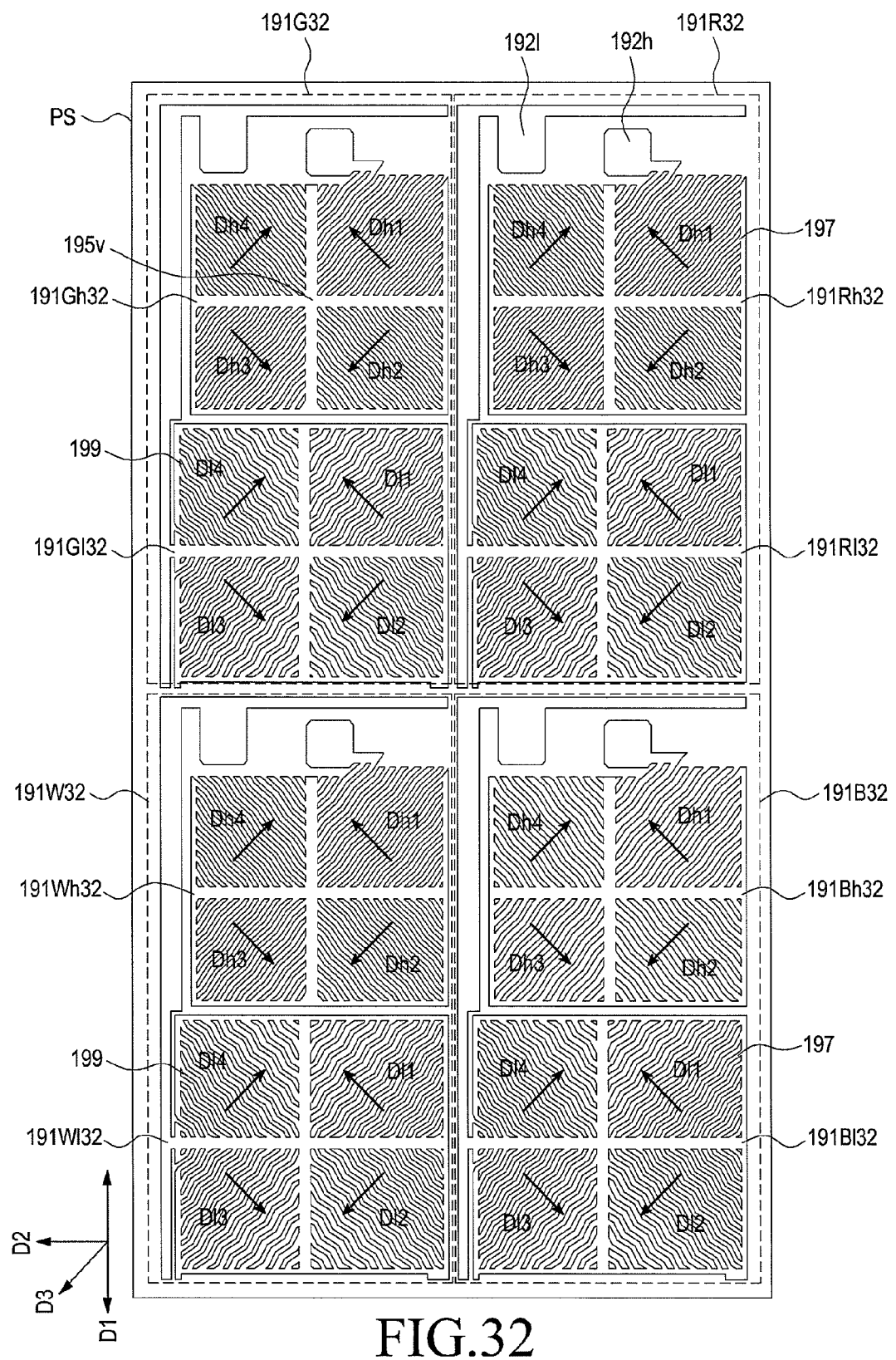
FIG. 32 is a plan view illustrating pixel electrodes of a pixel group of a liquid crystal display device according to another exemplary embodiment of the present invention.

In accordance with another exemplary embodiment of the present invention, color filters of primary colors, formed in a basic pixel group, may be repeatedly and periodically formed in the direction of the data line 171. In other words, a group of color filters consisting of primary colors may be repeatedly and consecutively arranged in the direction of the data line 171. On the other hand, four different colors may be arranged in a basic pixel group as illustrated in FIG. 32. A structure of the basic pixel group illustrated in FIG. 32 will be described below.

Liquid Crystal Display Panel Assembly Modes

Figure 6A:
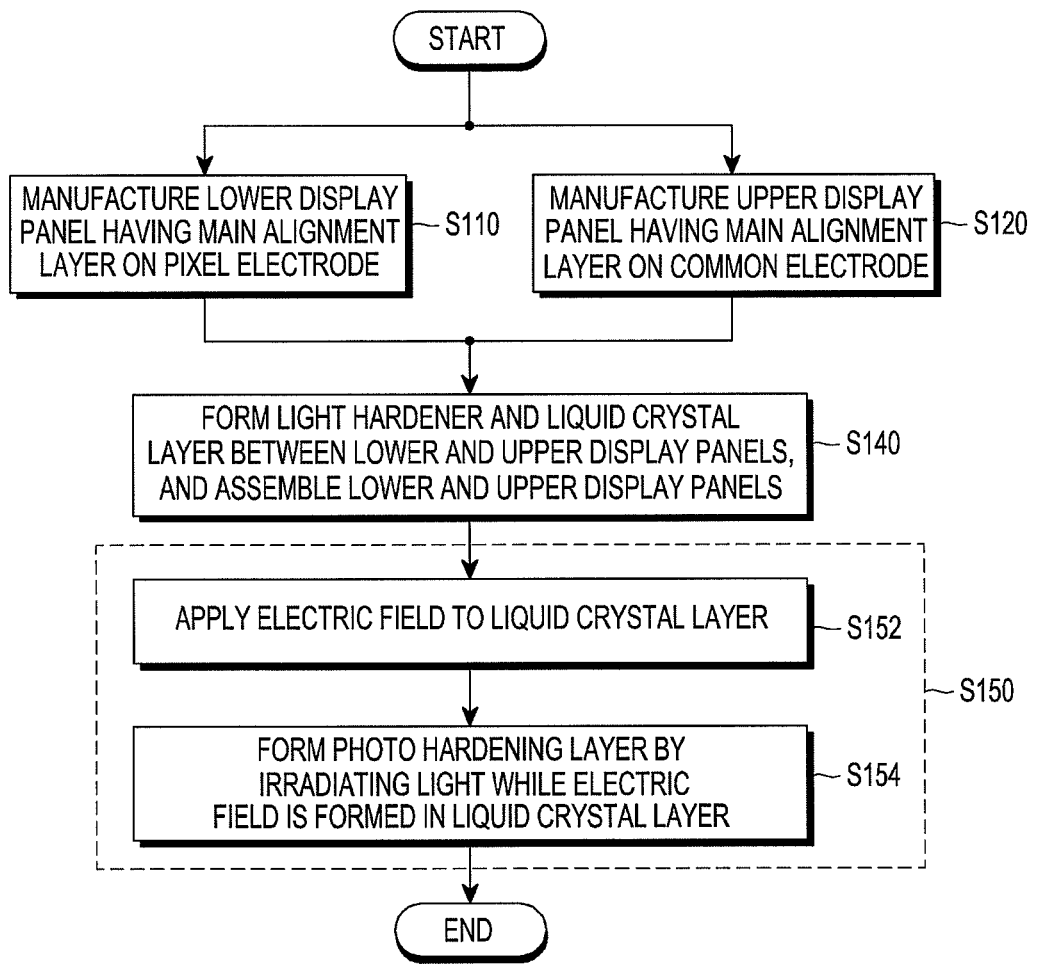
FIG. 6A is a flowchart illustrating a method for manufacturing a liquid crystal display panel assembly based on a Super Vertical Alignment (SVA) mode, according to an exemplary embodiment of the present invention.
Figure 6B:
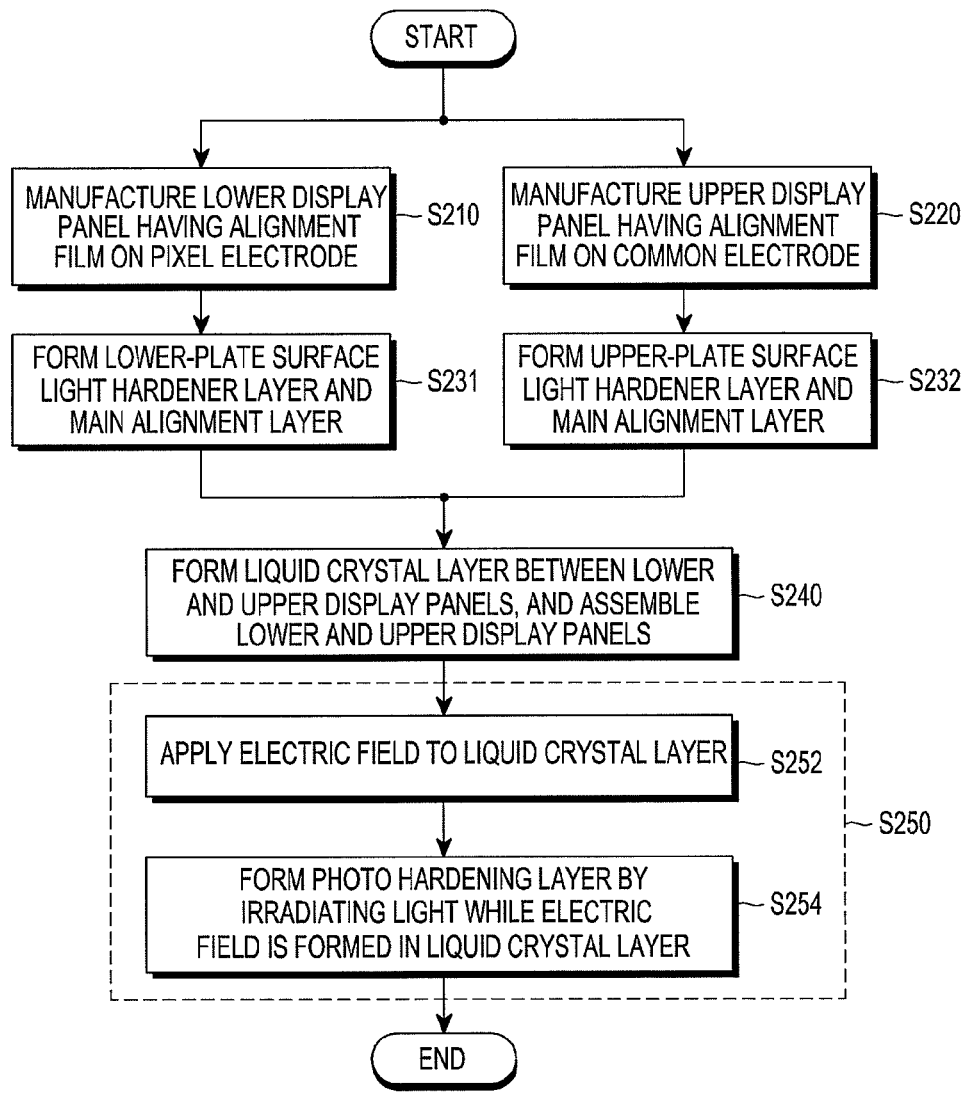
FIG. 6B is a flowchart illustrating a method for manufacturing a liquid crystal display panel assembly based on a Surface-Controlled Vertical Alignment (SC-VA) mode, according to an exemplary embodiment of the present invention.
Figure 6C:
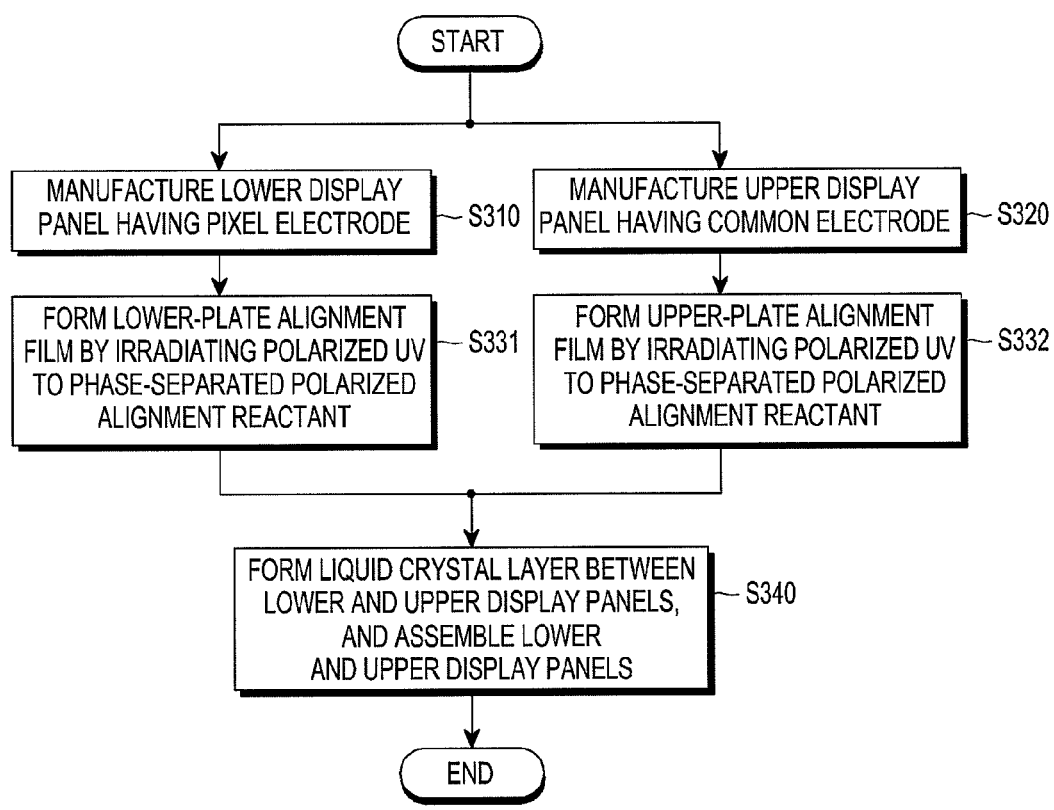
FIG. 6C is a flowchart illustrating a method for manufacturing a liquid crystal display panel assembly based on a polarized Ultra-Violet Vertical-Alignment (UV-VA) mode, according to an exemplary embodiment of the present invention.

Now, the liquid crystal display panel assembly 300, which can be manufactured in various ways using the display panels 100 and 200 manufactured in accordance with the methods described above, will be described in detail. FIGS. 6A, 6B and 6C are schematic flowcharts illustrating methods, according to exemplary embodiments of the present invention, for manufacturing the liquid crystal display panel assembly 300 based on a Super Vertical Alignment (SVA) mode, a Surface-Controlled Vertical Alignment (SC-VA) mode, and a polarized Ultra-Violet Vertical-Alignment Mode (UV-VA) mode, respectively, using the lower and upper display panels 100 and 200 manufactured in accordance with the techniques of FIGS. 1 to 5B. A process of forming the lower-plate alignment film 291 and a process of forming the upper-plate alignment film 292 is substantially the same in each of the modes. Therefore, to avoid duplicate descriptions, the process of forming the lower-plate alignment film 291 will be described in detail below.

SVA Mode

First, a method for manufacturing the liquid crystal display panel assembly 300 based on the SVA mode will be described in detail with reference to FIG. 6A. In first steps S110 and S120, the lower display panel 100 with the pixel electrode 191 and the upper display panel 200 with the common electrode 270 are manufactured, respectively, in accordance with the methods described in conjunction with FIGS. 1 to 5B. A main alignment material (not shown) is applied onto the pixel electrode 191 and the common electrode 270 by inkjet or roll printing. The main alignment material is formed on inner regions of the lower and upper display panels 100 and 200, and may be partially applied onto outer regions of the lower and upper display panels 100 and 200. The outer region of the lower display panel 100 is a region where pixels are not formed, to which a data voltage is applied, and the inner region thereof is a region where pixels are formed, to which a data voltage is applied. The outer and inner regions of the upper display panel 200 are regions corresponding to the outer and inner regions of the lower display panel 100, respectively, when the lower and upper display panels 100 and 200 are assembled or firmly fixed. In accordance with an exemplary embodiment of the present invention, a main alignment material may be applied to make a direct contact with a spacer, a color filter or an insulating layer in some regions.

In accordance with an exemplary embodiment of the present invention, a main alignment material may contain a light absorbent linked to a side chain, for example, a photo-sensitizer. Since the photo-sensitizer contained in the main alignment material absorbs UV having a wavelength of about 300 nm to about 400 nm in a process described below with reference to step S154, a lower layer of the main alignment material, for example, an insulating layer of an organic material is not damaged by incident light. The photo-sensitizer may be a 2-Hydroxyphenyl 2H-benzotriazole derivative. As nitrogen (N) atoms of a benzotriazole group make hydrogen bonding in the hydroxy group and an ortho position of a benzene ring constituting a 2-Hydroxyphenyl 2H-benzotriazole derivative, UV having a wavelength of about 300 nm to about 400 nm is easily absorbed. The 2-Hydroxyphenyl 2H-benzotriazole derivative may be 2,4-[di (2H-benzotriazol-2-yl)]-1,3-dihydroxybenzene, 2,4-[di (2H-benzotriazol-2-yl)]-1,3,5-trihydroxybenzene, or 2,4-[di(2H-benzotriazol-2-yl)]-1,3,5-trihydroxybenzene. A structural formula of the 2-Hydroxyphenyl 2H-benzotriazole derivative may be any one of the following Formulae PS-B1~PS-B7.

Formual PS-B1

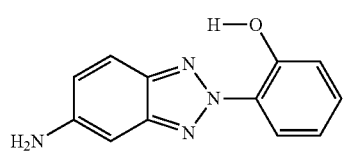

Formula PS-B2

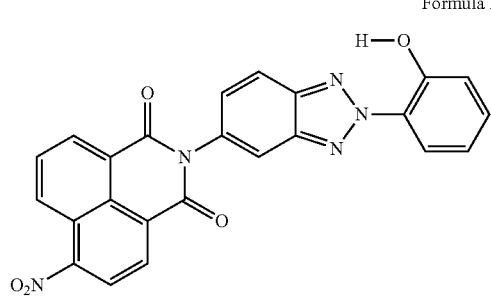

Formula PS-B3

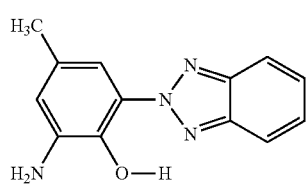

Formula PS-B4

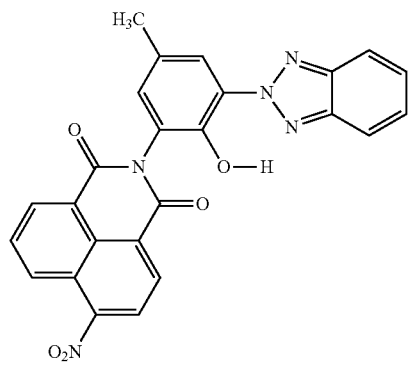

Formula PS-B5

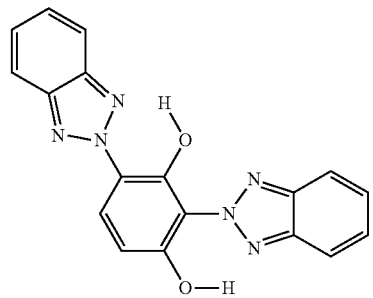

Formula PS-B6

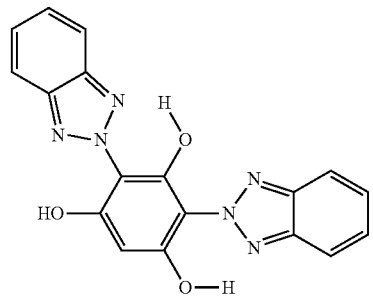

Formula PS-B7

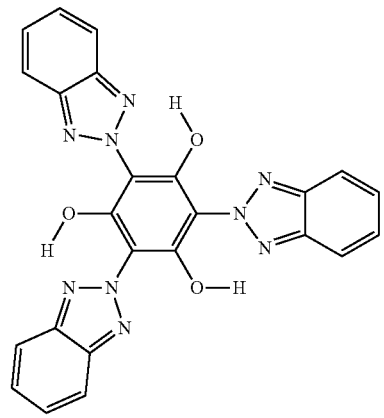

In addition, the photo-sensitizer may have the following Formula PS-A1 or PS-A2 having an amino functional group. Because a side chain that is capable of a polyimidization reaction is formed as the photo-sensitizer, the photo-sensitizer has an amino group. A photo-sensitizer having an amino group may improve the shortcomings of a photo-sensitizer formed as a monomer. An example of a shortcoming of a photo-sensitizer in the form a monomer is that as it becomes a component of a main alignment material, the photo-sensitizer may generate a gas during the process, reducing coating uniformity of the main alignment material.

Formula PS-A1

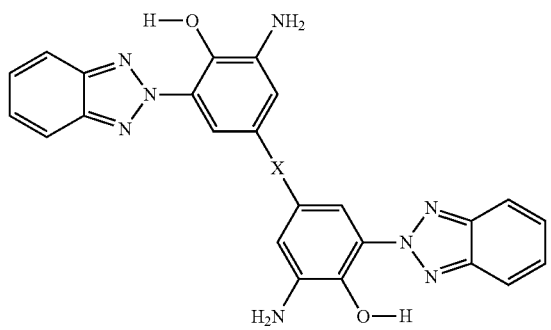

Formula PS-A2

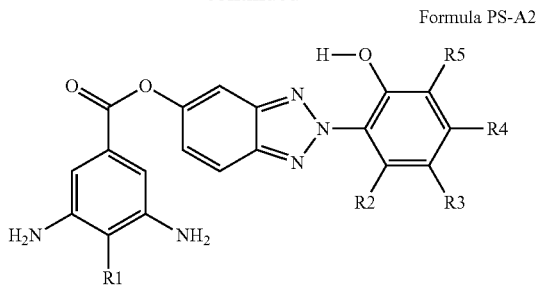

where X may be (CH2)n (where H, O or n is an integer of 1~10), and R1~R5 may be hydrogen or alkyl group.

In accordance with an exemplary embodiment of the present invention, a main alignment material containing a light absorbent may have the following Formula PI-A1, and may be manufactured as follows. First, a mixture of TCAAH (2,3,5-tricarboxycyclopentyl acetic dian-hydride) of 20 mol %, p-phenyldiamine of 12 mol %, cholesteric diamine of 2 mol %, and 2-Hydroxybenzotriazole diamine of 2 mol % (Formula PS-A1) is mixed with a DMAc (N,N-Dimethyl acetamide) solvent in a nitrogen atmosphere at a temperature of about a room temperature to 100° C. for about 48 hours. An intermediate stirred in this way is mixed with an ethanol having a purity of about 95% or more, obtaining a precipitated polyamic acid. Thereafter, a polyamic acid of about 4 wt % to about 10 wt %, a thermal hardener of about 0.1 wt % to about 40 wt %, and a solvent of about 80 wt % to about 95 wt % are mixed to manufacture a main alignment material having the following Formula PI-A1. The thermal hardener may be an epoxy-based monomer, and the solvent may be a solvent made by mixing butyl lacton, NVinylpyrro-lidone (NMP), and butyl cellulose in a ratio of about 4:3:3.

Formula PI-A1

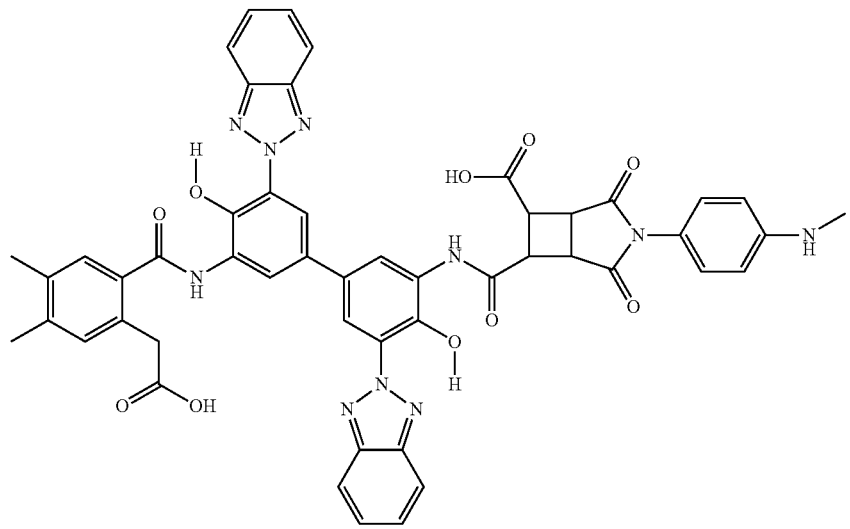

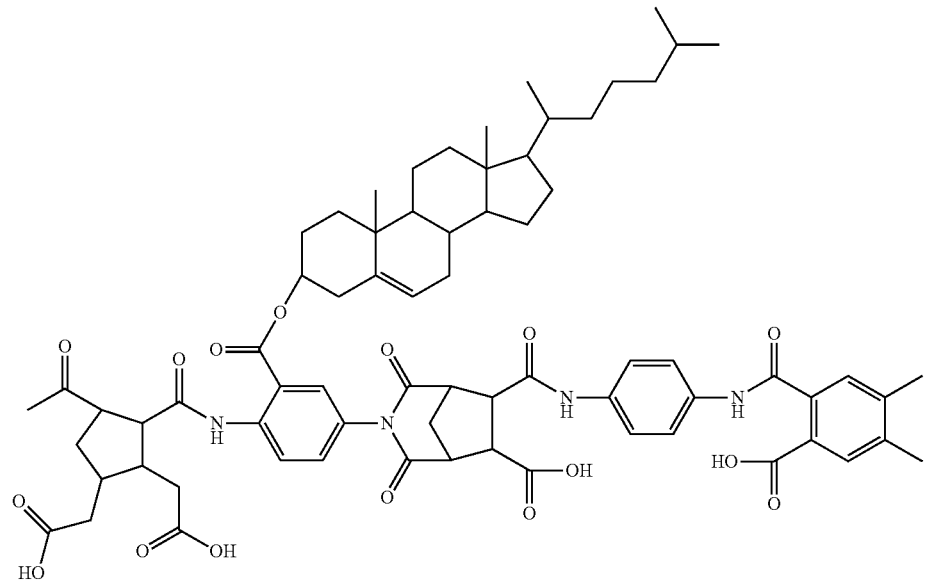

The main alignment material becomes the main alignment layer 33 after the below-described process, for example, after being hardened by light or heat. In accordance with another exemplary embodiment of the present invention, the main alignment material may be a material used for the VA mode or the TN mode.

In the next step S140 succeeding steps S110 and S120, the liquid crystal layer 3 having liquid crystal molecules 31 and a light hardener (not shown) is formed between the alignment film 292 on the upper display panel 200 and the main alignment layer 33 on the lower display panel 100, and the lower and upper display panels 100 and 200 are assembled by being sealed by a sealant (not shown). An upper-plate common voltage applying point (not shown) described below may be formed between the lower and upper display panels 100 and 200. The sealant is hardened by thermal curing, a visible ray, or UV. The light hardener is about 1.0 wt % or below, more preferably about 0.5 wt % or below, with respect to the liquid crystal layer 3.

In accordance with an exemplary embodiment of the present invention, liquid crystal molecules in the liquid crystal layer 3 may be a mixture having a 3-benzene ring monomer according to an exemplary embodiment of the present invention. This mixture may comprise an LC-A monomer of about 19 wt % to about 29 wt %, more preferably about 24 wt %, an LC-B monomer of about 2 wt % to about 8 wt %, more preferably about 5 wt %, an LC-C monomer of about 1 wt % to about 5 wt %, more preferably about 3 wt %, an LC-D monomer of about 19 wt % to about 29 wt %, more preferably about 24 wt %, an LC-E monomer of about 23 wt % to about 33 wt %, more preferably about 28 wt %, an LC-F monomer of about 5 wt % to about 11 wt %, more preferably about 8 wt %, and an LC-G monomer of about 5 wt % to about 11 wt %, more preferably about 8 wt %. A formula of the LC-A monomer is

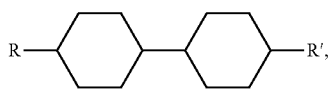

a formula of the LC-B monomer is

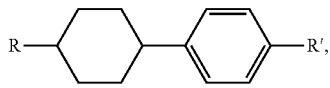

a formula of the LC-C monomer is

a formula of the LC-D monomer is

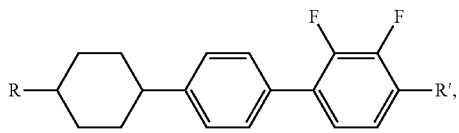

a formula of the LC-E monomer is

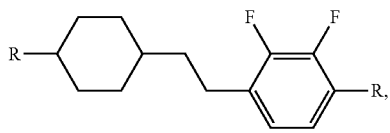

a formula of the LC-F monomer is

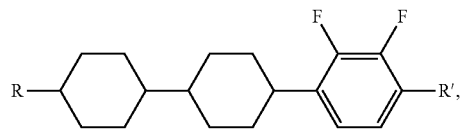

and a formula of the LC-G monomer is

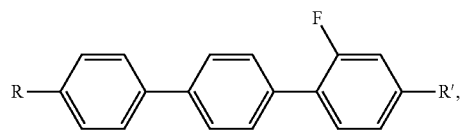

where R and R' may be an alkyl group or an alkoxy group. This mixture is about 80 mPs*s to about 110 mPs*s in rotational viscosity, about 0.088 to about 0.1080 in refractive index, about −2.5 to about −3.7 in permittivity, and about 70° C. to about 90° C. in liquid phase—isotropic phase transition temperature. Since liquid crystal molecules comprising such a mixture do not contain four benzene rings, resilience thereof may be excellent, contributing to a reduction in light leakage defects caused by liquid crystal molecules having poor resilience. Liquid crystal molecules comprising this mixture may be applied to the below-described SC-VA mode and polarized UV-VA mode liquid crystal display panel assemblies.

The light hardener according to an exemplary embodiment of the present invention may be a reactive mesogen. The term 'mesogen' refers to a photo cross-linking monomer or polymer copolymer including a mesogen group with liquid crystal properties. For example, the reactive mesogen may include one selected from the group consisting of acrylate, methacrylate, epoxy, oxetane, vinyl-ether, styrene, and thioren, and may be a material included in the aforementioned reactive mesogen described above with regard to forming the upper-plate alignment film 292. The reactive mesogen may be a material with a bar-type, banana-type, board-type or disk-type structure. The aforementioned photoinitiator (not shown) may be further contained in the liquid crystal layer 3. The photoinitiator contained in the liquid crystal layer 3 is about 0.01 wt % to about 1 wt % with respect to the total weight of the light hardener. The photoinitiator is decomposed into radicals by absorbing long-wavelength UV and promotes photo polymerization of the light hardener. The photoinitiator may be a material absorbing a wavelength of about 300 nm to about 400 nm.

In accordance with another exemplary embodiment of the present invention, a novel RM-liquid crystal mixture made by mixing a reactive mesogen with liquid crystal molecules, e.g., a ZSM-7160 mixture, is disclosed. Host liquid crystal molecules in the ZSM-7160 mixture contain a di-cyclohexyl group monomer, a cyclohexyl-fluorinated terphenyl group monomer, or a fluorinated terphenyl group monomer according to an exemplary embodiment of the present invention. The ZSM-7160 mixture is a mixture of host liquid crystal molecules and a reactive mesogen, and the mixed reactive mesogen may be about 0.1 wt % to about 1 wt %, more preferably about 0.2 wt % to about 0.5 wt % with respect to the total weight of the host liquid crystal molecules. The host liquid crystal molecules may comprise a di-cyclohexyl group monomer of about 20 wt % to about 30 wt %, a cyclohexyl-phenylene group monomer of about 0 wt % to about 10 wt %, a di-cyclohexyl-phenylene group monomer of about 0 wt % to about 10 wt %, a cyclohexyl-phenylene-difluorinated phenylene group monomer of about 20 wt % to about 30 wt %, a cyclohexyl-ethyl-difluorinated phenylene group monomer of about 20 wt % to about 30 wt %, a dicyclohexyl-difluorinated phenylene group monomer of about 5 wt % to about 10 wt %, and a cyclohexyl-fluorinated terphenyl group monomer or a fluorinated terphenyl group monomer of about 0 wt % to about 10 wt %. The wt % of a monomer in the host liquid crystal molecules is that monomer's weight divided by the total weight of the host liquid crystal molecules, wherein the total weight of the host liquid crystal molecules does not include the weight of a solvent. The host liquid crystal molecules may be about 0.08 to about 0.13 in refractive index.

A chemical structure of the di-cyclohexyl group monomer may be expressed by the following Formula LC-A1.

Formula LC-A1

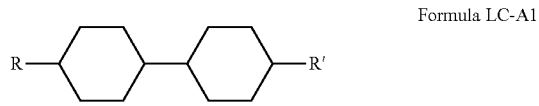

A chemical structure of the cyclohexyl-phenylene group monomer may be expressed by the following Formula LC-A2.

Formula LC-A2

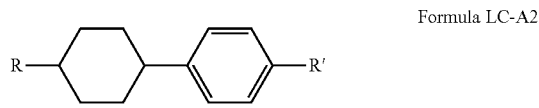

A chemical structure of the di-cyclohexyl-phenylene group monomer may be expressed by the following Formula LC-A3.

Formula LC-A3

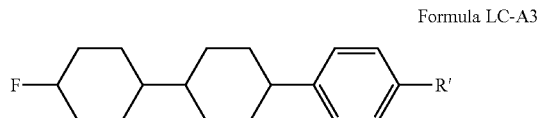

A chemical structure of the cyclohexyl-phenylene-difluorinated phenylene group monomer may be expressed by the following Formula LC-A4.

Formula LC-A4

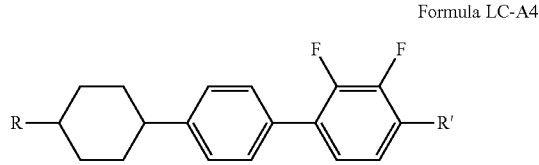

A chemical structure of the cyclohexyl-ethyl-difluorinated phenylene group monomer may be expressed by the following Formula LC-A5, and adjusts dielectric anisotropy and rotational viscosity of the host liquid crystal molecules.

Formual LC-A5

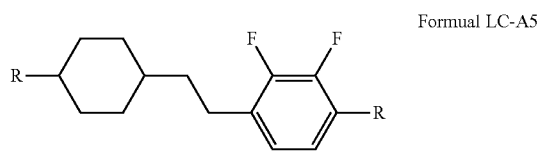

A chemical structure of the dicyclohexyl-difluorinated phenylene group monomer may be expressed by the following Formula LC-A6, and adjusts dielectric anisotropy and rotational viscosity of the host liquid crystal molecules.

Formula LC-A6

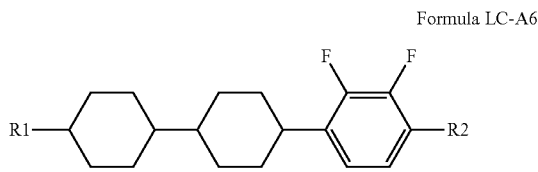

Chemical structures of the cyclohexyl-fluorinated terphenyl group monomer and the fluorinated terphenyl group monomer may be expressed by the following Formulae LC-A7-1 and LC-A7-2, respectively, and adjust dielectric anisotropy of the host liquid crystal molecules.

Formula LC-A7-1

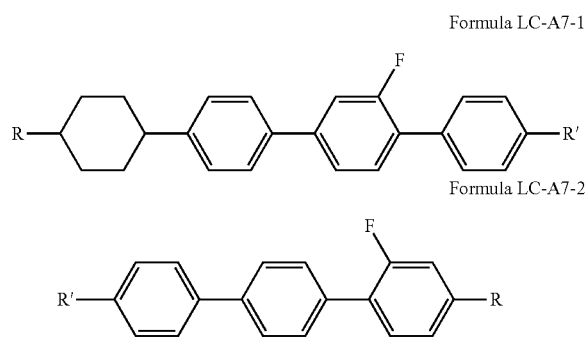

Formula LC-A7-2 where each of R and R' may be an alkyl group having one to ten carbon (C) atoms, —O—, —CH=CH—, —CO—, —COO—, or —COO—.

The reactive mesogen may be a fluorinated biphenyl dimethacrylate monomer expressed by the following Formula RM-A1.

Formula RM-A1

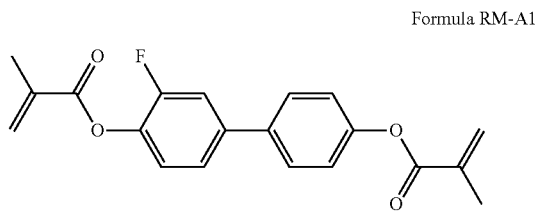 [SMILES: C=C(C)C(=O)Oc1ccc(-c2ccc(OC(=O)C(=C)C)c(F)c2)cc1]

The ZSM-7160 mixture including a mixture of host liquid crustal molecules and a reactive mesogen may contain a photoinitiator of about 0 wt % to about 1.0 wt % with respect to the total weight of the reactive mesogen. This ZSM-7160 mixture has the essentially the same characteristics as that of a conventional RM-liquid crystal mixture, thus making it possible to diversify materials of the RM-liquid crystal mixture and prevent a price increase of the RM-liquid crystal mixture by a producer.

A novel RM-liquid crystal mixture, e.g., a DS-09-9301 mixture, made by mixing a reactive mesogen with liquid crystal molecules according to another exemplary embodiment of the present invention is disclosed below. Host liquid crystal molecules constituting the DS-09-9301 mixture contain a biphenyl group monomer and a quinone derivative according to an exemplary embodiment of the present invention. A liquid crystal display device having the DS-09-9301 mixture may have fast response characteristics. The DS-09-9301 mixture is a mixture of host liquid crystal molecules and a reactive mesogen, and the mixed reactive mesogen may be about 0.1 wt % to about 1 wt %, more preferably about 0.2 wt % to about 0.4 wt % with respect to the total weight of the host liquid crystal molecules. The host liquid crystal molecules may comprise a biphenyl group monomer of about 10 wt % to about 20 wt %, a cyclohexyl-phenylene group monomer of about 0 wt % to about 10 wt %, a di-cyclohexyl-phenylene group monomer of about 5 wt % to about 10 wt %, a cyclohexyl-phenylene-difluorinated phenylene group monomer of about 15 wt % to about 30 wt %, a quinone derivative of about 15 wt % to about 30 wt %, a dicyclohexyl-difluorinated phenylene group monomer of about 0 wt % to about 5 wt %, and a cyclohexyl-ethyl-difluorinated phenylene group monomer of about 0 wt % to about 10 wt %. The wt % of a monomer in the host liquid crystal molecules is that monomer's weight divided by the total weight of the host liquid crystal molecules, wherein the total weight of the host liquid crystal molecules does not include the weight of a solvent. The host liquid crystal molecules may be about 0.08 to about 0.13 in refractive index.

A chemical structure of the biphenyl group monomer may be expressed by the following Formula LC-B1-1 or LC-B1-2, and has a high-refractive index characteristic since it includes a phenyl group.

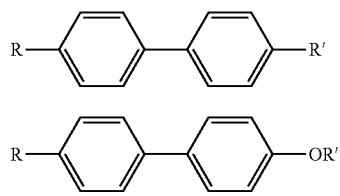

Formula LC-B1-1

Formula LC-B1-2

A chemical structure of the quinone derivative may be expressed by the following Formula LC-B7-1 or LC-B7-2, and adjusts dielectric anisotropy and rotational viscosity of the host liquid crystal molecules. In addition, since the monomer of Formula LC-B7-1 or LC-B7-2 has high polarity, a response speed of the host liquid crystal molecules may further increase.

Formula LC-B7-1

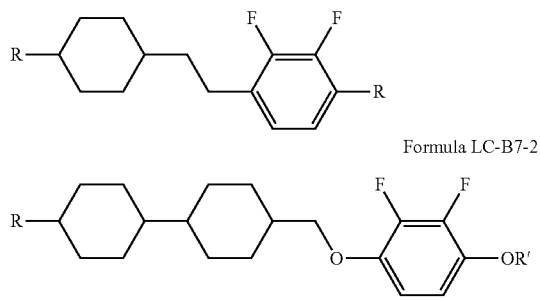

Formula LC-B7-2 where R, R' or OR' may be an alkyl group having one to ten carbon (C) atoms, —O—, —CH=CH—, —CO—, —COO—, or —COO—.

A chemical structure of the cyclohexyl-phenylene group monomer may be expressed by the foregoing Formula LC-A2. A chemical structure of the di-cyclohexyl-phenylene group monomer may be expressed by the foregoing Formula LC-A3. A chemical structure of the cyclohexyl-phenylene-difluorinated phenylene group monomer may be expressed by the foregoing Formula LC-A4. A chemical structure of the dicyclohexyl-difluorinated phenylene group monomer may be expressed by the foregoing Formula LC-A6. A chemical structure of the cyclohexyl-ethyl-difluorinated phenylene group monomer may be expressed by the foregoing Formula LC-A5. The reactive mesogen may be expressed by the foregoing Formula RM-A1. The DS-09-9301 mixture comprising the mixture of host liquid crystal molecules and a reactive mesogen may contain a photoinitiator of about 0 wt % to about 1.0 wt % with respect to the total weight of the reactive mesogen. A liquid crystal display device having this DS-09-9301 mixture may have fast response characteristics.

In accordance with another exemplary embodiment of the present invention, host liquid crystal molecules in the novel RM-liquid crystal mixture may comprise an alkenyl group monomer having a carbon double bond and a monomer having a chemical structure expressed by the following Formula LC-C9. Since the alkenyl group monomer having a carbon double bond is a low-viscosity monomer, an RM-liquid crystal mixture containing this monomer has a low-viscosity characteristic and a liquid crystal display device including this mixture may have a fast response characteristic. To improve a rotational viscosity of the host liquid crystal molecules, the alkenyl group monomer having a carbon double bond may be a monomer that has a carbon double bond and is expressed by the following Formula LC-C8-1 or LC-C8-2. The alkenyl group monomer having a carbon double bond, which is contained in the RM-liquid crystal mixture, may be about 1 wt % to about 60 wt % with respect to the total weight of the host liquid crystal molecules except for a solvent.

Formula LC-C8-1

Formula LC-C8-2

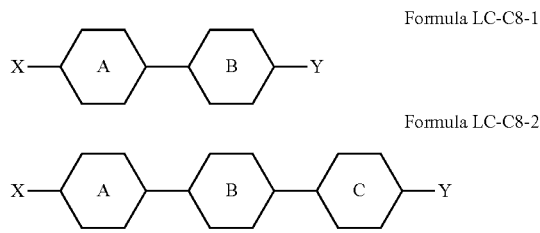

where each of A, B and C may be a benzene ring structure or a cyclohexane ring structure. At least one of X and Y has a carbon double bond in the form of

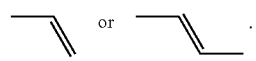

Outer hydrogen atoms in each of A, B and C may be substituted with polar atoms such as F and Cl.

A monomer having a chemical structure expressed by Formula LC-C9 prevents an alkenyl group monomer from being bonded with a reactive mesogen in the RM-liquid crystal monomer. As a π bond of a double bond constituting the alkenyl group monomer bonds with a methacrylate radical of a reactive mesogen, the reactive mesogen may not be hardened. As a result, the liquid crystal display device may suffer from afterimage defects caused by non-hardening of the reactive mesogen. The monomer having a chemical structure expressed by Formula LC-C9, which is contained in the RM-liquid crystal mixture, may be about 5 wt % or below with respect to the total weight of the host liquid crystal molecules except for a solvent.

Formula LC-C9

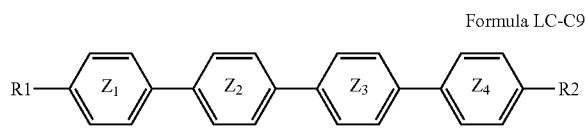

where each of Z1~Z4 may be a benzene ring structure or a cyclohexane ring structure. More preferably, Z1~Z4 may be four benzene rings. Each of R and R' may be an alkyl group having one to ten carbon (C) atoms, —O—, —CH=CH—, —CO—, —COO—, —COO—, F or Cl. In addition, outer hydrogen atoms of Z1~Z4 may be substituted with polar atoms such as F and Cl.

The reactive mesogen may be mixed with host liquid crystal molecules at about 0.05 wt % to about 1 wt %, more preferably about 0.2 wt % to about 0.4 wt % with respect to the total weight of the host liquid crystal molecules except for a solvent. The reactive mesogen may be any one of the above/below-descried materials corresponding thereto. An RM-liquid crystal mixture having this alkenyl group monomer and the chemical structure expressed by Formula LC-C9 showed a lower rotational viscosity of about 90 mPa·s to about 108 mPa·s, compared with a conventional mixture. In addition, a liquid crystal display device including this mixture had a non-hardened reactive mesogen of about 25 ppm to about 35 ppm, which is lower than that of the conventional mixture, and could have a black afterimage level of about 3 or below.

Now, processes performed in step S140 are described in detail. The main alignment material applied in steps S110 and S120 is primarily heated for about 100 seconds to about 140 seconds at about 80° C. to about 110° C.; more preferably for about 120 seconds at about 95° C. in step S140. During the primary heating, a solvent of the main alignment material is vaporized, and imidized monomers having vertical alignment properties are aligned in a direction perpendicular to a lower layer, forming the main alignment layer.

After the primary heating, the main alignment material is secondarily heated for about 1000 seconds to about 1400 seconds at about 200° C. to about 240° C., more preferably for about 1200 seconds at about 220° C. During the secondary heating, the main alignment material is hardened, forming the main alignment layer.

After the secondary heating, the main alignment layer is cleaned by DeIonized Water (DIW), and may be further cleaned by isopropyl alcohol (IPA). After the cleaning, the main alignment layer is dried. After the drying, a liquid crystal layer is formed on a lower or upper display panel 100 or 200. The liquid crystal layer may have a mixture comprising the above-described liquid crystal molecules and the above-described light hardeners, the ZSM-7160 mixture, the DS-09-9301 mixture, or a compound of liquid crystal molecules and the above-described light hardeners. The lower and upper display panels 100 and 200 are assembled by a sealant, with liquid crystal molecules and a light hardener included therein.

After the assembly, to improve fuzziness and uniformity of liquid crystal molecules, the lower and upper display panels 100 and 200 may be annealed in a chamber of about 100° C. to about 120° C. for about 60 minutes to about 80 minutes.

In the next step S150, after the assembly, the light hardener hardened by light becomes a photo hardening layer 35. The photo hardening layer 35 and the main alignment layer 33 constitute the lower-plate alignment film 291.

In step S152 of step S150, an electric field is formed in the liquid crystal layer 3 before the hardened lower-plate photo hardening layer 35 is formed, and then an exposure process is undertaken. These will now be described in detail. If voltages are supplied to the pixel electrode 191 on the lower display panel 100 and the common electrode 270 on the upper display panel 200, an electric field is formed in the liquid crystal layer 3.

Now, a description will be made of a method for forming an electric field in the liquid crystal layer 3 according to exemplary embodiments of the present invention. The method includes a method for supplying a Direct Current (DC) voltage and a method for supplying a multi-step voltage. First, a method for supplying a DC voltage to the liquid crystal display panel assembly 300 will be described with reference to FIG. 7A. If a predetermined first voltage V1 is supplied to the gate lines 121 and the data lines 171 of the liquid crystal display panel assembly 300 for a 'TA1' period, the subpixel electrodes 191h and 191l are provided with the first voltage V1. At this time, a ground voltage or a voltage of about a zero volt (0V) is supplied to the common electrode 270. The 'TA1' period is about 1 second to about 300 seconds, more preferably about 100 seconds. The first voltage V1 is about 5V to about 20V, more preferably about 7V to about 15V.

Now, a detailed description will be made of the movement of the liquid crystal molecules 31 aligned by the electric field that is generated in the liquid crystal layer 3 for the 'TA1' period. The 'TA1' period is a period in which the liquid crystal molecules 31 are aligned in the direction of a fringe electric field. An electric field is generated in the liquid crystal layer 3 by a difference between the voltage supplied to the subpixel electrodes 191h and 191l and the voltage supplied to the common electrode 270, and the liquid crystal molecules 31 having refractive-index anisotropy are aligned by the electric field. Since the edge's of the pixel electrodes 191h and 191l include the micro branches 197h and 197l, micro slits 199h and 199l, vertical connection portions 193h and 193l and horizontal connection portions 194h and 194l, as shown in FIG. 3, the pixel electrode edges distort the electric field, and a fringe electric field is formed in the liquid crystal layer 3. Due to the fringe electric field, major axes of the liquid crystal molecules 31 tend to be tilted in a direction perpendicular to the edges of the micro branches 197. Next, because directions of horizontal components of the fringe electric fields generated by the edges of the neighboring micro branches 197h and 197l are opposed to each other, and the interval W between the micro branches 197h and 197l, e.g., the width W of the micro slits 199h and 199l, is narrow, the liquid crystal molecules 31 tend to be tilted in the direction of the electric field by the horizontal components. However, since the fringe electric field by the edges of the vertical connection portions 193h and 193l and the edges the horizontal connection portions 194h and 194l of the pixel electrode 191 is greater in strength than the fringe electric field by the edges of the micro branches 197h and 197l, the liquid crystal molecules 31 are eventually tilted in parallel with the longitudinal direction of the micro branches 197h and 197l. In other words, the liquid crystal molecules 31 are tilted in parallel with the normal direction of the relatively large fringe electric field, e.g., the longitudinal direction of the micro branches 197h and 197l. The liquid crystal molecules 31 in the region where the parallel micro branches 197 are located make a tilt angle in the same direction, forming one domain. Since the micro branches 197 extend in 4 different directions in the first subpixel 190h or the second subpixel 190l of FIG. 3, the liquid crystal molecules 31 near the pixel electrode 191 are tilted in 4 different directions, and each of the subpixel electrodes 191h and 191l has four domains. If one pixel PX has a large number of domains, the side visibility of the liquid crystal display device may be excellent.

Thereafter, a predetermined exposure voltage is supplied for a 'TD1' period in which light is irradiated to the liquid crystal display panel assembly 300, whereby the liquid crystal molecules 31 are aligned in a stable state, during which the field exposure process is performed. The exposure voltage may be the same as the first voltage V1 in the 'TA1' period. The 'TD1' period is about 50 seconds to about 150 seconds, more preferably about 90 seconds.

In an alternative exemplary embodiment, the pixel electrode 191 may be provided with the ground voltage or a voltage of about 0V, and the common electrode 270 may be provided with the first voltage V1 or the exposure voltage.

A method for supplying a multi-step voltage to the liquid crystal display panel assembly 300 according to another exemplary embodiment of the present invention will be described in detail with reference to FIG. 7B. Since the movement of the liquid crystal molecules 31 caused by the electric field generated in the liquid crystal layer 3 has been described in detail in the description of the 'TA1' period in FIG. 7A, a description thereof will be omitted.

If a predetermined second voltage is supplied to the gate lines 121 and the data lines 171 for a 'TA2' period, the second voltage is supplied to the subpixel electrodes 191$h$ and 191$l$. At this point, the ground voltage or a voltage of about a zero volt (0V) is supplied to the common electrode 270. The second voltage is a voltage in the 'TA2' period, and consists of a low voltage and a high voltage V2. The second voltage is alternately supplied to the subpixel electrodes 191$h$ and 191$l$, and has a frequency of about 0.1 Hz to about 120 Hz. The low voltage may be the ground voltage or 0V, and the high voltage V2 is preferably higher than the maximum operating voltage of the liquid crystal display device. The high voltage V2 is about 5V to about 60V, more preferably about 30V to about 50V. The 'TA2' period is about 1 second to about 300 seconds, more preferably about 60 seconds. The time for which the low voltage or the high voltage V2 is maintained in the 'TA2' period is about 1 second. As stated above, because of the difference between the voltage supplied to the subpixel electrodes 191$h$ and 191$l$ and the voltage supplied to the common electrode 270, an electric field is formed in the liquid crystal layer 3. If the electric field is formed in the liquid crystal layer 3, the liquid crystal molecules 31 are tilted in a direction parallel to the longitudinal direction of the micro branches 197$h$ and 197$l$, and if no electric field is formed, the liquid crystal molecules 31 are aligned in a direction perpendicular to the upper or lower display panel 100 or 200. Because alternately supplying the low voltage and the high voltage V2 to the subpixel electrodes 191$h$ and 191$l$ switches on and off the electric field applied to the liquid crystal molecules 31 in the liquid crystal layer 3, the liquid crystal molecules 31, which are vertically aligned in the initial state, may be uniformly aligned in a desired tilt direction. Subsequently, a voltage gradually increasing from the low voltage to the high voltage V2 is supplied for a 'TB2' period, whereby the liquid crystal molecules 31 are sequentially aligned. The 'TB2' period may be about 1 second to about 100 seconds, more preferably about 30 seconds. Because in the 'TB2' period, the liquid crystal molecules 31 sequentially lie down (or are tilted) in a direction parallel to the longitudinal direction of the micro branches 197 of the pixel electrode 191 in the vertically aligned state with the passage of time, irregular movement of the liquid crystal molecules 31 is prevented, which may occur when an abrupt electric field is formed in the liquid crystal layer 3.

In the next 'TC2' period, the liquid crystal molecules 31 are tilted in a direction parallel to the longitudinal direction of the micro branches 197 of the pixel electrode 191 and then the arrangement of the liquid crystal molecules 31 is stabilized. The 'TC2' period is about 1 second to about 600 seconds, more preferably about 40 seconds. During the 'TC2' period, the high voltage V2 is consistently supplied.

Thereafter, in a 'TD2' period for which light is irradiated to the liquid crystal display panel assembly 300, a predetermined exposure voltage is supplied, whereby the liquid crystal molecules 31 are aligned in a stable state, during which the field exposure process is performed. The 'TD2' period is about 80 seconds to about 200 seconds, more preferably about 150 seconds. The exposure voltage may be the same as the final voltage of the second voltage. The exposure voltage is about 5V to about 60V, more preferably about 30V to about 50V. In an exemplary embodiment of the present invention, if the thickness of the liquid crystal layer 3 is about 3.6 μm, the exposure voltage may be about 20V to about 40V, and if the thickness of the liquid crystal layer 3 is about 3.2 μm, the exposure voltage may be about 10V to about 30V.

In an alternative exemplary embodiment of the present invention, the ground voltage or a voltage of about 0V may be supplied to the subpixel electrodes 191$h$ and 191$l$, and a predetermined second voltage (0V and V2) may be supplied to the common electrode 270.

In the next step S154, the DC or multi-step voltage is supplied to the upper display panel 200 and the lower display panel 100, and then light is irradiated to the liquid crystal layer 3 or the lower or upper display panel 100 or 200 having a surface alignment reactant while a predetermined electric field is formed in the liquid crystal layer 3, e.g., during the TD1 or TD2 period, eventually forming a photo hardening layer. As to the light irradiated to the liquid crystal layer 3, it may be irradiated in any one or both directions of the lower substrate 110 and the upper substrate 210. More preferably, to reduce a non-hardened light hardener and uniformly form a photo hardening layer, light may be incident in the direction of any one of the substrate 110 of the lower display panel 100 and the substrate 210 of the upper display panel 200, which has fewer layers absorbing or blocking the light.

Now, a method will be described in detail, in which the lower-plate photo hardening layer 35 is formed by a process in which light is irradiated to the liquid crystal layer 3 in which an electric field is formed, e.g., by the field exposure process. With an electric field existing in the liquid crystal layer 3, the liquid crystal molecules 31 near the main alignment layer 33 are aligned to be tilted in parallel with the direction of the micro branches 197. A light hardener existing in the liquid crystal layer 3 is hardened by the irradiated light at substantially the same tilt angle as those of the liquid crystal molecules 31 on the main alignment layer 33, thus forming the photo hardening layer 35. The photo hardening layer 35 is formed on the main alignment layer 33. After removal of the electric field formed in the liquid crystal layer 3, a side chain polymer of the photo hardening layer 35 maintains the intact directionality of adjacent liquid crystal molecules 31. The mesogen according to an exemplary embodiment of the present invention is a light hardener, and can maintain the intact directionality of the adjacent liquid crystal molecules 31 by UV or by inducing anisotropy of the mesogen at a specific temperature.

The 'TD1' or 'TD2' period has been described above. The light irradiated to the liquid crystal layer 3 may be collimated UV, polarized UV, or non-polarized UV. A UV wavelength may be about 300 nm to about 400 nm. Light energy is about 0.5 J/cm$^2$ to about 40 J/cm$^2$, more preferably about 5 J/cm$^2$. The lights hardening the light hardener and the sealant may be different in wavelength and energy.

In this way, if the liquid crystal molecules 31 maintain the pre-tilt angle in a direction parallel to the longitudinal direction of the micro branches 197 by the polymer of the photo hardening layer 35, the liquid crystal molecules 31 are rapidly tilted when an electric field is formed to change the direction of the liquid crystal molecules 31, ensuring a fast Response Time (RT) of the liquid crystal display device. The liquid crystal molecules 31 near the side chain of the photo hardening layer 35 have a slightly constant pre-tilt angle with respect to the vertical direction of the lower display panel 100, but the liquid crystal molecules 31, as they move from the photo hardening layer 35 to the center of the liquid crystal layer 3, may not have a constant pre-tilt angle. To improve the contrast ratio of the liquid crystal display device and prevent light leakage in a no-electric field state, the liquid crystal molecules 31 in the center of the liquid crystal layer 3 may not have the pre-tilt angle, unlike the liquid crystal molecules 31 adjacent to the photo hardening layer 35.

In an exemplary embodiment of the present invention, since the non-hardened light hardener remaining in the liquid crystal layer 3 may cause afterimages or image sticking, to remove the non-hardened light hardener existing in the liquid crystal layer 3 or to stabilize the photo hardening layers 35 and 36 having the pre-tilt angle, a process in which light is irradiated to the liquid crystal layer 3, e.g., the fluorescence exposure process may be performed, with no electric field formed in the liquid crystal layer 3. In accordance with an exemplary embodiment of the present invention, in the fluorescence exposure process, light may be irradiated for about 20 minutes to about 80 minutes, more preferably for about 40 minutes. The irradiated light may be UV which is about 300 nm to about 390 nm in wavelength, and an illuminance of which may be about 0.05 mW/cm$^2$ to about 0.4 mW/cm$^2$ at a wavelength of 310 nm.

In an alternative exemplary embodiment, the lower-plate or upper-plate photo hardening layer 35 or 36 may be formed, which has side chains of various pre-tilt angles, based the strength of an electric field formed in the liquid crystal layer 3, the level of a pixel voltage, the time of a voltage supplied to pixels PX, the light energy, the amount of light irradiation, the light irradiation time, or a combination thereof. In an exemplary embodiment, in the state where different exposure voltages are supplied to the subpixel electrodes 191$h$ and 191$l$, the first and second subpixels 190$h$ and 190$l$ having the photo hardening layers 35 and 36 of different pre-tilt angles may be formed by a field exposure process. In another exemplary embodiment, different exposure voltages or different field exposure processes may be applied according to the pixels so that at least one pixel, e.g., a blue pixel, among the primary color pixels constituting a basic pixel group PS may have a photo hardening layer having a pre-tilt angle different from those of the other pixels.

Polarizers (not shown) are attached to the lower and upper display panels 100 and 200 assembled by a sealant. The liquid crystal display panel assembly 300 that was assembled, with a light hardener contained in the liquid crystal layer 3, has characteristics of the SVA mode.

SC-VA Mode

Now, a method for manufacturing the liquid crystal display panel assembly 300 based on the SC-VA mode will be described in detail with reference to FIG. 6B, FIGS. 8A to 8E, and FIGS. 9A and 9B. A redundant description of the method for manufacturing the liquid crystal display panel assembly 300 based on the SVA mode will be omitted. A method for manufacturing the liquid crystal display panel assembly 300 based on the SC-VA mode will now be described in detail.

Figure 8A:
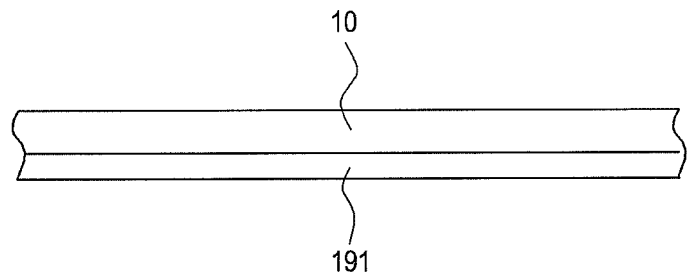
FIGS. 8A to 8E are cross-sectional views illustrating a sequential process in which a surface light hardener layer and a main alignment layer of a liquid crystal display panel assembly are formed in accordance with an SC-VA mode, according to an exemplary embodiment of the present invention.

FIG. 6B is a flowchart illustrating a method for manufacturing the liquid crystal display panel assembly 300 based on the SC-VA mode using the lower and upper display panels 100 and 200 manufactured in conjunction with FIGS. 1 to 5B. FIGS. 8A to 8E are cross-sectional views illustrating a sequential process of forming the lower-plate alignment film 291 of the liquid crystal display panel assembly 300 based on the SC-VA mode according to an exemplary embodiment of the present invention. FIGS. 9A and 9B are diagrams schematically illustrating a step of hardening a surface light hardener to form the photo hardening layer 35, according to an exemplary embodiment of the present invention.

Manufacturing of the lower display panel 100 with the pixel electrode 191 and the upper display panel 200 with the common electrode 270 in first steps S210 and S220 has been described with reference to FIGS. 1 to 5B.

In the next steps S231 and S232, a surface light hardener layer 35$a$ and the main alignment layer 33 are formed on the pixel electrode 191 and the common electrode 270, respectively.

A process of forming the lower-plate main alignment layer 33 and the surface light hardener layer 35$a$ will be described in detail with reference to FIGS. 8A to 8E. Referring to FIG. 8A, a surface alignment reactant 10 made of a surface light hardener (not shown) and a surface main alignment material (not shown) is formed on the pixel electrode 191 by inkjet printing or roll printing. The surface alignment reactant 10 is formed on inner regions of the lower and upper display panels 100 and 200, and may be partially applied onto outer regions thereof. Other lower layers of the pixel electrode 191 and the common electrode 270 have been described above. In other words, the surface alignment reactant 10 is a mixture or a compound of a surface light hardener and a surface main alignment material. The surface main alignment material is a vertical alignment material that aligns the liquid crystal molecules 31 perpendicularly to the plane of a substrate or the pixel electrode 191. The surface light hardener is a material that is hardened to pre-tilt the liquid crystal molecules 31 in a specific tilt direction with respect to the plane of the substrate or the pixel electrode 191. Materials of the surface main alignment material and the surface light hardener will be described later.

Figure 8B:
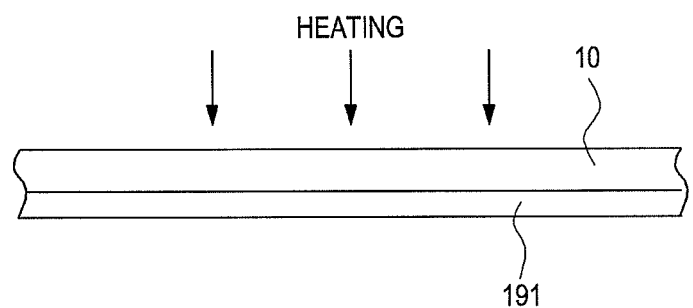
Figure 8C:
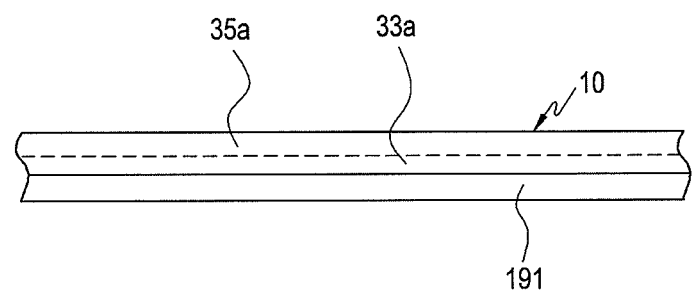
Figure 8D:
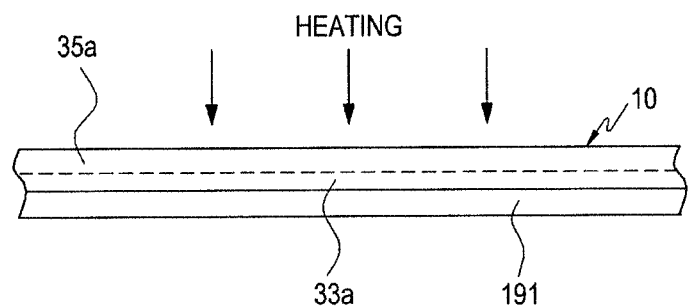
Figure 8E:
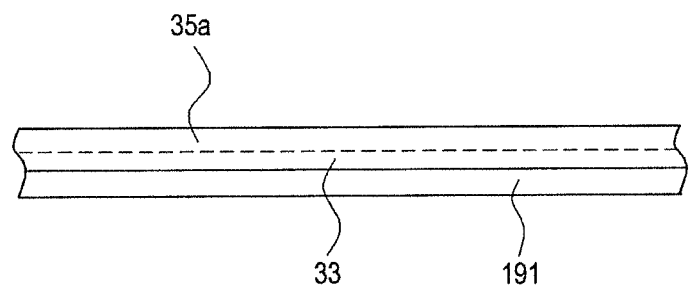
Figures 9A, 9B:
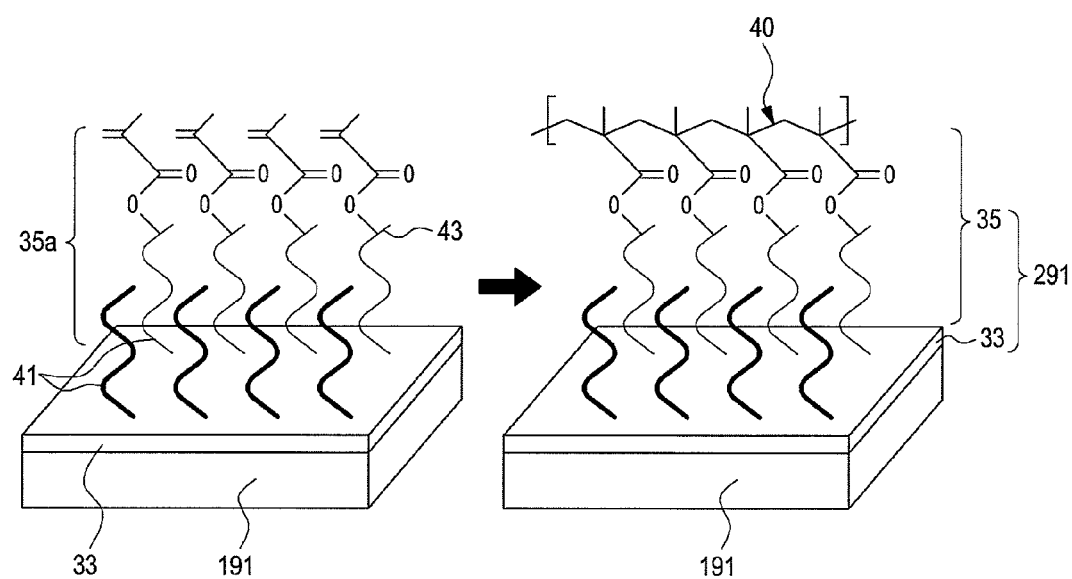
FIGS. 9A and 9B are diagrams conceptually illustrating a step in which a surface light hardener layer is hardened to form a photo hardening layer, according to an exemplary embodiment of the present invention.

Referring to FIG. 8B, the surface alignment reactant 10 formed on the pixel electrode 191 is primarily heated at a low temperature. The primary heating process is performed for about 100 seconds to about 140 seconds, more preferably for about 120 seconds at about 80° C. to about 110° C., more preferably at about 95° C. In the primary heating, a solvent of the surface alignment reactant 10 is vaporized. Referring to FIG. 8C, the surface alignment reactant 10 is phase-separated into a surface main alignment material layer 33$a$ with a surface main alignment material and a surface light hardener layer 35$a$ with a surface light hardener. In the surface alignment reactant 10, based on the polarity difference, a material with a relatively large polarity becomes the surface main alignment material layer 33$a$ with a surface main alignment material by moving around the pixel electrode 191, while a material with a relatively small polarity becomes the surface light hardener layer 35$a$ with a surface light hardener by moving up from the surface main alignment material layer 33$a$. The surface main alignment material has a relatively large polarity and aligns the liquid crystal molecules 31 perpendicularly to the plane of the substrate or the pixel electrode 191. The surface light hardener layer 35$a$ has a relatively small polarity since it contains an alkylated aromatic diamine-based monomer achieving a non-polarity effect that weakens a side-chain polarity. Referring to FIGS. 8D and 8E, if the surface main alignment material layer 33a and the surface light hardener layer 35a that underwent phase separation, are secondarily heated at a high temperature, the main alignment layer 33 is formed on the lower portion of reactant 10, has a relatively large polarity and aligns the liquid crystal molecules 31 perpendicularly to the plane of the substrate or the pixel electrode 191, while the surface light hardener layer 35a with a relatively small polarity is formed on the upper portion of reactant 10. As a result, the main alignment layer 33 and the surface light hardener layer 35a have different polarity values. The secondary heating process may be performed for about 1000 seconds to about 1400 seconds, more preferably for about 1200 seconds at about 200° C. to about 240° C., more preferably at about 220° C.

In an exemplary embodiment of the present invention, when the surface main alignment material layer 33a with a surface main alignment material and the surface light hardener layer 35a are separately formed on the lower layer of reactant 10 and the upper layer reactant 10, respectively, the primary heating process may be omitted.

Now, the surface light hardener and the surface main alignment material will be described in detail. According to an exemplary embodiment of the present invention, in the surface alignment reactant 10, the surface main alignment material is about 85 mol % to about 95 mol %, more preferably about 90 mol %, and the surface light hardener is about 5 mol % to about 15 mol %, more preferably about 10 mol %. A mol % composition ratio of the surface main alignment material and the surface light hardener in the surface alignment reactant 10 is computed based on a solvent not being including in the surface alignment reactant 10. The mol % composition ratio of the surface main alignment material and the surface light hardener is substantially the same, after phase separation into the main alignment layer 33 and the surface light hardener layer 35a or after forming the main alignment layer 33 and the photo hardening layer 35. In an exemplary embodiment of the present invention, the surface light hardener may have one of the aforementioned reactive mesogens. In accordance with an exemplary embodiment of the present invention, a solvent may be added to the surface alignment reactant 10 to improve coating and printing properties so that the surface alignment reactant 10 may be well spread on the lower or upper display panel 100 or 200 in a wide and thin manner. In addition, the solvent facilitates dissolution or mixing of a material constituting the surface alignment reactant 10. The solvent may be selected from a group of chlorobenzene, dimethyl sulfoxide, dimethylformamide, N-methylpyrrolidone, γ-butyrolactone, methyl methoxy butanol, ethoxy methyl butanol, toluene, chloroform, gamma-butyrolactone, methyl cellosolve, butyl cellosolve, butyl carbitol, tetrahydrofuran, and a combination thereof. Other materials may be used as the solvent. The aforesaid solvents may be applied to the foregoing or following main alignment material, surface alignment reactant 10, or polarized alignment reactant. The solvent may be vaporized by the foregoing or following primary heating, secondary heating, pre-heating, or post-heating process.

The surface main alignment material may be a polymer containing a dianhydride-based monomer such as an alicyclic dianhydride-based monomer, a diamine-based monomer such as an aromatic diamine-based monomer and an aliphatic ring substituted aromatic diamine-based monomer, and a crosslinker such as an aromatic epoxide-based monomer.

The alicyclic dianhydride-based monomer contained in the surface main alignment material may be about 39.5 mol % to about 49.5 mol % in the surface alignment reactant 10, the aromatic diamine-based monomer may be about 30.5 mol % to about 40.5 mol % in the surface alignment reactant 10, the aliphatic ring substituted aromatic diamine-based monomer may be about 7.5 mol % to about 10.5 mol % in the surface alignment reactant 10, and the aromatic epoxide-based monomer may be about 0.5 mol % to about 1.5 mol % in the surface alignment reactant 10.

The alicyclic dianhydride-based monomer may be a monomer expressed by any one of the following Formula I to Formula V. The alicyclic dianhydride-based monomer causes a polymer contained in the surface main alignment material to be soluble in solvents, and enhances electro-optical properties of the surface main alignment material.

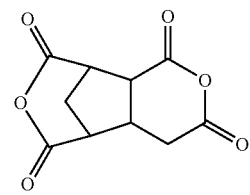

Formula I

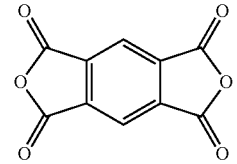

Formula II

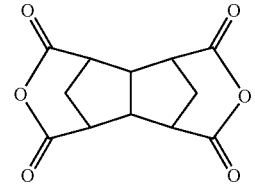

Formula III

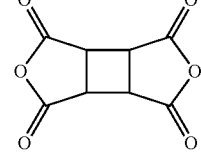

Formula IV

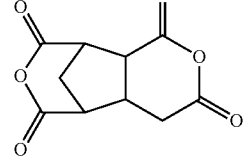

Formula V

The aromatic diamine-based monomer may be a monomer expressed by the following Formula VI. The aromatic diamine-based monomer in the surface main alignment material causes a polymer contained in the surface main alignment material to be soluble in solvents.

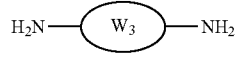

Formula VI where $W_3$ may be any one of the following Formula VII to Formula IX.

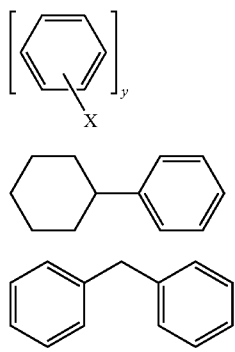

Formula VII

Formula VIII

Formula IX

X = alkyl, y = 1-3

The aliphatic ring substituted aromatic diamine-based monomer may be a monomer expressed by the following Formula X. The aliphatic ring substituted aromatic diamine-based monomer in the surface main alignment material has vertical alignment components, and enhances heat resistance and chemical resistance of the surface main alignment material.

Formula X

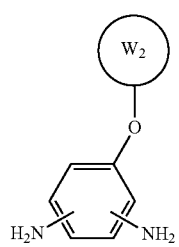

where $W_2$ may be any one of the following Formula XI and Formula XII.

Formula XI

Formula XII

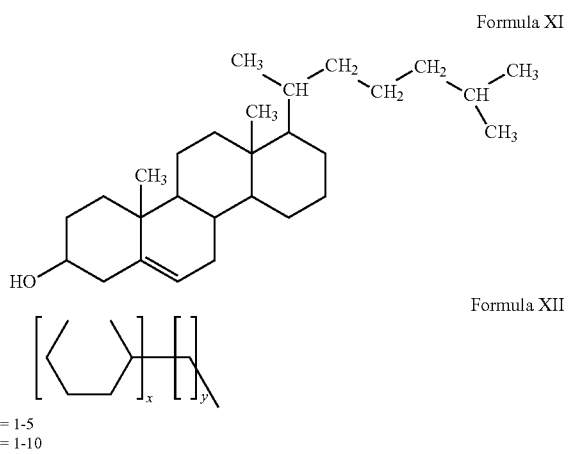

x = 1-5
y = 1-10

The aromatic epoxide-based monomer may be a monomer expressed by the following Formula XIII. Since the aromatic epoxide-based monomer in the surface main alignment material forms a crosslinking structure, it causes a polymer contained in the surface main alignment material and a polymer (reactive mesogen) contained in the surface light hardener to be bonded. In addition, the aromatic epoxide-based monomer enhances film properties, heat resistance and chemical resistance.

Formula XIII

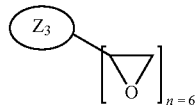

where $Z_3$ may be any one of the following Formula XIV and XV.

Formula XIV

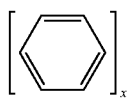

Formula XV

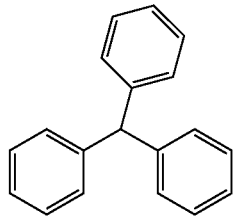

x = 1-4

The surface main alignment material according to an exemplary embodiment may contain a polymeric material, for example, at least one of polysiloxane, poly-amic acid, poly-imide, nylon, polyvinylalcohol (PVA), and PVC.

The surface light hardener contains a dianhydride-based monomer such as an alicyclic dianhydride-based monomer, and a diamine-based monomer such as a photo-reactive dianhydride-based monomer, an alkylated aromatic diamine-based monomer, and an aromatic diamine-based monomer.

The alicyclic dianhydride-based monomer contained in the surface light hardener may be about 2.5 mol % to about 7.5 mol % in the surface alignment reactant 10, the photo-reactive dianhydride-based monomer may be about 0.75 mol % to about 2.25 mol % in the surface alignment reactant 10, the alkylated aromatic diamine-based monomer may be about 0.75 mol % to about 2.25 mol % in the surface alignment reactant 10, and the aromatic diamine-based monomer may be about 1 mol % to about 3 mol % in the surface alignment reactant 10.

The alicyclic dianhydride-based monomer and the aromatic diamine-based monomer contained in the surface light hardener may be the same as the alicyclic dianhydride-based monomer and the aromatic diamine-based monomer contained in the surface main alignment material, respectively.

The photo-reactive dianhydride-based monomer is a monomer including a reactive mesogen, and serves to determine pre-tilt angle directions of the photo hardening layers 35 and 36, and liquid crystal molecules 31. In terms of the chemical structure, the photo-reactive dianhydride-based monomer may be a monomer expressed by the following Formula XVI, and more specifically a monomer expressed by the following Formula XVII.

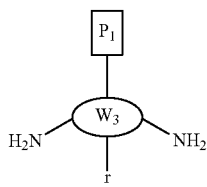

Formula XVI where $P_1$ is a reactive mesogen, and $W_3$ is an aromatic ring that may be any one of Formula VII to Formula IX described above.

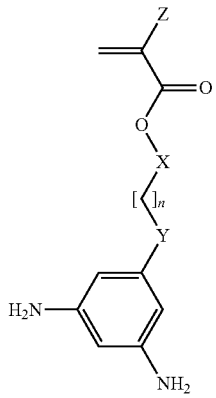

Formula XVII where X may be any one of methylene ($CH_2$), phenylene ($C_6H_4$), biphenylene ($C_{12}H_8$), cyclohexylene ($C_6H_8$), bicyclohexylene ($C_{12}H_{16}$) and phenyl-cyclohexylene ($C_6H_4$—$C_6H_8$), Y may be any one of methylene ($CH_2$), ether (O), ester (O—C=O or O=C—O), phenylene ($C_6H_4$) and cyclohexylene ($C_6H_8$), and Z may be methyl ($CH_3$) or hydrogen (H). In addition, n may be an integer of 1~10. A photo-reactive diamine-based monomer may be polystyrene.

The alkylated aromatic diamine-based monomer may be a vertical alignment monomer expressed by the following Formula XVIII. Since the alkylated aromatic diamine-based monomer of a polymer contained in the surface light hardener has vertical alignment components but contains an alkyl group that does not represent polarities in the side chain, the polymer of the surface light hardener layer 35a has a lower polarity than a polymer of the surface main alignment material layer 33a.

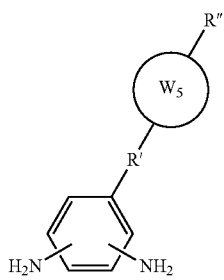

Formula XVIII where R' and R" are, respectively, defined as
R': —$(CH_2)_n$-[n=1-10] or —O—$(CH_2)_n$-[n=1-10] or —(O—C=O or O=C—O)—$(CH_2)_n$-[n=1-10]

R": —$(CH_2)_{n-1}$—$CH_3$[n=1-10] or —O—$(CH_2)_{n-1}$—$CH_3$ [n=1-10] or —(O—C=O or O=C—O)—$(CH_2)_{n-1}$—$CH_3$[n=1-10]

In addition, $W_5$ can be expressed by the following Formula XIX.

Formula XIX x or y = 1-3

The aromatic diamine-based monomer may be monomers expressed by Formula VI to Formula IX. The aromatic diamine-based monomer causes a polymer constituting the surface light hardener to be soluble in solvents. The aforementioned photoinitiator may be added to the surface light hardener.

After the secondary heating, the surface alignment reactant 10 is cleaned by DIW, and may be further cleaned by IPA. After the cleaning, the surface alignment reactants 10 are dried.

In step S240, the upper-plate common voltage applying point (not shown), the sealant and the liquid crystal layer 3 are formed between the lower and upper display panels 100 and 200, on each of which the surface light hardener layer 35a and the main alignment layer 33 are formed, and then the display panels 100 and 200 are assembled. After the drying, a sealant is formed on the lower display panel 100. To improve the adhesion, the sealant may be formed on the outer region of the lower display panel 100, where the surface alignment reactant 10 is not formed. On the other hand, the sealant may be formed on the outer region of the lower display panel 100 or the upper display panel 200 in such a manner that it may partially overlap the surface alignment reactant 10. The sealant may include a photoinitiator that is hardened by UV having a wavelength of about 300 nm to about 400 nm. The photoinitiator hardened at a wavelength of about 300 nm to about 400 nm may be Benzyl Dimethyl Ketal (BDK, Irgacure-651) or one of the aforesaid photoinitiators.

After the drying, the upper-plate common voltage applying point (not shown) and the liquid crystal layer 3 are formed on the upper display panel 200. The upper-plate common voltage applying point receives the common voltage Vcom provided from the outside, for example, the data driver 500, and provides the common voltage Vcom to the common electrode 270 formed on the upper display panel 200. The upper-plate common voltage applying point may directly contact a common voltage applying pattern (not shown) formed on the lower display panel 100 and the common electrode 270 formed on the upper display panel 200. The common voltage applying pattern is connected to the data driver 500 to receive the common voltage Vcom, and may be formed while a pixel electrode layer is formed. The upper-plate common voltage applying point may be formed on the outer region of the upper display panel 200, where the surface alignment reactant 10 is not formed. The upper-plate common voltage applying point may be comprised of spherical conductors, which are conductive and are about 4 μm or less in diameter. The liquid crystal layer 3 is formed on the region where the surface alignment reactant 10 of the upper display panel 200 is formed, or on the inside where the sealant is formed. The processes of forming the upper-plate common voltage applying point and the liquid crystal layer 3 may be performed simultaneously. In accordance with another exemplary embodiment of the present invention, by mixing the sealant, e.g., a conductive sealant, with the conductors forming the upper-plate common voltage applying point, the sealant and the upper-plate common voltage applying point may be formed of the same material in a single process. In a region of the lower display panel 100, in which a conductive sealant is formed, patterns of a data layer conductor may not be formed on a lower layer of the conductive sealant, thereby preventing the conductive sealant from being shorted to the patterns of the data layer conductor.

After the sealant and the liquid crystal layer 3 are formed, the lower and upper display panels 100 and 200 are assembled in a vacuum chamber by the sealant.

In step S250, as exposure voltages are supplied to the assembled display panels 100 and 200 and then light is irradiated thereto, e.g., as the assembled display panels 100 and 200 undergo the field exposure process, the lower-plate photo hardening layer 35 is formed on the lower-plate main alignment layer 33 and the upper-plate photo hardening layer 36 is formed on the upper-plate main alignment layer 34. The main alignment layers 33 and 34 and the photo hardening layers 35 and 36 constitute alignment films 291 and 292, respectively.

After the assembly, the sealant is exposed to UV having a wavelength of about 300 nm to about 400 nm, or to a visible ray having a wavelength of about 400 nm or more, thereby being hardened about 80%. The UV or visible ray may be irradiated to the sealant by being incident from the outside of the lower display panel 100. A shield mask is located between the sealant and the UV source, and shields UV so that the UV may not be irradiated to areas other than the sealant. If the UV irradiated to the sealant hardens light hardener around the sealant due to its deviation, because the light hardener around the sealant is hardened in advance, the liquid crystal display device may suffer from edge stain defects at around the sealant. The light hardener around the sealant may be a light hardener forming the alignment film, or a light hardener existing in the liquid crystal layer 3. The visible ray may be irradiated to the sealant without the shield mask.

Thereafter, the sealant undergoes thermal curing for about 70 minutes at about 100° C.

After the assembly, to improve the fuzziness and uniformity of liquid crystal molecules 31, the lower and upper display panels 100 and 200 are annealed in a chamber of about 100° C. to about 120° C. for about 60 minutes to about 80 minutes.

Since a process (step S252) in which after the annealing, exposure voltages are supplied to the assembled display panels 100 and 200 and an electric field is formed in the liquid crystal layer 3 is substantially the same as step S152 in the SVA mode-based manufacturing method, a description thereof is omitted.

In the next step S254, a process is described, in which the photo hardening layer 35 is formed by the field exposure process in which light is irradiated to the assembled liquid crystal display panel assembly 300 while the electric field is being formed. Since the process in which light is irradiated and then the photo hardening layer 35 aligns the liquid crystal molecules 31 in step S254 is the same as step S154 in the SVA mode, a detailed description thereof is omitted. To reduce non-hardened light hardener and uniformly form a photo hardening layer, the light irradiated to the surface light hardener layer 35a may be incident in the direction of any one of the substrate 110 of the lower display panel 100 and the substrate 210 of the upper display panel 200, which has fewer layers absorbing or blocking the light.

Now, a process in which upon receipt of light, the surface light hardener layer 35a formed on the main alignment layer 33 becomes the photo hardening layer 35 will be described in detail with reference to FIGS. 9A and 9B.

If an electric field is formed in the liquid crystal layer 3, surface light hardeners 43 of the surface light hardener layer 35a are aligned in substantially the same direction as that of neighboring liquid crystal molecules 31, and the surface light hardeners 43 are hardened in substantially the same direction as that of the neighboring liquid crystal molecules 31 (see FIGS. 21A and 21B) by the incident UV. The aligned and hardened surface light hardeners 43 form the photo hardening layer 35, whereby liquid crystal molecules 31 adjacent to the photo hardening layer 35 have a pre-tilt angle. The surface light hardeners 43 shown in FIGS. 9A and 9B are high-molecular compounds in which vertical alignment monomers 41 constituting the surface main alignment material and monomers including a reactive mesogen are chemically bonded. When UV is irradiated, the surface light hardeners 43 having a reactive mesogen have the double bond activated by the UV and a side-chain network 40 is additionally formed. By such reactions, the surface light hardeners 43 form the photo hardening layer 35 by UV irradiation hardening. As a result, the photo hardening layer 35 aligned in a direction slightly tilted with respect to the normal direction of the lower substrate 110 is formed on the main alignment layer 33 that vertically aligns the liquid crystal molecules 31. To harden the non-hardened light hardener and stabilize the photo hardening layer 35, the aforementioned fluorescence exposure process may be performed.

As described above in connection with the SVA mode, since the photo hardening layer 35 is hardened while being aligned along the tilt direction of the liquid crystal molecules 31, the liquid crystal molecules 31 have a pre-tilt angle in a tilt direction parallel with the longitudinal direction of the micro branches 197 of the pixel electrode 191 even in the state where no electric field is applied to the liquid crystal layer 3.

The liquid crystal display panel assembly 300 assembled in this way has characteristics of the SC-VA mode. If the liquid crystal display device is manufactured according to the SC-VA mode, light hardeners exist around the main alignment layer 33 without existing in the liquid crystal layer 3, significantly reducing non-hardened light hardeners remaining in the liquid crystal layer 3. Therefore, the liquid crystal display device having characteristics of the SC-VA mode improves the image-sticking defect, ensuring good quality. In addition, the process of irradiating light in the no-electric field state to harden the non-hardened light hardeners may be omitted, reducing the manufacturing cost of the liquid crystal display device.

Now, characteristics of the liquid crystal display device manufactured based on the SC-VA mode will be described in detail with reference to FIG. 10 and Tables 2 and 3. Table 2 shows characteristics of the liquid crystal display device based on the SC-VA mode with respect to a change in composition ratio of the surface main alignment material and the surface light hardener contained in the surface alignment reactant 10. The alicyclic dianhydride-based monomer, aromatic diamine-based monomer, aliphatic ring substituted aromatic diamine-based monomer and aromatic epoxide-based monomer constituting the surface main alignment material that were used in these experiments, were a tricyclo-hexyl dianhydride, a terphenyl diamine, a cholesteryl benzenediamine, and a hexaepoxy benzene derivative, respectively. In addition, the alicyclic dianhydride-based monomer, photo-reactive dianhydride-based monomer, alkylated aromatic diamine-based monomer, and aromatic diamine-based monomer constituting the surface light hardener that were used in these experiments, were a tricyclo-hexyl dianhydride, a mono-methacrylic benzenediamine, a mono-alkylated phenylcyclohexy benzenediamine, and a hexaepoxy benzene derivative, respectively.

The structure of a pixel PX is substantially the same as the structure shown in FIG. 3. The width of the micro branches 197 of the pixel electrode 191 was about 3 µm, and the cell spacing in the liquid crystal layer 3 was about 3.6 µm. The exposure voltage was about 7.5V, and UV intensity in the field exposure was about 5 J/cm². The liquid crystal display device was operated by charge sharing-based 1 Gate line 1 Data line (1G1D) driving described below in conjunction with FIG. 11. Other conditions are the same as those applied to the liquid crystal display device based on the SC-VA mode.

TABLE 2

| | Surface main alignment material (mol %) | Surface light hardener (mol %) | Response time (ms) | Afterimage occurrence time |
|---|---|---|---|---|
| Experiment1 | about 95 to about100 | about 0 to about 5 | about 161.1 | 168 hr or more |
| Experiment2 | about 85 to about95 | bout 5 to about 15 | about 7.9 | 168 hr or more |
| Experiment3 | bout 75 to about85 | about 15 to about 25 | about 7.5 | 168 hr or more |
| Experiment4 | about 65 to about75 | about 25 to about35 | about 7.3 | 168 hr or more |

Referring to Table 2, as can be seen from Experiment 2, when the surface main alignment material and the surface light hardener in the surface alignment reactant 10 were about 85 to about 95 mol % and about 5 to about 15 mol %, respectively; the response time of the liquid crystal display device was about 0.0079 seconds, and no afterimage was generated for 168 hours, obtaining better results compared with the other experiments.

Table 3 shows characteristics of the liquid crystal display device based on the SC-VA mode with respect to a change in composition ratio of the photo-reactive dianhydride-based reactive mesogen and the alkylated aromatic diamine-based vertical alignment monomer contained in the surface light hardener. The reactive mesogen and the vertical alignment monomer, which were applied to these experiments, were mono-methacrylic benzenediamine and mono-alkylated phenylcyclohexy benzenediamine, respectively. Other conditions were the same as those applied to the liquid crystal display device described in conjunction with Table 2.

TABLE 3

| | Reactive Mesogen (RM) (mol %) | Vertical alignment monomer (mol %) | Response time (ms) | Occurrence of Black light leakage |
|---|---|---|---|---|
| Experiment5 | about 0.75 to about 2.25 | about 0.5 to about 0.75 | about 8.2 | Yes |
| Experiment6 | about 2.25 to about 3.75 | about 0.5 to about 0.75 | about 7.7 | Yes |
| Experiment7 | about 0.75 to about 2.25 | about 0.75 to about 2.25 | about 7.9 | No |
| Experiment8 | about 2.25 to about 3.75 | about 0.75 to about 2.25 | about 7.4 | Yes |

Referring to Table 3, as can be seen from Experiment 7, when the reactive mesogen and the vertical alignment monomer in the surface alignment reactant 10 were about 0.75 mol % to about 2.25 mol % and about 0.75 to about 2.25 mol %, respectively, the response time of the liquid crystal display device was about 0.0079 seconds, and the light leakage did not occur in the black state. Accordingly, it was found that Experiment 7 showed excellent characteristics compared with the other experiments.

Figure 10:
FIG. 10 illustrates Scanning Electron Microscope (SEM) images obtained by photographing one pixel of a liquid crystal display device of the SC-VA mode, according to an exemplary embodiment of the present invention, over time.

FIG. 10 illustrates Scanning Electron Microscope (SEM) images obtained by photographing one pixel PX of the liquid crystal display device of the SC-VA mode, over time. The composition ratio of the surface alignment reactant 10 used to manufacture the liquid crystal display device is as follows. The alicyclic dianhydride-based monomer (e.g., tricyclo-hexyl dianhydride), aromatic diamine (e.g., terphenyl diamine), aliphatic ring substituted aromatic diamine-based monomer (e.g., cholesteryl benzenediamine) and aromatic epoxide-based monomer (e.g., a hexaepoxy benzene derivative) contained in the surface main alignment material were about 45 mol %, about 36 mol %, about 9 mol %, and about 1.25 mol %, respectively. The alicyclic dianhydride-based monomer (e.g., tricyclo-hexyl dianhydride), photo-reactive dianhydride-based monomer (e.g., mono-methacrylic benzenediamine), alkylated aromatic diamine-based monomer (e.g., mono-alkylated phenylcyclohexy benzenediamine) and aromatic diamine-based monomer (e.g., hexaepoxy, benzene derivative) contained in the surface light hardener were about 5 mol %, about 1.5 mol %, about 1.5 mol %, and about 2 mol %, respectively. Other conditions here are the same as those applied to the liquid crystal display device described in conjunction with Table 2. Mol % of each component of the liquid crystal display device described in conjunction with Tables 2 and 3 and FIG. 10 is its mol % in the surface alignment reactant 10, and solvents are not involved in the composition ratio of the surface alignment reactant 10.

As can be seen from FIG. 10, no texture occurred in images of a pixel PX taken from 0 to 0.048 seconds. In addition, the inter-gray scale response time of the liquid crystal display device was about 0.008 seconds. Thus, the liquid crystal display device manufactured based on the SC-VA mode had a fast response time and did not cause image sticking and light leakage for an extended period, ensuring good image quality.

An alignment film of a liquid crystal display device according to an exemplary embodiment of the present invention has negative electricity characteristics. The photo hardening layers 35 and 36 of the alignment film have the negative electricity characteristics, and they are formed by hardening the surface alignment reactant 10. Since substances such as fluorine atoms (F) are bonded with a portion of molecules of the light hardener, the surface alignment reactant 10 may have the negative electricity characteristics. Because the photo hardening layers 35 and 36 have the negative electricity characteristics, polymers having negative electricity characteristics, which constitute the photo hardening layers 35 and 36, and liquid crystal molecules 31 in the liquid crystal layer 3 can be simultaneously aligned by the electric field formed in the liquid crystal layer S. As a result, the photo hardening layers 35 and 36 may have a more uniform pre-tilt angle. In addition, when the liquid crystal display device is driven, the liquid crystal molecules 31 in the liquid crystal layer 3 and the photo hardening layers 35 and 36 having the negative electricity characteristics move simultaneously by the electric field, ensuring a fast response time of the liquid crystal display device.

This exemplary embodiment is different from the aforementioned manufacturing method based on the SC-VA mode in that, unlike that in FIG. 8C, the material constituting the surface alignment reactant 10 may not be phase-separated in the process of forming the alignment film. Since details of this exemplary embodiment are substantially similar to those of the manufacturing method based on the SC-VA mode, duplicate descriptions thereof are simplified or omitted. Since the upper and lower-plate alignment films 292 and 291 are formed in a substantially similar way, the process of forming alignment films according to exemplary embodiments of the present invention will be described in detail without distinguishing between the alignment films 292 and 291.

Now, a process of forming alignment films having negative electricity characteristics will be described in detail. The lower display panel 100 with the pixel electrode 191 and the upper display panel 200 with the common electrode 270 are each manufactured using the foregoing or following methods corresponding thereto.

The below-stated surface alignment reactant 10 having negative electricity characteristics according to an exemplary embodiment of the present invention is applied onto the pixel electrode 191 and the common electrode 270 by the foregoing methods corresponding thereto. The surface alignment reactant 10 is formed on inner regions of the lower and upper display panels 100 and 200, and may be partially applied to outer regions thereof.

The surface alignment reactant 10 is a compound obtained by chemically bonding a light hardener, which is bonded to materials having negative electricity characteristics, and a material forming the main alignment layer, and it has the negative electricity characteristics. The light hardener is a material, which is hardened as described above, causing the liquid crystal molecules 31 to be pre-tilted in a certain tilt direction with respect to the surface of the substrates 110 and 210 or the pixel electrode 191, and forms the photo hardening layers 35 and 36. The light hardener may be linked to a side chain of the material forming the main alignment layer. The light hardener may be at least one material selected from the aforementioned photo-reactive polymer, reactive mesogen, photopolymerization material, photo-isomerization material, and a mixture or compound thereof. A reactive mesogen having negative electricity characteristics according to an exemplary embodiment of the present invention is a photo-reactive fluorinated diamine-based monomer described below.

A material forming the main alignment layer is a vertical alignment material that, as described above, aligns the liquid crystal molecules 31 in a direction perpendicular to the surface of the substrates 110 and 210 or the pixel electrode 191. The material forming the main alignment layer may be a compound of an alicyclic dianhydride-based monomer and an aliphatic ring substituted aromatic diamine-based monomer. The material forming the main alignment layer may also include an aromatic diamine-based monomer, or a crosslinker. In addition, the material forming the main alignment layer may be the aforesaid surface main alignment material 33a.

Now, the surface alignment reactant 10 having negative electricity characteristics according to an exemplary embodiment of the present invention will be described in detail. The surface alignment reactant 10 having negative electricity characteristics may be a polymer that contains a dianhydride-based monomer such as an alicyclic dianhydride-based monomer, a diamine-based monomer such as a photo-reactive fluorinated diamine-based monomer, an alkylated aromatic diamine-based monomer, an aromatic diamine-based monomer and an aliphatic ring substituted aromatic diamine-based monomer, and a crosslinker such as an aromatic epoxide-based monomer.

The surface alignment reactant 10 having negative electricity characteristics according to an exemplary embodiment of the present invention is a mixture in which a polyimide (PI)-based compound and a crosslinker are mixed. The polyimide-based compound is a compound in which monomers constituting a dianhydride-based monomer and a diamine-based monomer are chemically bonded. The polyimide-based compound may be manufactured by an imidization reaction in which if monomers included in the dianhydride-based monomer and the diamine-based monomer are mixed and dissolved in a polar solvent, an amino group of the monomers included in the diamine-based monomer makes a neucleophilic attack on an acid anhydride group of the dianhydride-based monomer. The monomers constituting the diamine-based monomer, which include the photo-reactive fluorinated diamine-based monomer, the alkylated aromatic diamine-based monomer, the aromatic diamine-based monomer and the aliphatic ring substituted aromatic diamine-based monomer, are mixed before the imidization reaction.

The surface alignment reactant 10 having negative electricity characteristics, contains the alicyclic dianhydride-based monomer which may be about 44 mol % to about 54 mol %, more preferably about 49 mol %, the photo-reactive fluorinated diamine-based monomer which may be about 0.5 mol % to about 1.5 mol %, more preferably about 1 mol %, the alkylated aromatic diamine-based monomer which may be about 12 mol % to about 18 mol %, more preferably about 15 mol %, the aromatic diamine-based monomer which may be about 25 mol % to about 35 mol %, more preferably about 30 mol %, the aliphatic ring substituted aromatic diamine-based monomer which may be about 2 mol % to about 6 mol %, more preferably about 4 mol %, and the aromatic epoxide-based monomer which may be about 0.5 mol % to about 1.5 mol %, more preferably about 1 mol %. The solvent is not involved in the mol % composition ratio of the surface alignment reactant 10.

The alicyclic dianhydride-based monomer is the same as the material described in connection with FIG. 6B. The alicyclic dianhydride-based monomer causes the polymer contained in the surface alignment reactant 10 to be soluble in the solvent, and it improves electro-optical characteristics, e.g., a Voltage Holding Ratio (VHR), of the alignment film and reduces a Residual Direct Current (RDC) voltage. The VHR refers to a ratio of the charged voltage that the liquid crystal layer 3 holds while no data voltage is applied to the pixel electrode 191, and it is ideal that the VHR approximates 100%. The higher the VHR, the better image quality of the liquid crystal display device. The RDC voltage refers to the voltage that remains in the liquid crystal layer 3 even though no external voltage is applied thereto, as impurities in the ionized liquid crystal layer 3 are absorbed on the alignment film, and the lower the RDC voltage, the better image quality of the liquid crystal display device.

The photo-reactive fluorinated diamine-based monomer forms the photo hardening layers 35 and 36 by being hardened by UV. Since fluorine atoms (F) are bonded in a particular direction of benzene, the photo-reactive fluorinated diamine-based monomer has negative electricity characteristics. In accordance with an exemplary embodiment of the present invention, in terms of the chemical structure, the photo-reactive fluorinated diamine-based monomer may be a monomer expressed by Formula XVI-F, more specifically a mono-methacrylic fluorinated benzenediamine monomer expressed by Formula XVII-F.

Formula XVI-F

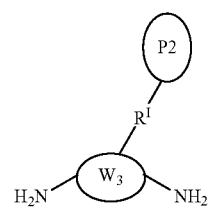

where P2 is a fluorinated aryl acrylate-based reactive mesogen, and it may be selected from the following Formulae XVI-F-P2-11, XVI-F-P2-21, XVI-F-P2-22, XVI-F-P2-23, XVI-F-P2-31, XVI-F-P2-32, and XVI-F-P2-41 and a mixture thereof. In addition, W3 is an aromatic ring and may be any one of Formulae VII~IX described in connection with FIG. 6B. Furthermore, R' has been described in conjunction with FIG. 6B.

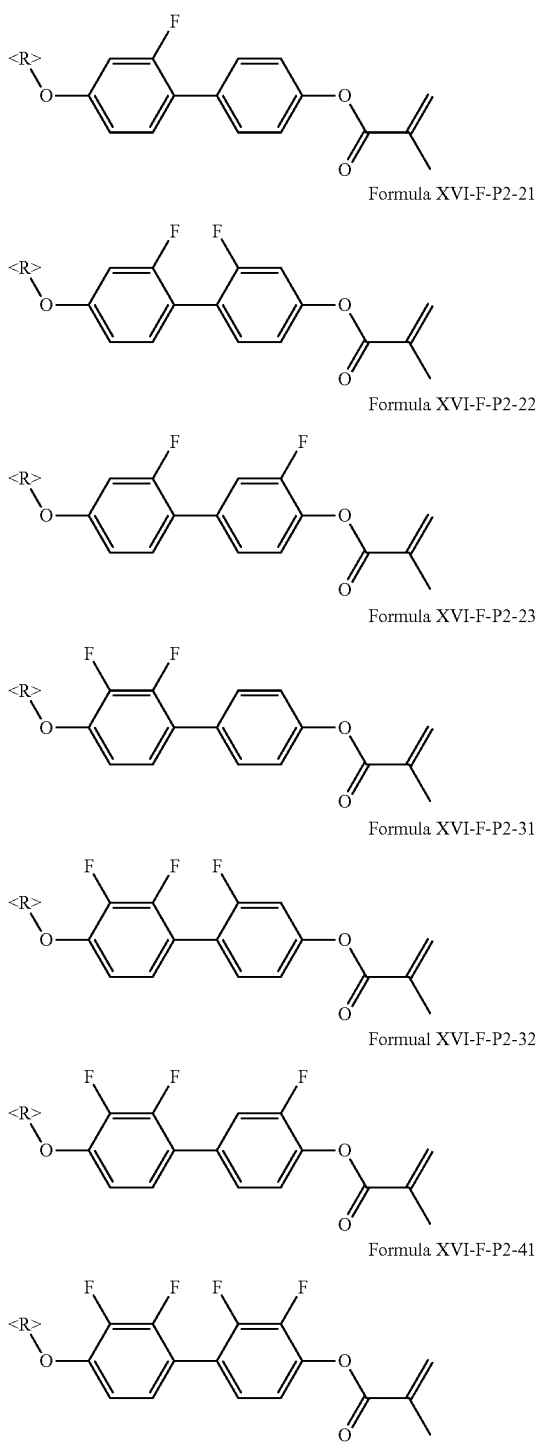

Formula XVI-F-P2-11

Formula XVI-F-P2-21

Formula XVI-F-P2-22

Formula XVI-F-P2-23

Formula XVI-F-P2-31

Formual XVI-F-P2-32

Formula XVI-F-P2-41

Here, P2 has negative electricity characteristics, as fluorine atoms (F) are bonded to the benzene.

The mono-methacrylic fluorinated benzenediamine monomer is expressed by the following Formula XVII-F.

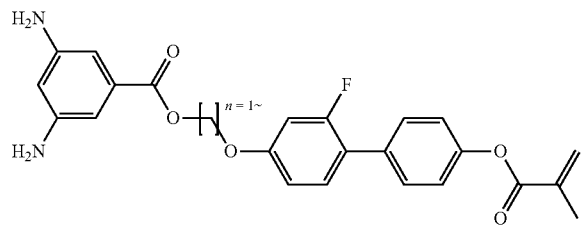

Formula XVII-F where n may be an integer of 1~6.

The mono-methacrylic fluorinated benzenediamine monomer may be manufactured in such a manner that if a mono-methacrylic hydroxy fluorinated biphenyl intermediate and a bromoalkyl benzenediamine derivative are mixed in a polar solvent, a hydroxy group of the biphenyl intermediate makes a neucleophilic attack on a bromo group of the diamine derivative, causing the bromo group to deviate therefrom. The mono-methacrylic hydroxy fluorinated biphenyl intermediate may be synthesized by an esterification reaction once methacrylic chloride and dihydroxy fluorinated biphenyl are mixed in the polar solvent.

The alkylated aromatic diamine-based monomer is the same as the material described in connection with FIG. 6B. The alkylated aromatic diamine-based monomer contained in the surface alignment reactant 10 is a vertical alignment monomer. The alkylated aromatic diamine-based monomer may have non-polar characteristics.

The aromatic diamine-based monomer is the same as the material described in connection with FIG. 6B. The aromatic diamine-based monomer causes the polymer contained in the surface alignment reactant 10 to be soluble in the solvent.

The aliphatic ring substituted aromatic diamine-based monomer is the same as the material described in connection with FIG. 6B. The aliphatic ring substituted aromatic diamine-based monomer is a vertical alignment monomer that vertically aligns liquid crystal molecules 31 with respect to the lower and upper display panels 100 and 200.

The aromatic epoxide-based monomer is the same as the material described in connection with FIG. 6B. Since the aromatic epoxide-based monomer forms a crosslinking structure, it enables combination of a dianhydride-based monomer and a diamine-based monomer, or enables combination of the dianhydride-based monomer and the dianhydride-based monomer with the diamine-based monomer. The aromatic epoxide-based monomer enhances film properties, heat resistance and chemical resistance.

The surface alignment reactant 10 having negative electricity characteristics may contain a photoinitiator. The photoinitiator may be the same as that described above, or may be α-hydroxyketone (Irgacure-127, Ciba, Switzerland), methyl benzoylformate (Irgacure-754, Ciba, Switzerland), acrylophosphine oxide (Irgacure-819, Ciba, Switzerland), Titanocene (Irgacure-784, Ciba, Switzerland), α-aminoacetophenone (Irgacure-369, Ciba, Switzerland), α-aminoketone (Irgacure-379, Ciba, Switzerland), α-hydroxyketone (Irgacure-2959, Ciba, Switzerland), oxime ester (Irgacure-OXE01, Ciba, Switzerland), oxime ester (Irgacure-OXE02, Ciba, Switzerland), or acrylophosphine oxide (Irgacure-TPO, Ciba, Switzerland).

The surface alignment reactant 10 having negative electricity characteristics according to an exemplary embodiment of the present invention may contain the reactive mesogen having negative electricity characteristics, with which chlorine atoms (Cl) or chlorine molecules (Cl2) are bonded.

The surface alignment reactant 10 having negative electricity characteristics according to an exemplary embodiment of the present invention may include a compound in which the dianhydride-based monomer and the diamine-based monomer are chemically bonded.

The surface alignment reactant 10 according to an exemplary embodiment of the present invention may be made by combination of the crosslinker and the surface alignment reactant 10 having negative electricity characteristics.

The surface alignment reactant 10 according to an exemplary embodiment of the present invention may be a mixture of the reactive mesogen having negative electricity characteristics and the material forming the main alignment layer.

In accordance with an exemplary embodiment of the present invention, in some regions, the surface alignment reactant 10 may be applied to directly contact the spacer 250, the color filter 230, or the insulating layer 140.

The applied surface alignment reactant 10 having negative electricity characteristics is heated by the aforementioned primary heating process. During the primary heating process, monomers of the reactive mesogen constituting the surface alignment reactant 10 and the vertical alignment component forming the main alignment layer are aligned in a direction perpendicular to the lower layer of 10. In addition, the reactive mesogen molecules linked to a side chain of the material constituting the surface alignment reactant 10 may be on the surface of the surface alignment reactant 10. During the primary heating, the surface alignment reactant 10 having negative electricity characteristics may not undergo the phase separation described in connection with FIG. 8C.

After the primary heating, the surface alignment reactant 10 having negative electricity characteristics is heated by the aforesaid secondary heating process. During the secondary heating, the solvent of the surface alignment reactant 10 is vaporized and the crosslinker forms a crosslinking structure, thereby forming the main alignment layer.

After the secondary heating, the surface alignment reactant 10 having negative electricity characteristics is cleaned by DIW and may be further cleaned by IPA. After the cleaning, the surface alignment reactants 10 are dried.

After the drying, a sealant is formed on the lower display panel 100. As in the foregoing methods, the sealant is formed on the outer region of the lower display panel 100, or may be formed on the inner region of the lower display panel 100 or the upper display panel 200 so that it may partially overlap the surface alignment reactant 10. The sealant may be the aforementioned material, and may be hardened by UV having a wavelength of about 300 nm to about 400 nm, or by the below-stated visible ray having a wavelength of about 400 nm or more.

After the drying, an upper-plate common voltage applying point (not shown) and a liquid crystal layer 3 are formed on the upper display panel 200 in the aforementioned method corresponding thereto.

After the sealant and the liquid crystal layer 3 are formed, the lower and upper display panels 100 and 200 are assembled by the sealant in a vacuum chamber.

After the assembly, the sealant, as described above, is hardened about 80% by being exposed to UV having a wavelength of about 300 nm to about 400 nm, or to a visible ray having a wavelength of about 400 nm or more.

Thereafter, the sealant undergoes thermal curing for about 70 minutes at about 100° C.

After the bonding, to improve the fuzziness and uniformity of liquid crystal molecules 31, the lower and upper display panels 100 and 200 are annealed in a chamber at about 100° C. to about 120° C. for about 60 minutes to about 80 minutes.

After the annealing, voltages are supplied to the pixel electrode 191 and the common electrode 270 of the display panels 100 and 200 by the DC voltage supply or multi-step voltage supply described in connection with FIGS. 7A and 7B. The process in which an electric field is formed in the liquid crystal layer 3 is also similar to that described in connection with FIGS. 7A and 7B. The reactive mesogen having no negative electricity characteristics is aligned to be tilted in the electric field through interaction with liquid crystal molecules 31. However, since the reactive mesogen molecules according to an exemplary embodiment of the present invention have negative electricity characteristics, they are aligned to be tilted in the electric field together with the liquid crystal molecules 31. Therefore, it may be good that the reactive mesogen having negative electricity characteristics can be aligned more easily and uniformly tilted.

While the liquid crystal molecules 31 and the reactive mesogen polymers are aligned in a specific tilt angle, the field exposure process is performed, in which light is irradiated to the liquid crystal display panel assembly 300. Since the method in which the field exposure process and the photo hardening layers 35 and 36 form a pre-tilt angle of the liquid crystal molecules 31 is substantially similar to that of the aforementioned step S254, a description thereof is made in brief.

If UV is incident while the reactive mesogen polymers and the liquid crystal molecules 31 are aligned to be tilted, the reactive mesogen is hardened in a direction substantially similar to that of the surrounding liquid crystal molecules 31 by the incident UV. How the acrylate reactive group of the reactive mesogen is crosslinked or hardened by UV to form the photo hardening layers 35 and 36 has been described above. The reactive mesogen hardened while being aligned, forms the photo hardening layers 35 and 36 on the main alignment layer, and the liquid crystal molecules 31 adjacent to the photo hardening layers 35 and 36 have a pre-tilt angle by the hardened reactive mesogen. The main alignment layer formed in the secondary heating process and the photo hardening layers 35 and 36 formed by the photo hardening process form the alignment film (See FIGS. 21A and 21B).

The aforesaid fluorescence exposure process may be performed in accordance with an exemplary embodiment of the present invention.

The manufactured liquid crystal display panel assembly 300 has characteristics of the SC-VA mode described in connection with FIG. 6B, and has the photo hardening layers 35 and 36 having a more uniform pre-tilt angle. In other words, compared with conventional non-polar photo hardening layers, the photo hardening layers 35 and 36 according to an exemplary embodiment of the present invention can uniformly form a pre-tilt angle of the liquid crystal molecules 31. In addition, during driving of the liquid crystal display device, the photo hardening layers having negative electricity characteristics are controlled by the electric field formed in the liquid crystal layer 3 and the controlled photo hardening layers control the liquid crystal molecules 31, increasing the response time of the liquid crystal molecules 31. As a result, the liquid crystal display device according to an exemplary embodiment of the present invention can reduce the occurrence of a texture and improve video features due to its high-speed driving. In addition, since the reactive mesogen has negative electricity characteristics, the photo hardening layers 35 and 36 may be formed by a low exposure voltage.

In accordance with an exemplary embodiment of the present invention, a polymer of vertical alignment components forming the main alignment layer 33/34, for example, an alkylated aromatic diamine-based monomer constituting a diamine-based monomer may have negative electricity characteristics. The vertical alignment polymer having negative electricity characteristics facilitates fast movement of liquid crystal molecules 31, which are controlled by an electric field. As a result, the liquid crystal display device having this vertical alignment polymer may have a fast response time.

In accordance with an exemplary embodiment of the present invention, the monomers forming the photo hardening layers 35 and 36 or the monomers of the vertical alignment components forming the main alignment layer 33/34 may have positive electricity characteristics. The alignment layer having positive electricity characteristics has the same effect as the aforementioned alignment layer having negative electricity characteristics.

In accordance with an exemplary embodiment of the present invention, the monomers forming the photo hardening layers 35 and 36 or the monomers of the vertical alignment components forming the main alignment layer 33/34 may have negative or positive dielectric anisotropic characteristics. The negative or positive dielectric anisotropic characteristics may occur due to the inclusion of a material which is polarized by the electric field formed in the liquid crystal layer 3. The alignment layer having negative or positive dielectric anisotropic characteristics has the same effect as the aforesaid alignment layer having negative electricity characteristics.

Now, a description will be made of characteristics of the liquid crystal display device having negative electricity characteristics, which is manufactured by the just described method. The alignment layer having negative electricity characteristics is formed by the surface alignment reactant 10 having the reactive mesogen with which fluorine atoms (F) are bonded.

To manufacture the liquid crystal display device, the surface alignment reactant 10 having negative electricity characteristics includes a tricyclo-hexyl dianhydride of about 49 mol % as an alicyclic dianhydride-based monomer, a monomethacrylic fluorinated benzenediamine of about 1 mol % as a photo-reactive fluorinated diamine-based monomer, a mono-alkylated phenylcyclohexy benzenediamine of about 15 mol % as an alkylated aromatic diamine-based monomer, a terphenyl diamine of about 30 mol % as an aromatic diamine-based monomer, a cholesteryl benzenediamine of about 4 mol % as an aliphatic ring substituted aromatic diamine-based monomer, and a hexaepoxy benzene derivative of about 1 mol % as an aromatic epoxide-based monomer. Mol % of each component is its mol % in the surface alignment reactant 10, and a solvent is not involved in the composition ratio of the surface alignment reactant 10.

The structure of the pixels PX of the liquid crystal display device was substantially the same as the structure of those in FIG. 3. The width of the micro branches 197 of the pixel electrode 191 was about 3 μm, and the cell spacing in the liquid crystal layer 3 was about 3.6 μm. The exposure voltage was about 20V, and UV intensity in the field exposure process was about 6.55 J/cm$^2$. UV intensity applied to the fluorescence exposure process was about 0.15 mW/cm$^2$, and the light irradiation time was about 40 minutes. The liquid crystal display device was operated by charge sharing-based 1G1D driving described above in conjunction with FIG. 11.

The liquid crystal display device with the alignment layer having negative electricity characteristics according to an exemplary embodiment of the present invention had the texture of an allowable level, and showed good quality without the occurrence of texture even at high-speed driving of 240 hz.

An alignment film of the liquid crystal display device according to an exemplary embodiment of the present invention has rigid vertical alignment side-chains. The rigid vertical alignment side-chains are contained in the main alignment layers 33 and 34 of the alignment films 291 and 292. The main alignment layers 33/34 having the rigid vertical alignment side-chains prevent the liquid crystal molecules 31 from being excessively pre-tilted around the alignment films. If the liquid crystal molecules 31 are excessively pre-tilted in the vicinity of the alignment films, the liquid crystal display device has light leakage defects in black images, reducing its contrast ratio or image clarity. The alignment films having rigid vertical alignment side-chains, which are manufactured in accordance with an exemplary embodiment of the present invention, reduce the light leakage defects of the liquid crystal display device and improve the image quality thereof.

This exemplary embodiment is different from the aforesaid method of manufacturing alignment films having negative electricity characteristics in terms of the material constituting the surface alignment reactant 10 and the structure of the rigid vertical alignment components linked to the side chains. In addition, intensity of the UV irradiated to the liquid crystal display panel assembly 300 may be higher than that in the SC-VA mode-based methods described above in connection with FIG. 6B. Since certain features of this exemplary embodiment are substantially similar to those in the aforesaid method for manufacturing the alignment films having negative electricity characteristics, duplicate descriptions thereof are simplified or omitted. However, other features of this exemplary embodiment will be described in detail, such as the material constituting the surface alignment reactant 10, the structure of the vertical alignment components, and the intensity of the UV irradiated to the liquid crystal display panel assembly 300.

Now, a process of forming an alignment film having rigid vertical alignment components will be described in detail. As described above, the surface alignment reactant 10 having rigid vertical alignment components is applied onto the pixel electrode 191 and the common electrode 270.

The surface alignment reactant 10 having rigid vertical alignment components is a compound in which the light hardener having a photo-reactive monomer and the material having rigid vertical alignment components that form the main alignment layer are chemically bonded. The light hardener is at least one material selected from the aforementioned photo-reactive polymer, reactive mesogen, photopolymerization material, photo-isomerization material, and a compound or mixture thereof, and the light hardener forms the photo hardening layers 35 and 36 by being hardened. In addition, the light hardener may be linked to a side chain of the material forming the main alignment layer 33/34. As stated above, the material forming the main alignment layer 33/34 is a vertical alignment material that aligns the liquid crystal molecules 31 in a direction perpendicular to the surface of the substrates 110 and 210 or the pixel electrode 191. The material forming the main alignment layer 33/34 according to an exemplary embodiment of the present invention may be a compound of the below-stated alicyclic dianhydride-based monomer and alkylated aromatic diamine-based monomer. The alkylated aromatic diamine-based monomer makes the vertical alignment rigid, and may have a plate-type cyclic ring bonded to the benzene. The material forming the main alignment layer 33/34 may contain an aromatic diamine-based monomer or a crosslinker. In addition, the material forming the main alignment layer 33/34 may be the aforesaid surface main alignment material 33a.

Now, the surface alignment reactant 10 having side chains of the rigid vertical alignment components will be described in detail. The surface alignment reactant 10 forming the alignment films with the rigid vertical alignment side-chains may be a polymer containing a dianhydride-based monomer such as an alicyclic dianhydride-based monomer, a diamine-based monomer such as a photo-reactive diamine-based monomer, an alkylated aromatic diamine-based monomer, and an aromatic diamine-based monomer, and a crosslinker such as aromatic epoxide-based monomer.

The surface alignment reactant 10 having side chains of the rigid vertical alignment components according to an exemplary embodiment of the present invention is a mixture in which a polyimide-based compound and a crosslinker are mixed. The polyimide-based compound is a compound in which a dianhydride-based monomer and a diamine-based monomer are chemically bonded. As described above, the polyimide-based compound may be manufactured by an imidization reaction of monomers included in the dianhydride-based monomer and the diamine-based monomer. The monomers constituting the diamine-based monomer, e.g., a photo-reactive diamine-based monomer, an alkylated aromatic diamine-based monomer, and an aromatic diamine-based monomer are mixed before the imidization reaction.

The surface alignment reactant 10 forming the alignment films with the rigid vertical alignment side-chains, contains the alicyclic dianhydride-based monomer which may be about 38 mol % to about 48 mol %, more preferably about 43 mol %, the photo-reactive diamine-based monomer which may be about 5 mol % to about 11.5 mol %, more preferably about 8.5 mol %, the alkylated aromatic diamine-based monomer which may be about 3.5 mol % to about 9.5 mol %, more preferably about 6.5 mol %, the aromatic diamine-based monomer which may be about 23 mol % to about 33 mol %, more preferably about 28 mol %, and the aromatic epoxide-based monomer which may be about 1lmol % to about 17 mol %, more preferably about 14 mol %. The solvent is not involved in the mol % composition ratio of the surface alignment reactant 10.

The alicyclic dianhydride-based monomer causes the polymer contained in the surface alignment reactant 10 to be soluble in the solvent, and it enhances electro-optical characteristics, e.g., a VHR, of the alignment films and reduces an RDC voltage. In terms of the chemical structure, the alicyclic dianhydride-based monomer may be a cyclobutyl dianhydride-based monomer expressed by the following Formula XVI-RCA.

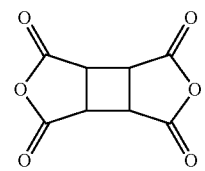

Formula XVI-RCA

The photo-reactive diamine-based monomer contains a reactive mesogen, and forms the photo hardening layers 35 and 36 by being hardened by UV. In addition, the photo-reactive diamine-based monomer serves to determine a pre-tilt angle of the photo hardening layers 35 and 36, and a pre-tilt angle of the liquid crystal molecules 31 near the photo hardening layers 35 and 36. In terms of the chemical structure, the photo-reactive diamine-based monomer may be a monomer expressed by the following Formula XVI-RC or XVI-RA, and more specifically a monomer expressed by Formula XVI-RC1, XVI-RC2, XVI-RC3, XVI-RC4, XVI-RA1, XVI-RA2, XVI-RA3, XVI-RA4, XVI-RA5 or XVI-RA6.

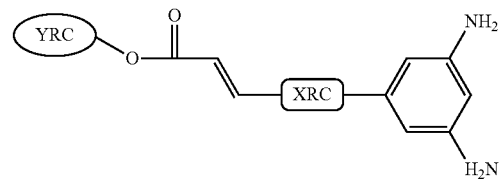

Formula XVI-RC

In this formula, XRC may be any one of alkyl, ether, ester, phenyl, cyclohexyl, and phenyl ester, and YRC may be any one of alkyl, phenyl, biphenyl, cyclohexyl, bicyclohexyl, and phenyl-cyclohexyl.

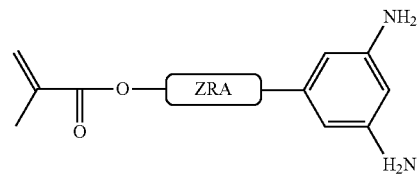

Formula XVI-RA

In this formula, ZRA may be any one of alkyl, alkyl ether (n-O), alkyl ester, alkyl phenyl ester, alkyl phenyl ether, alkyl biphenyl ester, alkyl biphenyl ether, phenyl ether, phenyl ether alkyl, biphenyl ether, biphenyl ether alkyl, cyclohexyl alkyl, bicyclohexyl alkyl, and cyclohexyl alkyl ester.

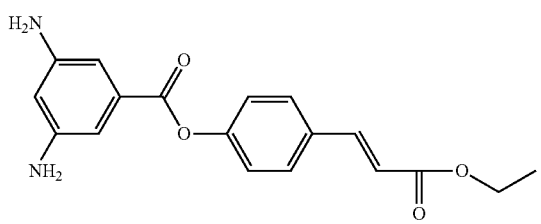

Formula XVI-RC1

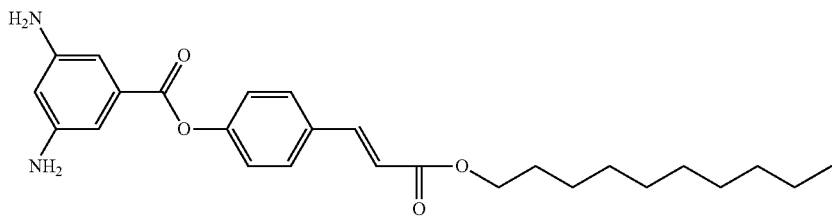
Formula XVI-RC2
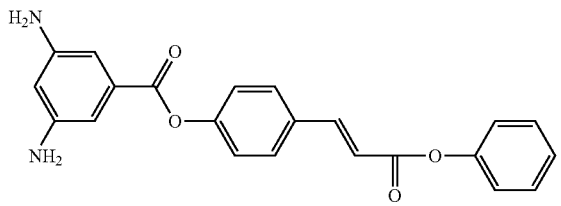
Formula XVI-RC3
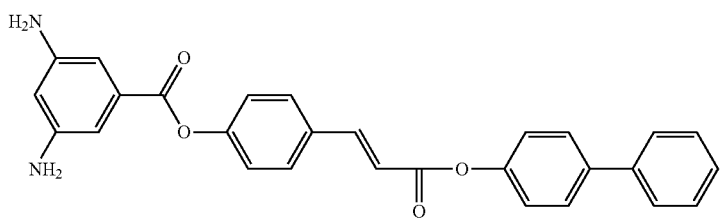
Formula XVI-RC4
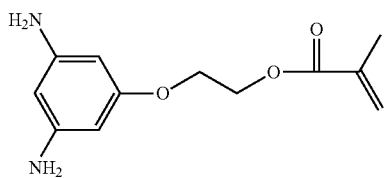
Formula XVI-RA1
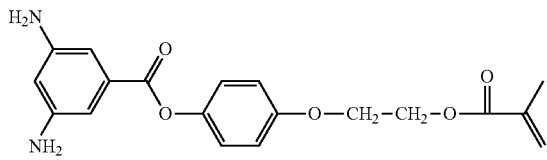
Formula XVI-RA2
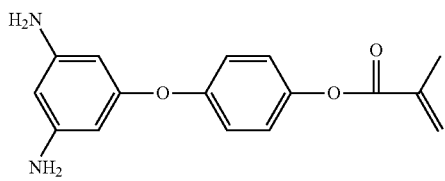
Formula XVI-RA3
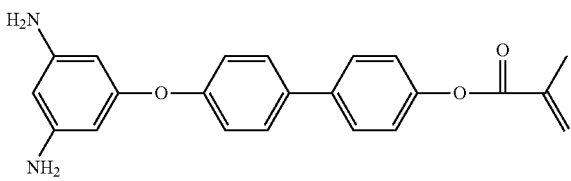
Formula XVI-RA4
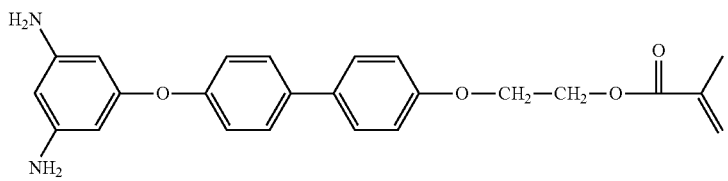
Formula XVI-RA5
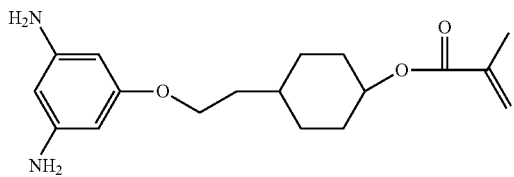
Formula XVI-RA6

The photo-reactive diamine-based monomer may be a decyl cinnamoyl benzenediamine monomer or a mono-methacrylic benzenediamine monomer. The decyl cinnamoyl benzenediamine monomer may be manufactured by mixing a decyl cinnamoyl phenol intermediate and a diamino benzoyl chloride derivative in a polar solvent, and then performing an esterification reaction on the mixture. The decyl cinnamoyl phenol intermediate may be manufactured by mixing hydroxy benzene cinnamoyl chloride and decyl alcohol in a polar solvent, and then performing an esterification reaction on the mixture. The mono-methacrylic benzenediamine monomer may be manufactured by mixing a hydroxy alkyl benzenediamine derivative and a methacrylic chloride in a polar solvent, and then performing an esterification reaction on the mixture.

In accordance with another exemplary embodiment of the present invention, a photo-reactive diamine-based monomer may be an acryl-cinnamoyl hybrid benzenediamine expressed by Formula XVI-RD. An acryl-cinnamoyl hybrid benzenediamine monomer has both an acrylate reactive group and a cinnamate reactive group. The acrylate reactive group makes side chains crosslink, and the cinnamate reactive groups are linked to each other, thereby increasing a pre-tilt angle.

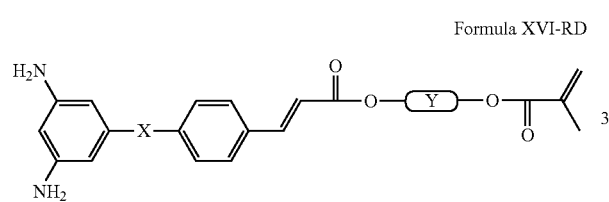

Formula XVI-RD where X may be any one of an alkyl group having one to ten carbon (C) atoms, ether and ester, and Y may be any one of alkyl, phenyl, biphenyl, cyclohexyl, bicyclohexyl, and phenyl-cyclohexyl.

The alkylated aromatic diamine-based monomer is a monomer of vertical alignment components. The cyclic ring bonded to the benzene makes the vertical alignment rigid. Liquid crystal molecules adjacent to the alkylated aromatic diamine-based molecules are aligned in a vertical direction. The cyclic ring may be plate-type molecules. In terms of the chemical structure, the alkylated aromatic diamine-based monomer may be octadecyl cyclohexyl benzenediamine expressed by Formula XVIII-RCA1 or alkyl substituted aliphatic aromatic benzenediamine expressed by Formula XVIII-RCA2.

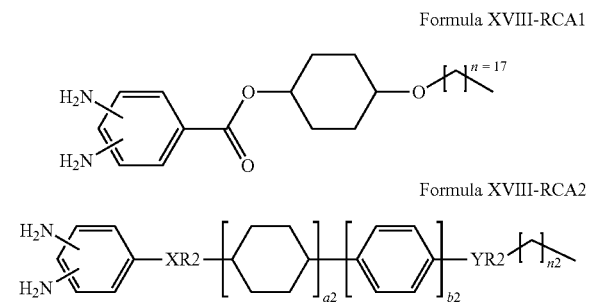

Formula XVIII-RCA1

Formula XVIII-RCA2

In formula XVIII-RCA2, XR2 may be ether or ester, YR2 may be ether, n2 may be 10~20, a2 and b2 may be 0~3, and a2 and b2 do not both become 0.

The octadecyl cyclohexyl benzenediamine monomer may be manufactured by mixing an octadecyl cyclohexanol intermediate and a diamino benzoyl chloride derivative in a polar solvent, and then performing an esterification reaction on the mixture. The octadecyl cyclohexanol intermediate may be manufactured in such a manner that bromooctadecane and cyclohexanediol are mixed in a polar solvent and in this mixture, a hydroxyl group of the cyclohexanediol makes a neucleophilic attack on a bromo group of the bromooctadecane, causing the bromo group to deviate therefrom.

The aromatic diamine-based monomer causes the polymer contained in the surface alignment reactant 10 to be soluble in the solvent. In terms of the chemical structure, the aromatic diamine-based monomer may be diphenyl diamine expressed by Formula VI-RCA.

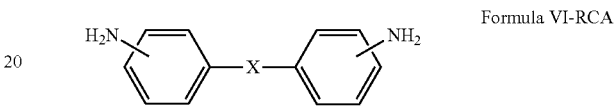

Formula VI-RCA where X may be a aliphatic compound.

The aromatic epoxide-based monomer forms a crosslinking structure, thereby improving thermal stability and chemical resistance. In terms of the chemical structure, the aromatic epoxide-based monomer may be an epoxy benzene derivative expressed by Formula XIII-RCA.

Formula XIII-RCA

The aforesaid photoinitiator may be added to the surface alignment reactant 10. Unlike the surface alignment reactant 10 having negative electricity characteristics, the surface alignment reactant 10 having rigid vertical alignment components may not have the polymer having negative electricity characteristics.

The applied surface alignment reactant 10 having rigid vertical alignment components is primarily heated by the aforementioned primary heating method. While being primarily heated, the alkylated aromatic diamine-based monomer is aligned in perpendicular to the lower layer of 10, and the alkylated aromatic diamine-based monomer constituting the surface alignment reactant 10 and consisting of reactive mesogen components constituting the photo-reactive diamine-based monomer and vertical alignment components forms the main alignment layer. During the primary heating, the surface alignment reactant 10 may not undergo phase separation described above in connection with FIG. 8C.

After undergoing the primary heating, the surface alignment reactant 10 is secondarily heated by one of the aforesaid secondary heating methods. During the secondary heating, the solvent of the surface alignment reactant 10 is vaporized. In the secondary heating, side chains of the reactive mesogen may be formed on the surface of the surface alignment reactant 10. After the secondary heating, the surface alignment reactant 10 is cleaned and dried by the aforementioned cleaning and drying methods.

After the drying, a sealant is formed by an aforementioned method corresponding thereto. As described above, the sealant may be hardened in UV having a wavelength of about 300 nm to about 400 nm, or in light having a wavelength of about 400 nm or more. Thereafter, in accordance with the aforementioned methods corresponding thereto, an upper-plate common voltage applying point (not shown) and a liquid crystal layer are formed, and the lower and upper display panels 100 and 200 are assembled. The sealant is hardened by light or heat as described above.

The assembled display panels are annealed by the aforementioned methods corresponding thereto, and provided with voltages by the DC voltage supply or multi-step voltage supply.

While liquid crystal molecules 31 and reactive mesogens are aligned in a specific tilt angle by the supplied voltage, the field exposure process is performed on the assembled liquid crystal display panel assembly 300 by the aforementioned field exposure method. Unlike the method of forming alignment films having negative electricity characteristics, the reactive mesogens may be aligned in a specific tilt angle through interaction with the liquid crystal molecules 31. The UV irradiated to the liquid crystal display panel assembly 300 having rigid vertical alignment components according to an exemplary embodiment of the present invention may be greater in intensity than the aforementioned UV. In accordance with an exemplary embodiment of the present invention, the intensity of UV irradiated to the liquid crystal display panel assembly 300 while an electric field is formed in the liquid crystal layer 3, may be about 6 $J/cm^2$ to about 17.5 $J/cm^2$, more preferably about 12 $J/cm^2$. The reactive mesogen is hardened by light, forming the photo hardening layers 35 and 36 on the main alignment layer 33/34, and as described above, the photo hardening layers 35 and 36 have a pre-tilt angle. However, since the main alignment layer 33/34 according to an exemplary embodiment of the present invention has the rigid vertical alignment components, the pre-tilt angle of the photo hardening layers 35 and 36 may be small. The small pre-tilt angle of the photo hardening layers 35 and 36 reduces the light leakage in black images, improving the image quality and contrast ratio of the liquid crystal display device.

Thereafter, the aforementioned fluorescence exposure process may be performed.

Through this process, the surface alignment reactant 10 having rigid vertical alignment components forms the alignment films, manufacturing the liquid crystal display panel assembly 300. The alignment films having rigid vertical alignment side-chains, manufactured according to an exemplary embodiment of the present invention, may reduce the black light leakage defects of the liquid crystal display device.

The liquid crystal display device with the alignment films 291 and 292 including the main alignment layers 33 and 34 having rigid vertical alignment side-chains is manufactured according to an exemplary embodiment of the present invention. The surface alignment reactant 10 having rigid vertical alignment side-chains includes a cyclobutyl dianhydride of about 43 mol % as an alicyclic dianhydride-based monomer, a mono-methacrylic benzenediamine of about 8.5 mol % as a photo-reactive diamine-based monomer, an octadecyl cyclohexyl benzenediamine of about 6.5 mol % as an alkylated aromatic diamine-based monomer, a diphenyl diamine of about 28 mol % as an aromatic diamine-based monomer, and an epoxy benzene derivative of about 14 mol % as an aromatic epoxide-based monomer. Mol % of each component is its mol % in the surface alignment reactant 10, and the solvent is not involved in the composition ratio of the surface alignment reactant 10.

The liquid crystal display panel assembly 300 was manufactured according to the just mentioned method. The structure of the pixels PX of the liquid crystal display device was substantially similar to the structure of those in FIG. 3. The cell spacing in the liquid crystal layer 3 was about 3.6 μm, the width of the micro branches 197 of the pixel electrode 191 was about 3 μm, the exposure voltage was about 7.5V, about 10V, about 20V, about 30V and about 40V by the DC voltage supply, and UV intensity in the field exposure process was about 7 $J/cm^2$, about 9 $J/cm^2$, about 11 $J/cm^2$, about 12 $J/cm^2$ and about 15 $J/cm^2$. The manufactured liquid crystal display device was operated by charge sharing-based 1G1D driving described above in conjunction with FIG. 11.

A response time of the manufactured liquid crystal display device was about 0.01 second to about 0.014 seconds, and a black afterimage thereof showed a good level of approximately 2.

The surface alignment reactant 10 forming the alignment films according to an exemplary embodiment of the present invention has a compound in which a light hardener and a crosslinker are bonded. The surface alignment reactant 10 is formed, with the light hardener bonded to the crosslinker, thus reducing the non-hardened light hardener remaining in the process of manufacturing the liquid crystal display panel assembly 300. The non-hardened light hardener increases an RDC in the liquid crystal display device, causing the image-sticking defect. The alignment films manufactured by the surface alignment reactant 10 having a compound of the light hardener and the crosslinker according to an exemplary embodiment of the present invention, reduce the afterimage, or persistence, of the liquid crystal display device.

The current exemplary embodiment of the present invention is substantially similar to the aforesaid method of manufacturing the liquid crystal display panel assembly 300 with the alignment films 291 and 292 having negative electricity characteristics, except for the material constituting the surface alignment reactant 10 and that the crosslinker bonded to the light hardener is linked to side chains of the main alignment layer 33/34. Duplicate descriptions will be simplified or omitted.

Now, a detailed description will be made of a process of forming alignment films with a compound of a light hardener and a crosslinker. By the aforementioned methods corresponding thereto, the surface alignment reactant 10 having a compound of the light hardener and the crosslinker, is applied onto the lower display panel 100 with the pixel electrode 191 and the upper display panel 200 with the common electrode 270.

The compound of the light hardener and the crosslinker forms the surface alignment reactant 10 by being mixed with the material forming the main alignment layer. The light hardener is chemically bonded to the crosslinker, thus reducing the occurrence of ionic impurities. The light hardener may be the aforementioned photo-reactive polymer, reactive mesogen, light hardener, photopolymerization material, or photo-isomerization material, and the light hardener forms photo hardening layers. The material forming the main alignment layer may be one of the aforesaid materials for doing such, and it aligns the liquid crystal molecules 31 in a direction perpendicular to the surface of the substrates 110 and 210 or the pixel electrode 191.

Now, a detailed description will be made of the material of the surface alignment reactant 10 having a compound of a light hardener and a crosslinker. The surface alignment reactant 10 having a compound of a light hardener and a crosslinker according to an exemplary embodiment of the present invention is a mixture in which a polyimide-based compound and a crosslinker are mixed. The polyimide-based compound is a compound in which a dianhydride-based monomer and a diamine-based monomer are chemically bonded. As described above, the polyimide-based compound may be manufactured by an imidization reaction of monomers included in the dianhydride-based monomer and the diamine-based monomer. The monomers constituting the diamine-based monomer, e.g., an alkylated aromatic diamine-based monomer and an aromatic diamine-based monomer are mixed before the imidization reaction.

The light hardener according to an exemplary embodiment of the present invention is a reactive mesogen. Therefore, the surface alignment reactant 10 having a compound of a reactive mesogen and a crosslinker may be a polymer containing a dianhydride-based monomer such as an alicyclic dianhydride-based monomer, a diamine-based monomer such as an alkylated aromatic diamine-based monomer and aromatic diamine-based monomer, and a crosslinker such as an aromatic acryl-epoxide-based monomer. The aromatic acryl-epoxide-based monomer according to an exemplary embodiment of the present invention is a compound in which a reactive mesogen and a crosslinker are bonded.

The surface alignment reactant 10 having a compound of a reactive mesogen and a crosslinker, includes the alicyclic dianhydride-based monomer which may be about 31 mol % to about 41 mol %, more preferably about 36 mol %, the alkylated aromatic diamine-based monomer which may be about 3 mol % to about 9 mol %, more preferably about 6 mol %, the aromatic diamine-based monomer which may be about 25 mol % to about 35 mol %, more preferably about 30 mol %, and the aromatic acryl-epoxide-based monomer which may be about 23 mol % to about 33 mol %, more preferably about 28 mol %. The solvent is not involved in the mol % composition ratio of the surface alignment reactant 10.

The alicyclic dianhydride-based monomer causes the polymer contained in the surface alignment reactant 10 to be soluble in the solvent, and it improves electro-optical characteristics, e.g., a VHR, of the alignment films and reduces an RDC voltage. In terms of the chemical structure, the alicyclic dianhydride-based monomer may be a cyclobutyl dianhydride monomer expressed by the foregoing Formula XVI-RCA.

The alkylated aromatic diamine-based monomer is a monomer of vertical alignment components. A cyclic ring bonded to the benzene makes the vertical alignment rigid. The cyclic ring may be plate-type molecules. In terms of the chemical structure, the alkylated aromatic diamine-based monomer may be octadecyl cyclohexyl benzenediamine expressed by the foregoing Formula XVIII-RCA1 or alkyl substituted aliphatic aromatic benzenediamine expressed by the foregoing Formula XVIII-RCA2.

The aromatic diamine-based monomer causes the polymer contained in the surface alignment reactant 10 to be soluble in the solvent. In terms of the chemical structure, the aromatic diamine-based monomer may be diphenyl diamine expressed by the foregoing Formula VI-RCA.

The aromatic acryl-epoxide-based monomer improves thermal stability and chemical resistance by forming a crosslinking structure, and forms photo hardening layers having a pre-tilt angle by being hardened by UV. The aromatic acryl-epoxide-based monomer is a compound in which epoxy molecules, or a crosslinker, and acrylate molecules, or a light hardener, are chemically bonded. The combination of the light hardener and the crosslinker may reduce the occurrence of ionic impurities. In terms of the chemical structure, the aromatic acryl-epoxide-based monomer may be an acryl-epoxy hybrid benzene derivative expressed by the following Formula XIII-C.

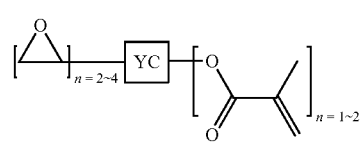

Formula XIII-C where YC may be a phenyl derivative.

The acryl-epoxy hybrid benzene derivative may be manufactured by mixing an epoxy substituted phenol derivative and a methacrylic chloride in a polar solvent, and then performing an esterification reaction on the mixture.

The aforesaid photoinitiator may be added to the surface alignment reactant 10. Unlike the surface alignment reactant 10 having negative electricity characteristics, the surface alignment reactant 10 having a compound of a light hardener and a crosslinker may not have the polymer having negative electricity characteristics.

After being applied, the surface alignment reactant 10 having a compound of a reactive mesogen and a crosslinker is primarily heated by the aforementioned primary heating method. While being primarily heated, monomers of the reactive mesogen components and the vertical alignment components forming the main alignment layer are aligned in perpendicular to the lower layer of 10. During the primary heating, the surface alignment reactant 10 having a compound of a reactive mesogen and a crosslinker may not undergo phase separation described above in connection with FIG. 8C.

After undergoing the primary heating, the surface alignment reactant 10 is secondarily heated by the aforementioned secondary heating method. The solvent of the surface alignment reactant 10 is vaporized by the secondary heating. In addition, the crosslinker bonded to the reactive mesogen is linked to a side chain of the polymer forming the main alignment layer. Therefore, side chains of the reactive mesogen are formed on the surface of the surface alignment reactant 10.

After the secondary heating, the surface alignment reactant 10 is cleaned and then dried by an aforementioned cleaning and drying method. After the drying, a sealant is formed by one of the aforementioned sealing methods. As described above, the sealant may be hardened in UV having a wavelength of about 300 nm to about 400 nm, or in light having a wavelength of about 400 nm or more. Thereafter, in accordance with the aforementioned methods corresponding thereto, an upper-plate common voltage applying point (not shown) and a liquid crystal layer are formed, and the lower and upper display panels 100 and 200 are assembled. The sealant is hardened by light or heat as described above.

Figure 7A:
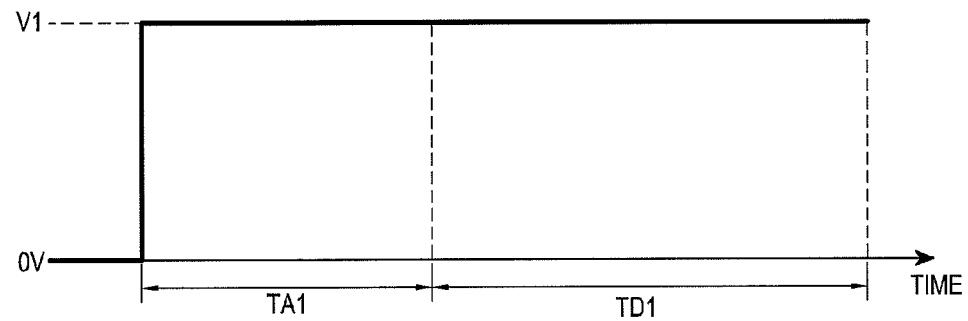
FIG. 7A is a diagram illustrating a waveform for supplying a Direct Current (DC) voltage to a liquid crystal display panel assembly, according to an exemplary embodiment of the present invention.
Figure 7B:
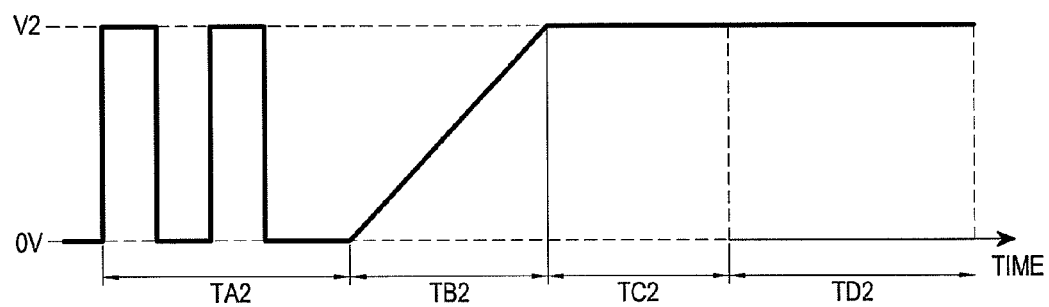
FIG. 7B is a diagram illustrating a waveform for supplying a multi-step voltage to a liquid crystal display panel assembly, according to an exemplary embodiment of the present invention.

The assembled display panels are annealed by the aforementioned annealing methods, and provided with voltages by the DC voltage supply or multi-step voltage supply of FIG. 7A or 7B. The process in which an electric field is formed in the liquid crystal layer 3 is substantially similar to the aforementioned process corresponding thereto. Unlike the method of forming the alignment films having negative electricity characteristics, the vertically aligned reactive mesogen is aligned to be tilted in the electric field through interaction with liquid crystal molecules 31. While the liquid crystal molecules 31 and the reactive mesogens are aligned in a specific tilt angle by the supplied voltage, the field exposure process is performed on the assembled liquid crystal display panel assembly 300 by the aforementioned field exposure method. An acrylate reactive group of the reactive mesogen is hardened by light to form a network among reactive mesogen monomers. The reactive mesogen formed as a network forms the photo hardening layers 35 and 36 having a pre-tilt angle on the main alignment layer 33/34. The photo hardening layer according to an exemplary embodiment of the present invention, e.g., reactive mesogen, is bonded to the crosslinker, thus significantly reducing the non-hardened reactive mesogen and the occurrence of ionic impurities. In addition, the combination of the reactive mesogen and the crosslinker reduces the ionic impurities and the RDC, contributing to the improved persistence of the liquid crystal display device.

Thereafter, the aforementioned fluorescence exposure process may be performed.

By doing so, the surface alignment reactant 10 having a compound of a reactive mesogen and a crosslinker forms the alignment films, manufacturing the liquid crystal display panel assembly 300. The alignment films manufactured by the compound bonded to the crosslinker according to an exemplary embodiment of the present invention can reduce the persistence defect of the liquid crystal display panel.

The alignment films 291 and 292 formed by the surface alignment reactant 10 having a compound of a reactive mesogen and a crosslinker according to an exemplary embodiment of the present invention were manufactured, and the liquid crystal display device having them was manufactured. In accordance with an exemplary embodiment of the present invention, the surface alignment reactant 10 forming the alignment films contained a cyclobutyl dianhydride of about 36 mol % as an alicyclic dianhydride-based monomer, an octadecyl cyclohexyl benzenediamine of about 6 mol % as an alkylated aromatic diamine-based monomer, a diphenyl diamine of about 30 mol % as an aromatic diamine-based monomer, and an acryl-epoxy hybrid benzene derivative of about 28 mol % as an aromatic acryl-epoxide-based monomer. Mol % of each component is its mol % in the surface alignment reactant 10, and the solvent is not involved in the composition ratio of the surface alignment reactant 10.

The liquid crystal display panel assembly 300 was manufactured according to the just mentioned method. The structure of the pixels PX of the liquid crystal display device was substantially similar to the structure of those in FIG. 3. The cell spacing in the liquid crystal layer 3 was about 3.6 μm, the width of the micro branches 197 of the pixel electrode 191 was about 3 μm, the exposure voltage was about 30V, about 40V and about 50V by the DC voltage supply, and UV intensity in the field exposure process was about 9 J/cm$^2$, about 12 J/cm$^2$ and about 17 J/cm$^2$. The manufactured liquid crystal display device was operated by charge sharing-based 1G1D driving described above in conjunction with FIG. 11.

The manufactured liquid crystal display device was operated for about 336 hours, and its black afterimage showed a good level of approximately 2 or less.

The surface alignment reactant 10 forming the alignment films according to another exemplary embodiment of the present invention has a compound in which an inorganic-based material and a light hardener are bonded. In other words, the surface alignment reactant 10 consisting of an inorganic-based material bonded to a light hardener is used to form the alignment films.

Unlike the organic-based material, the inorganic-based material forming alignment films does not absorb ionic impurities in the liquid crystal, has small changes in physical properties, and is not oxidized or does not generate ionic impurities at a high temperature. Thus, the alignment films formed by the inorganic-based material bonded to the light hardener not only have small changes in physical properties and a photo hardening layer having a stable pre-tilt angle, but reduce the persistence and stains of the liquid crystal display device despite a long operating time and do not reduce a VHR. In addition, the inorganic-based material can form the alignment films even at a low temperature, making it possible to select various materials forming a lower layer of the alignment films. The inorganic-based material may be an orthosilicate-based monomer or a siloxane-based monomer. An alignment film formed of the organic-based material reduces the VHR and generates afterimages, stains and a DC voltage because a lot of non-imidized carboxy groups absorb ionic impurities in the liquid crystal. Herein, imidization refers to performing thermal cyclodehydration on polyamic acid obtained by conducting condensation polymerization on the dianhydride and the aromatic diamine.

The current exemplary embodiment of the present invention is substantially similar to the aforesaid method of manufacturing the liquid crystal display panel assembly 300 with the alignment films 291 and 292 having negative electricity characteristics, except for the material constituting the surface alignment reactant 10 and the secondary heating for forming the main alignment layer 33/34. Duplicate descriptions will be simplified or omitted.

The surface alignment reactant 10 having a compound of an inorganic-based material and a light hardener is applied by the aforementioned methods (corresponding thereto) on the lower display panel 100 with the pixel electrode 191 and the upper display panel 200 with the common electrode 270. The inorganic-based material and the light hardener may be chemically bonded. The surface alignment reactant 10 according to another exemplary embodiment of the present invention may be deposited on the pixel electrode 191 and the common electrode 270 by vapor deposition such as Chemical Vapor Deposition (CVD).

Now, a material of the surface alignment reactant 10 having a compound of an inorganic-based material and a light hardener will be described in detail. The surface alignment reactant 10 having a compound of an inorganic-based material and a light hardener according to an exemplary embodiment of the present invention is a compound in which an alkyl alcohol-based monomer and a vinyl alcohol-based monomer included in an orthosilicate-based monomer and an alkoxide-based monomer are chemically bonded. The surface alignment reactant 10 may be manufactured in such a manner that if the orthosilicate-based monomer, alkyl alcohol-based monomer and vinyl alcohol-based monomer are mixed in a polar solvent and the mixture is stirred with water (H2O) consisting of acid or base catalysts, then hydroxyl groups of the alkyl alcohol-based monomer and the vinyl alcohol-based monomer make a neucleophilic attack on silicon atoms of the orthosilicate, causing a hydrolysis condensation polymerization.

The inorganic-based material according to an exemplary embodiment of the present invention is the orthosilicate-based monomer. Therefore, the surface alignment reactant 10 having a compound of an inorganic-based material and a light hardener may be a polymer consisting of an orthosilicate-based monomer of about 30 mol % to about 60 mol %, more preferably about 44 mol %, and an alkoxide-based monomer of about 40 mol % to about 70 mol %, more preferably about 56 mol %, including a light hardener. The orthosilicate-based monomer may be a tetraalkoxy orthosilicate monomer. The alkoxide-based monomer may consist of an alkyl alcohol-based monomer of about 1 mol % to about 10 mol %, more preferably about 6 mol %, and a light hardener of about 40 mol % to about 60 mol %, more preferably about 50 mol %. The solvent is not involved in the mol % composition ratio of the surface alignment reactant 10. The monomer including the light hardener according to an exemplary embodiment of the present invention may be at least one material selected from a vinyl alcohol-based monomer, an acryl-based monomer, a cinnamoyl-based monomer, and mixtures or compounds thereof.

The orthosilicate monomer forms a main chain of the main alignment layer, causes the polymer contained in the surface alignment reactant 10 to be soluble in the solvent, and increases electro-optical characteristics, e.g., a VHR, of the alignment films. The orthosilicate monomer according to an exemplary embodiment of the present invention may be a tetraalkoxy orthosilicate monomer. In terms of the chemical structure, the tetraalkoxy orthosilicate monomer may be a tetraethyl orthosilicate-based monomer, an alkyl-based monomer, or a hydroxyl-based monomer expressed by the following Formula XIX-T1.

Formula XIX-T1

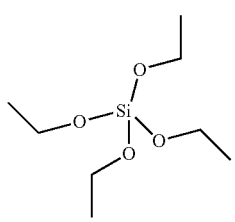

The orthosilicate-based monomer according to an exemplary embodiment of the present invention may be a polysiloxane-based polymer prepared by polymerizing silane compounds or alkoxy silane compounds.

The alkyl alcohol-based monomer is a monomer of vertical alignment components linked to side chains of the orthosilicate-based polymer constituting the main chain. Therefore, the alkyl alcohol-based monomer may contain a long alkyl-based polymer. In terms of the chemical structure, the alkyl alcohol-based monomer may be a dodecanol-based monomer expressed by the following Formula XIX-A1, a cholesteric group-based monomer expressed by Formula XIX-A2 (below), an alkylated alicylic-based monomer expressed by Formula XIX-A3 (below), and an alkylated aromatic-based monomer or alkyl-based monomer expressed by Formula XIX-A4 (below).

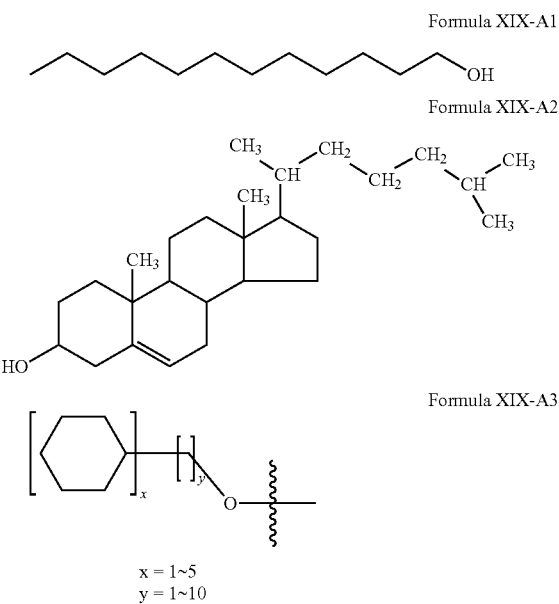

Formula XIX-A1

Formula XIX-A2

Formula XIX-A3

$x = 1\sim5$
$y = 1\sim10$

Formula XIX-A4

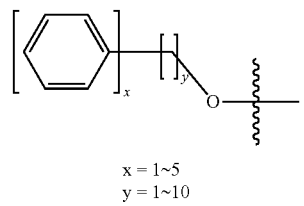

$x = 1\sim5$
$y = 1\sim10$

The vinyl alcohol-based monomer, which is a vinyl-based monomer, forms a photo hardening layer having a pre-tilt angle by being hardened by UV. The vinyl alcohol-based monomer is linked to a side chain of the orthosilicate-based polymer constituting the main chain. In terms of the chemical structure, the vinyl alcohol-based monomer may be a hybroxyalkyl acrylate-based monomer expressed by Formula XIX-V1 (below), or an alkylated vinyl-based monomer expressed by Formula XIX-V2 (below).

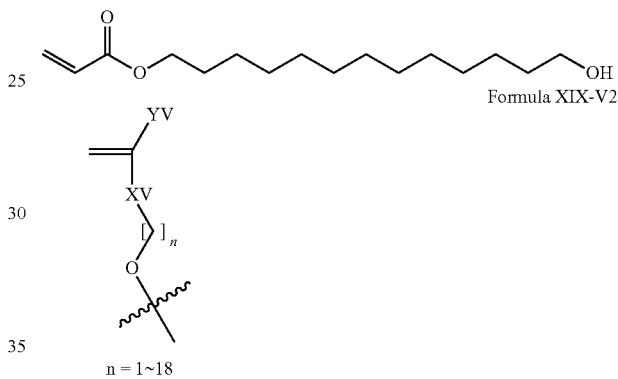

Formula XIX-V1

Formula XIX-V2

$n = 1\sim18$ where XV may be alkyl, ether or ester, and YV may be methyl or hydrogen.

The cinnamoyl-based monomer is linked to a side chain of the orthosilicate-based polymer constituting the main chain, and forms a photo hardening layer having a pre-tilt angle by being hardened by UV. The hybroxyalkyl acrylate-based monomer may be manufactured by mixing alkanediol and acrylic chloride in a polar solvent, and then performing an esterification reaction on the mixture.

In terms of the chemical structure, the cinnamoyl-based monomer may be an alkylated cinnamoyl-based monomer expressed by Formula XIX-C1 (below).

Formula XIX-C1

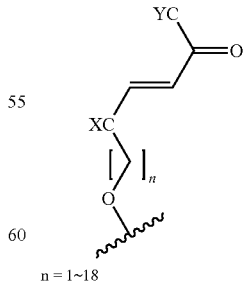

$n = 1\sim18$ where XC may be any one of alkyl, ether, ester, phenyl, cyclohexyl, and phenyl ester, and YC may be any one of alkyl, phenyl, biphenyl, cyclohexyl, bicyclohexyl, and phenyl-cyclohexyl.

The light hardener may be the aforementioned photo-reactive polymer, reactive mesogen, light hardener, photopolymerization material, or photo-isomerization material. The aforementioned photoinitiator may be added to the surface alignment reactant 10 having a compound of an inorganic-based material and a light hardener.

The applied surface alignment reactant 10 having a compound of an inorganic-based material and a light hardener is primarily heated by the aforementioned primary heating method. While being primarily heated, the alkyl alcohol-based molecules of vertical alignment components linked to side chains of the orthosilicate-based monomer and the light hardener forming the photo hardening layers 35 and 36 are aligned in perpendicular to the lower layer of 10. During the primary heating, the applied surface alignment reactant 10 having a compound of an inorganic-based material and a light hardener may not undergo phase separation as described above in connection with FIG. 8C.

After undergoing the primary heating, the surface alignment reactant 10 is secondarily heated at a temperature lower than the aforementioned secondary heating temperature, e.g., at about 150° C. to about 200° C., more preferably at about 180° C. The secondary heating may be performed for about 1000 seconds to about 1400 seconds, more preferably for about 1200 seconds. Because of the low secondary heating temperature, the material constituting the lower layer of the surface alignment reactant 10 may be selected from a wide range of materials. A color filter material formed on the bottom of the surface alignment reactant 10 according to an exemplary embodiment of the present invention may be dye that can be processed at a low temperature. During the secondary heating, the solvent of the surface alignment reactant 10 is vaporized, and the orthosilicate-based monomer constituting the main chain and the alkyl alcohol-based monomer of vertical alignment components linked to side chain, form the main alignment layer 33/34. The main alignment layer 33/34 formed by the surface alignment reactant 10 having a compound of an inorganic-based material and a light hardener, does not absorb ionic impurities, and is not oxidized or does not generate ionic impurities at a high temperature, thus reducing afterimages and stains of the liquid crystal display device and increasing a VHR.

After the secondary heating, the surface alignment reactant 10 having a compound of an inorganic-based material and a light hardener is cleaned and dried by an aforementioned cleaning and drying method. The surface alignment reactant 10 according to an exemplary embodiment of the present invention is not deteriorated in material properties by the cleaning or drying process.

After the drying, a sealant is formed by one of the aforementioned sealing methods. As described above, the sealant may be hardened in UV having a wavelength of about 300 nm to about 400 nm, or in light having a wavelength of about 400 nm or more. Next, in accordance with the aforementioned methods corresponding thereto, an upper-plate common voltage applying point (not shown) and a liquid crystal layer are formed, and the lower and upper display panels 100 and 200 are assembled. The sealant is hardened by light or heat as described above.

The assembled display panels are annealed by one of the aforementioned annealing methods, and provided with voltages by the DC voltage supply or multi-step voltage supply of FIGS. 7A and 7B. The process in which an electric field is formed in the liquid crystal layer is substantially similar to the aforementioned electric-field forming process. Unlike the method of forming the alignment films having negative electricity characteristics, the vertically aligned light hardener or reactive mesogen is aligned to be tilted in the electric field through interaction with liquid crystal molecules 31. While the liquid crystal molecules and the reactive mesogens are aligned in a specific tilt angle by the supplied voltage, the field exposure process is performed on the assembled liquid crystal display panel assembly by an aforementioned field exposure method. The UV intensity in the field exposure process may be about 6 J/cm$^2$ to about 20 J/cm$^2$, more preferably about 12 J/cm$^2$.

An acrylate reactive group of the reactive mesogen is hardened by light to form a network among reactive mesogen monomers. The reactive mesogen formed as a network forms the photo hardening layers 35 and 36 having a pre-tilt angle on the main alignment layer 33/34. The main alignment layer 33/34 and the photo hardening layer 35/36 formed in the pre-process form the alignment film. The photo hardening layer 35/36 formed by the surface alignment reactant 10 having a compound of an inorganic-based material and a light hardener shows excellent reliability and stability because of the combination with the inorganic-based material.

Thereafter, the aforementioned fluorescence exposure process may be performed.

By doing so, the surface alignment reactant 10 having a compound of an inorganic-based material and a light hardener, forms the alignment films consisting of the main alignment layers 33 and 34 and the photo hardening layers 35 and 36, thereby manufacturing the liquid crystal display panel assembly 300 having the alignment films.

The alignment films formed by the surface alignment reactant 10 having a compound of an inorganic-based material and a light hardener according to an exemplary embodiment of the present invention have photo hardening layers having a stable pre-tilt angle, and the alignment films show excellent thermal resistance, long-term reliability, chemical resistance, and uniformity. In addition, the surface alignment reactant 10 having a compound of an inorganic-based material and a light hardener may reduce the time for manufacturing the liquid crystal display device, since it needs no additional process because of its excellent electrostatic elimination properties.

The alignment layers 291 and 292 formed by the surface alignment reactant 10 having a compound of an inorganic-based material and a light hardener according to an exemplary embodiment of the present invention were manufactured, and the liquid crystal display device having them was manufactured. The surface alignment reactant 10 forming the alignment films according to an exemplary embodiment of the present invention contained a tetraalkoxy orthosilicate-based monomer of about 44 mol % as a tetraalkoxy orthosilicate-based monomer, a dodecanol-based monomer of about 6 mol % as an alkyl alcohol-based monomer, and a hybroxyalkyl acrylate-based monomer of about 50 mol % as a vinyl alcohol-based monomer. Mol % of each component is for the surface alignment reactant 10, with a solvent excluded.

The liquid crystal display panel assembly 300 was manufactured according to the just mentioned method. The structure of the pixels PX of the liquid crystal display device was substantially similr to the structure of those in FIG. 3. The cell spacing in the liquid crystal layer 3 was about 3.6 μm, the width of the micro branches 197 of the pixel electrode 191 was about 3 μm, the exposure voltage was about 20V or about 24V by the DC voltage supply, and UV intensity in the field exposure process was about 5 J/cm$^2$, about 10 J/cm$^2$, and about 20 J/cm$^2$. The manufactured liquid crystal display device was operated by charge sharing-based 1G1D driving described above in conjunction with FIG. 11.

In the manufactured liquid crystal display device, the VHR was about 90.5% or more, the ion density was about 5 pC/cm$^2$ or less, and the black afterimage showed a good level of about 2.5 in a 168-hour operation.

The surface alignment reactant 10 (See FIGS. 8A, 8B, 8C and 8D) forming an alignment film according to an exemplary embodiment of the present invention is a mixture of inorganic materials in which functional groups are bonded. In one embodiment, the alignment film containing an inorganic-based material has an excellent adhesion with the lower layer, a low adhesion with ionic impurities remaining in the liquid crystal layer, and a high reliability when used in an oxidizing atmosphere at a high temperature for an extended period of time.

Materials of the surface alignment reactant 10 can be manufactured by mixing inorganic-based compounds in which functional groups are bonded and such a manufacturing process is described in detail below. The surface alignment reactant 10 in which inorganic-based compounds are mixed is a mixture of a first surface alignment compound (not shown) containing a first inorganic-based material and a second surface alignment compound (not shown) containing a second inorganic-based material. In accordance with an embodiment of the present invention, the first inorganic-based material and the second inorganic-based material can be siloxane. The first surface alignment compound may have functional groups that increase the reliability and material properties of the alignment film. The second surface alignment compound can have various functional groups that align liquid crystal molecules. The functional groups are described below. Examples of suitable solvents capable of mixing the first and second surface alignment compounds include one or more of hexylene glycol (HG), butyl cellosolve (BCS), 1,3-butane diol (1,3-BD), and propylene glycol monobutyl ether and the like. The solvent may include materials different from the above-described materials capable of dissolving the first and second surface alignment compounds. In one embodiment, the sum of the first and second surface alignment compounds included in the surface alignment reactant 10 can be from about 2% by weight (herein after 2 wt %) to about 4 wt %, and the corresponding percentage by weight of solvent can be from about 96 wt % to about 98 wt %. In another embodiment, the first and second surface alignment compounds are mixed at a weight ratio of (from about 6 to 8 of first alignment compound):(about 2 to 4 of second surface alignment compound), or in a second alternative mixture the ratio can be about 7 to about 3. The solvent is not included in these weight ratios. In one embodiment, the solvent contained in the surface alignment reactant 10 may contain hexylene glycol (HG) at about 45 wt % to about 65 wt %, butyl cellosolve (BCS) at about 10 wt % to about 30 wt %, and propylene glycol monobutyl ether at about 15 wt % to about 35 wt %. In another embodiment, the solvent contained in the surface alignment reactant 10 contains hexylene glycol (HG) at about 25 wt % to about 45 wt %, butyl cellosolve (BCS) at about 8 wt % to about 28 wt %, 1,3-butane diol (1,3-BD) at about 3 wt % to about 11 wt %, and propylene glycol monobutyl ether at about wt 30% to about 50 wt %. In still another embodiment, the surface alignment reactant 10 contains a first surface alignment compound at about 2.1 wt %, a second surface alignment compound at about 0.9 wt %, an hexylene glycol (HG) at about 65 wt %, butyl cellosolve (BCS) at about 30 wt %, and 1,3-butane diol (1,3-BD) at about 5 wt %. Because the surface alignment reactant 10 is a mixture of the first and second surface alignment compounds, In certain embodiments, the surface alignment reactant 10 may be easily phase-separated into a material containing the first surface alignment compound and a material containing the second surface alignment compound in the process of forming the alignment film.

The first surface alignment compound has the following Formula IM1 (see below), in which siloxane group monomers (i.e., inorganic-based materials) and functional groups IM-R6 are bonded. The first surface alignment compound can be stably coupled to the lower layer. Because the first surface alignment compound has characteristics of an inorganic material, the alignment films 291 (FIG. 9B) and 292 (shown as 34 and 36 in FIGS. 22A-G) containing the first surface alignment compound can have excellent reliability. The first surface alignment compound may be easily phase-separated from the second surface alignment compound having a different polarity in the below-described heating process, for example when it has the same polarity or other physicochemical properties as that of the lower layer, such as for example, hydrophilic properties or hydrophobic properties. In one embodiment, the functional groups IM-R6 included in the first surface alignment compound may be substantially hydrophilic. In another embodiment, the functional groups IM-R6 included in the first surface alignment compound may be substantially hydrophobic.

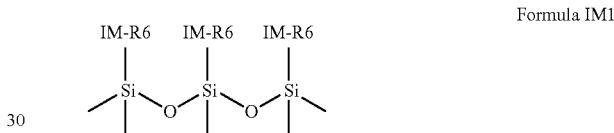

Formula IM1 wherein IM-R6 may contain an alkyl group monomer or an hydroxy group monomer, and the alkyl group monomer if present, can have from 1 to about 5 carbon atoms.

The first surface alignment compound may be synthesized as in the following Formula IM1-M1. The first surface alignment compound may be manufactured by mixing tetraethyl orthosilicate in tetrahydrofuran (THF), and then stirring this compound with water (H$_2$O) containing acid (e.g., hydrochloric acid (HCl)) or one or more base catalysts.

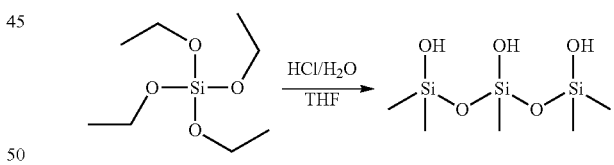

Formula IM1-M1

The second surface alignment compound will now be described in detail. In accordance with an exemplary embodiment of the present invention, the second surface alignment compound has the Formula IM2, in which siloxane group monomers (i.e., inorganic-based materials) and functional groups IM-T1, IM-T2 and IM-T3 are bonded. Each of the functional groups IM-T1, IM-T2 and IM-T3 may form a side chain by being bonded to the siloxane group monomer constituting the main chain.

The functional group IM-T1 is a vertical functional group capable of vertically aligning the liquid crystal molecules with respect to the lower layer. The functional group IM-T1 may interact with the liquid crystal molecules. The functional group IM-T2 can undergo polymerization by light (e.g., UV) or heat. The functional groups IM-T2 are pre-tilting functional groups capable of obliquely aligning the liquid crystal molecules by undergoing cross-linking, polymerization, or curing. The functional group IM-T3 is a functional group capable of improving the reliability of the alignment film formed of the second surface alignment compound, and of enhancing the material properties of the alignment film. In one embodiment, the second surface alignment compound includes the functional group IM-T1 from about 5 mol % to about 15 mol %;, and the functional group IM-T2 from about 40 mol % to about 60 mol %, and the functional group IM-T3 from about 30 mol % to about 50 mol %. In one embodiment the second surface alignment compound includes the functional group IM-T1 at about 10 mol %. In another embodiment the second surface alignment compound includes the functional group IM-T2 at about 50 mol %. In another embodiment the second surface alignment compound includes the functional group IM-T3 at about 40 mol %. The mol % of each functional group is its mol % in the second surface alignment compound with the siloxane and solvent excluded. The second surface alignment compound containing these various functional groups can be easily phase-separated in the process of forming the alignment film. These various functional groups align the liquid crystal molecules vertically or obliquely at a specific angle with respect to the lower layer, thus improving the display quality of the liquid crystal display device. The functional groups IM-T1 and IM-T2 contained in the second surface alignment compound may substantially have the hydrophobic properties. The second surface alignment compound may also include a photoinitiator as described above.

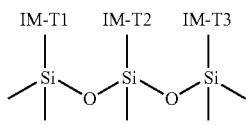

Formula IM2

The functional group IM-T1 may contain a monomer of the above-described vertical alignment component that vertically aligns the liquid crystal molecules in the liquid crystal layer. In one embodiment the functional group IM-T1 includes monomers according to at least one of the Formulae: XIX-A1, XIX-A2, XIX-A3 and XIX-A4. The functional group IM-T1 may contain an alkyl alcohol-based monomer having from about 5 to about 20 carbon atoms.

The functional groups IM-T2 may form a photo hardening layer having a pre-tilt angle by undergoing polymerization and cross-linking by light (e.g., UV) or heat energy in the process of forming the alignment film. In one embodiment the functional group IM-T2 contains one or more of the following groups: a vinyl group, an acrylic group, an acrylate group, a cinnamate group, and a methacrylate group. The vinyl group or the acrylic group may contain an aliphatic alkyl group having from about 1 to about 18 carbon atoms. The functional group IM-T2 may include monomers according one or more of the Formulae: XIX-V1, XIX-V2 and XIX-C1 (see above). The functional group IM-T2 may include one or more of the aforementioned photo-reactive polymer, reactive mesogen, light hardener, photopolymerization material, and photo-isomerization material.

In one non-limiting embodiment of the present invention, the functional group IM-T3 includes one or more of the functional groups IM-R6 listed above.

The second surface alignment compound may be synthesized as in the Formula IM2-M1 shown below. In one embodiment the second surface alignment compound can be formed by mixing a tetraethyl orthosilicate in a polar solvent (e.g., tetrahydrofuran (THF)), and then stirring this compound, a long alkyl, and an alkylated acrylate with water ($H_2O$) containing acid (e.g., hydrochloric acid (HCl)) or one or more base catalysts. The long alkyl group may serve as the functional group IM-T1. The acrylate group may serve as the functional group IM-T2. The second surface alignment compound may be manufactured by nucleophilic hydrolysis and condensation polymerization reactions.

Formula IM2-M1

A process of manufacturing the alignment films 291 (see FIG. 9B) and 292 (not shown) and the liquid crystal display panel assembly 300 using the above-described surface alignment reactant 10 manufactured by mixing the inorganic-based compounds in which functional groups are bonded will now be described in detail. In this embodiment the surface alignment reactant 10 includes the first surface alignment compound for enhancing the reliability and the material properties of the alignment film, and the second surface alignment compound having functional groups for aligning the liquid crystal molecules. The surface alignment reactant 10, in which the inorganic-based compounds are mixed, forms the alignment film of the liquid crystal display panel assembly 300 substantially according to the SC-VA mode-based method. A method of forming the alignment films 291 and 292 will be described in detail with reference to FIGS. 8A to 8E. Duplicate descriptions are either simplified or omitted. Differences between the SC-VA mode-based method and the method of forming the alignment film according to an embodiment of the present invention are described in detail below.

The lower display panel 100 with the pixel electrode 191 and the upper display panel 200 with the common electrode 270 can be manufactured according to any of the methods described above or as follows: A method of forming the alignment film using the above-described surface alignment reactant 10 manufactured by mixing the inorganic-based compounds in which functional groups are bonded will now be described in detail. To avoid duplicate descriptions, the method of forming the upper-plate alignment film 292 will be omitted, and only the method of forming the lower-plate alignment film 291 will be described.

Referring to FIG. 8A, the surface alignment reactant 10 manufactured by mixing the inorganic-based compounds in which functional groups are bonded, is formed on the pixel electrode 191 by the above-described methods.

Referring to FIG. 8B, the surface alignment reactant 10 containing the first and second surface alignment compounds is first heated according to the previously-described method. The solvent of the surface alignment reactant 10 is removed in the primary heating process.

Referring to FIG. 8C, the surface alignment reactant 10 is phase-separated into a surface inorganic layer 33a and a surface functional layer 35a. The surface inorganic layer 33a is in contact with the pixel electrode 191, while the surface functional layer 35a is in contact with the air. As the surface alignment reactant 10 is phase-separated, the surface inorganic layer 33a contains most of the first surface alignment compound while the surface functional layer 35a contains most of the second surface alignment compound. In the primary heating process, siloxanes contained in the surface inorganic layer 33a and the surface functional layer 35a are bonded, forming polysiloxanes. The polysiloxanes form the main chains in the surface inorganic layer 33a and the surface functional layer 35a. The functional groups IM-T1 contained in the surface functional layer 35a are disposed in contact with the air, and may be arranged perpendicularly to the surface of the substrate or the pixel electrode 191. The functional groups IM-T2 contained in the surface functional layer 35a may be disposed in contact with the air. The first surface alignment compound may have hydrophilic properties, while the second surface alignment compound may have hydrophobic properties.

Referring to FIGS. 8D and 8E, the phase-separated surface inorganic layer 33a and surface functional layer 35a are secondarily heated according to the above-described method. In the secondary heating process, the phase-separated surface inorganic layer 33a and surface functional layer 35a are hardened. The polysiloxanes contained in the surface inorganic layer 33a and the surface functional layer 35a additionally undergo cross-linking, forming a stable matrix. During the secondary heating process, the surface inorganic layer 33a forms a surface inorganic alignment layer 33. The polysiloxanes contained in the surface inorganic layer 33a may be cross-linked to the polysiloxanes contained in the surface functional layer 35a. In the secondary heating process, hydroxyl ions remaining in the surface inorganic layer 33a and the surface functional layer 35a may be removed. Reference numerals 33a, 33 and 35a are used to indicate different names, i.e., the surface inorganic layer 33a, the surface inorganic alignment layer 33, and the surface functional layer 35a, because they have partially different functions from those of the surface main alignment material layer 33a, the main alignment layer 33, and the surface light hardener layer 35a. In an alternative embodiment of the present invention, the primary heating process can be omitted, and the reactions described above with reference to the primary and secondary heating processes occur in the secondary heating process.

Thereafter, the surface inorganic alignment layer 33 or the surface functional layer 35a are washed in deIonized water (DIW), and may be further cleaned by isopropyl alcohol (IPA). After the cleaning, the surface inorganic alignment layer 33 or the surface functional layer 35a is dried.

In step S240, as described above, the sealant, the upper-plate common voltage applying point, and the liquid crystal layer 3 are formed, and the lower display panel 100 and the upper display panel 200 are assembled. The assembled lower and upper display panels 100 and 200 may be annealed according to the method described above.

In step S250, an exposure voltage is applied and light is irradiated to the assembled lower and upper display panels 100 and 200, forming a surface functional hardening layer 35. The surface inorganic alignment layer 33 and the surface functional hardening layer 35 form the lower-plate alignment film 291. A surface inorganic alignment layer 34 and the surface functional hardening layer 36 included in the upper-plate alignment film 292 may be formed according to the method described above, or as follows:

One embodiment of the method of forming the surface functional hardening layer 35 will be described in detail below with reference to step S250. In step S252, an electric field is applied to the liquid crystal layer 3. The electric field is formed in the liquid crystal layer 3 according to the methods described with reference to step S152. In step S254, a field exposure process is performed, in which light is irradiated to the assembled lower and upper display panels 100 and 200 while an electric field is formed in the liquid crystal layer 3. The field exposure process may also optionally be performed according to the above-described method.

In the field exposure process, the functional groups IM-T2 contained in the surface functional layer 35a are cured. The cured functional groups IM-T2 may then form the surface functional hardening layer 35. The functional groups IM-T2 are cured to be tilted in the substantially same direction as that of their near liquid crystal molecules 31 by the incident UV in the method described above with reference to FIGS. 9A and 9B. The functional groups IM-T2 may form a network in which they are bonded to each other, by undergoing polymerization. For example, a double bond of alkenes contained in the functional groups IM-T2 may be activated by UV, making it possible for the functional groups IM-T2 to form the network of cross-linking chains, and thereby being bonded to their adjacent functional IM-T2 groups. The liquid crystal molecules 31 adjacent to the functional groups IM-T2 may be arranged at a substantially constant pre-tilt angle by the hardened functional groups IM-T2. In one embodiment of the present invention, the liquid crystal molecules 31 are normally arranged at the substantially constant pre-tilt angle when an electric field is not applied to the liquid crystal layer 3 as described above. In another embodiment the average of the pre-tilt angles of the liquid crystal molecules 31 corresponds to the pre-tilt angle of the photo hardening layer. The pre-tilt angle may coincide with the tilt direction being parallel to the longitudinal direction of the micro branches 197 of the pixel electrode 191. The hardened functional groups IM-T2, the functional groups IM-T1 and the functional groups IM-T3 may be bonded to the side chains of the polysiloxanes formed by the siloxanes contained in the surface functional layer 35a. The above-described fluorescence exposure process is optional. The polysiloxanes formed by performing the primary and secondary heating on the second surface alignment compound may be formed on the polysiloxanes formed by the first surface alignment compound. As before, the fluorescence exposure process is optional. The upper-plate surface functional hardening layer 36 may be formed according to the method of forming the lower-plate surface functional hardening layer 35.

The liquid crystal display panel assembly 300 including the surface alignment reactant 10 manufactured by mixing inorganic-based compounds in which functional groups are bonded, may produced so as to have the characteristics of the SC-VA mode. The surface alignment reactant 10 may be easily phase-separated in the process of forming the alignment films 291 and 292, because it is a mixture of compounds bonded to the inorganic-based materials. Because the polymers that align the liquid crystal molecules vertically or at a pre-tilt angle are bonded to the inorganic-based materials, the manufactured liquid crystal display device may have a high VHR, preventing the display quality of the liquid crystal display device from deteriorating due to the ionic impurities.

Because the inorganic-based materials and the polymers having various functional groups are bonded (e.g., the second surface alignment compound), the process of eliminating the electrostatics is optional in the process of forming the alignment film, simplifying the method of manufacturing the liquid crystal display device.

In a particular embodiment of the present invention the surface alignment reactant 10 forming the alignment film has two or more light hardeners whose chain lengths are different thus increasing the cross-linking rate of the light hardeners.

Materials of the surface alignment reactant 10 containing light hardeners having different chain lengths will now be described in detail. The surface alignment reactant 10 containing light hardeners having different chain lengths is a mixture of a third surface alignment compound and a fourth surface alignment compound. The surface alignment reactant 10 may be easily phase-separated in the process of forming the alignment film because it is a mixture of surface alignment compounds with physicochemical properties that permit phase separation. The third surface alignment compound may enhance the reliability and the material properties of the alignment film, as for the first surface alignment compound. The fourth surface alignment compound contains various functional groups that align the liquid crystal molecules. The fourth surface alignment compound contains two different types of light hardeners having different chain lengths, as pre-tilting functional groups contained in the second surface alignment compound. The light hardeners having different chain lengths may increase their cross-linking rate in the process of forming the alignment film.

The third and fourth surface alignment compounds contained in the surface alignment reactant 10 may be mixed in a weight ratio selected from about 6 to about 8:2 to about 4, more preferably at the weight ratio of about 7:3. The solvent is not included in this weight ratio. The third and fourth surface alignment compounds and the solvent contained in the surface alignment reactant 10 may be composed at the ratio described above with reference to the first and second surface alignment compounds. At the composition ratio of the components, the first surface alignment compound may be replaced by the third surface alignment compound, while the second surface alignment compound may be replaced by the fourth surface alignment compound. The solvent may be the solvent that has been described above along with the materials of the surface alignment reactant 10 formed by mixing the compounds containing the inorganic-based materials. The third surface alignment compound has the Formula IM1 (shown above) or the Formula IM3 (see below). In Formula IM3, siloxane group monomers constituting the main chains and the functional groups IM-R6 and IM-M6 forming the side chains are bonded to each other. The third surface alignment compound having Formula IM3 for the siloxane group monomers may be stably coupled to the layer formed thereunder. The third surface alignment compound may contain functional groups IM-M6 of about 5 mol % to about 15 mol %, more preferably about 10 mol %, and functional groups IM-R6 of about 80 mol % to about 95 mol %, more preferably about 90 mol %. The mol % of each functional group is its mol % in the third surface alignment compound excluding the siloxane and solvent. The functional groups IM-M6 may be phase separation enhancers. The phase separation enhancer may facilitate phase separation by blocking the materials (e.g., silicon) contained in the third surface alignment compound and the materials (e.g., silicon) contained in the fourth surface alignment compound from being bonded in the compounds. The functional groups IM-M6 may reduce the density of the surface inorganic alignment layer formed by the third surface alignment compound, facilitating the alignment film rework. If the density of the surface inorganic alignment layer is reduced, the solvent used for the alignment film rework may more easily penetrate the surface inorganic alignment layer. The functional groups IM-M6 may include methyl groups. The functional groups IM-R6 have been described with reference to Formula IM1. The functional groups IM-M6 and IM-R6 contained in the third surface alignment compound may have substantially hydrophilic properties.

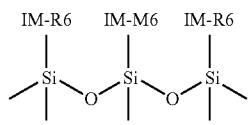

Formula IM3

The third surface alignment compound may be synthesized as in the following Formula IM1-M3. The third surface alignment compound may be manufactured by mixing tetraethyl orthosilicate in tetrahydrofuran (THF), and then stirring this compound and methyl group donors with water ($H_2O$) containing acid (e.g., hydrochloric acid (HCl)) or one or more base catalysts.

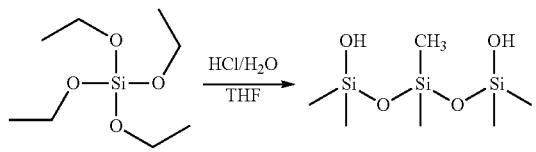

Formula IM1-M3

The fourth surface alignment compound will now be described in detail. The fourth surface alignment compound contains two different functional groups (e.g., hardeners), which are hardened by light or heat. The two functional groups, which can be hardened, have different chain lengths. The two functional groups, which can be hardened, may substantially serve as the pre-tilting functional groups, which have been described with reference to the second surface alignment compound. Thus, the pre-tilting functional groups contained in the fourth surface alignment compound have different chain lengths, thereby increasing the density and cross-linking rate of the pre-tilting functional groups contained in the fourth surface alignment compound. The increase in cross-linking rate of the hardeners or the pre-tilting functional groups may contribute to the improvement in the display quality of the liquid crystal display panel.

The fourth surface alignment compound has the following Formula IM4, in which siloxane group monomers constituting the main chains and functional groups IM-T1, IM-T2, IM-T21 and IM-T3 forming the side chains are bonded. The fourth surface alignment compound may contain functional groups IM-T1 of about 5 mol % to about 15 mol %, more preferably bout 10 mol %, functional groups IM-T2 of about 30 mol % to about 50 mol %, more preferably about 40 mol %, functional groups IM-T21 of about 5 mol % to about 15 mol %, more preferably about 10 mol %, and functional groups IM-T3 of about 30 mol % to about 50 mol %, more preferably about 40 mol %. The mol % of each functional group is its mol % in the fourth surface alignment compound excluding the siloxane and solvent. The functional groups IM-T1, IM-T2, and IM-T21 contained in the fourth surface alignment compound may have substantially hydrophobic properties.

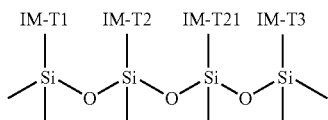

Formula IM4

The functional groups IM-T1, IM-T2 and IM-T3 have been described with reference to Formula IM2. The functional group IM-T21 is a pre-tilting functional group capable of polymerization or cross-linking by light (e.g., UV) or heat. The functional group IM-T21, like the aforementioned functional group IM-T2, may form a photo hardening layer having a pre-tilt angle in the process of forming the alignment film. The functional group IM-T21 may include one or more of the following groups: a vinyl group, a styrene group, a methacrylate group, a cinnamate group, and an acrylic group. The functional group IM-T21 may contain monomers according to one or more of the Formulae XIX-V1, XIX-V2 and XIX-C1. The functional group IM-T21 may include one or more of the following: a photo-reactive polymer, a reactive mesogen, a light hardener, a photopolymerization material, and a photo-isomerization material. The ratio of the mol % of the functional group IM-T2 to the functional group IM-T21, each having the characteristics of the pre-tilting functional groups contained in the fourth surface alignment compound, may be about 2 to about 10:1. The ratio of the mol % of the functional group IM-T1 having the characteristics of the vertical functional groups contained in the fourth surface alignment compound to the functional group IM-T21 having the characteristics of the pre-tilting functional groups contained in the fourth surface alignment compound, may be about 1 to about 3: about 1 to about 3. The mol % of the functional group IM-T1 having the characteristics of the vertical functional groups contained in the fourth surface alignment compound, the functional group IM-T21 having the characteristics of the pre-tilting functional groups contained in the fourth surface alignment compound, the functional group IM-T21 having the characteristics of the pre-tilting functional groups contained in the fourth surface alignment compound, to the phase separation enhancer contained in the fourth surface alignment compound may be about 1 to about 3: about 2 to about 10: about 1 to about 3: about 1 to about 3.

The fourth surface alignment compound may contain a photoinitiator (such as forinstance, a thiol group). The photoinitiator contained in the fourth surface alignment compound may contain alkylated thiol groups having 1 to 5 carbon atoms. The photoinitiator may be bonded to the side chains of the siloxane group monomers. The photoinitiator may facilitate hardening of the functional groups IM-T2 and IM-T21. The photoinitiator may improve the display quality of the liquid crystal display device because it can reduce radicals by reacting with any residual radical generated in the material and behaving like an insulating layer.

The functional groups IM-T2 and IM-T21 according to an exemplary embodiment of the present invention are described in detail below. The functional groups IM-T2 and IM-T21 include a curing agent (also referred to as a hardener). The chain length of the functional group IM-T2 is different from the chain length of the functional group IM-T21. The chain length of the functional group IM-T2 may be longer than the chain length of the functional group IM-T21, increasing the density of the functional groups or the hardeners capable of performing polymerization or cross-linking. In the process of performing polymerization or cross-linking by light or heat, the functional groups IM-T21 between the functional groups IM-T2 may facilitate the polymerization or cross-linking, increasing the cross-linking rate of the hardeners, i.e., the functional groups IM-T2 and IM-T21. The chain length is a sum of lengths of bonds linking the shortest chain from an alkene included in the functional group IM-T2 or IM-T21, to a silicon atom of the main silaoxane chain. In calculating the chain length, it is assumed that a bond length between any pair of atoms is the same. For example, it is assumed that the bonds between carbon atoms, the bonds between a carbon and an oxygen atom, and the bonds between a carbon and a silicon atom are the all of equal length. In one embodiment of the present invention, In one embodiment of the present invention the chain length of the functional group IM-T2 is about 3 times to about 7 times the chain length of the functional group IM-T21. When the chain length of the functional group IM-T2 is more than about 7 or more times the chain length of the functional group IM-T21, the force of aligning the liquid crystal molecules is reduced, causing the arrangement of the liquid crystal molecules to be irregular. The irregularity of the liquid crystal molecules may deteriorate the quality of the liquid crystal display device.

In another embodiment, the bonding number of the functional group IM-T2 is different from the bonding number of the functional group IM-T21. The bonding number of the functional group IM-T2 may be greater than the bonding number of the functional group IM-T21. The bonding number is the number of bonds cof the shortest cross-linker from a carbon atom originally of an alkene included in the functional group IM-T2 or IM-T21, to a silicon atom of the main siloxane chain.

In one embodiment, the bonding number of the functional group IM-T2 may be about 3 times to about 7 times the bonding number of the functional group IM-T21. If the single bonding number of the functional group IM-T2 is more than about 7 times the single bonding number of the functional group IM-T21, the force aligning the liquid crystal molecules is reduced, causing the arrangement of the liquid crystal molecules to be irregular.

In one embodiment, the number of spacer atoms included in the functional group IM-T2 is different from the number of spacer atoms included in the functional group IM-T21. The number of spacer atoms included in the functional group IM-T2 may be greter than the number of spacer atoms included in the functional group IM-T21. The number of spacer atoms included in the functional group IM-T2 may be about 2 times to about 5 times the number of spacer atoms included in the functional group IM-T21. The number of spacer atoms included in the functional group IM-T2 may be about 1 to about 5, and the number of spacer atoms included in the functional group IM-T21 may be any number from 1 to about 4. The spacer atoms may be in an alkyl group, wherein the number of spacer atoms is the number of carbon atoms. Alternatively, the functional group IM-T21 may include no spacer atoms.

In one embodiment, the functional group IM-T2 includes an alkylated methacrylate group, and the functional group IM-T21 includes a vinyl group. An alkyl group included in the alkylated methacrylate group may include about 2 to 4 carbon atoms. When the alkylated methacrylate group includes a $(CH_2)_3$ alkyl group bonded to the siloxane, the chain length of the functional group IM-T2 is about 6 times the unit length of the carbon-silicon bond, and the number of spacer (carbon) atoms is 3. When a vinyl group included in the functional group IM-T21 having no spacer is bonded to the siloxane, a carbon atom of the double bond of the vinyl group is bound directly to the silicon atom of the siloxane and the chain length of the functional group IM-T21 is therefore the length of the single carbon-silicon bond. Therefore, in this example, the chain length of the functional group IM-T2 is 6 times the chain length of the functional group IM-T21. In the functional group IM-T2 with the alkylated methacrylate group including the alkyl group of $(CH_2)_3$, the single bonding number between carbons is 3, the single bonding number between a carbon and an oxygen is 2, and the single bonding number between a carbon and a silicon is 1. In the functional group IM-T21 with the vinyl group, the single bonding number between a carbon and a silicon atom is 1. The single bonding number of the functional group IM-T2 is about 6 times the single bonding number of the functional group IM-T21. The functional groups IM-T2 and IM-T21 each have a curing function in the same or different material, and the chain length or the bonding number of the functional group IM-T2 is different from the chain length or the bonding number of the functional group IM-T21.

The fourth surface alignment compound may be synthesized as in the Formula IM2-M4 shown below. The fourth surface alignment compound may be formed by mixing tetraethyl orthosilicate in a polar solvent (e.g., tetrahydrofuran (THF)), and then stirring this compound with a long alkyl alcohol, a vinyl group, and an alkylated acrylate with water ($H_2O$) containing acid (e.g., hydrochloric acid (HCl)) or one or more base catalysts. The long alkyl group may serve as the functional group IM-T1. The acrylate group may serve as the functional group IM-T2. The vinyl group may serve as the functional group IM-T21. The hydroxyl group may serve as a functional group IM-T3. The fourth surface alignment compound may be formed by nucleophilic hydrolysis and condensation polymerization.

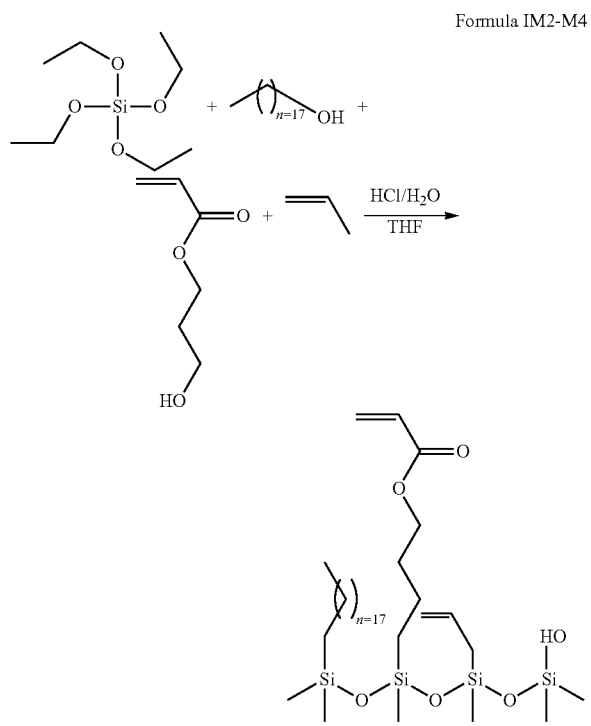

Formula IM2-M4

A process of manufacturing the alignment films 291 and 292, and the liquid crystal display panel assembly 300 using the surface alignment reactant 10 containing the pre-tilting functional groups having different chain lengths, is described in detail below. The surface alignment reactant 10 containing the pre-tilting functional groups (e.g., light hardeners) having different chain lengths forms the alignment film of the liquid crystal display panel assembly 300 substantially by the SC-VA mode-based method. This surface alignment reactant 10 may increase the cross-linking rate in the field exposure process.

A method of forming the alignment films 291 and 292 using the surface alignment reactant 10 containing the light initiators having different chain lengths is described below, based on the above-described method of forming the alignment films 291 and 292 using the surface alignment reactant 10 formed by mixing the inorganic-based compounds in which functional groups are bonded. Duplicate descriptions are simplified or omitted for convenience. To avoid duplicate descriptions, a method of forming the upper-plate alignment film 292 is omitted, and only the method of forming the lower-plate alignment film 291 is described.

The lower display panel 100 with the pixel electrode 191 and the upper display panel 200 with the common electrode 270 may be manufactured according to the methods described herein above and as follows: The surface alignment reactant 10 containing the pre-tilting functional groups (e.g., light initiators) having different chain lengths is formed on the pixel electrode 191 by the above-described methods. The surface alignment reactant 10 having a mixture of the third and fourth surface alignment compounds undergoes a primary heating process, thereby removing its solvent.

In the primary heating process, the surface alignment reactant 10 is phase-separated into the surface inorganic layer 33a and the surface functional layer 35a. The surface inorganic layer 33a substantially contains the third surface alignment compound, while the surface functional layer 35a substantially contains the fourth surface alignment compound. The functional groups IM-T1, IM-T2, and IM-T21 of the fourth surface alignment compound contained in the surface functional layer 35a may be bonded to the side chains of polysiloxanes, and may be arranged substantially perpendicularly to the surface of the substrate or the pixel electrode 191, or arranged in contact with the air. The third surface alignment compound may contain a phase separation enhancer. The surface alignment reactant 10 containing the phase separation enhancer (e.g., methyl groups) may be easily phase-separated for the above-recited reasons. In the primary heating process, the siloxanes contained in the surface inorganic layer 33a and the surface functional layer 35a may form the main chains including the polysiloxanes as described above. After the primary heating, the surface inorganic layer 33a and the surface functional layer 35a may undergo alignment film rework if they were formed poorly. The alignment film rework is a process of removing the poorly formed surface inorganic layer 33a and surface functional layer 35a, re-forming the surface alignment reactant 10 on the pixel, and re-performing the primary heating process thereon.

The surface alignment reactant 10 including the phase-separated surface inorganic layer 33a and surface functional layer 35a is secondarily heated in the aforesaid method. In the secondary heating process, the surface functional layer 35a is cured in the aforesaid method, and the polysiloxanes contained in the surface inorganic layer 33a and the surface functional layer 35a may undergo cross-linking. The surface inorganic layer 33a forms the surface inorganic alignment layer 33 as its polysiloxanes are additionally bonded. The primary heating process is optional. In this case, the reactions described with reference to the primary and secondary heating processes may occur in the second heating process.

Thereafter, the surface inorganic alignment layer 33 or the surface functional layer 35a is cleaned by washing with DIW, and may be further cleaned by washing with IPA. After this cleaning, the surface inorganic alignment layer 33 or the surface functional layer 35a is dried. Thereafter, as described above, the sealant, the upper-plate common voltage applying point, and the liquid crystal layer 3 are formed, and the lower and upper display panels 100 and 200 are assembled and then annealed according to the above-described method.

Thereafter, light is irradiated to the assembled lower and upper display panels 100 and 200, with an exposure voltage applied thereto. By doing so, the surface functional layer 35a forms the surface functional hardening layer 35. The surface inorganic alignment layer 33 and the surface functional hardening layer 35 form the lower-plate alignment film 291.

One method of forming the surface functional hardening layer 35 is similar to the method described with reference to the functional groups IM-T2 in Formula IM2, so only differences between these methods are described in detail. The field exposure process is performed while an electric field is formed in the liquid crystal layer 3. The functional groups IM-T2 and IM-T21 contained in the surface functional layer 35a are cross-linked and cured by the field exposure process. The functional groups IM-T2 may form a network by being cross-linked to the functional groups IM-T2 or IM-T21. As for the alkenes included in the functional groups IM-T2 and the alkenes included the functional groups IM-T21, their double bonds are activated by light energy, and the functional groups 1M-T2 and 1M-T21 are cross-linked. The alkenes included in the functional groups IM-T2 and IM-T21 serve as reactants for this cross-linking. As the functional groups IM-T2 and IM-T21 are cross-linked, the reactant groups of the functional groups IM-T2 becomes a cross-linking chain between the functional groups IM-T2, and the reaction part of the functional groups IM-T21 becomes a cross-linking chain bonded to the functional groups IM-T21. The functional groups IM-T2 and IM-T21 cured in the field exposure process form the surface functional hardening layer 35. The functional groups IM-T1 have the characteristics of the vertical alignment monomers of the vertical functional groups. The functional groups IM-T2, IM-T21, IM-T1 and IM-T3 may be bonded to the side chains of the polysiloxanes formed by primarily or secondarily heating the fourth surface alignment compound. As described above, the functional groups IM-T2 are different from the functional groups IM-T21 in chain length, making it possible to increase the cross-linking rate of the functional groups IM-T2 and IM-T21. The increase in cross-linking rate may reduce the number of the non-hardened (non-cured) functional groups IM-T2 or IM-T21. In the process of manufacturing the liquid crystal display device, the non-cured functional groups IM-T2 or IM-T21 may generate impurities, or may cause the pre-tilt angle to be irregular by being cured later in the process. The increase in cross-linking rate may improve the reliability or the quality of the liquid crystal display device, and may make the fluorescence exposure process unnecessary. By the cross-linking, the cured functional groups IM-T2 and IM-T21 arrange their adjacent liquid crystal molecules 31 to be tilted in the substantially same direction. The liquid crystal molecules 31 adjacent to the cured functional groups IM-T2 and IM-T21 may similarly be arranged at a substantially constant pre-tilt angle when no electric field is applied in the liquid crystal layer 3. The surface inorganic alignment layer 34 and the surface functional hardening layer 36 included in the upper-plate alignment film 292 may be formed according to the methods described herein for forming the lower-plate alignment film 291. The functional groups IM-T2 may be different from the functional groups IM-T21 in terms of the bonding number or the number of spacers. The polysiloxanes formed by primarily or secondarily heating the fourth surface alignment compound are formed on the polysiloxanes of the third surface alignment compound.

The liquid crystal display panel assembly 300 manufactured by the surface alignment reactant 10 containing the light initiators having different chain lengths may have the characteristics of the SC-VA mode. Because the surface alignment reactant 10 contains the light initiators having different chain lengths, the cross-linking rate of the light initiators may increase, improving the quality of the liquid crystal display device.

In accordance with an exemplary embodiment of the present invention, the alignment films 291 and 292 formed by the surface alignment reactant 10 containing the light initiators having different chain lengths was manufactured, and the liquid crystal display device having these alignment films was manufactured. The surface alignment reactant 10 forming these alignment films was a mixture of the third and fourth surface alignment compounds having the following materials, mixed at the weight ratio of about 7 to about 3. The third surface alignment compound contained methyl groups of about 10 mol %, and hydroxy groups of about 90 mol %. The fourth surface alignment compounds contained alkyl groups of about 10 mol % having about 17 carbons, methacrylate groups of about 40 mol % having $(CH_2)_3$, vinyl groups of about 10 mol %, and hydroxy groups of about 40 mol %. The mol % of each component is its mol % in the third and fourth surface alignment compounds with the solvent excluded. The chain length of the functional groups IM-T2 is about 6 times the chain length of the functional groups IM-T21. The bonding number of the functional groups IM-T2 is about 6 times the bonding number of the functional groups IM-T21.

The liquid crystal display panel assembly 300 was manufactured according to the method of manufacturing the alignment films 291 and 292 using the surface alignment reactant 10 containing the light hardeners having different chain lengths. In the process of manufacturing the liquid crystal display panel assembly 300, the surface inorganic alignment layer 33 or the surface functional layer 35a was cleaned by washing with DIW and then with IPA. The pixel structure of the liquid crystal display device was substantially similar to that of FIG. 3. The cell spacing in the liquid crystal layer 3 was about 3.0 µm. The width of the micro branches 197 of the pixel electrode 191 were about 5 µm, and the width of the micro slits 199 was about 3 µm. The exposure voltage V2 supplied by the multi-step voltage supply was about 15V. The UV intensity of the field exposure process was about 6.5 J/cm². The manufactured liquid crystal display device was operated by charge sharing-based 1G1D driving described with reference to FIG. 11. The stacked structure of the liquid crystal display panel assembly 300 was as shown in FIG. 21A or 21B. The overcoat 225 formed on the upper display panel 200 contained the acryl-based materials. In the manufactured liquid crystal display device, the cross-linking rate increased by about 80% or more, and the black afterimage showed a good level of about 2.5 after a 168 hours of operation.

The sealant according to an exemplary embodiment of the present invention is hardened in light having a wavelength of about 400 nm or more. By the light having a wavelength of about 400 nm or more, the sealant is hardened and the light hardener existing in an inner region of the lower or upper display panel 100 or 200 is not hardened, thereby reducing the edge stain defects occurring at around the sealant. Since the sealant hardened in UV having a wavelength of about 300 nm to about 400 nm is hardened by the light that hardens the light hardener contained in the material forming the alignment film or the liquid crystal, the light hardener around the sealant is hardened during hardening of the sealant, so that the liquid crystal display device might have the edge stain defects. To correct this, the sealant and the light hardener may be hardened in light having different wavelengths.

The sealant according to an exemplary embodiment of the present invention, which is hardened in light having a wavelength of about 400 nm or more, is similar to that applied in the aforementioned processes, except for the material of the sealant and the method of hardening the sealant. Therefore, a duplicate description of the aforesaid sealing processes will be omitted, and the features of this exemplary embodiment will be described in detail.

The sealant according to an exemplary embodiment of the present invention, which is hardened in the light having a wavelength of about 400 nm or more, may be applied to the lower or upper display panel 100 or 200 in the liquid crystal display panel assembly manufacturing methods described above or below in connection with FIGS. 6A, 6B and 6C, e.g., according to the SVA mode, SC-VA mode, and polarized UV-VA mode. The applied sealant is hardened in the light having a wavelength of about 400 nm or more. The light having a wavelength of about 400 nm or more according to an exemplary embodiment of the present invention may be a visible ray.

Since the sealant according to an exemplary embodiment of the present invention is hardened in the light having a wavelength of about 400 nm or more, the light hardener forming the alignment film or contained in the liquid crystal layer 3 is not hardened even though the light irradiated to the sealant deviates to surroundings of the sealant. Therefore, the shield mask, which was needed to prevent the light irradiated to the sealant from deviating to surroundings of the sealant, may not be necessary, which simplifies the manufacturing process of the liquid crystal display panel assembly 300 and prevents the edge stain defects occurring around the sealant in the liquid crystal display device.

Now, a material of the sealant hardened in the light having a wavelength of about 400 nm or more will be described in detail. The sealant hardened in the light having a wavelength of about 400 nm or more has a resin consisting of a acryl-epoxy hybrid resin, an acryl resin and an epoxy resin, a hardener consisting, of diamine, a coupling agent consisting of silane, a photoinitiator consisting of oxime ester, and a filler consisting of silica and acryl particle. The sealant hardened in the light having a wavelength of about 400 nm or more according to an exemplary embodiment of the present invention, may have an oxime ester-based photoinitiator.

The acryl-epoxy hybrid resin, acryl resin, and epoxy resin constitute the main chain of the sealant, and serve as prepolymers. The acryl-epoxy hybrid resin may be a diphenylpropyl acryl-epoxy hybrid resin expressed by the following Formula S-I, the acryl resin may be a diphenylpropyl acryl resin expressed by the following Formula S-II, and the epoxy resin may be a diphenylpropyl epoxy hybrid resin expressed by the following Formula S-III.

The diamine hardens the epoxy resin by reacting with it, and reduces contamination of the sealant. The diamine may be octanedihydrazide, which can be expressed by the following Formula S-IV.

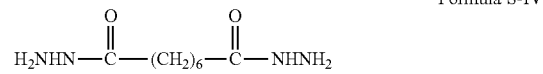

Formula S-IV

The silane improves the adhesion of a filler, an organic, or an inorganic. The silane may be trimethoxy [3-(oxiranylmethoxy)propyl]silane, which can be expressed by the following Formula S-V.

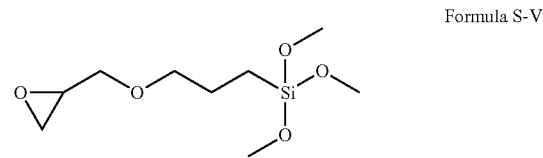

Formula S-V

The oxime ester is a photopolymerization initiator for hardening prepolymers. The oxime ester may be 4-acetyldiphenyl sulfide oxime ester (Ciba, IRGACURE OXE01, OXE02), which can be expressed by the following Formula S-VI. The oxime ester may be hardened in the light having a wavelength of about 400 nm or more, and may also be hardened by a visible ray.

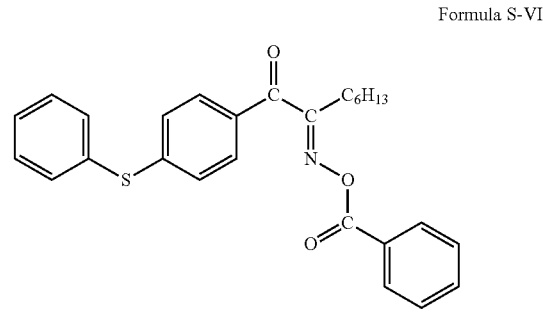

Formula S-VI

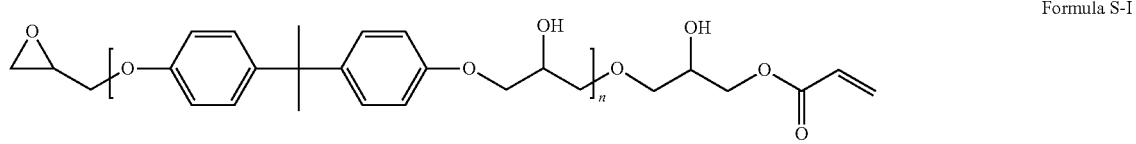

Formula S-I

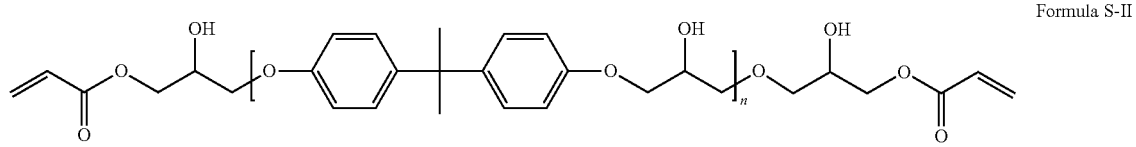

Formula S-II

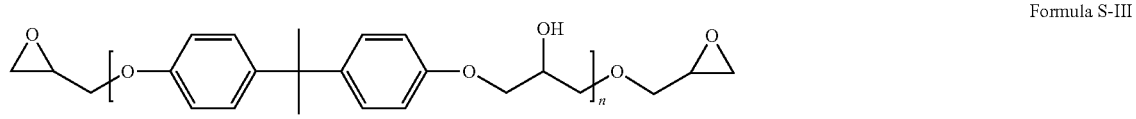

Formula S-III

The oxime ester according to another exemplary embodiment of the present invention can be expressed by the following Formula S-VII.

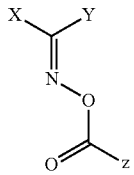

Formula S-VII where X may be any one of 4-acetyldiphenyl sulfide, N-ethylcarbazole and 2'-methylphenonyl n-ethylcarbazole, which can be expressed by the following Formulae S-VII-X1, S-VII-X2 and S-VH-X3, respectively. In addition, Y and Z each may be an alkyl group (CnH2n+1), n may be an integer of 1-12, and Z may be phenyl.

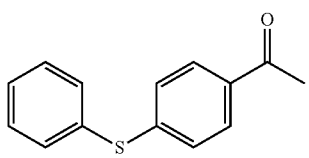

Formula S-VII-X1

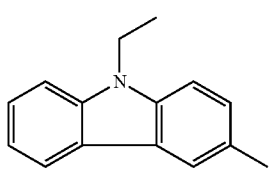

Formula S-VII-X2

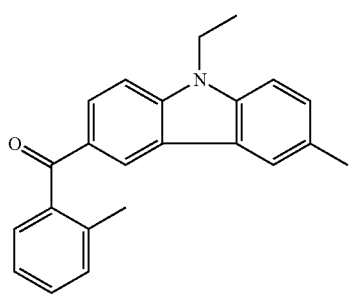

Formula S-VII-X3

The acryl particle reduces the internal stress of the sealant, increases the adhesive strength thereof, and prevents the liquid crystal from flowing out from the resin. The acryl particle may be an acryl resin, which can be expressed by the following Formula S-VIII.

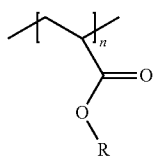

Formula S-VIII

The silica reduces the thermal expansion coefficient and the absorbability of the sealant, and increases the strength of the sealant. The silica may be silica dioxide (SiO2).

The sealant hardened in the light having a wavelength of about 400 nm or more according to an exemplary embodiment of the present invention, may include the diphenylpropyl acryl-epoxy hybrid resin which may be about 13 wt % to about 19 wt %, more preferably about 16 wt %, the diphenylpropyl acryl resin which may be about 39 wt % to about 49 wt %, more preferably about 44 wt %, the diphenylpropyl epoxy hybrid resin which may be about 2 wt % to about 7 wt %, more preferably about 4.5 wt %, the octanedihydrazide which may be about 2 wt % to about 6 wt %, more preferably about 4 wt %, the trimethoxy [3-(oxiranylmethoxy) propyl] Silane which may be about 0.75 wt % to about 1.75 wt %, more preferably about 1.25 wt %, the 4-acetyldiphenyl sulfide oxime ester (Ciba, IRGACURE OXE01, OXE02) which may be about 0.75 wt % to about 1.75 wt %, more preferably about 1.25 wt %, the silica dioxide (SiO2) which may be about 13 wt % to about 19 wt %, more preferably about 16 wt %, and the acryl resin which may be about 10 wt % to about 16 wt %, more preferably about 13 wt %.

A manufacturing process of the liquid crystal display panel assembly 300 is simplified by including the sealant hardened in the light having a wavelength of about 400 nm or more according to an exemplary embodiment of the present invention. In addition, the liquid crystal display device may not have the edge stain defects occurring around the sealant. Furthermore, because it is not necessary to form the sealant on the inner regions of the display panels 100 and 200 apart from the edges to reduce the edge stains and the sealant may be formed on the inner regions of the display panels 100 and 200 or formed close to the inner regions, the width of the outer regions of the liquid crystal display device can be narrower than the conventional liquid crystal display device width by about 0.3 mm to about 1.5 mm.

The sealant hardened in the light having a wavelength of about 400 nm or more according to an exemplary embodiment of the present invention may be applied to the liquid crystal display panel assembly manufacturing methods described above or below in connection with FIGS. 6A, 6B and 6C, e.g., to the SVA mode, SC-VA mode, and polarized UV-VA mode.

A liquid crystal display panel assembly manufactured by lower and upper mother-glass (not shown) display panels according to an exemplary embodiment of the present invention will be described in detail. An exposure voltage is stably supplied to the mother-glass assembly in which a plurality of liquid crystal display panel assemblies are included according to an exemplary embodiment of the present invention, thus reducing the manufacturing time of the liquid crystal display panel assemblies and enabling mass production thereof.

The lower mother-glass display panel according to an exemplary embodiment of the present invention has a plurality of lower display panels 100, and the upper mother-glass display panel has a plurality of upper display panels 200. The lower or upper mother-glass display panel may have a different number of display panels according to the size of the lower or upper display panels. Except that one assembled mother-glass display panel has a plurality of liquid crystal display panel assemblies, the method of manufacturing one liquid crystal display panel assembly is substantially similar to the SVA mode or SC-VA mode-based manufacturing methods described above in connection with FIGS. 6A and 6B. Therefore, in a description of a method for manufacturing a liquid crystal display panel assembly using the mother-glass display panel, the duplicate description of the SVA mode or SC-VA mode-based manufacturing method will be omitted or simplified. The rest of the features of the method for manufacturing a liquid crystal display panel assembly using the mother-glass display panel according to an exemplary embodiment of the present invention will be described in detail.

The lower mother-glass display panel having a plurality of lower display panels 100 and the upper mother-glass display panel having a plurality of upper display panels 200 are manufactured by a manufacturing method substantially similar to the aforementioned manufacturing method for the lower display panel 100 and the upper display panel 200. The mother-glass display panel manufactured and assembled by the SVA mode or SC-VA mode-based manufacturing methods described above in connection with FIGS. 6A and 6B is annealed as described above. The assembled mother-glass display panel is comprised of a lower mother-glass display panel and an upper mother-glass display panel, and includes a plurality of assembled liquid crystal display panels.

After the annealing, to apply exposure voltages to the pixel electrodes and the common electrodes of a plurality of assembled liquid crystal display panels, the lower mother-glass display panel of the assembled mother-glass display panel is partially cut at one or more sides. In other words, a horizontal or vertical side of the lower mother-glass display panel is cut so that the lower mother-glass display panel is smaller in size than the upper mother-glass display panel by about 10 mm. Since the upper mother-glass display panel is greater than the lower mother-glass display panel by about 10 mm, a common electrode layer formed on the upper mother-glass display panel is exposed. The exposed common electrode layer has a common voltage applying trimming pattern and a pixel voltage applying trimming pattern. The common voltage applying trimming pattern and the pixel voltage applying trimming pattern may be formed in a prior process by a method such as laser trimming. The common voltage applying trimming pattern is connected to common electrodes of respective assembled liquid crystal display panels, and the pixel voltage applying trimming pattern is connected to pixel electrodes of respective assembled liquid crystal display panels.

The exposure voltages are applied to the trimming patterns on the exposed common electrode layer. In other words, a common electrode voltage is applied to the common voltage applying trimming pattern, and a pixel voltage is applied to the pixel voltage applying trimming pattern. The exposure voltages are supplied by the DC voltage or multi-step voltage supply methods described in connection with FIGS. 7A and 7B. In accordance another exemplary embodiment of the present invention, the common voltage applying trimming pattern and the pixel voltage applying trimming pattern may receive a voltage of about 0V and a voltage of about 9V to about 25V, alternately. In other words, a voltage of about 0V and a voltage within a range of about 9V to about 25V are applied to the common voltage applying trimming pattern and the pixel voltage applying trimming pattern, swinging at a frequency of about 0.05 Hz to about 5 Hz. More preferably, a voltage of about 0V and a voltage of about 10V may swing at a frequency within a range of about 0.05 Hz to about 1 Hz, while a voltage of 0V and a voltage of about 20V may swing at a frequency within a range of about 0.05 Hz to about 5 Hz. A time between cycles may fall within a range of about 0 ms to about 5 ms. The applied exposure voltages are simultaneously supplied to the pixel electrodes and common electrodes constituting the plurality of liquid crystal display panels. Since the exposure voltages are applied to the trimming patters of the mother-glass display panels connected to the pixel electrodes and common electrodes of the plurality of liquid crystal display panel assemblies, the manufacturing process may be simple and the uniform exposure voltages may be applied to the plurality of liquid crystal display panel assemblies. Thereafter, the methods of forming the photo hardening layers 35 and 36 having a pre-tilt angle by irradiating UV to the liquid crystal display panel assembly are performed, and these methods are substantially similar to the SVA mode or SC-VA mode-based manufacturing methods described above in connection with FIGS. 6A and 6B. The completed liquid crystal display panel assemblies are each separated from the mother-glass display panels.

By supplying the exposure voltages to the mother-glass display panels according to an exemplary embodiment of the present invention, the image qualities of the liquid crystal display panel assemblies are uniform and a lot of the liquid crystal display panel assemblies can be manufactured in a short time.

To reduce the signal delay and the deviation between voltages applied to the pixel electrodes and common electrodes of the liquid crystal display panel assemblies which are formed on the mother-glass display panels and then assembled according to an exemplary embodiment of the present invention, cut portions of the lower mother-glass display panel may be on two or more sides facing each other.

In accordance with an exemplary embodiment of the present invention, the pixel voltage applying trimming pattern may be electrically connected to the pixel electrodes by an electric conductor applied during forming of the upper-plate common voltage applying point, in the process of forming the upper-plate common voltage applying point.

Polarized UV-VA Mode

Now, a method for manufacturing the liquid crystal display panel assembly 300 based on the polarized UV-VA mode will be described with reference to FIG. 6C. FIG. 6C is a schematic flowchart illustrating a method for manufacturing the liquid crystal display panel assembly 300 based on the polarized UV-VA mode using the lower and upper display panels 100 and 200 manufactured with reference to FIG. 1 to FIGS. 5A and 5B. The method for manufacturing the liquid crystal display panel assembly 300 based on the polarized UV-VA mode is similar to the method for manufacturing the liquid crystal display panel assembly 300 based on the SVA mode or the SC-VA mode except for how to form the alignment films 291 and 292. Therefore, duplicate descriptions will be omitted except for how to form the alignment films 291 and 292 of the instant exemplary embodiment. Further, the difference between the polarized UV-VA mode and other modes will be described in detail. In addition, since the lower-plate and upper-plate alignment films 291 and 292 are substantially the same in their forming process, a forming process of the lower-plate alignment film 291 will be described in detail to avoid duplicate description.

Manufacturing the lower display panel 100 with the pixel electrode 191 and the upper display panel 200 with the common electrode 270 in first steps S310 and S320 is substantially the same as that described in conjunction with FIG. 1 to FIGS. 5A and 5B. The pixel electrode 191 and the common electrode 270 may not have the aforementioned micro branches 197 or micro slits 199.

In the next steps S331 and S332, a polarized alignment reactant (not shown) is applied onto each of the pixel electrode 191 and the common electrode 270, and then undergoes Micro Phase Separation (MPS) into a vertical photo alignment material layer (not shown) and a polarized main alignment material layer (not shown), by heat. After polarized UV is irradiated to the MPS-separated polarized alignment reactants, the lower-plate and upper-plate alignment films 291 and 292 having directionality are formed. Now, the forming process of the lower-plate alignment film 292 will be described in detail.

The polarized alignment reactant is made of a vertical photo alignment material and a polarized main alignment material. The polarized alignment reactant is applied onto the electrodes 191 and 270 by inkjet or roll printing, and then MPS-separated by a hardening described below. The hardening for MPS may proceed in two steps. First, pre-heating, or a pre-bake process, proceeds at about 60° C. to about 90° C., more preferably at about 80° C., for about 1 minute to about 5 minutes, more preferably for about 2 minutes to about 3 minutes to remove a solvent of the polarized alignment reactant, and then post-heating, or a post-bake process, proceeds at about 200° C. to about 240° C., more preferably at about 220° C., for about 10 minutes to about 60 minutes, more preferably for about 10 minutes to about 20 minutes, thereby forming an MPS structure. After the polarized alignment reactant undergoes MPS, the vertical photo alignment material forms a vertical photo alignment material layer (not shown) mainly in the vicinity of the liquid crystal layer 3, and the polarized main alignment material forms a polarized main alignment material layer (not shown) mainly in the vicinity of the pixel electrode 191. The polarized main alignment material layer MPS-separated by hardening becomes the main alignment layers 33 and 34. The lower-plate main alignment layer 33 may be about 1000 Å thick. Therefore, the closer it gets to the liquid crystal layer 3, the higher the molarity of the vertical photo alignment material is compared with that of the polarized main alignment material.

A mixed wt % ratio of the vertical photo alignment material and the polarized main alignment material constituting the polarized alignment reactant may be about 5:95 to about 50:50, more preferably about 10:90 to about 30:70. The solvent is not involved in the composition ratio of the polarized alignment reactant. The less the vertical photo alignment material mixed in the polarized alignment reactant is, the less the non-hardened photo-reactive group is, thus reducing persistence-of-vision of the liquid crystal display device and increasing reaction efficiency of the photo-reactive group. Accordingly, it is preferable that the vertical photo alignment material is mixed about 50 wt % or less. When the vertical photo alignment material is mixed about 5 wt % or more, the pre-tilt uniformity improves, reducing stains of the liquid crystal display device. A surface tension of each of the vertical photo alignment material and the polarized main alignment material is about 25 dyne/cm to about 65 dyne/cm. For MPS to ensure clear separation, the surface tension of the vertical photo alignment material should be equal to or not less than that of the polarized main alignment material.

The vertical photo alignment material, a polymeric material with a weight average molecular weight of about 1,000 to about 1,000,000, is a compound in which at least one side chain is linked to the main chain, the side chain including a flexible functional group, a thermoplastic functional group, a photo-reactive group, and a vertical functional group.

The flexible functional group or the thermoplastic functional group is a functional group helping the side chain linked to the polymer main chain to be easily aligned, and may be comprised of a substituted or non-substituted alkyl group or alkoxy group with a carbon number of about 3 to about 20.

The photo-reactive group is a functional group in which a photo dimerization or photo isomerization reaction directly occurs by irradiation of light such as UV. For example, the photo-reactive group is comprised of at least one material selected from an azo-based compound, a cinnamate-based compound, a chalcone-based compound, a coumarin-based compound, a maleimide-based compound, and a mixture thereof.

The vertical functional group is a functional group shifting all side chains in the vertical direction with respect to the main chain located in parallel with the substrates 110 and 210, and may be comprised of an aryl group in which an alkyl group or alkoxy group with a carbon number of about 3 to about 10 is substituted, or a cyclohexyl group in which an alkyl group or alkoxy group with a carbon number of about 3 to about 10 is substituted.

A monomer, such as diamine in which a flexible functional group, a photo-reactive group and a vertical functional group are bonded, may be polymerized with acid anhydride to make a vertical photo alignment material. As an example, diamine in which at least one side chain including a fluorine F aryl group, and cinnamate is substituted is polymerized with acid dianhydride to form a vertical photo alignment material. The fluorine F is a marker for detecting the vertical photo alignment material.

A vertical photo alignment material according to another exemplary embodiment may be made by adding a compound in which a thermoplastic functional group, a photo-reactive group and a vertical functional group are bonded, to polyimide, polyamic acid, etc. In this case, a thermoplastic functional group is directly linked to the polymer main chain, whereby the side chain includes the thermoplastic functional group, photo-reactive group, vertical functional group, etc.

In addition, the polarized main alignment material may include the polymer main chain, and its weight average molecular weight is about 10,000 to about 1,000,000. If the polarized main alignment material contains an imide group with a molarity of about 50 mol % to about 80 mol %, stains and persistence of the liquid crystal display device are reduced. To ensure elaborate MPS and reduce persistence of the liquid crystal display device, the polarized main alignment material may contain a vertical functional group linked to the polymer main chain at about 5 mol % or less.

The main chain may be made of at least one material selected from polyimide, polyamic acid, polyamide, polyamicimide, polyester, polyethylene, polyurethane, polystyrene, and a mixture thereof. The more the main chain includes the ring structure of the imide group, (for example, if it includes the imide group preferably about 50 mol % or more), the greater the rigidity of the main chain becomes. Therefore, stains occurring when the liquid crystal display device is driven for a long time are reduced, and alignment stability of liquid crystal molecules 31 improves.

The polarized main alignment material may correspond to the surface main alignment material in the SC-VA mode. In addition, it will be understood that the polarized main alignment material may be a material used for making the VA mode or the TN mode devices.

If UV is irradiated to the MPS-separated vertical photo alignment material layer, a photo-reactive group is light-hardened, thereby forming the photo hardening layer 35. The main alignment layer 33 formed by thermal hardening and the photo hardening layer 35 formed by UV constitute the lower-plate alignment film 291.

The light irradiated to the vertical photo alignment material layer may be polarized UV, collimated UV, or slanted light. The polarized UV may be Linearly Polarized Ultra Violet (LPUV) or Partially Polarized Ultra Violet (PPUV). The irradiated wavelength may be about 270 nm to about 360 nm, and the irradiated energy may be about 10 mJ to about 5,000 mJ. A mask provided with an opening portion transmitting light and a light blocking portion blocking light is placed to correspond to a photo hardening region or a non-photo hardening region on the lower or upper display panel 100 and 200, and then light is irradiated thereto. In accordance with an exemplary embodiment of the present invention, the LPUV is irradiated at a predetermined tilt angle, e.g., about 20° to about 70°, with respect to the substrates 110 and the 210 of the display panels 100 and 200. The vertical photo alignment material layer undergoes a dimerization reaction, cis-trans isomerization, or light-decomposition reaction by the light passing through the opening portion in the mask. Therefore, the polymer of the photo hardening layer 35 light-hardened according to the LPUV's direction and the polarization direction has a direction that is slightly tilted with respect to the direction perpendicular to the substrate 110.

This gives the same effect as if the surfaces of the alignment films 291 and 292 have been rubbed in a specific direction. The liquid crystal molecules 31 adjacent to the photo hardening layer 35 are tilted similar to the polymer of the photo hardening layer 35, having a pre-tilt angle of a specific angle. Therefore, depending on the tilt angle of polarized UV, a direction of the pre-tilt angle of the liquid crystal molecules 31 is determined and a domain having liquid crystal molecules 31 aligned in a specific pre-tilt direction is formed. According to an exemplary embodiment of the present invention, photo hardening layers 35 and 36 having two pre-tilt angle directions are formed on each of the lower and upper display panels 100 and 200, and the liquid crystal layer 3 of the liquid crystal display device has four domains, which have different azimuths in the pre-tilt angles of the photo hardening layers 35 and 36 by the vector sum. On the other hand, the photo hardening layers 35 and 36 having four different directions may be formed on any one of the lower and upper display panels 100 and 200, so that the liquid crystal layer 3 may have four domains. Azimuths of the four domains may be tilted about 45° with respect to the polarization axis of the polarizer.

In the next step S340, a sealant is formed between the lower and upper display panels 100 and 200 on which the lower-plate and upper-plate alignment films 291 and 292 are formed, respectively, and the two display panels 100 and 200 are sealed, thereby manufacturing the liquid crystal display panel assembly 300. The manufactured liquid crystal display panel assembly 300 has characteristics of the polarized UV-VA mode. If the liquid crystal display device is manufactured based on the polarized UV-VA mode, the non-hardened photo-reactive group is reduced, contributing to a reduction in persistence of the liquid crystal display device. In addition, domains are formed depending on the direction of the polarized UV, improving fairness of the liquid crystal display devices. In other words, in the SVA mode or the SC-VA mode, the liquid crystal molecules 31 have a pre-tilt angle according to the electric field, which is formed in the liquid crystal layer 3 by an exposure voltage, and the direction of the micro branches 197, but in the polarized UV-VA mode, the photo hardening layer 35 is formed before sealing of the two display panels 100 and 200 regardless of the existence and direction of the micro branches 197, thereby improving the fairness.

An alignment film of a liquid crystal display device according to another exemplary embodiment of the present invention is formed by a polarized alignment reactant having a mixed photo alignment material 48. The mixed photo alignment material 48 contained in the polarized alignment reactant according to an exemplary embodiment of the present invention easily moves to the surface of the polarized alignment reactant in the phase separation process, thus reducing the non-hardened photo-reactive polymer, and reducing the production cost, the RDC voltage, or the afterimages of the liquid crystal display device. The mixed photo alignment material 48 according to an exemplary embodiment of the present invention includes a heat-reactive part 48a, a photo-reactive part 48b, and a vertical functional part 48c (see FIGS. 15A-G), and may be a compound thereof.

This exemplary embodiment of the present invention is substantially similar to the exemplary embodiment of the liquid crystal display panel assembly manufactured by the aforementioned polarized UV-VA mode except for the materials constituting the polarized alignment reactant and the MPS process in the thermal curing process. A duplicate description will be simplified or omitted. Since the lower-plate and upper-plate alignment films 291 and 292 are formed in a substantially similar way, the forming process of the alignment film according to the current exemplary embodiment of the present invention will be described without distinguishing between the alignment films 291 and 292.

Figure 15A:
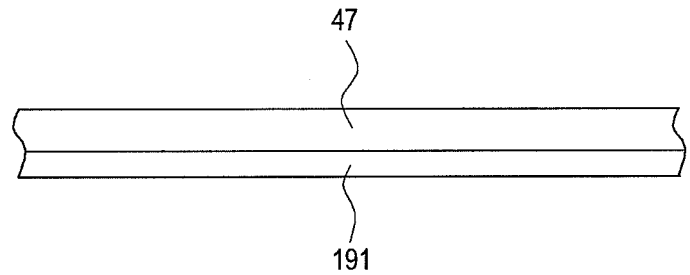
FIGS. 15A to 15G are cross-sectional views illustrating a sequential process of forming an alignment film of a liquid crystal display panel assembly of a UV-VA mode, according to an exemplary embodiment of the present invention.

Now, reference will be made to FIGS. 15A to 15G to give a detailed description of a forming process for an alignment film formed by a polarized alignment reactant 47 having the mixed photo alignment material 48 according to an exemplary embodiment of the present invention. FIGS. 15A to 15G illustrate a sequential process of forming an alignment film of a liquid crystal display panel assembly of another UV-VA mode according to an exemplary embodiment of the present invention. Referring to FIG. 15A, the polarized alignment reactant 47 having the mixed photo alignment material 48 is applied onto the pixel electrode 191 and the common electrode 270 as described above. The polarized alignment reactant 47 having the mixed photo alignment material 48 is formed on inner regions of the lower and upper display panels 100 and 200, or may be applied on outer regions thereof in a partially overlapping manner. The polarized alignment reactant 47 having the mixed photo alignment material 48 may be may be a mixture of a polarized main alignment material 37, a photo alignment vertical material 49, the mixed photo alignment material 48, and a solvent. The pixel electrode 191 and the common electrode 270 may not have the aforementioned micro branches 197 or micro slits 199.

Now, a detailed description will be made of a composition ratio of the polarized main alignment material 37, the photo alignment vertical material 49, the mixed photo alignment material 48, and the solvent constituting the polarized alignment reactant 47 having the mixed photo alignment material 48.

Solid contents manufactured to contain the photo alignment vertical material 49, the polarized main alignment material 37 and the mixed photo alignment material 48 are dissolved in the solvent to form the polarized alignment reactant 47 having the mixed photo alignment material 48. In the polarized alignment reactant 47, the solvent may be about 85 wt % to about 98 wt %, more preferably about 93.5 wt %, and solid contents except for the solvent, e.g., a mixture of the polarized main alignment material 37, the photo alignment vertical material 49 and the mixed photo alignment material 48 may be about 2 wt % to about 15 wt %, more preferably about 6.5 wt %. When applied onto the lower or upper display panel 100 or 200, the solid contents with a content of about 2 wt % or more can improve a printability of the polarized alignment reactant 47. The solid contents with a content of about 15 wt % or less may prevent generation of precipitates which are formed because the solid contents are not dissolved in the solvent, and may improve the printability of the polarized alignment reactant 47.

In the solid contents, the polarized main alignment material 37 may be about 34 wt % to about 89.55 wt %, more preferably about 70 wt %, the photo alignment vertical material 49 may be about 8.5 wt % to about 59.7 wt %, more preferably about 30 wt %, and the mixed photo alignment material 48 may be about 0.5 wt % to about 15 wt %, more preferably about 5 wt %. As for the solid contents, the solvent is excluded from the polarized alignment reactant 47. The mixed photo alignment material 48 with a content of about 0.5 wt % or more of the total weight of the solid contents may introduce the minimum photo reactivity to the photo alignment vertical material 49 by reacting with the photo alignment vertical material 49. In addition; the mixed photo alignment material 48 with a content of about 15 wt % or less of the total weight of the solid contents may minimize the reduction in alignment properties of the alignment film formed by the polarized alignment reactant 47.

A weight ratio of the photo alignment vertical material 49 to the polarized main alignment material 37 may be about 1:9 to about 6:4, more preferably about 1:9 to about 5:5. The polarized alignment reactant 47 having this weight ratio may easily undergo MPS by the aforementioned pre-heating or post-heating process, and the mixed photo alignment material 48 may easily move to the surface of the polarized alignment reactant 47, which is in contact with air. For the storability and printability of materials, the photo alignment vertical material 49 and the polarized main alignment material 37 each may have a weight average molecular weight of about 10,000 to about 900,000. The weight average molecular weight is a monodispersed polystyrene-reduced value measured by Gel Permeation Chromatography (GPC).

Now, a detailed description will made of each of the polarized main alignment material 37, the photo alignment vertical material 49, and the solvent constituting the polarized alignment reactant 47 having the mixed photo alignment material 48.

The polarized main alignment material 37 is a compound of a monomer of about 95 mol % to about 100 mol % having no side chain and a monomer of about 0 mol % to about 5 mol % having a side chain, and the polarized main alignment material 37 having these compositions has horizontal alignment properties. Although in the polarized main alignment material 37, the monomer having no side chain is preferably about 100 mol %, this monomer may fall within a composition range where the horizontal alignment properties are not reduced, e.g., a range of about 95 mol % to about 100 mol %. In addition, in the polarized main alignment material 37, the monomer having a side chain may fall within a composition range where the horizontal alignment properties are not reduced, e.g., a range of about 0 mol % to about 5 mol %. Side chains of the monomers constituting the polarized main alignment material 37 may include all functional groups except for —H. Although the side chains of the monomers constituting the polarized main alignment material 37 may be substantially the same as the side chains of the monomers constituting the photo alignment vertical material 49, the polarized main alignment material 37 may have horizontal alignment properties because of the low composition ratio of the monomer having a side chain.

The polarized main alignment material 37 may be at least one material selected from a polyimide-based compound, a polyamic acid-based compound, a poly siloxane-based compound, a polyvinylcinnamate-based compound, a polyacrylate-based compound, a polymethylmethacrylate-based compound, and mixtures thereof.

If the polarized main alignment material 37 is the polyimide-based compound according to an exemplary embodiment of the present invention, it may be a monomer, whose main chain has an imide bond.

The photo alignment vertical material 49 is a compound of a monomer in which a terminal is linked to a side chain having a hydrophobic group, and a monomer having no side chain. The monomer having a side chain, constituting the photo alignment vertical material 49, may be about 10 mol % to about 70 mol %, more preferably about 20 mol % to about 60 mol %, and the monomer having no side chain may be about 30 mol % to about 90 mol %, more preferably about 40 mol % to about 80 mol %. The photo alignment vertical material 49 having these compositions has vertical alignment properties.

Each of the monomer having a side chain and the monomer having no side chain, constituting the photo alignment vertical material 49, may be at least one material selected from a monomer of an imide bond constituting the polyimide-based compound, an auric acid-based monomer constituting the polyamic acid-based compound, a siloxane-based monomer constituting the poly siloxane-based compound, a vinylcinnamate-based monomer constituting the polyvinylcinnamate-based compound, an acrylate-based monomer constituting the polyacrylate-based compound, a methylmethacrylate-based monomer constituting the polymethylmethacrylate-based compound, and mixtures thereof.

The main chain of the photo alignment vertical material 49 may be the polyimide-based compound or the polyamic acid-based compound. The photo alignment vertical material 49 comprised of the monomer of an imide bond according to an exemplary embodiment of the present invention contains the polyimide-based compound as a main chain, and has a structure in which a side chain is linked to the main chain. The photo alignment vertical material 49 comprised of the monomer of an imide bond may be manufactured by imidizing a part of the polyamic acid-based compound. The main chain of the photo alignment vertical material 49 is defined as a linking part of monomers except for the side chain. The photo alignment vertical material 49 containing the polyamic acid-based compound as a main chain according to an exemplary embodiment of the present invention may be manufactured by the reaction of a diamine-based compound and an acid anhydride. The diamine-based compound may be a diamine having substantially the same functional group as the side chain.

The side chain of the photo alignment vertical material 49 has a first functional group, a second functional group connected to the first functional group and including a plurality of carbon rings, and a vertical functional group 49c linked to the second functional group. The first functional group may contain an alkyl group or alkoxy group with a carbon number of about 1 to about 10. The second functional group is linked to the main chain by the first functional group, and linked to the vertical functional group 49c. The second functional group may contain cyclohexane, benzene, chroman, naphthalene, tetrahydropyran, dioxane or a steroid derivative. The vertical functional group 49c shown in FIG. 15C is a hydrophobic group linked to a terminal of the side chain. The vertical functional group 49c may contain a linear alkyl group with a carbon number of 1~12, a branched alkyl group with a carbon number of 1~12, in which a side chain is linked to the linear alkyl, or an alkenyl group with a carbon number of 2~12. In the vertical functional group 49c, hydrogen atoms may be substituted with F or Cl.

In accordance with an exemplary embodiment of the present invention, the side chain of the photo alignment vertical material 49 may be a monomer expressed by the following Formulae X-UV1~X-UV4.

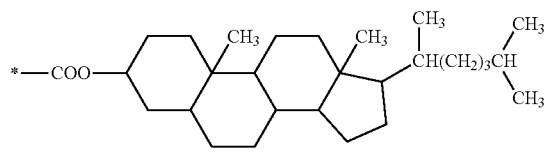

Formula X-UV1

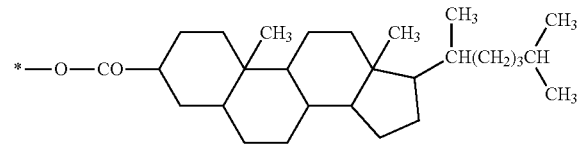

Formula X-UV2

-continued

Formula X-UV3

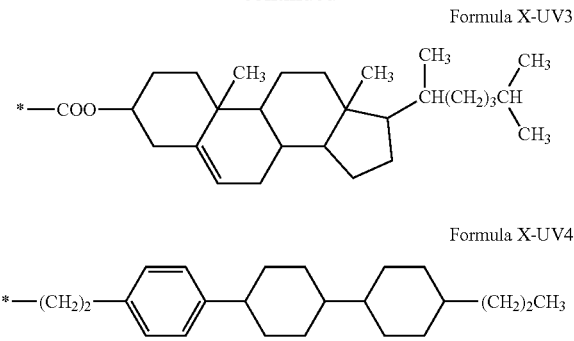

Formula X-UV4

In accordance with an exemplary embodiment of the present invention, the side chain of the photo alignment vertical material 49 may contain the photo-reactive part 48b having a photo-reactive group. The photo-reactive group linked to the side chain of the photo alignment vertical material 49 may form a photo hardening layer having a pre-tilt angle by being hardened by light. The photo-reactive part 48b may be substituted with the second functional group, e.g., interposed between the first functional group and the vertical functional group 49c, and linked to the first functional group and the vertical functional group 49c. On the other hand, the photo-reactive part 48b may be interposed between the first functional group and the second functional group, and linked to each of the first and second functional groups. The photo-reactive part linked to the side chain of the photo alignment vertical material 49 may be a monomer expressed by the following Formulae X-UV5-X-UV9.

The photo-reactive part linked to the side chain of the photo alignment vertical material 49 may be at least one material selected from the aforementioned photo-reactive polymer, reactive mesogen, photopolymerization material, photo-isomerization material, and a mixture or compound thereof.

The mixed photo alignment material 48 according to an exemplary embodiment the present invention has a compound expressed by the following Formula X-UP1. The mixed photo alignment material 48 includes the heat-reactive part 48a, the photo-reactive part 48b, a linking part, and the vertical functional part 48c. The heat-reactive part 48a, in which a bond between carbons is broken by the heat, facilitates combination of the photo alignment vertical material 49 and the mixed photo alignment material 48. The photo-reactive part 48b is bonded to other photo-reactive parts by light. The linking part links the photo-reactive part 48b, the heat-reactive part 48a and the vertical functional part 48c. The vertical functional part 48c improves the vertical alignment properties of the mixed photo alignment material 48.

$$B_1\text{-}X_1\text{-}A_1\text{-}Y_1\text{-}D$$ Formula X-UP1

In this chemical formula, $A_1$ is the photo-reactive part 48b of the mixed photo alignment material 48 shown in FIG. 15C. The photo-reactive part 48b may be polymerized or hardened with adjacent photo-reactive parts by receiving the irradiated light. $A_1$ may be cinnamate, coumarin or chalcone.

$X_1$ and $Y_1$ are linking parts, and they link a photo-reactive part $A_1$, a heat-reactive part $B_1$, and a vertical functional part D. $X_1$ and $Y_1$ each may be a single bond or —$C_nH_{2n}$— (where n is an integer of 1-6). If $X_1$ and/or $Y_1$ are —$C_nH_{2n}$—, $X_1$ and/or $Y_1$ may have a linear or branched hydrocarbon. Each of one or more —$CH_2$— constituting $X_1$ or $Y_1$ may be substi- Formula X-UV5

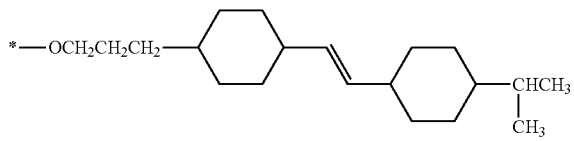

Formula X-UV6

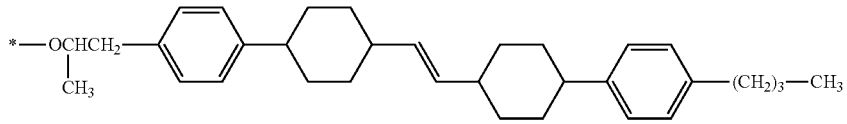

Formula X-UV7

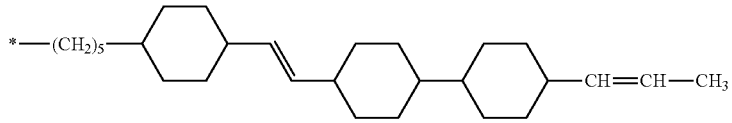

Formula X-UV8

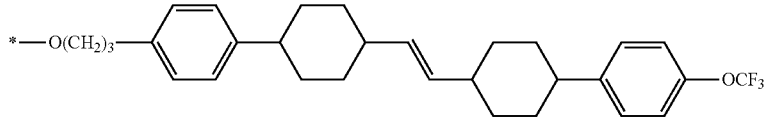

Formula X-UV9

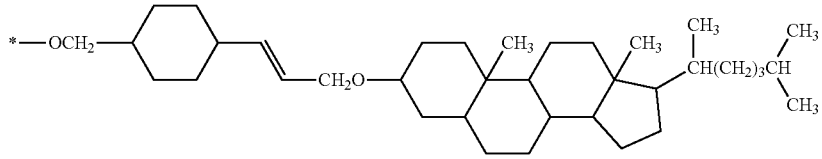

tuted with —O— or —Si—. In accordance with an exemplary embodiment of the present invention, $X_1$ and/or $Y_1$ may be —$CH_2$—, —$CH_2$—$CH_2$—, —O—$CH_2$—, —$CH_2$—Si—, or —O—Si—O—.

$B_1$ is the heat-reactive part 48a shown in FIG. 15C. $B_1$ is made by a bond between carbons or a bond between carbon and oxygen, which is easily broken by heat, and may be easily bonded to the photo alignment vertical material 49. $B_1$ may be

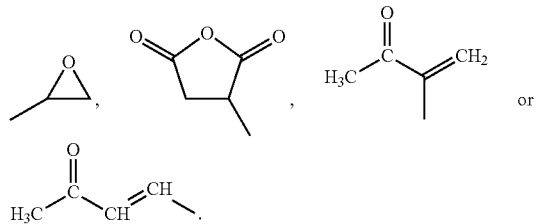

D is the vertical functional part 48c of the mixed photo alignment material 48 having vertical alignment properties, shown in FIG. 15C, and it is an alkyl group with a carbon number of 1~12, or an alkenyl group with a carbon number of 2~12. The vertical functional part 48c of the mixed photo alignment material 48 improves the vertical alignment properties. In other words, in addition to the vertical functional group 49c linked to the side chain of the photo alignment vertical material 49, the mixed photo alignment material 48 has the vertical functional part 48c, increasing the number of vertical functional groups constituting the polarized alignment reactant 47. As a result, the mixed photo alignment material 48 having the vertical functional part 48c, and the photo alignment vertical material 49 having the vertical functional group 49c are bonded in the thermal curing process, increasing density of the vertical functional groups and improving vertical alignment properties of the alignment film. In Formula X-UP1, each hydrogen atom except for $B_1$ may be substituted with F or Cl.

The mixed photo alignment material 48 expressed by Formula X-UP1 according to an exemplary embodiment of the present invention has cinnamate constituting $A_1$, —O—Si—O— constituting each of $X_1$ and $Y_1$,

constituting $B_1$, and

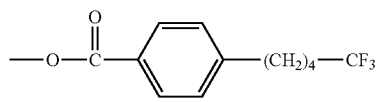

constituting D.

The mixed photo alignment material 48 according to another exemplary embodiment of the present invention may have a compound expressed by the following Formula X-UP2.

$B_2$-$X_2$-$A_2$      Formula X-UP2

In this chemical formula, $A_2$ may be a material constituting the photo-reactive part 48b of the mixed photo alignment material 48. $X_2$ may be a material constituting a linking part of the mixed photo alignment material 48. $B_2$ may be a material constituting the heat-reactive part 48a of the mixed photo alignment material 48. In Formula X-UP2, each hydrogen atom except for $B_2$ may be substituted with F or Cl.

Compared with the mixed photo alignment material 48 expressed by Formula X-UP1, the mixed photo alignment material 48 expressed by Formula X-UP2 does not have the vertical functional part 48c. Although the mixed photo alignment material 48 expressed by Formula X-UP2 does not have the vertical functional part 48c, the large size of the photo-reactive part 48b enables stable arrangement of the side chains of the photo alignment vertical material 49.

The solvent may be a compound for facilitating dissolution or mixing of the photo alignment vertical material 49, the polarized main alignment material 37, and the mixed photo alignment material 48, or a compound capable of improving the printability thereof. The solvent may be an organic solvent, or may be one of the aforementioned solvent materials.

To improve the photo hardening reaction, the polarized alignment reactant 47 may further include the aforementioned photoinitiator.

Referring to FIGS. 15B to 15E, after being applied, the polarized alignment reactant 47 is thermally cured by pre-heating (FIG. 15B) or post-heating (FIG. 15D) as described above. The polarized alignment reactant 47 undergoes MPS by the thermal curing. In accordance with an exemplary embodiment of the present invention, the polarized alignment reactant 47 undergoes phase separation in the pre-heating step, and the phase separation is completed in the post-heating step. Now, the phase separation process for the polarized alignment reactant 47 will be described in detail.

Figure 15B:
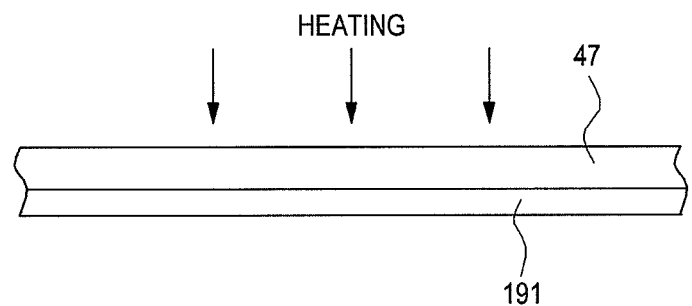
Figure 15C:
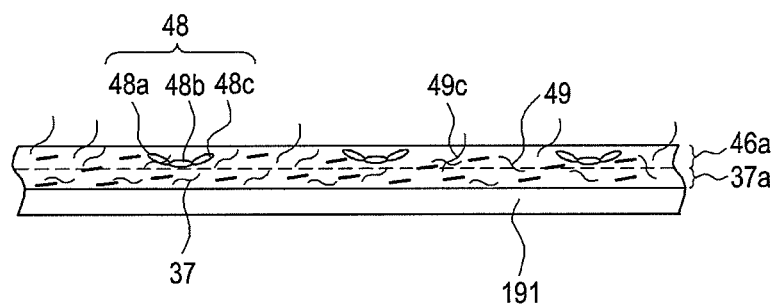

Referring to FIG. 15B, the polarized alignment reactant 47 is pre-heated. The pre-heated polarized alignment reactant 47 is MPS-separated into a polarized main alignment material layer 37a and a vertical photo alignment material layer 46a, and the solvent of the polarized alignment reactant 47 is vaporized. The polarized main alignment material layer 37a is formed close to the pixel electrode or the common electrode, and primarily contains the polarized main alignment material 37. The polarized main alignment material layer 37a may contain the photo alignment vertical material 49 and the mixed photo alignment material 48. The vertical photo alignment material layer 46a is formed close to the surface contacting air, and primarily contains the polarized main alignment material 37 and the mixed photo alignment material 48. The vertical photo alignment material layer 46a may contain the polarized main alignment material 37. The photo alignment vertical material 49 and the polarized main alignment material 37 might be substantially mixed in the interface between the polarized main alignment material layer 37a and the vertical photo alignment material layer 46a.

Referring to FIG. 15C, the polarized alignment reactant 47 is phase-separated as follows. In accordance with an exemplary embodiment of the present invention, the photo alignment vertical material 49 constituting the polarized alignment reactant 47 has a non-polarity compared with the polarized main alignment material 37, while the polarized main alignment material 37 has a polarity compared with the photo alignment vertical material 49. In addition, air has a non-polarity compared with the material constituting the pixel or common electrode, while the material constituting the pixel or common electrode has a polarity compared with air. Hence, in the pre-heating process, the photo alignment vertical material 49 constituting the polarized alignment reactant 47 mostly moves in the direction of the surface contacting air because its affinity to air is greater than that of the polarized main alignment material 37. In addition, since the polarized main alignment material 37 having a polarity extrudes the mixed photo alignment material 48, the mixed photo alignment material 48 moves like the photo alignment vertical material 49, thus being mixed with the photo alignment vertical material 49. Hence, the mixed photo alignment material 48 and the photo alignment vertical material 49, which have moved in the direction of the surface in the pre-heating step, form the vertical photo alignment material layer 46a. Consequently, the mixed photo alignment material 48 can easily move toward the surface contacting air by virtue of the phase separation process for the polarized main alignment material 37 and the photo alignment vertical material 49, thus reducing the content of the mixed photo alignment material 48 contained in the polarized alignment reactant 47. On the other hand, the polarized main alignment material 37 constituting the polarized alignment reactant 47 moves toward an electrode layer because its affinity to the material formed on the bottom of the polarized alignment material 47, e.g., near the pixel electrode or the common electrode, is greater than that of the photo alignment vertical material 49. Having moved toward the electrode layer, the polarized main alignment material 37 and some of the photo alignment vertical material 49 form the polarized main alignment material layer 37a. The vertical functional group 49c of the photo alignment vertical material 49 may have a vertical alignment in the pre-heating. The mixed photo alignment material 48 may include the heat-reactive part 48a, the photo-reactive part 48b, and the vertical functional part 48c.

Figure 15D:
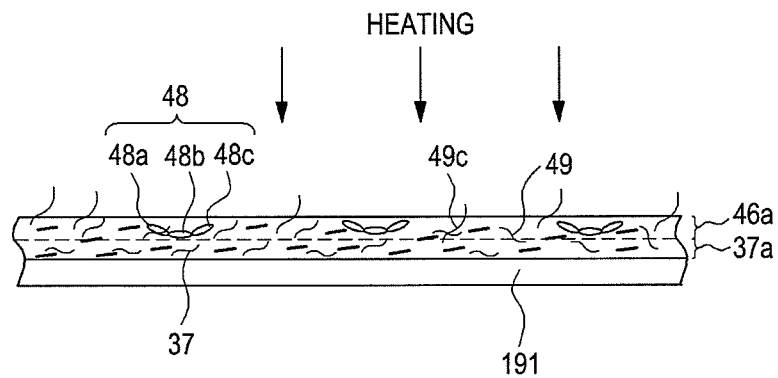
Figure 15E:
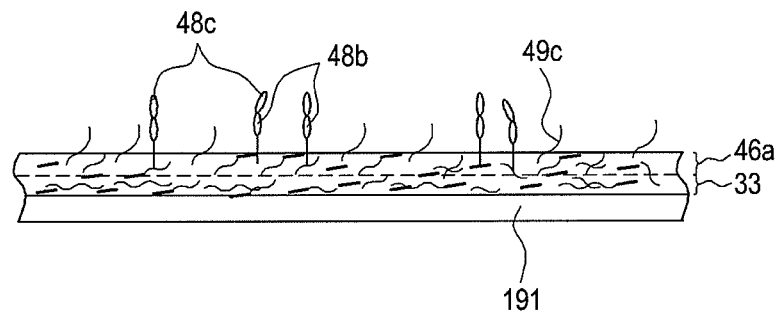

Referring to FIGS. 15D and 15E, the phase-separated polarized alignment reactants 46a and 37a are post-heated as described above. The post-heated polarized alignment reactants 46a and 37a form a main alignment layer 33 and a vertical alignment. The main alignment layer 33 is formed mainly by curing of the polarized main alignment material 37. In the post-heating process, the chemical bond of the heat-reactive part 48a constituting the mixed photo alignment material 48 is easily broken, and the bond-broken heat-reactive part 48a is chemically bonded to the photo alignment vertical material 49. Therefore, the photo alignment vertical material 49 constituting the vertical photo alignment material layer 46a, and the heat-reactive part 48a of the mixed photo alignment material 48 are chemically bonded, and the photo-reactive part 48b and the vertical functional part 48c form a vertical alignment on the surface of the vertical alignment material layer 46a. Accordingly, even though the photo alignment vertical material 49 does not have the photo reactivity, the photo alignment vertical material 49 may have the photo reactivity by being bonded to the heat-reactive part 48a of the mixed photo alignment material 48. The photo alignment vertical material 49 or the polarized main alignment material 37 bonded to the mixed photo alignment material 48 can have the photo reactivity, thus further reducing the content of the mixed photo alignment material 48 contained in the polarized alignment reactant 47. In the post-heating process, the solvent of the polarized alignment reactant 47 may be additionally vaporized. Further, in the post-heating process, the vertical functional group 49c contained in the photo alignment vertical material 49 may be vertically aligned.

After completion of the post-heating process, the polarized alignment reactant 47 is cleaned by DIW, and may be additionally cleaned by IPA. After the cleaning, the polarized alignment reactants 47 are dried.

Figure 15F:
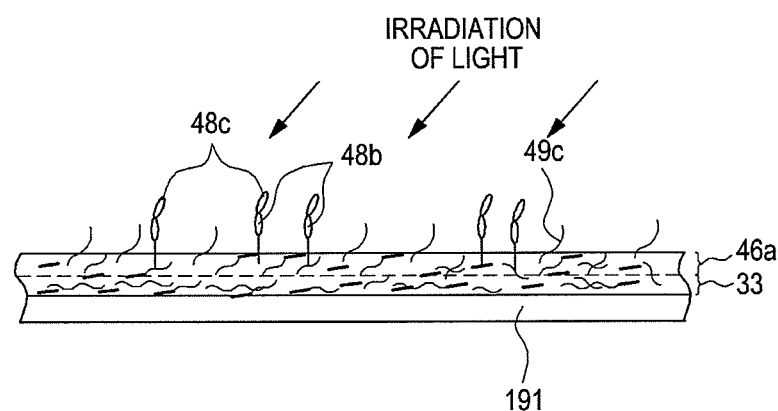
Figure 15G:
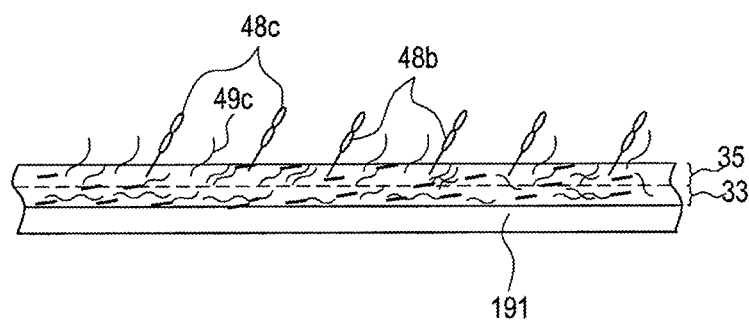

Now, referring to FIGS. 15F and 15G if light is irradiated to the vertical photo alignment material layer 46a, the photo-reactive part 48b of the mixed photo alignment material 48 is hardened, forming the photo hardening layer 35 on the main alignment layer as illustrated in FIG. 15G The main alignment layer 33 formed by heat curing and the photo hardening layer 35 formed by UV light constitute the lower-plate alignment film 291. The light irradiated to the vertical photo alignment material layer 46a and the photo hardening process, shown in FIG. 15F, are the same as those described above in relation to the polarized UV-VA mode. By the non-content photo hardening process, the photo hardening layer has a pre-tilt angle. The pre-tilt angle of the photo hardening layer may be about 80° to about 90°, more preferably about 87.5° to about 89.5°, with respect to the substrates of the display panels 100 and 200. Owing to the light irradiation method, even though the pixel electrodes do not have the micro slits 199 or micro branches 197, the liquid crystal display device according to an exemplary embodiment of the present invention may have a plurality of domains, which divide the liquid crystal layer 3 into a plurality of domains.

Thereafter, as described above in relation to step S340, the liquid crystal layer 3 and the sealant are formed between the lower and upper display panels 100 and 200 on which the lower-plate and upper-plate alignment films 291 and 292 are formed, respectively. The display panels 100 and 200 assembled by the sealant are annealed. The material of the sealant, the process of curing the sealant, and the annealing may be the same as those described above for the main alignment layers 33 and 34 having rigid vertical alignment side-chains. The liquid crystal display panel assembly 300 manufactured in this way has characteristics of the polarized UV-VA mode.

According to an exemplary embodiment of the present invention, the mixed photo alignment material 48 contained in the polarized alignment reactant 47 can easily move toward the surface onto which light is irradiated, in the process of forming the alignment film, making it possible to reduce the content of the mixed photo alignment material 48 contained the polarized alignment reactant 47. Therefore, the production cost of the liquid crystal display device is reduced.

In addition, the photo alignment vertical material 49 or the polarized main alignment material 37 can have a polarity due to their combination with the mixed photo alignment material 48, contributing to a further reduction in the content of the mixed photo alignment material 48 contained in the polarized alignment reactant 47.

Furthermore, the amount of the mixed photo alignment material 48 remaining in the alignment film can be minimized, contributing to a reduction in the RDC voltage or afterimages of the liquid crystal display device.

The main alignment layers 33 and 34 were formed by the polarized alignment reactant 47 having the mixed photo alignment material 48 according to an exemplary embodiment of the present invention, and the liquid crystal display device having them was manufactured.

The polarized alignment reactant 47 applied to experiments involving a liquid crystal display according to an exemplary embodiment of the present invention contained a solvent and solid contents having the polarized main alignment material 37, the photo alignment vertical material 49, and the mixed photo alignment material 48. The solid contents constituting the polarized alignment reactant 47 were about 6.5 wt %, and a solvent thereof was about 93.5 wt %. In addition, photo alignment vertical material 49 constituting the solid contents was about 30 wt %, the polarized main alignment material 37 was about 70 wt %, and the mixed photo alignment material 48 was about 5 wt %.

The photo alignment vertical material 49 was a compound (JSR, PI-37) of diacid anhydride and diamine, in which

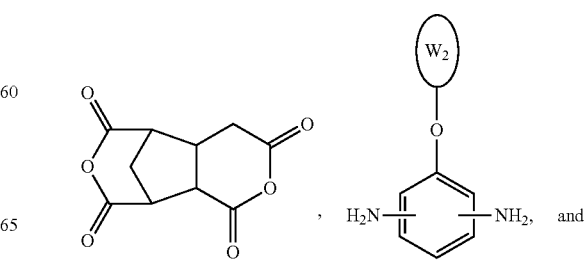

-continued

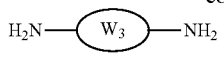

are composed in the ratio of about 1:0.4:0.6, where W2 is

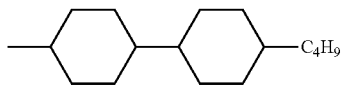

and W3 is

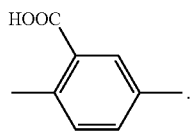

The polarized main alignment material 37 was a compound (JSR, PA-4) of diacid anhydride and diamine, in which

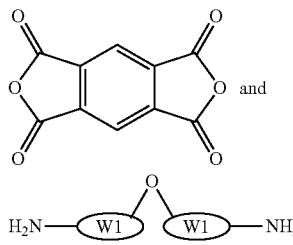

are composed in the ratio of about 1:1, where W1 is

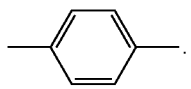

The mixed photo alignment material 48 was a compound (JSR, P_A(std.)) expressed by the following Formula X-UP3.

Formula X-UP3

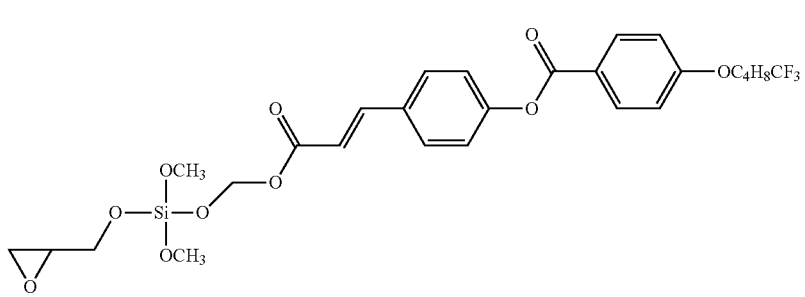

The solvent was a mixture of N-methylpyrrolidone of about 45 wt % and butyl cellosolve of about 55 wt %.

The polarized alignment reactant 47 having the above composition ratio, applied onto a 17-inch liquid crystal display panel, was pre-heated at about 80° C., and then post-heated at about 220° C. for about 20 minutes. Thereafter, linearly polarized UV was irradiated in an anti-parallel direction to the polarized alignment reactant 47 formed on the common electrode constituting the upper display panel, while having a tilt angle of about 50° with respect to the surface of the substrate of the display panel. In the same manner, the linearly polarized UV was irradiated to the polarized alignment reactants 47 formed on the pixel electrodes constituting the lower display panel.

Due to the irradiated UV, the lower-plate and upper-plate photo hardening layers 35 and 36 had anti-parallel pre-tilt angles. In other words, the photo hardening layers 35 and 36 had four different pre-tilt angles, and the liquid crystal layer 3 of the liquid crystal display device had four domains which were formed to have different azimuths by the photo hardening layers 35 and 36 having four different pre-tilt angles. The azimuths of the four domains are defined by a vector sum of the four different pre-tilt angles. An intensity of the linearly polarized UV was about 20 mJ/cm$^2$. The manufactured liquid crystal display panel assembly was operated by charge sharing-based 1G1D driving described above in conjunction with FIG. 11.

In the manufactured liquid crystal display device, liquid crystal molecules 31 adjacent to the photo hardening layer 35/36 had a pre-tilt angle of about 88.2° with respect to the surface of the substrate of the liquid crystal display panel. In addition, the surface afterimage of the liquid crystal display device, which had been operated in a chamber having a high temperature of about 50° C. for 24 hours with an image of a check flicker pattern, showed a good level of approximately 3.

Driving of Liquid Crystal Display Device

Now, the structure and operation of an equivalent circuit for one pixel PX of a liquid crystal display device will be described with reference to FIG. 11. FIG. 11 is an equivalent circuit diagram of a Charge Sharing (CS) charging-based 1 Gate line 1 Data line (1G1D) for one pixel PX shown in FIG. 3 according to an exemplary embodiment of the present invention. The equivalent circuit for one pixel PX in the liquid crystal display device includes signal lines and a pixel PX connected thereto, the signal lines including a gate line 121, a storage electrode line 125, a down gate line 123, and a data line 171.

One pixel PX is comprised of first, second and third TFTs Qh, Ql and Qc, first and second liquid crystal capacitors Clch and Clcl, first and second storage capacitors Csth and Cstl, and a down capacitor Cstd. The first and second TFTs Qh and Ql formed on the lower display panel 100 are 3-terminal devices, in which their gate electrodes or control terminals are connected to the gate line 121, their source electrodes or input terminals are connected to the data line 171, and their drain electrodes or output terminals are connected to the first and second liquid crystal capacitors Clch and Clcl and the first and second storage capacitors Csth and Cstl, respectively. The third TFT Qc is a 3-terminal device, in which its gate electrode or a control terminal is connected to the down gate line 123, its source electrode or an input terminal is connected to the second liquid crystal capacitor Clcl or the output terminal the second TFT Ql, and its drain electrode or an output terminal is connected to the down capacitor Cstd. First and second subpixel electrodes 191*h* and 191*l* constituting a pixel electrode 191 are connected to the drain electrodes or output terminals of the first and second TFTs Qh and Ql, respectively. Electrodes of the first and second liquid crystal capacitors Clch and Clcl are connected to the first and second subpixel electrodes 191*h* and 191*l*, respectively, and other electrodes thereof are each connected to the common electrode 270 on the upper display panel 200. Electrodes of the first and second storage capacitors Csth and Cstl are connected to the first and second subpixel electrodes 191*h* and 191*l*, respectively, and other electrodes thereof are each connected to the storage electrode line 125 on the lower display panel 100, or to the portions 126, 127 and 128 connected to the storage electrode line 125. One electrode of the down capacitor Cstd is connected to the output terminal of the third TFT Qc, and another electrode thereof is connected to the storage electrode line 125. The first and second storage electrodes Csth and Cstl enhance voltage maintaining abilities of the first and second liquid crystal capacitors Clch and Clcl, respectively. The electrodes of the capacitors Clch, Clcl, Csth, Cstl and Cstd overlap one another, with the insulators 3, 140, 181 and 182 interposed therebetween.

Now, the charging principle of a pixel PX will be described in detail. If a gate-on voltage Von is supplied to an n-th gate line Gn, the first and second TFTs Qh and Ql connected thereto are turned on, and a gate-off voltage Voff is supplied to an n-th down gate line An. Accordingly, a data voltage on an n-th data line Dn is equally supplied to the first and second subpixel electrodes 191*h* and 191*l* via the first and second TFTs Qh and Ql, which are turned on. Since the first and second liquid crystal capacitors Clch and Clcl charge charges as much as voltage differences between a common voltage Vcom on the common electrode 270 and the voltages on the first and second subpixel electrodes 191*h* and 191*l*, respectively, the charged voltage values of the first and second liquid crystal capacitors Clch and Clcl are the same. Thereafter, the gate-off voltage Voff is supplied to the n-th gate line Gn and the gate-on voltage Von is supplied to the n-th down gate line An. In other words, the first and second TFTs Qh and Ql are each turned off, and the third TFT Qc is turned on. Thus, charges on the second subpixel electrode 191*l* connected to the output terminal of the second TFT Ql flow into the down capacitor Cstd, lowering a voltage on the second liquid crystal capacitor Clcl. As a result, though the same data voltage is supplied to the subpixel electrodes 191*h* and 191*l*, the charged voltage on the first liquid crystal capacitor Clch is greater than that on the second liquid crystal capacitor Clcl. A ratio of the voltage on the second liquid crystal capacitor Clcl to the voltage on the first liquid crystal capacitor Clch may be about 0.6 to about 0.9:1, more preferably about 0.77:1. In this manner, the first and second subpixel electrodes 191*h* and 191*l* are provided with the same data voltage, and the second liquid crystal capacitor Clcl of the second subpixel electrode 191*l* and the down capacitor Cstd share charges to make capacitances of the first and second liquid crystal capacitors Clch and Clcl different from each other. This is called CS charging.

As a result, liquid crystal molecules 31 of the first subpixel electrode 191*h* receive an electric field of higher strength than that of liquid crystal molecules 31 of the second subpixel electrode 191*l*, so the liquid crystal molecules 31 of the first subpixel electrode 191*h* are tilted more. Since the liquid crystal molecules 31 of first and second subpixels 190*h* and 190*l* charged by CS compensate for phase retardation of light if they have different tilt angles, the liquid crystal display device according to an exemplary embodiment of the present invention may have excellent side visibility and a wide reference viewing angle. The reference viewing angle refers to a limit angle or an inter-gray scale luminance-crossing limit angle at which a side contrast ratio versus a front contrast ratio is about 1/10. The wider the reference viewing angle, the better the side visibility of the liquid crystal display device. In addition, one gate line 121 and one data line 171 are connected to one pixel PX to operate subpixels 190*h* and 190*l* constituting one pixel PX, thus increasing the aperture ratio of the liquid crystal display device. This method in which one gate line 121 and one data line 171 are connected to one pixel PX is 1G1D.

In an exemplary embodiment of the present invention, if the gate-on voltage Von supplied to the n-th gate line Gn and the gate-on voltage Von supplied to the n-th down gate line An overlap due to a signal delay of the gate-on voltages, poor charging may occur in the pixel electrode. To correct this, the n-th down gate line An may be connected to an (n+m)-th gate line 121 (where m≥1), more preferably an (n+4)-th gate line 121, to receive the gate-on voltage Von.

A 1-pixel PX circuit according to another exemplary embodiment of the present invention is 2-TFT (2T) charging-based 1 Gate 2 Data (1G2D), in which two TFTs and two data lines are connected to one pixel PX. In other words, first and second subpixel electrodes 191*h* and 191*l* are respectively connected to output terminals of first and second TFTs having gate electrodes connected to the same gate line, and two different data lines are connected to input terminals of the first and second TFTs, respectively. Different data voltages supplied to the first and second subpixel electrodes 191*h* and 191*l* via the two different data lines are divided voltages of a voltage corresponding to one image. The 2T charging-based 1G2D driving can apply an arbitrary data voltage to each of the subpixel electrodes 191*h* and 191*l*, thus further improving the side visibility of the liquid crystal display device.

Another exemplary embodiment of the present invention provides a swing voltage electrode line driving method. In this driving method, each pixel has two TFTs, one gate line, one data line, and two swing voltage electrode lines. Gate electrodes of first and second TFTs are connected to the gate line, source electrodes thereof are connected to the data line, and drain electrodes thereof are connected to first and second subpixel electrodes and first and second storage capacitors, respectively. Electrodes of first and second liquid crystal capacitors are connected to the first and second subpixel electrodes, respectively, and other electrodes thereof are each connected to a common electrode formed on the upper display panel. Electrodes of the first and second storage capacitors are connected to the first and second subpixel electrodes, respectively, and other electrodes thereof are connected to swing voltage electrode lines, respectively. During a pixel operaiion, pulse trains having a voltage level of a specific period are applied to the swing voltage electrode lines, and opposite-phase voltages are simultaneously applied to the swing voltage electrode line of the first subpixel and the swing voltage electrode line of the second subpixel. The pulse trains provided to the swing voltage electrode lines may have two different voltages. Hence, a voltage charged in a first-subpixel liquid crystal capacitor and a voltage charged in a second-subpixel liquid crystal capacitor are different from each other in level, thus improving side visibility of the liquid crystal display device.

Another exemplary embodiment of the present invention provides a storage electrode line charge sharing driving method. In this driving method, each pixel has three TFTs, one-gate line, one data line, and one storage electrode line. Gate electrodes of first and second TFTs are connected to the gate line, source electrodes thereof are connected to the data line, and drain electrodes thereof are connected to terminals of first and second-subpixel liquid crystal capacitors, respectively. Other terminals of the first and second-subpixel liquid crystal capacitors are each connected to the upper-plate common electrode. A gate electrode of a third TFT is connected to the storage electrode line, a source electrode thereof is connected to the second-subpixel liquid crystal capacitor's electrode that is connected to the drain electrode of the second TFT, and a drain electrode thereof is connected to an opposing electrode of the storage electrode line or a drain electrode's extended portion of the third TFT. Since a charged voltage of the second-subpixel liquid crystal capacitor shares charges with the drain electrode's extended portion of the third TFT by the voltage on the storage electrode line, a charged voltage of the second subpixel is lower than a charged voltage of the first subpixel. The voltage supplied to the storage electrode line may be substantially the same as the voltage on the common electrode.

Now, an operation of the liquid crystal display device manufactured by the aforementioned method will be described in detail. The liquid crystal display device has the pixel PX structure shown in FIG. 3, and operates in the method described in conjunction with FIG. 11. Each of the modes for manufacturing the liquid crystal display panel assembly 300, e.g., SVA, SC-VA and polarized UV-VA modes, was distinguished depending on the method of forming the alignment films 291 and 292. However, after the liquid crystal display panel assembly 300 is manufactured, the liquid crystal display device operates in substantially the same way regardless of the mode used. Therefore, the operation of the liquid crystal display device will be described below without reference to the modes used to form the alignment films.

The liquid crystal display panel assembly 300 is assembled based on the SVA, SC-VA or polarized UV-VA mode, using the lower and upper display panels 100 and 200 having the pixel PX of FIG. 3. The liquid crystal display device is manufactured by connecting the drivers 400 and 500, the signal controller 600 and the gray scale voltage generator 800 to the liquid crystal display panel assembly 300 as illustrated in FIG. 1. While no voltage is supplied to the pixel PX in the liquid crystal display device, liquid crystal molecules 31 adjacent to the alignment films 291 and 292 have a specific pre-tilt angle slightly tilted with respect to the direction perpendicular to the lower and upper display panels 100 and 200. If a data voltage is supplied to the pixel electrode 191, the liquid crystal molecules 31 in the same domain move in the same tilt direction. Because directions of the micro branches 197 of the first and second subpixel electrodes 191h and 191l are different from each other with respect to the transmission axis or polarization axis of the polarizer, the strength of the fringe electric field is different according to the widths of micro slits 199, voltages of the liquid crystal capacitors are different, and the subpixel electrodes 190h and 190l are different in luminance. By adjusting the liquid crystal's tilt angles of the subpixel electrodes 191h and 191l in this way, the side visibility of the liquid crystal display device may be improved. In addition, since the second subpixel electrode 191l has the MA region described above, the arrangement of the liquid crystal molecules 31 continuously changes, reducing the texture occurring when the liquid crystal molecules 31 are aligned discontinuously.

Basic Pixel Group of Liquid Crystal Display Device

Now, with reference to FIGS. 12, 14, and 28 to 32, a basic pixel group PS representing the primary colors according to exemplary embodiments of the present invention will be described. This basic pixel group PS improves visibility of the liquid crystal display device and reduces rainbow stains or the yellowish phenomenon, contributing to improvement of the quality of a liquid crystal display device having this basic pixel group. FIGS. 12, 14, and 28 to 32 are plan views of the pixel electrodes 191 of the basic pixel group PS of the liquid crystal display device according to exemplary embodiments of the present invention. FIGS. 12, 14, and 28 to 32 illustrate plan views of only the pixel electrodes of the basic pixel group PS formed on the lower display panel 100. Since other plan views except the plan view of the pixel electrode 191 are the same as above, a description thereof is omitted, as well as other duplicate descriptions.

Figure 12:
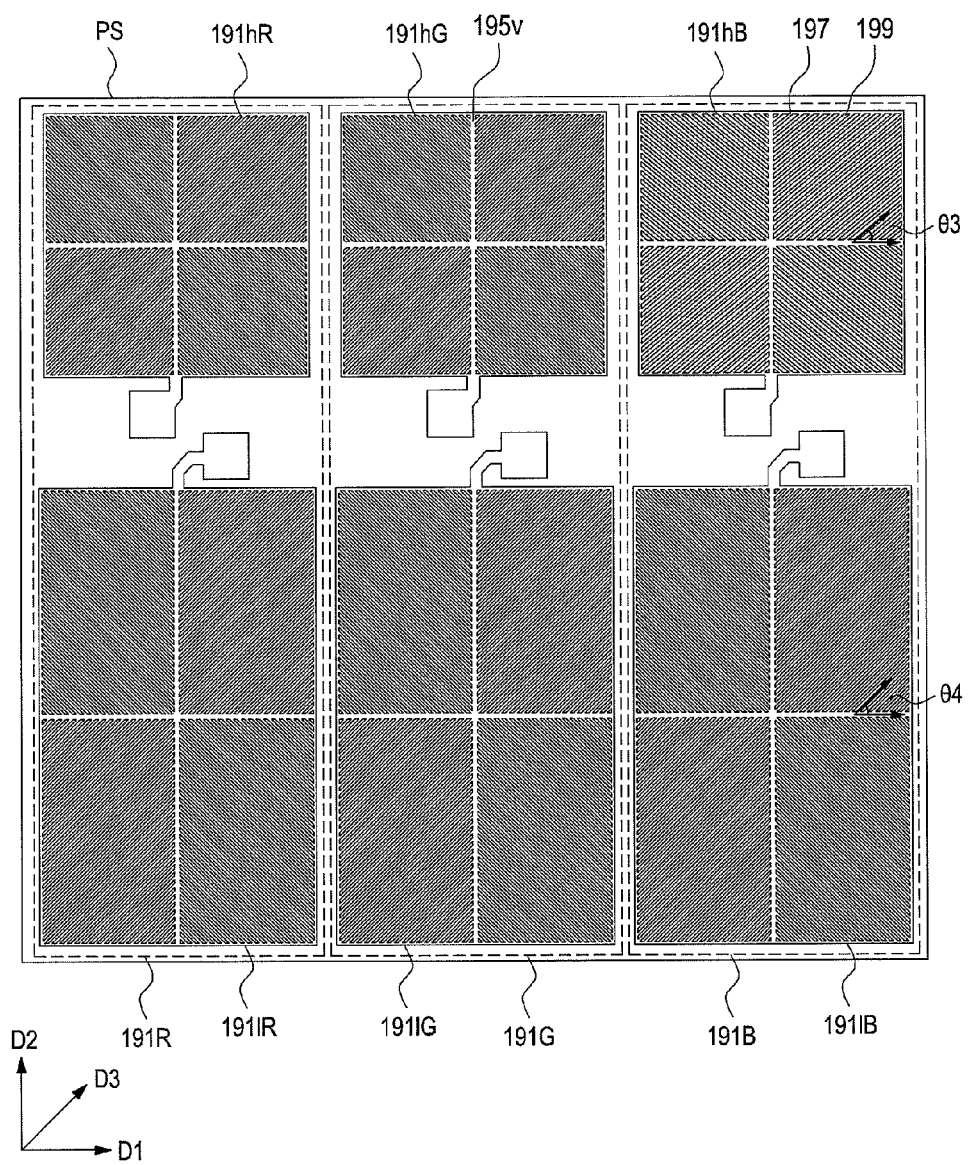
FIG. 12 is a plan view illustrating pixel electrodes of a pixel group in a liquid crystal display device according to an exemplary embodiment of the present invention.

As illustrated in FIG. 12, the basic pixel group PS is comprised of pixel electrodes 191R, 191G and 191B corresponding to the primary colors of red, green and blue. The pixel electrodes 191R and 191G of red and green pixels PX are the same in structure, but the pixel electrode 191B of a blue pixel PX is partially different in structure from the other pixel electrodes 191R and 191G. The basic pixel group PS consists of red, green and blue pixels PX corresponding to the 3 primary colors: red R, green G and blue B. The red, green and blue pixels PX have the red, green and blue pixel electrodes 191R, 191G and 191B, respectively. Color filters representing the primary colors may be formed on the lower or upper display panel 100 or 200. Each of the pixel electrodes 191R, 191G and 191B is divided into two subpixel electrodes 191h and 191l formed in two subpixel regions. The red pixel electrode 191R has a first red subpixel electrode 191hR formed in a first subpixel region of the red pixel and a second red subpixel electrode 191lR formed in a second subpixel region of the red pixel. The green pixel electrode 191G has a first green subpixel electrode 191hG formed in a first subpixel region of the green pixel and a second green subpixel electrode 191lG formed in a second subpixel region of the green pixel. The blue pixel electrode 191B has a first blue subpixel electrode 191hB formed in a first subpixel region of the blue pixel and a second blue subpixel electrode 191lB formed in a second subpixel region of the blue pixel. A micro branch width and a micro slit width of each of the first red subpixel electrode 191hR and the first green subpixel electrode 191hG were about 3 μm and about 3 μm, respectively, and a micro branch width and a micro slit width of the first blue subpixel electrode 191hB were about 3 μm and about 4 μm, respectively. A micro branch width and a micro slit width of each of the second red subpixel electrode 191lR, the second green subpixel electrode 191lG and the second blue subpixel electrode 191lB were about 3 μm and about 3 μm, respectively. According to an exemplary embodiment of the present invention, the width of the micro slits of the first subpixel electrode 191hB in the blue pixel is greater than the widths of the micro slits of the first subpixel electrodes 191hR and 191hG and the second subpixel electrodes 191lR, 191lG and 191lB in the other pixels, thus reducing first subpixel's luminance in the blue pixel.

A direction of micro branches of each of the first red, green and blue subpixel electrodes 191hR, 191hG and 191hB is θ3, which is about 40°. A direction of micro branches of each of the second red, green and blue subpixel electrodes 191lR, 191lG and 191lB is θ4, which is about 45°. Each of θ3 and θ4 is an angle with respect to the polarization axis of the polarizer. If micro branch directions of the first subpixel electrodes 191hR, 191hG and 191hB and the second subpixel electrodes 191lR, 191lG and 191lB are set different in this way, luminance of the first subpixels and luminance of the second subpixels are adjusted. In each of the pixels constituting the basic pixel group, the area of the second subpixel is about 1.75 times that of the first subpixel.

Figure 13A:
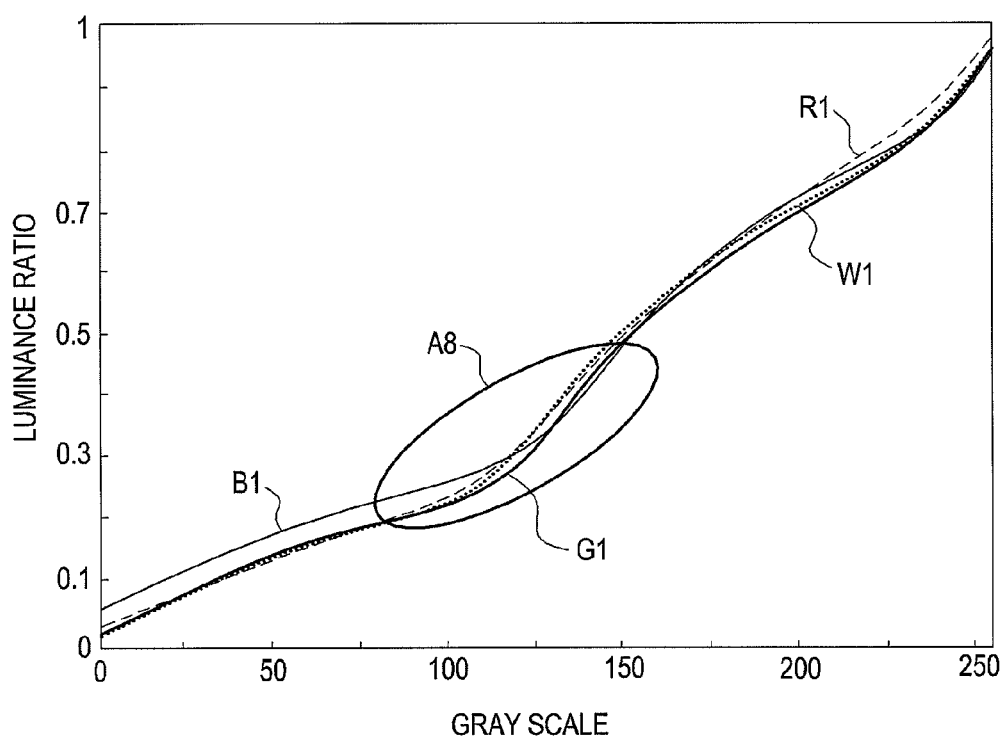
FIG. 13A is a gray scale-luminance ratio graph of a conventional liquid crystal display device.
Figure 13B:
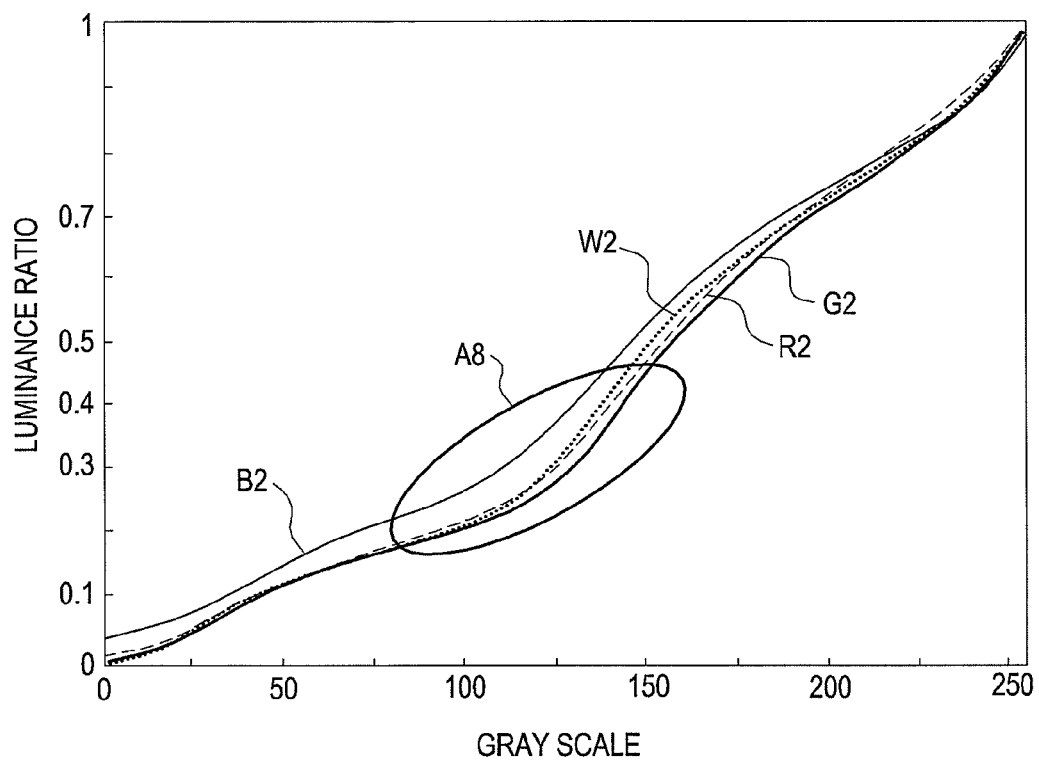
FIG. 13B is a gray scale-luminance ratio graph of a liquid crystal display device according to an exemplary embodiment of the present invention.

Now, a description will be made of optical properties and effects of the liquid crystal display device having the pixel electrodes 191 of the basic pixel group PS shown in FIG. 12. FIG. 13A is a gray scale-luminance ratio graph measured in a conventional liquid crystal display device in which all of the pixel electrodes constituting a basic pixel group PS have the same structure. FIG. 13B is a gray scale-luminance ratio graph measured in the liquid crystal display device having the pixel electrodes 191 of the basic pixel group PS shown in FIG. 12 according to an exemplary embodiment of the present invention. The liquid crystal display device according to an exemplary embodiment of the present invention was manufactured based on the SVA mode and operated using the CS charging-based 1G1D driving. Further, in the current exemplary embodiment of the present invention, the voltage charged in the second subpixel electrode was about 0.77 times the voltage charged in the first subpixel electrode, and the cell spacing in the liquid crystal layer was about 3.55 μm.

The horizontal axis of the gray scale-luminance ratio graph represents a gray scale corresponding to a voltage supplied to the subpixel electrodes 191h and 191l, and the vertical axis thereof represents a luminance ratio of the liquid crystal display device, which was measured by a spectroscope on the right side of the liquid crystal display device at approximately 60°. The luminance ratio on the vertical axis represents a ratio of gray scale luminance to the maximum luminance of each color, measured at the right side at approximately 60°. Referring to a blue luminance curve B1 shown in FIG. 13A by way of example, if blue pixel's luminance is 100 candela (cd) at the highest gray scale of 250, and 50cd at a gray scale of 150, the luminance ratio of the blue luminance curve B1 is about 0.5. Curves R1, G1, B1 and W1 shown in FIG. 13A are luminance ratio curves of red light, green light, blue light and white light, respectively, measured in the conventional liquid crystal display device. Curves R2, G2, B2 and W2 shown in FIG. 13B are luminance ratio curves of red light, green light, blue light and white light, respectively, measured in the liquid crystal display device according to an exemplary embodiment of the present invention. The white-light luminance W1 and W2 are sums of the red-light luminance R1 and R2, the green-light luminance G1 and G2, and the blue-light luminance B1 and B2. Ratios of the red-light luminance, green-light luminance and blue-light luminance to the white-light luminance are about 55% to about 65%, 20% to about 30% and 10% to about 20%, respectively.

As can be seen from the graph, of FIG. 13A, in the medium gray scale portion A8 represented by an ellipse, the conventional red-light luminance ratio curve R1 abruptly increases in slope, crossing the blue-light luminance ratio curve B1. After passing the point where the red-light luminance ratio curve G1 and the blue-light luminance ratio curve B1 cross each other, the red-light luminance ratio is higher than the blue-light luminance ratio. In this gray scale portion A8 where the blue-light luminance ratio becomes lower than the red-light luminance ratio, a yellowish color appears at the side of the liquid crystal display device. If the yellowish color is visually perceived, the image quality is decreased and the color of the original image is disordered, thus deteriorating the display quality of the liquid crystal display device. Therefore, it may be good to prevent the yellowish color from being visually perceived. The luminance ratios of the primary colors cross each other at a specific one of high gray scales, but at the high gray scales, a luminance difference between gray scales is large, so the yellowish color can be scarcely observed.

However, as illustrated in FIG. 13B, the liquid crystal display device having the pixel electrodes of the basic pixel group PS according to an exemplary embodiment of the present invention does not have the point where the red-light luminance ratio curve G1 and the blue-light luminance ratio curve B1 cross each other, which was observed in the conventional liquid crystal display device. In the medium gray scale portion A8 represented by an ellipse in FIG. 13B, since the red-light luminance ratio curve R2 and the blue-light luminance ratio curve B2 are similar in the slope, there is no point where the red-light luminance ratio, and the blue-light luminance ratio cross each other. Therefore, the liquid crystal display device according to an exemplary embodiment of the present invention does not generate the yellowish color.

In addition, if luminance ratios among the primary colors change as the luminance ratios of different primary colors cross each other at a particular gray scale, the liquid crystal display device may cause color error or chromaticity shift. To correct this, the luminance ratios among the primary color pixels constituting the basic pixel group may be designed in balance.

Figure 14:
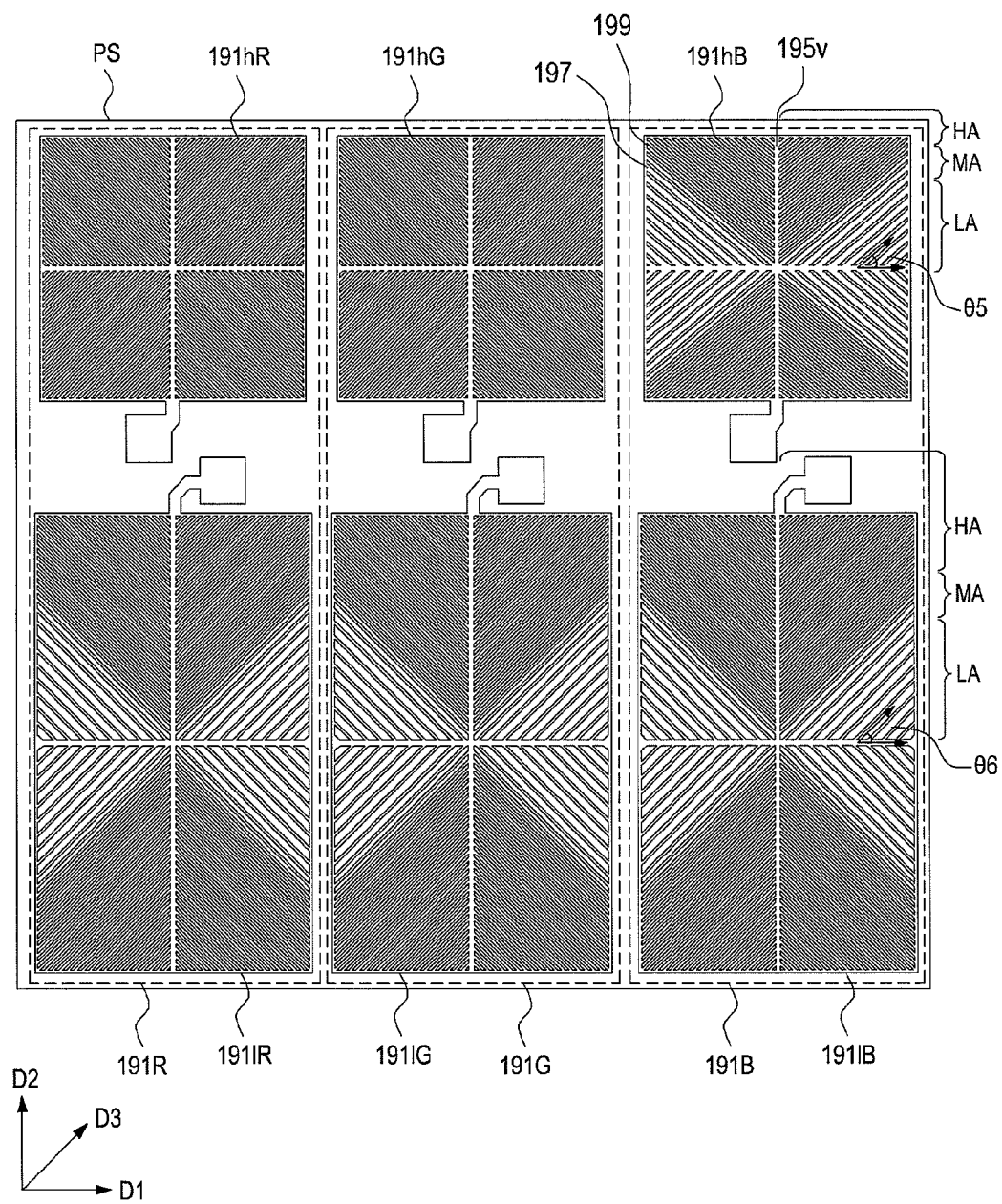
FIG. 14 is a plan view illustrating pixel electrodes of a pixel group in a liquid crystal display device according to an exemplary embodiment of the present invention.

FIG. 14 is a plan view of the pixel electrodes 191 of the basic pixel group PS of a liquid crystal display device according to another exemplary embodiment of the present invention. FIG. 14 illustrates a plan view of only the pixel electrodes 191 of the basic pixel group PS formed on the lower display panel 100. Since other plan views except the plan view of the pixel electrode 191 are the same as those described in FIG. 12, a description thereof is omitted, and other duplicate descriptions are also omitted except for the differences. The basic pixel group PS consists of red, green and blue pixels PX corresponding to the three primary colors: red R, green G and blue B. In each of the pixels, pixel electrodes are formed, and each pixel electrode consists of first and second subpixel electrodes.

A micro branch width and a micro slit width of each of the first red subpixel electrode 191hR and the first green subpixel electrode 191hG are about 3 μm and about 3 μm, respectively, and a micro branch width and a micro slit width of the first blue subpixel electrode 191hB are, respectively, about 3 μm and about 3 μm in the HA region, about 3 μm and about 4 μm in the LA region, and about 3 μm and about 3 μm to about 4 μm in the MA region. Micro branches 197 formed in each domain are symmetrical about the horizontal and vertical cross-shaped branches 195. If the first blue subpixel electrode 191lB is formed in this manner, the first blue subpixel is lower in luminance than the first subpixels of other color pixels.

A micro branch width and a micro slit width of each of the second red subpixel electrode 191lR, the second green subpixel electrode 191lG and the second blue subpixel electrode 191lB are, respectively, about 3 μm and about 3 μm in the HA region, about 3 μm and about 4 μm in the LA region, and about 3 μm and about 3 μm to about 4 μm in the MA region. The MA region included in each of the first and second blue subpixel electrodes 191hB and 191lB, the second red subpixel electrode 191lR and the second green subpixel electrode 191lG is a region where the micro branch width is constant to about 3 μm and the micro slit width gradually changes from about 3 μm to about 4 μm. In each domain, the area of the HA region is about 61% of the total area of the domain region, e.g., the combined area of the HA region, LA region and the MA region. In addition, the area of the MA region is about 30% to about 35% of the HA region's area. Micro branches 197 formed in each domain in each subpixel are symmetrical about the horizontal and vertical cross-shaped branches 195. By forming the subpixel electrodes of the second subpixels in this manner, it is possible to adjust luminance of the second subpixels with respect to luminance of the first subpixels. In addition, since the MA regions are formed on the second subpixel electrodes, texture occurrence decreases and luminance of the second subpixels increases.

A direction of micro branches of each of the first red, green and blue subpixel electrodes 191hR, 191hG and 191hB is equal to θ5, which is about 40°. A direction of micro slits of each of the second red, green and blue subpixel electrodes 191lR, 191lG and 191lB is equal to θ6, which is about 45°. Each of θ5 and θ6 is an angle with respect to the polarization axis of the polarizer. Since angles of θ5 and θ6 are formed different, luminance of the first and second subpixels is adjusted, improving the side visibility of the liquid crystal display device.

By differentiating the micro slit width of the first subpixel electrode 191hB of the blue pixel electrode 191B from those of the first subpixel electrodes of other color pixels as illustrated in FIG. 14, the yellowish phenomenon of the liquid crystal display device may be prevented.

Unlike the exemplary embodiments shown in FIGS. 12 and 14, one pixel electrode other than the blue pixel electrode may be formed different in structure from other pixel electrodes.

In an alternative exemplary embodiment of the present invention, micro branches 197 formed in each domain may be symmetrical about any one of the horizontal and vertical cross-shaped branches 195, more preferably about the horizontal cross-shaped branch 195.

In another exemplary embodiment of the present invention, the basic pixel group PS may be comprised of four or more colors, including the yellow color. To improve the color quality of the liquid crystal display device, the structure of two or more primary colors' pixel electrodes 191 may be formed different from the structure of the other one primary color's, pixel electrode 191 in the basic pixel group PS comprised of four or more primary colors.

A pixel electrode structure of a basic pixel group (PS) will be described in detail below with reference to FIGS. 28 to 32. Micro branches 197 and micro slits 199 illustrated FIGS. 28 to 32 have a zigzag shape. An area ratio of a first subpixel electrode 191h28 to a second subpixel electrode 191l28 may fall within a range of about 1:2 to about 1:1.5. Duplicate descriptions will be omitted hereinafter.

Figure 28:
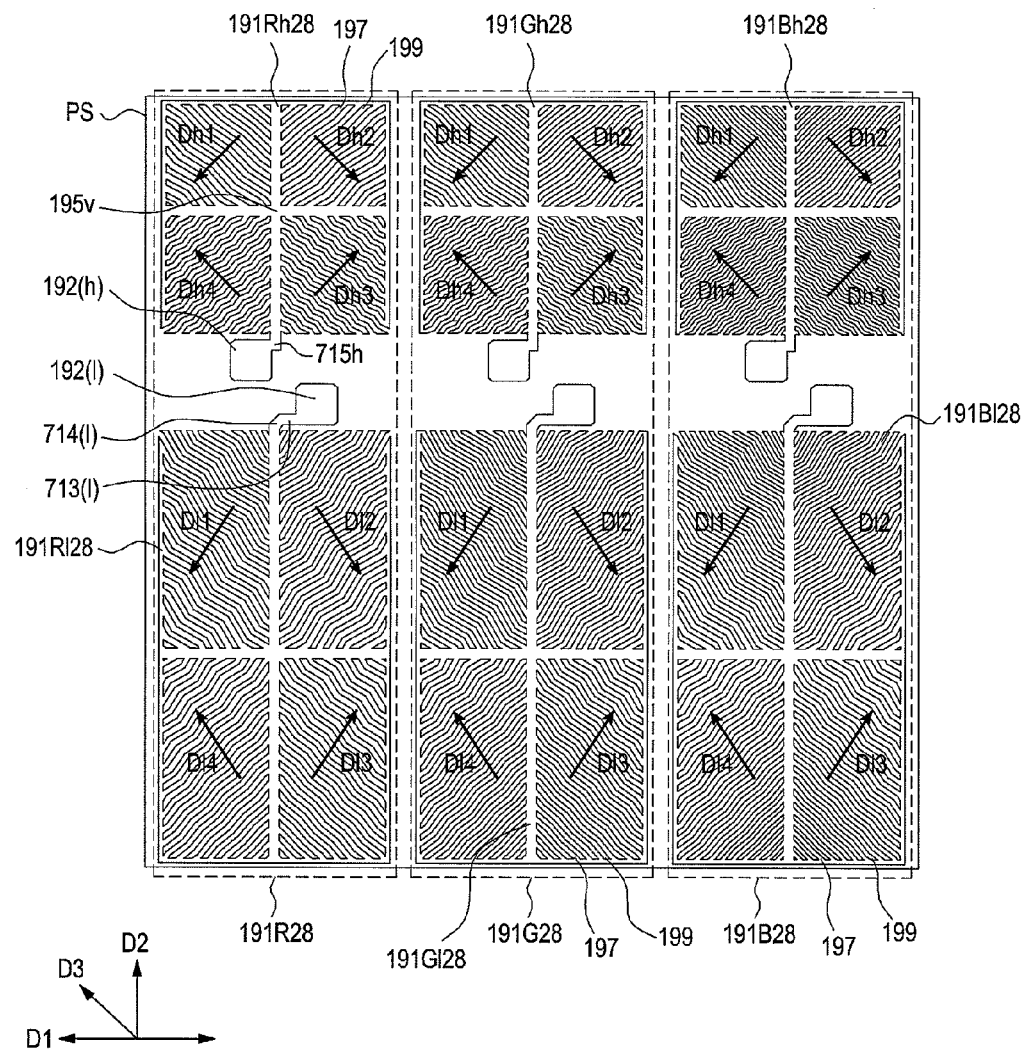
FIG. 28 is a plan view illustrating pixel electrodes of a pixel group of a liquid crystal display device according to another exemplary embodiment of the present invention.

According to an exemplary embodiment of the present invention, a basic pixel group PS illustrated in FIG. 28 includes different structures of pixel electrodes corresponding to pixels having different primary colors. The primary colors include a red color R, a green color G and a blue color B, and they constitute red, green and blue pixels PXs, respectively. On a red pixel PX is formed a red pixel electrode 191R28, which includes first and second subpixel electrodes 191Rh28 and 191Rl28. On a green pixel PX is formed a green pixel electrode 191G28, which includes first and second subpixel electrodes 191Gh28 and 191Gl28. On a blue pixel PX is formed a blue pixel electrode 191B28, which includes first and second subpixel electrodes 191Bh28 and 191Bl28. First subpixel electrodes 191Bh28, 191Gh28, and 191Rh28 of pixel electrodes, e.g., red, green and blue pixel electrodes 191R28, 191G28, and 191B28 of the basic pixel group, each have four domain regions Dh1, Dh2, Dh3, and Dh4, and also, second subpixel electrodes 191Bl28, 191Gl28, and 191Rl28 thereof each have four domain regions Dl1, Dl2, Dl3, and Dl4.

Micro branches 197 and micro slits 199 constituting pixel electrodes of the primary colors may be different in widths in different pixel electrodes of the primary colors. For example, in eight domains Dh1, Dh2, Dh3, Dh4, Dl1, Dl2, Dl3, and Dl4 formed on first and second subpixel electrodes 191Rh28 and 191Rl28 of the red pixel electrode 191R28, widths S and W of micro branches 197 and micro slits 199 gradually increase in the arrow directions illustrated in FIG. 28 from about 3.4 μm to about 4.2 μm by a value falling within a range of about 0.2 μm to about 0.5 μm. In eight domains Dh1, Dh2, Dh3, Dh4, Dl1, Dl2, Dl3, and Dl4 formed on first and second subpixel electrodes 191Gh28 and 191Gl28 of the green pixel electrode 191G28, widths S and W of micro branches 197 and micro slits 199 gradually increase in the arrow directions illustrated in FIG. 28 from about 3 μm to about 3.8 μm by a value falling within a range of about 0.2 μm to about 0.5 μm. In eight domains Dh1, Dh2, Dh3, Dh4, Dl1, Dl2, Dl3, and Dl4 formed on first and second subpixel electrodes 191Bh28 and 191Bl28 of the blue pixel electrode 191B28, widths S and W of micro branches 197 and micro slits 199 gradually increase in the arrow directions illustrated in FIG. 28 from about 2.5 μm to about 4 μm by a value falling within a range of about 0.2 μm to about 0.5 μm. In accordance with an exemplary embodiment of the present invention, each of domains Dh1~Dh4, and Dl1~Dl4 is divided into a plurality of groups, which have micro branches with the same widths S and micro slits with the same widths W, and in which widths of micro branches and micro slits may increase along groups in the arrow directions.

Main directions, zigzag angles and zigzag unit lengths of zigzag-shaped micro branches 197 will be described below. In domains Dh1 and Dh2 formed on first subpixel electrodes 191Rh28, 191Gh28, and 191Bh28 of pixel electrodes 191R28, 191G28, and 191B28 in the basic pixel group, a zigzag unit length is about 20 μm, main direction angles of micro branches 197 are about 40°, and a zigzag angle gradually increases in the arrow directions illustrated in FIG. 28 from about ±0° to about ±12° by a value falling within a range of about 0.5° to about 1°. In domains Dh3 and Dh4 formed on first subpixel electrodes 191Rh28, 191Gh28, and 191Bh28 of pixel electrodes 191R28, 191G28, and 191B28 in the basic pixel group, a zigzag unit length is about 7 μm, main direction angles of micro branches 197 are about 40°, and a zigzag angle is about ±15°. In domains Dl1 and Dl2 formed on second subpixel electrodes 191Rl28, 191Gl28, and 191Bl28 of red, green and blue pixel electrodes 191R28, 191G28 and 191B28, a zigzag unit length is about 20 μm, main direction angles of micro branches 197 are about 45°, and a zigzag angle is about ±15°. In domains Dl3 and Dl4 formed on second subpixel electrodes 191Rl28, 191Gl28, and 191Bl28 of pixel electrodes 191R28, 191G28, and 191B28 in the basic pixel group, a zigzag unit length is about 14 μm, main direction angles of micro branches 197 are about 45°, and zigzag angles gradually increase in the arrow directions illustrated in FIG. 28 from about ±0° to about ±15° by a value falling within a range of about 0.5° to about 1°. Main directions, zigzag angles and zigzag unit lengths of micro branches 197 formed in domains Dh1, Dh2, Dh3, Dh4, Dl1, Dl2, Dl3 and Dl4 constituting the green pixel electrode 191G28 are equal to main directions, zigzag angles and zigzag unit lengths of micro branches 197 formed in domains constituting the red and blue pixel electrodes 191R28 and 191B28. In accordance with an exemplary embodiment of the present invention, in pixel electrodes 191R28, 191G28, and 191B28 of the basic pixel group, pixel electrode structures in domains Dh1, Dh4, Dl1, and Dl4 formed at the left of cross-shaped branch's vertical portions 195v may be symmetrical to pixel electrode structures in domains Dh2, Dh3, Dl2, and Dl3 formed at the right of the cross-shaped branch's vertical portions 195v about the vertical portions 195v. The basic pixel group constructed with these pixel electrodes may improve visibility of the liquid crystal display device, prevent the yellowish color from being visible, and significantly reduce rainbow stains by dispersing diffraction spots of light diffracted in the liquid crystal display device.

Figure 29:
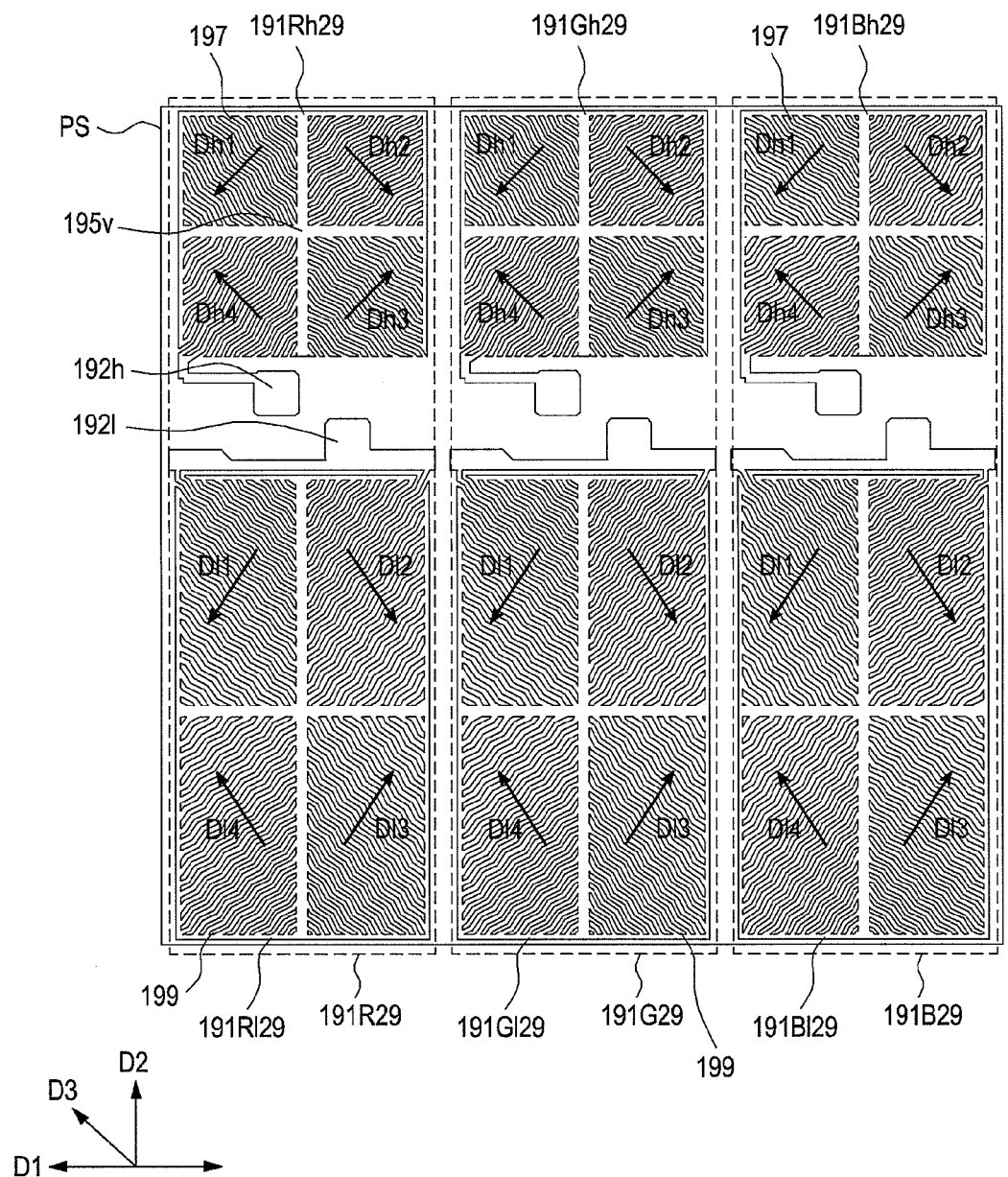
FIG. 29 is a plan view illustrating pixel electrodes of a pixel group of a liquid crystal display device according to another exemplary embodiment of the present invention.

Each of pixel electrode junction connection portions formed on first subpixel electrodes 191Rh28, 191Gh28, and 191Bh28 has a pixel electrode's vertical connection portion 715h that connects a first pixel electrode contact portion 192h to a cross-shaped branch's vertical portion 195v. Each of pixel electrode junction connection portions formed on second subpixel electrodes 191Rl28, 191Gl28, and 191Bl28 has a pixel electrode's horizontal connection portion 713l connected to a second pixel electrode contact portion 192l, and a pixel electrode's oblique connection portion 714l that connects the pixel electrode's horizontal connection portion 713l to a cross-shaped branch's vertical portion 195v. These pixel electrode junction connection portions reduce liquid crystal molecule's unrestoration and light leakage defects. Domains formed on pixel electrodes constituting a basic pixel group illustrated in FIG. 29 have different main directions and the same zigzag angle according to an exemplary embodiment of the present invention. Widths of micro branches 197 and micro slits 199 illustrated in FIG. 29 are equal in domains formed on the same subpixels. In other words, widths of micro branches 197 and micro slits 199 are uniformly distributed in all domains Dh1, Dh2, Dh3, and Dh4 formed on first subpixels, and widths of micro branches 197 and micro slits 199 are uniformly distributed in all domains Dl1, Dl2, Dl3, and Dl4 formed on second subpixels. However, widths of micro branches 197 or micro slits 199 formed in domains of first subpixels are different from those in domains of second subpixels. For example, in domains Dh1, Dh2, Dh3, and Dh4 formed on first subpixel electrodes 191Rh29, 191Gh29, and 191Bh29 of pixel electrodes 191R29, 191G29, and 191B29 in the basic pixel group, widths S and W of micro branches 197 and micro slits 199 gradually increase in the arrow directions illustrated in FIG. 29 from about 2.5 μm to about 3.2 μm by a value falling within a range of about 0.2 μm to about 0.5 μm. In domains Dl1, Dl2, Dl3, and Dl4 formed on second subpixel electrodes 191Rl29, 191Gl29, and 191Bl29 of pixel electrodes 191R29, 191G29, and 191B29 in the basic pixel group, widths S and W of micro branches 197 and micro slits 199 gradually increase in the arrow directions illustrated in FIG. 29 from about 2.5 μm to about 3.5 μm by a value falling within a range of about 0.2 μm to about 0.5 μm. In accordance with an exemplary embodiment of the present invention, each of domains Dh1~Dh4, and Dl1~Dl4 is divided into a plurality of groups, which have micro branches with the same widths and micro slits with the same widths, and in which widths of micro branches and micro slits may increase along groups in the arrow directions.

Main directions, zigzag angles and zigzag unit lengths of zigzag-shaped micro branches 197 will be described below. Zigzag unit lengths are about 14 μm in domains Dh1, Dh2, Dh3 and Dh4 formed on first subpixel electrodes 191Rh29, 191Gh29, and 191Bh29 of pixel electrodes 191R29, 191G29, and 191B29 in the basic pixel group, and about 10 μm in domains Dl1, Dl2, Dl3 and Dl4 formed on second subpixel electrodes 191Rl29, 191Gl29, and 191Bl29. In domains Dh1, Dh2, Dh3 and Dh4 formed on first subpixel electrodes 191Rh29 and 191Gh29 of red and green pixel electrodes 191R29 and 191G29, and domains Dl1, Dl2, Dl3 and Dl4 formed on a second subpixel 191Bl29 of a blue pixel electrode 191B29, main direction angles of micro branches 197 are about 50°, about 48°, about 40°, and about 41.3°, respectively, and zigzag angles are about ±15° in each domain. In domains Dl1, Dl2, Dl3 and Dl4 formed on second subpixel electrodes 191Rl29 and 191Gl29 of red and green pixel electrodes 191R29 and 191G29, and domains Dh1, Dh2, Dh3 and Dh4 formed on a first subpixel electrode 191Bh29 of a blue pixel electrode 191B29, main direction angles of micro branches 197 are about 42°, about 40.8°, about 48°, and about 49.2°, respectively, and zigzag angles are about ±15° in each domain.

The basic pixel group PS having primary colors, the pixel electrodes 191R29, 191G29, and 191B29 including first subpixel electrodes 191Rh29, 191Gh29, and 191Bh29 and second subpixel electrodes 191R129, 191G129, and 191B129, the pixel electrodes divided into domain regions Dh1, Dh2, Dh3, Dh4, Dl1, Dl2, Dl3, and Dl4, the zigzag-shaped micro branches 197, and the area ratios of first subpixel electrodes to second subpixel electrodes are substantially similar to those described above or in connection with FIG. 28. The basic pixel group constructed with these pixel electrodes has the characteristics described in connection with FIG. 28. Pixel electrode junction connection portions formed on first and second subpixel electrodes 191Rh29, 191Gh29, 191Bh29, 191Rl29, 191Gl29, and 191Bl29 are similar to those described with reference to FIGS. 23C and 24C.

Figure 30:
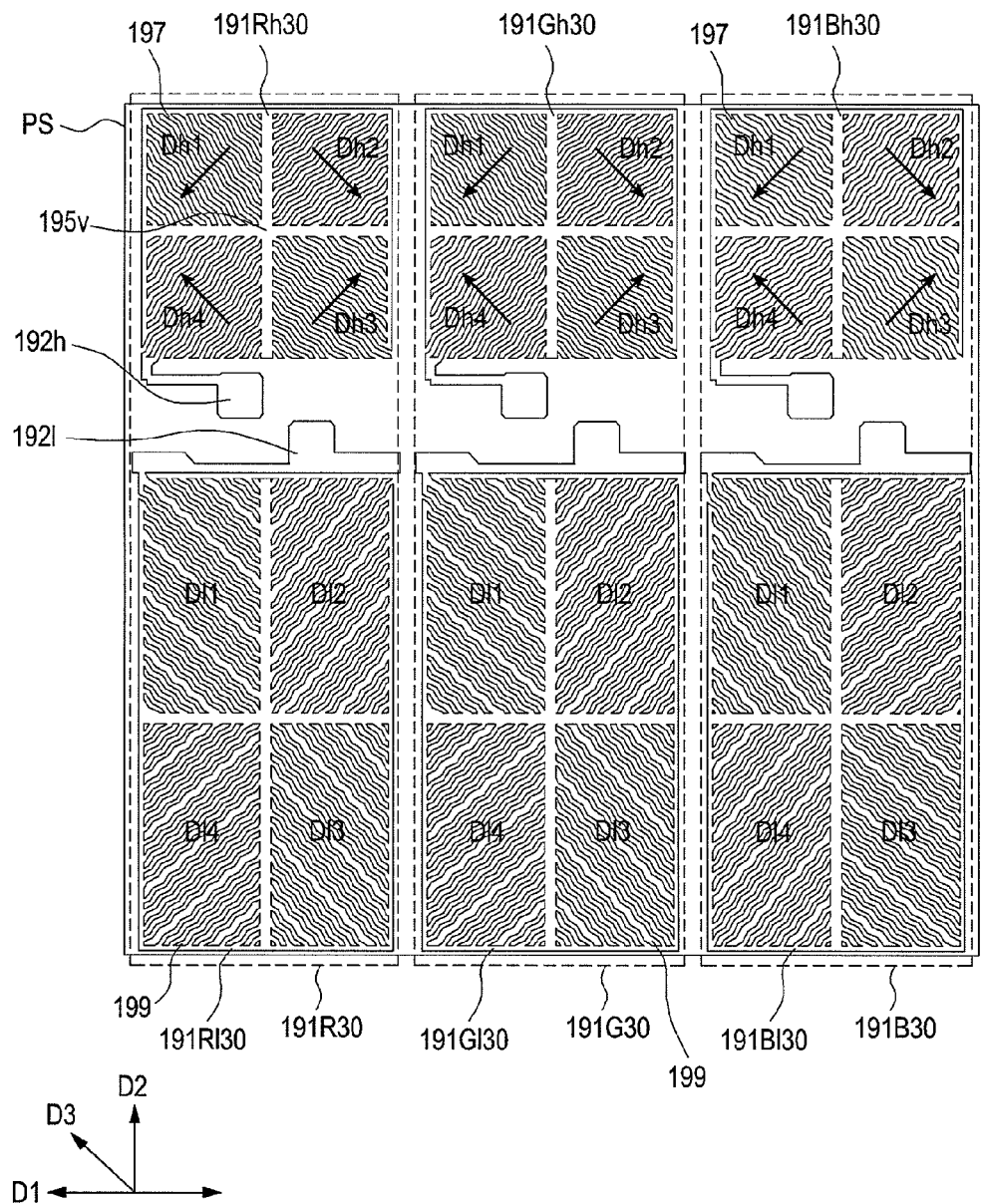
FIG. 30 is a plan view illustrating pixel electrodes of a pixel group of a liquid crystal display device according to another exemplary embodiment of the present invention.

According to an exemplary embodiment of the present invention, in pixel electrodes constituting a basic pixel group PS illustrated in FIG. 30, each of domains Dl1, Dl2, Dl3, and Dl4 on second subpixel electrodes 191Rl30, 191Gl30, and 191Bl30 has a plurality of subdomains, micro branches and micro slits in each subdomain have the same widths, and a width between adjacent subdomains is greater than the widths of micro branches or micro slits in each subdomain. However, in domains Dh1~Dh4 on first subpixel electrodes 191Rh30, 191Gh30, and 191Bh30, widths of micro branches and micro slits gradually increase in the arrow directions. For example, in domains Dh1, Dh2, Dh3, and Dh4 formed on first subpixel electrodes 191Rh30 and 191Gh30 of red and green pixel electrodes 191R30 and 191G30, widths S and W of micro branches 197 and micro slits 199 gradually increase in the arrow directions illustrated in FIG. 30 from about 2.8 μm to about 3.3 μm by a value falling within a range of about 0.2 μm to about 0.5 μm. In domains Dh1, Dh2, Dh3, and Dh4 formed on a first subpixel electrode 191Bh30 of a blue pixel electrode 191B30, widths S of micro branches 197 gradually increase in the arrow directions illustrated in FIG. 30 from about 2.8 μm to about 3.3 μm by a value falling within a range about 0.2 μm to about 0.5 μm, and widths W of micro slits 199 gradually increase from about 3.8 μm to about 4.0 μm. In accordance with an exemplary embodiment of the present invention, each of domains Dh1~Dh4, and Dl1~Dl4 is divided into a plurality of groups, which have micro branches with the same widths and micro slits with the same widths. In subdomains of domains Dl1, Dl2, Dl3, and Dl4 on second subpixel electrodes 191Rl30, 191Gl30, and 191Bl30 of pixel electrodes 191R30, 191G30, and 191B30 in the basic pixel group, widths S and W of micro branches 197 and micro slits 199 are about 3.0 μm, respectively. A width of each subdomain in each domain is about 27 μm, and an interval between adjacent subdomains in each domain is about 4.5 μm. Domains Dl3 and Dl4 formed on second subpixel electrodes 191Rl30, 191Gl30, and 191Bl30 may have subdomains in which widths S and W of most micro branches 197 and micro slits 199 are about 3.0 μm, and micro slits 199 include a width, for example, a width of about 4.5 μm, different from the width S of their adjacent micro slits 199, at intervals of a specific distance, for example, about 27 μm. In accordance with another exemplary embodiment of the present invention, micro branches 197 or micro slits 199 having a width greater than a width of their adjacent micro branches 197 or micro slits 199 may be formed in domains Dh1, Dh2, Dh3, Dh4, Dl1, Dl2, Dl3, and Dl4 constituting first or second subpixel electrode, at intervals of a specific distance. Zigzag unit lengths are about 10 μm in domains Dh1, Dh2, Dh3 and Dh4 formed on first subpixel electrodes 191Rh30, 191Gh30, and 191Bh30 of pixel electrodes 191R30, 191G30, and 191B30 in the basic pixel group, and about 7 μm in domains Dl1, Dl2, Dl3 and Dl4 formed on second subpixel electrodes 191Rl30, 191Gl30, and 191Bl30. Main directions and zigzag angles of micro branches 197 formed in domains of the basic pixel group are substantially similar to those described in connection with FIG. 29.

The basic pixel group PS having primary colors, the pixel electrodes 191R30, 191G30, and 191B30 including first subpixel electrodes 191Rh30, 191Gh30, and 191Bh30 and second subpixel electrodes 191Rl30, 191Bl30, and 191B130, the pixel electrodes divided into domains Dh1, Dh2, Dh3, Dh4, Dl1, Dl2, Dl3, and Dl4, the zigzag-shaped micro branches 197, and the area ratios of first subpixel electrodes to second subpixel electrodes are substantially similar to those described above or in connection with FIG. 28. The basic pixel group constructed with these pixel electrodes has the characteristics described in connection with FIG. 28. Pixel electrode junction connection portions formed on first and second subpixel electrodes 191Rh30, 191Gh30, 191Bh30, 191Rl30, 191Gl30, and 191Bl30 are similar to those described with reference to FIGS. 23F and 24C.

Figure 31:
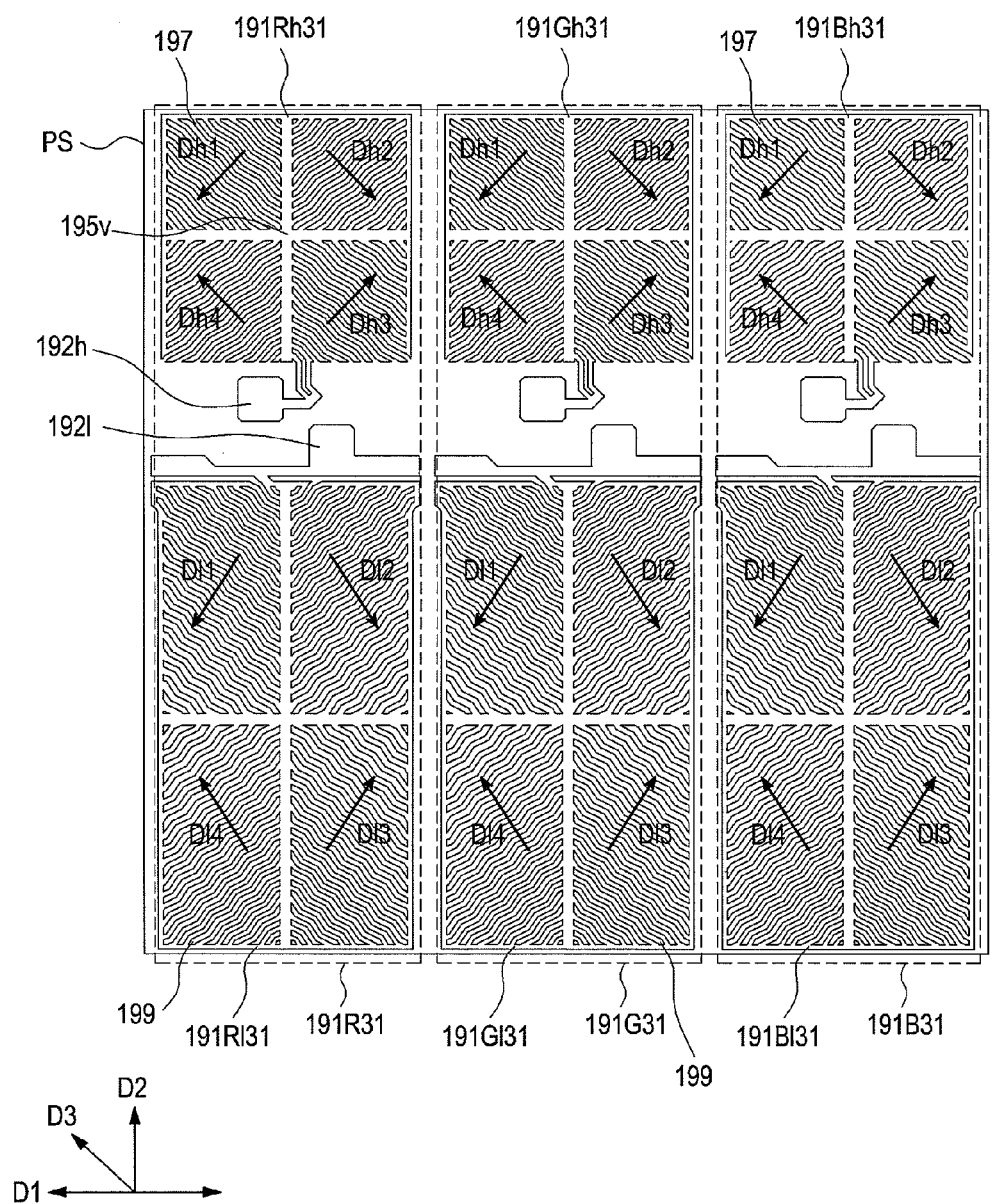
FIG. 31 is a plan view illustrating pixel electrodes of a pixel group of a liquid crystal display device according to another exemplary embodiment of the present invention.

In a basic pixel group PS illustrated in FIG. 31, main direction angles of micro branches 197 are greater in domains formed on second subpixel electrodes 191Rl31, 191Gl31, and 191Bl31 rather than in domains formed on first subpixel electrodes 191Rh31, 191Gh31, and 191Bh31 according to an exemplary embodiment of the present invention. In domains Dh1 and Dh2 on first subpixel electrodes 191Rh31, 191Gh31, and 191Bh31 of pixel electrodes 191R31, 191G31, and 191B31 in the basic pixel group, a zigzag unit length is about 14 μm, main direction angles of micro branches 197 are about 40.8°, and a zigzag angle is about 10°. In domains Dh3 and Dh4 thereof, a zigzag unit length is about 14 μm, main direction angles of micro branches 197 are about 39.2°, and a zigzag angle is about 10°. In domains Dl1 and Dl2 on second subpixel electrodes 191Rl31, 191Gl31, and 191Bl31 of pixel electrodes 191R31, 191G31, 191B31 in the basic pixel group, a zigzag unit length is about 10 μm, main direction angles of micro branches 197 are about 42°, and a zigzag angle is about 15°. In domains Dl3 and Dl4 thereof, a zigzag unit length is about 10 μm, main direction angles of micro branches 197 are about 41.3°, and a zigzag angle is about 15°. Main direction angles of micro branches 197 may be an angle with respect to the direction D1.

In domains Dh1, Dh2, Dh3, and Dh4 formed on first subpixel electrodes 191Rh31, and 191Gh31 of red and green pixel electrodes 191R31 and 191G31, widths S and W of micro branches 197 and micro slits 199 gradually increase in the arrow directions illustrated in FIG. 31 from about 2.8 μm to about 3.3 μm by a value falling within a range of about 0.2 μm to about 0.5 μm. In domains Dh1, Dh2, Dh3, and Dh4 formed on a first subpixel electrode 191Bh31 of a blue pixel electrode 191B31, widths S and W of micro branches 197 and micro slits 199 gradually increase in the arrow directions illustrated in FIG. 31 from 3.3 μm to about 3.7 μm by a value falling within a range of about 0.2 μm to about 0.5 μm. In domains Dl1, Dl2, Dl3, and Dl4 on second subpixel electrodes 191Rl31, 191Gl31, and 191Bl31 of pixel electrodes 191R31, 191G31, and 191B31, widths S and W of micro branches 197 and micro slits 199 gradually increase in the arrow directions illustrated in FIG. 31 from about 2.8 μm to about 3.9 μm by a value falling within a range of about 0.2 μm to about 0.5 μm. In accordance with an exemplary embodiment of the present invention, each of domains Dh1~Dh4, and Dl1~Dl4 is divided into a plurality of groups, which have micro branches with the same widths and micro slits with the same widths, and in which widths of micro branches and micro slits may increase along groups in the arrow directions. Other components are similar to those described in connection with FIG. 28, so a description thereof is omitted. Pixel electrode junction connection portions formed on first and second subpixel electrodes 191Rh31, 191Gh31, 191Bh31, 191Rl31, 191Gl31, and 191Bl31 are similar to those described with reference to FIG. 20C.

In accordance with another exemplary embodiment of the present invention, a basic pixel group PS illustrated in FIG. 32 includes four pixels PX having the structures described in connection with FIGS. 25 to 27B, in which longer sides of pixel electrodes are formed in parallel to a gate line 121. In accordance with an exemplary embodiment of the present invention, the four pixels PX illustrated in FIG. 32 have four different primary colors—red R, green G, blue B and white W—and include red, green, blue and white pixel electrodes 191R32, 191G32, 191B32 and 191W32. The pixel electrodes 191R32, 191G32, 191B32 and 191W32 include first subpixel electrodes 191Rh32, 191Gh32, 191Bh32, and 191Wh32, and second subpixel electrodes 191Rl32, 191Gl32, 191Bl32, and 191Wl32. Each of the first subpixel electrodes has four domain regions Dh1, Dh2, Dh3, and Dh4, and each of the second subpixel electrodes has four domain regions Dl1, Dl2, Dl3, and Dl4. First subpixel electrodes of the red, green and white pixel electrodes 191R32, 191G32 and 191W32 are equal in structure, and a first subpixel electrode of the blue pixel electrode 191B32 is different from the first subpixel electrodes of pixel electrodes having other colors. Widths S and W of micro branches 197 and micro slits 199 formed in domains of the first subpixel electrodes 191Rh32, 191Gh32 and 191Wh32 may fall within a range of about 5 μm to about 5.6 μm, and they may have different sizes in one domain. In accordance with an exemplary embodiment of the present invention, widths S and W of micro branches 197 and micro slits 199 formed in domains of first subpixel electrodes 191Rh32, 191Gh32 and 191Wh32 may gradually increase in the arrow directions illustrated in FIG. 32. Widths S and W of micro branches 197 and 199 formed in domains of a first subpixel electrode 191Bh32 may fall within a range of about 6 μm to about 6.8 μm, or may have different sizes. In accordance with an exemplary embodiment of the present invention, widths S and W of micro branches 197 and micro slits 199 formed in domains of the first subpixel electrode 191Bh32 may gradually increase in the arrow directions illustrated in FIG. 32. In accordance with an exemplary embodiment of the present invention, widths S of micro branches 197 formed in domains of the first subpixel electrode 191Bh32 are greater than widths S of micro branches 197 formed in domains of the first subpixel electrodes 191Rh32, 191Gh32 and 191Wh32. Widths W of micro slits 199 formed in domains of the first subpixel electrode 191Bh32 are greater than widths W of micro slits 199 formed in domains of the first subpixel electrodes 191Rh32, 191Gh32 and 191Wh32.

Second subpixel electrodes of the red, green and white pixel electrodes 191R32, 191G32 and 191W32 are equal in structure. Widths S and W of micro branches 197 and micro slits 199 formed in domains of second subpixel electrodes 191Rl32, 191Gl32, 191Bl32 and 191Wl32 may fall within a range of about 5 μm to about 6.8 μm, and they may have different sizes in one domain. Widths S and W of micro branches 197 and micro slits 199 may gradually increase in the arrow directions illustrated in FIG. 32. Main directions, zigzag angles and zigzag unit lengths of zigzag-shaped micro branches 197 are described below. In domains Dh1, Dh2, Dh3 and Dh4 formed on first subpixel electrodes 191Rh32, 191Gh32, 191Bh32, and 191Wh32 of pixel electrodes 191R32, 191G32, 191B32, and 191W32 in the basic pixel group, a zigzag unit length is about 14 μm, main direction angles of micro branches 197 may be about 40.8° or about 39.2°, and a zigzag angle may be about ±7°. In domains Dh1, Dh2, Dh3 and Dh4 formed on second subpixel electrodes 191Rl32, 191Gl32, 191Bl32, and 191Wl32, a zigzag length is about 10 μm, main direction angles of micro branches 197 may be about 42° or about 41.3°, and a zigzag angle may be about ±5°. The basic pixel group constructed with these pixel electrodes may not only have the characteristics of the basic pixel group described in connection with FIG. 28, but also improve transmittance of the liquid crystal display device. Pixel electrode junction connection portions formed on first subpixel electrodes 191Rh32, 191Gh32, 191Bh32, and 191Wh32 are similar to those described with reference to FIG. 23B, while pixel electrode junction connection portions formed on second subpixel electrodes 191Rl32, 191Gl32, 191Bl32, and 191Wl32 are connected to pixel electrode contact portions extending in the direction of a gate line, and are substantially similar to those described with reference to FIG. 23A. In accordance with another exemplary embodiment of the present invention, the primary colors may include red, green, blue and yellow colors.

Shapes of pixel electrodes, splitting of pixel electrodes, partitioning of domains, and structures of basic pixel groups will be described in detail below with reference to FIGS. 33A to 33I. For convenience of description, shapes of, pixel electrodes illustrated in FIGS. 33A to 33I may be represented by contours of pixel electrodes or splitting of pixel electrodes. Other parts of pixel electrodes, for example, pixel electrode contact portions, micro branches 197 and micro slits 199, will be described in FIGS. 33A to 33I, as well. The structures and methods described with reference to FIGS. 3, 5, 12, 14, 16, 17, 18, 20, 23, 24, 25 and 28 to 32, may be applied to pixel electrodes illustrated in FIGS. 33A to 33I.

First, shapes and splitting of pixel electrodes will be described in detail with reference to FIGS. 33A to 33F. Each of the pixel electrodes illustrated in FIGS. 33A to 33F includes a first subpixel electrode 191h and a second subpixel electrode 191l. Each of the subpixel electrodes 191h and 191l may receive a data voltage by the above-described data voltage reception method, and the first subpixel electrode 191h may be higher than the second subpixel electrode 191l in terms of the charging voltage thereon. Referring to FIG. 33A, a first subpixel electrode 191h has four domains, and a second subpixel electrode 191l has eight domains. In other words, the first subpixel electrode 191h has domains Dha, Dhb, Dhc and Dhd, and the second subpixel electrode 191l has domains Dla, Dlb, Dlc, Dld, Dle, Dlf, Dlg and Dlh. The structure of the second subpixel electrode 191l formed in this way may improve visibility of the liquid crystal display device. The second subpixel electrode 191l may be greater in area than the first subpixel electrode 191h. Domains thereof may have the above-described structure. Referring to FIGS. 33B to 33F, each of first and second subpixel electrodes 191h and 191l includes four domains. In other words, the first subpixel electrode 191h has domains Dha, Dhb, Dhc and Dhd, and the second subpixel electrode 191l has domains Dla, Dlb, Dlc and Dld. Sides of first and second subpixel electrodes 191h and 191l illustrated in FIG. 33B may be oblique lines extending in the direction of a data line 171. The oblique lines may be substantially in parallel to a transmission axis of a polarizer. Domains of the first and second subpixel electrodes 191h and 191l may be in the shape of a parallelogram. The pixel electrode formed in this way may improve visibility and transmittance of the liquid crystal display device. First and second subpixel electrodes 191h and 191l illustrated in FIGS. 33C to 33F are adjacent to each other by oblique sides thereof. The oblique directions may be substantially in parallel to a transmission axis of a polarizer. The structure of a pixel electrode formed in this way may improve the visibility and transmittance of the liquid crystal display device. In the structure of pixel electrodes illustrated in FIGS. 33D to 33F, any one of first and second subpixel electrodes 191h and 191l substantially accommodates the other one. If boundary sides between adjacent subpixel electrodes are large in area, or domains of first and second subpixel electrodes 191h and 191l are uniformly distributed in this manner, the visibility of the liquid crystal display device may be improved. A first subpixel electrode 191h illustrated in FIG. 33D is split into two, bordering on a second subpixel electrode 191l. A second subpixel electrode 191l illustrated in FIG. 33E substantially surrounds a first subpixel electrode 191h, and a first subpixel electrode 191h illustrated in FIG. 33F substantially surrounds a second subpixel electrode 191l. The second subpixel electrode 191l illustrated in FIG. 33F is diamond-shaped, and domains thereof are triangular.

Figure 33G:
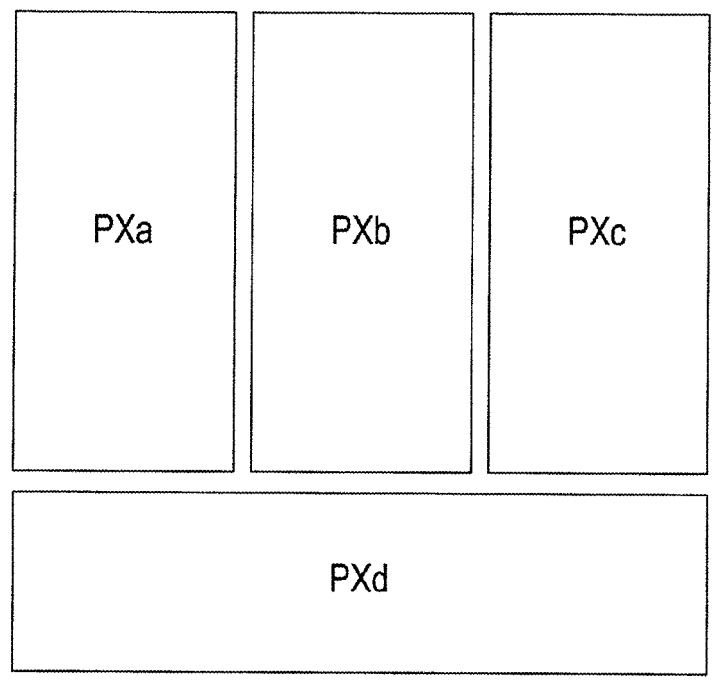
Figure 33H:
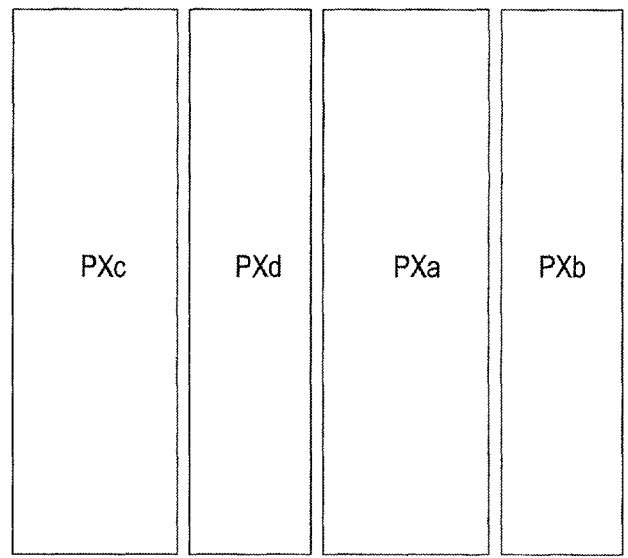
Figure 33I:
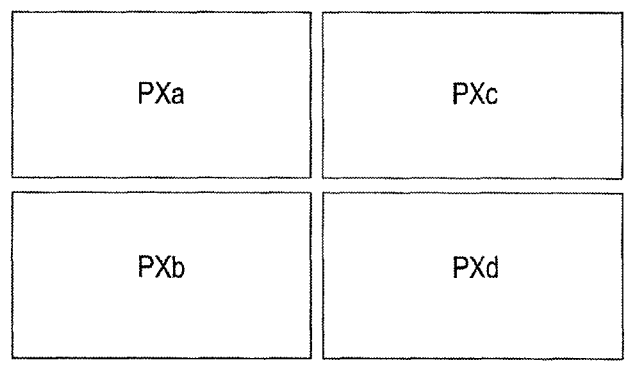

Structures of basic pixel groups PS will be described in detail below with reference to FIGS. 33G to 33I. Each of the basic pixel groups PS illustrated in FIGS. 33G to 33I includes four pixels PXa, PXb, PXc, and PXd having four different primary colors. The four primary colors may include red, green, blue and yellow or white colors. A pixel PXa may have a red color, a pixel PXb may have a green color, a pixel PXc may have a blue color, and a pixel PXd may have a yellow or white color. The basic pixel groups PS formed in this way may improve color reproducibility, transmittance and visibility of the liquid crystal display device. In accordance with another exemplary embodiment of the present invention, the primary colors may include a variety of colors as described above. The pixels PXa, PXb, PXc and PXd illustrated in FIG. 33G have red, green, blue and white colors in order, thereby improving transmittance of the liquid crystal display device. The pixels PXa, PXb, PXc and PXd illustrated in FIG. 33H have red, green, blue and yellow colors in order, thereby improving color reproducibility and display quality of the liquid crystal display device. In addition, to further improve color reproducibility and display quality of the liquid crystal display device, an area ratio of the red, green, blue and yellow pixels may be about 1.4 to about 1.8:1.0 to about 1.3:1.4 to about 1.8:1, more preferably about 1.6:1.1:1.6:1. The basic pixel group PS including pixels PXa, PXb, PXc and PXd illustrated in FIG. 33I is similar to that described in connection with FIG. 32. The pixels FIG. 33I may be substantially identical in area.

As is apparent from the foregoing description, the liquid crystal display device and the alignment film provided by the present invention may improve the alignment properties of liquid crystal molecules and the persistence of the liquid crystal display device, ensuring the excellent display quality of the liquid crystal display device.

While the present invention has been shown and described with reference to exemplary embodiments thereof, it will be understood by those skilled in the art that various changes in form and details may be made therein without departing from the spirit and scope of the present invention as defined by the appended claims.

What is claimed is:
1. A liquid crystal display device comprising:
 a liquid crystal layer comprising liquid crystal molecules interposed between a first display panel and a second display panel; and
 an alignment film formed on at least one of the first display panel and the second display panels, the alignment film comprising:

a first polysiloxane of a first layer;
a second polysiloxane of a second layer disposed on the first layer;
wherein a first portion of silicon atoms of the second polysiloxane is bonded to a vertical functional group interacting with the liquid crystal molecules in the liquid crystal layer;
wherein a second portion of silicon atoms of the second polysiloxane is bonded to a first pre-tilting functional group to cause the liquid crystal molecules in the liquid crystal layer to be tilted with respect to at least one of the first and second display panels;
wherein a third portion of the silicon atoms of the second polysiloxane is bonded to a second pre-tilting functional group cross-linked to the first pre-tilting functional group;
wherein the first polysiloxane and the second polysiloxane have different bonding structures; and
wherein the first polysiloxane is bonded to a phase separation enhancer.

2. The liquid crystal display device of claim 1, wherein a chain length of the first pre-tilting functional group is larger than a chain length of the second pre-tilting functional group.

3. The liquid crystal display device of claim 2, wherein the first chain length is from about 3 times to about 7 times the second chain length.

4. The liquid crystal display device of claim 3, wherein each of the first and second pre-tilting functional groups comprises one or more groups selected from a vinyl group, a styrene group, a methacrylate group, a cinnamate group and an acrylic group.

5. The liquid crystal display device of claim 4, wherein the first pre-tilting functional groups and the second pre-tilting functional groups are present in a mol % ratio in a range from about 2:1 to about 10:1.

6. The liquid crystal display device of claim 3, wherein the first pre-tilting functional group and the second pre-tilting functional group are present in a mol % ratio in a range from about 2:1 to about 10:1.

7. The liquid crystal display device of claim 1, wherein each of the first and second pre-tilting functional groups comprises one or more groups selected from a vinyl group, a styrene group, a methacrylate group, a cinnamate group and an acrylic group.

8. The liquid crystal display device of claim 7, wherein the first pre-tilting functional group and the second pre-tilting functional group are present in a mol % ratio in a range from about 2:1 to about 10:1.

9. The liquid crystal display device of claim 7, wherein the first pre-tilting functional group comprises an alkylacrylate group, an alkyl group of the alkylacrylate group having from 1 to about 5 carbon atoms, and the second pre-tilting functional group comprises a vinyl group.

10. The liquid crystal display device of claim 1, wherein the first pre-tilting functional group and the second pre-tilting functional group are present in a mol % ratio in a range from about 2:1 to about 10:1.

11. The liquid crystal display device of claim 10, wherein the first pre-tilting functional groups and the second pre-tilting functional groups are present in a mol % ratio in a range from about 1:3 to about 3:1.

12. The liquid crystal display device of claim 1, wherein the phase separation enhancer comprises a methyl group.

13. The liquid crystal display device of claim 1, wherein the vertical functional group, the first pre-tilting functional group, the second pre-tilting functional group, and the phase separation enhancer are present in a mol % ratio in a range from about 1:2:1:1 to about 3:10:3:3.

14. A liquid crystal display device comprising:
a liquid crystal layer comprising liquid crystal molecules interposed between a first display panel and a second display panel; and
an alignment film formed on at least one of the first display panel and the second display panel, the alignment film comprising:
a first polysiloxane of a first layer;
a second polysiloxane of a second layer disposed on the first layer;
wherein a first portion of silicon atoms of the second polysiloxane is bonded to a vertical functional group interacting with the liquid crystal molecules in the liquid crystal layer;
wherein a second portion of silicon atoms of the second polysiloxane is bonded to a first pre-tilting functional group to cause the liquid crystal molecules in the liquid crystal layer to be tilted with respect to at least one of the first and second display panels;
wherein the first polysiloxane and the second polysiloxane have different bonding structures; and
wherein the first polysiloxane is bonded to a phase separation enhancer.

15. The liquid crystal display device of claim 14, wherein the phase separation enhancer comprises a methyl group.

16. The liquid crystal display device of claim 15, wherein the vertical functional group, the first pre-tilting functional group, a second pre-tilting functional group cross-linked to the first pre-tilting group, and the phase separation enhancer are present in a mol % ratio in a range from about 1:2:1:1 to about 3:10:3:3.

17. The liquid crystal display device of claim 14, wherein the vertical functional group, the first pre-tilting functional group, a second pre-tilling functional group cross-linked to the first pre-tilting group, and the phase separation enhancer are present in a mol % ratio in a range from about 1:2:1:1 to about 3:10:3:3.

18. The liquid crystal display device of claim 14, wherein the vertical functional group, the first pre-tilting functional group, the second pre-tilting group, and the phase separation enhancer are present in a mol % ratio in a range from about 1:2:1:1 to about 3:10:3:3.

19. The liquid crystal display device of claim 14, wherein the second polysiloxane is bonded to a photoinitiator.

20. The liquid crystal display device of claim 19, wherein the photoinitiator comprises a thiol group and an alkyl group having from 1 to about 5 carbon atoms.

* * * * *